United States Patent [19]
Mizutani et al.

[11] Patent Number: 6,151,227
[45] Date of Patent: Nov. 21, 2000

[54] CONTROLLER FOR POWER CONVERTER

[75] Inventors: Mami Mizutani; Yasuhiko Miguchi, both of Tokyo, Japan

[73] Assignee: Kabushiki Kaisha Toshiba, Kawasaki, Japan

[21] Appl. No.: 09/128,660

[22] Filed: Aug. 4, 1998

[30]     Foreign Application Priority Data

| Aug. 4, 1997 | [JP] | Japan | 9-209337 |
| Nov. 21, 1997 | [JP] | Japan | 9-320698 |
| Nov. 27, 1997 | [JP] | Japan | 9-326366 |

[51] Int. Cl.$^7$ ................................. H02M 7/521
[52] U.S. Cl. ............................... 363/41; 363/42; 363/43; 363/71
[58] Field of Search .................. 363/16, 17, 27, 363/28, 65, 71, 72, 95, 96, 98, 132, 136, 41, 42, 43

[56]           References Cited

U.S. PATENT DOCUMENTS

| 4,167,775 | 9/1979 | Baker et al. | 363/42 |
| 5,132,892 | 7/1992 | Mizoguchi | 363/41 |
| 5,566,061 | 10/1996 | Uchino | 363/71 |
| 5,737,206 | 4/1998 | Yamamoto | 363/96 |

*Primary Examiner*—Jessica Han
*Attorney, Agent, or Firm*—Foley & Lardner

[57]           ABSTRACT

The controller for a power converter of the present invention:

calculates the range number in which the voltage command vector for a multi-level converter is present;

rotates the voltage command vector through a specified angle;

performs coordinate transformation of that vector to a vector in an oblique coordinate system which takes the vector in the a axis direction and a vector which has been rotated through a specified angle anti-clockwise from the a axis as two unit vectors;

splits the converter output-enabled portion of the vector diagram of the −30 degrees +30 degrees range of the spatial vector diagram in which output vector is positioned, which has undergone oblique coordinate transformation, into square-shape patterns so that the outputs vector is positioned in the upper left/the lower right/both the lower left and upper right of each square-shape pattern;

splits any square-shape pattern which holds the output vector in both its lower left and its upper right into two triangular domains by a segment which joins the upper left vertex and the lower right vertex;

judges in which square-shape pattern/triangular domain in the domain-split oblique coordinate system diagram the voltage command vector which has undergone oblique coordinate transformation is present; and selects, rotates through a specified angle and calculates the output vector which corresponds to that domain.

29 Claims, 87 Drawing Sheets

| vp | vq | vr | vpx | vqx |
|----|----|----|-----|-----|
| 0 | 0 | 0 | 0 | 0 |
| 0 | 0 | 1 | 1 | 1 |
| 0 | 1 | 0 | 1 | 1 |
| 0 | 1 | 1 | 1 | 1 |
| 0 | 2 | 0 | 0 | 3 |
| 0 | 2 | 1 | 0 | 3 |
| 0 | 3 | 0 | 0 | 3 |
| 0 | 3 | 1 | 1 | 4 |
| 0 | 4 | 0 | 1 | 4 |
| 0 | 4 | 1 | 1 | 4 |
| 0 | 5 | 0 | 0 | 6 |
| 0 | 5 | 1 | 0 | 6 |
| 0 | 6 | 0 | 0 | 6 |
| 0 | 6 | 1 | 0 | 6 |
| 1 | 0 | 0 | 1 | 1 |
| 1 | 0 | 1 | 1 | 1 |
| 1 | 1 | 0 | 1 | 1 |
| 1 | 1 | 1 | 2 | 2 |
| 1 | 2 | 0 | 2 | 2 |
| 1 | 2 | 1 | 2 | 2 |
| 1 | 3 | 0 | 1 | 4 |
| 1 | 3 | 1 | 1 | 4 |
| 1 | 4 | 0 | 1 | 4 |
| 1 | 4 | 1 | 2 | 5 |
| 1 | 5 | 0 | 2 | 5 |
| 1 | 5 | 1 | 2 | 5 |
| 1 | 6 | 0 | 2 | 5 |
| 1 | 6 | 1 | 2 | 5 |

| vp | vq | vr | vpx | vqx |
|----|----|----|-----|-----|
| 2 | 0 | 0 | 3 | 0 |
| 2 | 0 | 1 | 3 | 0 |
| 2 | 1 | 0 | 2 | 2 |
| 2 | 1 | 1 | 2 | 2 |
| 2 | 2 | 0 | 2 | 2 |
| 2 | 2 | 1 | 3 | 3 |
| 2 | 3 | 0 | 3 | 3 |
| 2 | 3 | 1 | 3 | 3 |
| 2 | 4 | 0 | 2 | 5 |
| 2 | 4 | 1 | 2 | 5 |
| 2 | 5 | 0 | 2 | 5 |
| 2 | 5 | 1 | 2 | 5 |
| 2 | 6 | 0 | 2 | 5 |
| 2 | 6 | 1 | 2 | 5 |
| 3 | 0 | 0 | 3 | 0 |
| 3 | 0 | 1 | 4 | 1 |
| 3 | 1 | 0 | 4 | 1 |
| 3 | 1 | 1 | 4 | 1 |
| 3 | 2 | 0 | 3 | 3 |
| 3 | 2 | 1 | 3 | 3 |
| 3 | 3 | 0 | 3 | 3 |
| 3 | 3 | 1 | 4 | 4 |
| 3 | 4 | 0 | 4 | 4 |
| 3 | 4 | 1 | 4 | 4 |
| 3 | 5 | 0 | 4 | 4 |
| 3 | 5 | 1 | 4 | 4 |
| 3 | 6 | 0 | 4 | 4 |
| 3 | 6 | 1 | 4 | 4 |

| vp | vq | vr | vpx | vqx |
|---|---|---|---|---|
| 4 | 0 | 0 | 4 | 1 |
| 4 | 0 | 1 | 4 | 1 |
| 4 | 1 | 0 | 4 | 1 |
| 4 | 1 | 1 | 5 | 2 |
| 4 | 2 | 0 | 5 | 2 |
| 4 | 2 | 1 | 5 | 2 |
| 4 | 3 | 0 | 4 | 4 |
| 4 | 3 | 1 | 4 | 4 |
| 4 | 4 | 0 | 4 | 4 |
| 4 | 4 | 1 | 4 | 4 |
| 4 | 5 | 0 | 4 | 4 |
| 4 | 5 | 1 | 4 | 4 |
| 4 | 6 | 0 | 4 | 4 |
| 4 | 6 | 1 | 4 | 4 |
| 5 | 0 | 0 | 6 | 0 |
| 5 | 0 | 1 | 6 | 0 |
| 5 | 1 | 0 | 5 | 2 |
| 5 | 1 | 1 | 5 | 2 |
| 5 | 2 | 0 | 5 | 2 |
| 5 | 2 | 1 | 5 | 2 |
| 5 | 3 | 0 | 4 | 4 |
| 5 | 3 | 1 | 4 | 4 |
| 5 | 4 | 0 | 4 | 4 |
| 5 | 4 | 1 | 4 | 4 |
| 5 | 5 | 0 | 4 | 4 |
| 5 | 5 | 1 | 4 | 4 |
| 5 | 6 | 0 | 4 | 4 |
| 5 | 6 | 1 | 4 | 4 |

| vp | vq | vr | vpx | vqx |
|---|---|---|---|---|
| 5 | 0 | 0 | 6 | 0 |
| 6 | 0 | 1 | 6 | 0 |
| 6 | 1 | 0 | 5 | 2 |
| 6 | 1 | 1 | 5 | 2 |
| 6 | 2 | 0 | 5 | 2 |
| 6 | 2 | 1 | 5 | 2 |
| 6 | 3 | 0 | 4 | 4 |
| 6 | 3 | 1 | 4 | 4 |
| 6 | 4 | 0 | 4 | 4 |
| 6 | 4 | 1 | 4 | 4 |
| 6 | 5 | 0 | 4 | 4 |
| 6 | 5 | 1 | 4 | 4 |
| 6 | 6 | 0 | 4 | 4 |
| 6 | 6 | 1 | 4 | 4 |

Fig.27

| vp | vq | vr | vpx | vqx | vvux | vvvx | vvwx |
|---|---|---|---|---|---|---|---|
| 0 | 0 | 0 | 0 | 0 | 0 | 0 | 0 |
| 0 | 0 | 1 | 1 | 1 | 1 | 0 | 0 |
| 0 | 1 | 0 | 1 | 1 | 1 | 0 | 0 |
| 0 | 1 | 1 | 1 | 1 | 1 | 0 | 0 |
| 0 | 2 | 0 | 0 | 3 | 2 | 1 | 0 |
| 0 | 2 | 1 | 0 | 3 | 2 | 1 | 0 |
| 0 | 3 | 0 | 0 | 3 | 2 | 1 | 0 |
| 0 | 3 | 1 | 1 | 4 | 3 | 1 | 0 |
| 0 | 4 | 0 | 1 | 4 | 3 | 1 | 0 |
| 0 | 4 | 1 | 1 | 4 | 3 | 1 | 0 |
| 0 | 5 | 0 | 0 | 6 | 4 | 2 | 0 |
| 0 | 5 | 1 | 0 | 6 | 4 | 2 | 0 |
| 0 | 6 | 0 | 0 | 6 | 4 | 2 | 0 |
| 0 | 6 | 1 | 0 | 6 | 4 | 2 | 0 |
| 1 | 0 | 0 | 1 | 1 | 1 | 0 | 0 |
| 1 | 0 | 1 | 1 | 1 | 1 | 0 | 0 |
| 1 | 1 | 0 | 1 | 1 | 1 | 0 | 0 |
| 1 | 1 | 1 | 2 | 2 | 2 | 0 | 0 |
| 1 | 2 | 0 | 2 | 2 | 2 | 0 | 0 |
| 1 | 2 | 1 | 2 | 2 | 2 | 0 | 0 |
| 1 | 3 | 0 | 1 | 4 | 3 | 1 | 0 |
| 1 | 3 | 1 | 1 | 4 | 3 | 1 | 0 |
| 1 | 4 | 0 | 1 | 4 | 3 | 1 | 0 |
| 1 | 4 | 1 | 2 | 5 | 4 | 1 | 0 |
| 1 | 5 | 0 | 2 | 5 | 4 | 1 | 0 |
| 1 | 5 | 1 | 2 | 5 | 4 | 1 | 0 |
| 1 | 6 | 0 | 2 | 5 | 4 | 1 | 0 |
| 1 | 6 | 1 | 2 | 5 | 4 | 1 | 0 |

| vp | vq | vr | vpx | vqx | vvux | vvvx | vvwx |
|---|---|---|---|---|---|---|---|
| 2 | 0 | 0 | 3 | 0 | 2 | 0 | 1 |
| 2 | 0 | 1 | 3 | 0 | 2 | 0 | 1 |
| 2 | 1 | 0 | 2 | 2 | 2 | 0 | 0 |
| 2 | 1 | 1 | 2 | 2 | 2 | 0 | 0 |
| 2 | 2 | 0 | 2 | 2 | 2 | 0 | 0 |
| 2 | 2 | 1 | 3 | 3 | 3 | 0 | 0 |
| 2 | 3 | 0 | 3 | 3 | 3 | 0 | 0 |
| 2 | 3 | 1 | 3 | 3 | 3 | 0 | 0 |
| 2 | 4 | 0 | 2 | 5 | 4 | 1 | 0 |
| 2 | 4 | 1 | 2 | 5 | 4 | 1 | 0 |
| 2 | 5 | 0 | 2 | 5 | 4 | 1 | 0 |
| 2 | 5 | 1 | 2 | 5 | 4 | 1 | 0 |
| 2 | 6 | 0 | 2 | 5 | 4 | 1 | 0 |
| 2 | 6 | 1 | 2 | 5 | 4 | 1 | 0 |
| 3 | 0 | 0 | 3 | 0 | 2 | 0 | 1 |
| 3 | 0 | 1 | 4 | 1 | 3 | 0 | 1 |
| 3 | 1 | 0 | 4 | 1 | 3 | 0 | 1 |
| 3 | 1 | 1 | 4 | 1 | 3 | 0 | 1 |
| 3 | 2 | 0 | 3 | 3 | 3 | 0 | 0 |
| 3 | 2 | 1 | 3 | 3 | 3 | 0 | 0 |
| 3 | 3 | 0 | 3 | 3 | 3 | 0 | 0 |
| 3 | 3 | 1 | 4 | 4 | 4 | 0 | 0 |
| 3 | 4 | 0 | 4 | 4 | 4 | 0 | 0 |
| 3 | 4 | 1 | 4 | 4 | 4 | 0 | 0 |
| 3 | 5 | 0 | 4 | 4 | 4 | 0 | 0 |
| 3 | 5 | 1 | 4 | 4 | 4 | 0 | 0 |
| 3 | 6 | 0 | 4 | 4 | 4 | 0 | 0 |
| 3 | 6 | 1 | 4 | 4 | 4 | 0 | 0 |

| vp | vq | vr | vpx | vqx | vvux | vvvx | vvwx |
|----|----|----|-----|-----|------|------|------|
| 4 | 0 | 0 | 4 | 1 | 3 | 0 | 1 |
| 4 | 0 | 1 | 4 | 1 | 3 | 0 | 1 |
| 4 | 1 | 0 | 4 | 1 | 3 | 0 | 1 |
| 4 | 1 | 1 | 5 | 2 | 4 | 0 | 1 |
| 4 | 2 | 0 | 5 | 2 | 4 | 0 | 1 |
| 4 | 2 | 1 | 5 | 2 | 4 | 0 | 1 |
| 4 | 3 | 0 | 4 | 4 | 4 | 0 | 0 |
| 4 | 3 | 1 | 4 | 4 | 4 | 0 | 0 |
| 4 | 4 | 0 | 4 | 4 | 4 | 0 | 0 |
| 4 | 4 | 1 | 4 | 4 | 4 | 0 | 0 |
| 4 | 5 | 0 | 4 | 4 | 4 | 0 | 0 |
| 4 | 5 | 1 | 4 | 4 | 4 | 0 | 0 |
| 4 | 6 | 0 | 4 | 4 | 4 | 0 | 0 |
| 4 | 6 | 1 | 4 | 4 | 4 | 0 | 0 |
| 5 | 0 | 0 | 6 | 0 | 4 | 0 | 2 |
| 5 | 0 | 1 | 6 | 0 | 4 | 0 | 2 |
| 5 | 1 | 0 | 5 | 2 | 4 | 0 | 1 |
| 5 | 1 | 1 | 5 | 2 | 4 | 0 | 1 |
| 5 | 2 | 0 | 5 | 2 | 4 | 0 | 1 |
| 5 | 2 | 1 | 5 | 2 | 4 | 0 | 1 |
| 5 | 3 | 0 | 4 | 4 | 4 | 0 | 0 |
| 5 | 3 | 1 | 4 | 4 | 4 | 0 | 0 |
| 5 | 4 | 0 | 4 | 4 | 4 | 0 | 0 |
| 5 | 4 | 1 | 4 | 4 | 4 | 0 | 0 |
| 5 | 5 | 0 | 4 | 4 | 4 | 0 | 0 |
| 5 | 5 | 1 | 4 | 4 | 4 | 0 | 0 |
| 5 | 6 | 0 | 4 | 4 | 4 | 0 | 0 |
| 5 | 6 | 1 | 4 | 4 | 4 | 0 | 0 |

| vp | vq | vr | vpx | vqx | vvux | vvvx | vvwx |
|----|----|----|-----|-----|------|------|------|
| 6 | 0 | 0 | 6 | 0 | 4 | 0 | 2 |
| 6 | 0 | 1 | 6 | 0 | 4 | 0 | 2 |
| 6 | 1 | 0 | 5 | 2 | 4 | 0 | 1 |
| 6 | 1 | 1 | 5 | 2 | 4 | 0 | 1 |
| 6 | 2 | 0 | 5 | 2 | 4 | 0 | 1 |
| 6 | 2 | 1 | 5 | 2 | 4 | 0 | 1 |
| 6 | 3 | 0 | 4 | 4 | 4 | 0 | 0 |
| 6 | 3 | 1 | 4 | 4 | 4 | 0 | 0 |
| 6 | 4 | 0 | 4 | 4 | 4 | 0 | 0 |
| 6 | 4 | 1 | 4 | 4 | 4 | 0 | 0 |
| 6 | 5 | 0 | 4 | 4 | 4 | 0 | 0 |
| 6 | 5 | 1 | 4 | 4 | 4 | 0 | 0 |
| 6 | 6 | 0 | 4 | 4 | 4 | 0 | 0 |
| 6 | 6 | 1 | 4 | 4 | 4 | 0 | 0 |

Fig.32

|    |    |    | VTH = 0 | | | VTH = 1 | | | VTH = 2 | | |
|----|----|----|-----|-----|-----|-----|-----|-----|-----|-----|-----|
| vp | vq | vr | vvu | vvv | vvw | vvu | vvv | vvw | vvu | vvv | vvw |
| 0 | 0 | 0 | 0 | 0 | 0 | 0 | 0 | 0 | 0 | 0 | 0 |
| 0 | 0 | 1 | 1 | 0 | 0 | 1 | 1 | 0 | 0 | 1 | 0 |
| 0 | 1 | 0 | 1 | 0 | 0 | 1 | 1 | 0 | 0 | 1 | 0 |
| 0 | 1 | 1 | 1 | 0 | 0 | 1 | 1 | 0 | 0 | 1 | 0 |
| 0 | 2 | 0 | 2 | 1 | 0 | 1 | 2 | 0 | 0 | 2 | 1 |
| 0 | 2 | 1 | 2 | 1 | 0 | 1 | 2 | 0 | 0 | 2 | 1 |
| 0 | 3 | 0 | 2 | 1 | 0 | 1 | 2 | 0 | 0 | 2 | 1 |
| 0 | 3 | 1 | 3 | 1 | 0 | 2 | 3 | 0 | 0 | 3 | 1 |
| 0 | 4 | 0 | 3 | 1 | 0 | 2 | 3 | 0 | 0 | 3 | 1 |
| 0 | 4 | 1 | 3 | 1 | 0 | 2 | 3 | 0 | 0 | 3 | 1 |
| 0 | 5 | 0 | 4 | 2 | 0 | 2 | 4 | 0 | 0 | 4 | 2 |
| 0 | 5 | 1 | 4 | 2 | 0 | 2 | 4 | 0 | 0 | 4 | 2 |
| 0 | 6 | 0 | 4 | 2 | 0 | 2 | 4 | 0 | 0 | 4 | 2 |
| 0 | 6 | 1 | 4 | 2 | 0 | 2 | 4 | 0 | 0 | 4 | 2 |
| 1 | 0 | 0 | 1 | 0 | 0 | 1 | 1 | 0 | 0 | 1 | 0 |
| 1 | 0 | 1 | 1 | 0 | 0 | 1 | 1 | 0 | 0 | 1 | 0 |
| 1 | 1 | 0 | 1 | 0 | 0 | 1 | 1 | 0 | 0 | 1 | 0 |
| 1 | 1 | 1 | 2 | 0 | 0 | 2 | 2 | 0 | 0 | 2 | 0 |
| 1 | 2 | 0 | 2 | 0 | 0 | 2 | 2 | 0 | 0 | 2 | 0 |
| 1 | 2 | 1 | 2 | 0 | 0 | 2 | 2 | 0 | 0 | 2 | 0 |
| 1 | 3 | 0 | 3 | 1 | 0 | 2 | 3 | 0 | 0 | 3 | 1 |
| 1 | 3 | 1 | 3 | 1 | 0 | 2 | 3 | 0 | 0 | 3 | 1 |
| 1 | 4 | 0 | 3 | 1 | 0 | 2 | 3 | 0 | 0 | 3 | 1 |
| 1 | 4 | 1 | 4 | 1 | 0 | 3 | 4 | 0 | 0 | 4 | 1 |

Fig.40

| Sx | +2 | +1 | 0 | -1 | -2 |
|----|----|----|----|----|----|
| P1 | ON | OFF | OFF | OFF | OFF |
| P2 | ON | ON | OFF | OFF | OFF |
| P3 | ON | ON | ON | OFF | OFF |
| P4 | ON | ON | ON | ON | OFF |
| N1 | OFF | ON | ON | ON | ON |
| N2 | OFF | OFF | ON | ON | ON |
| N3 | OFF | OFF | OFF | ON | ON |
| N4 | OFF | OFF | OFF | OFF | ON |

*Fig. 42(a)*

| | U PHASE | V PHASE | W PHASE |
|---|---|---|---|
| x | u | v | w |
| P | U | V | W |
| N | X | Y | Z |

*Fig. 42(b)*

THE CHARACTER X, P AND N IN THE TABLE AT THE LEFT ARE SUBSTITUTED IN THE COMBINATIONS AT RIGHT ACCORDING TO PHASE

| vp | vq | vr | vpx | vqx | SSux | SSvx | SSwx |
|----|----|----|-----|-----|------|------|------|
| 0 | 0 | 0 | 0 | 0 | 2 | 2 | 2 |
| 0 | 0 | 1 | 1 | 1 | 2 | 1 | 1 |
| 0 | 1 | 0 | 1 | 1 | 2 | 1 | 1 |
| 0 | 1 | 1 | 1 | 1 | 2 | 1 | 1 |
| 0 | 2 | 0 | 0 | 3 | 2 | 1 | 0 |
| 0 | 2 | 1 | 0 | 3 | 2 | 1 | 0 |
| 0 | 3 | 0 | 0 | 3 | 2 | 1 | 0 |
| 0 | 3 | 1 | 1 | 4 | 2 | 0 | -1 |
| 0 | 4 | 0 | 1 | 4 | 2 | 0 | -1 |
| 0 | 4 | 1 | 1 | 4 | 2 | 0 | -1 |
| 0 | 5 | 0 | 0 | 6 | 2 | 0 | -2 |
| 0 | 5 | 1 | 0 | 6 | 2 | 0 | -2 |
| 0 | 6 | 0 | 0 | 6 | 2 | 0 | -2 |
| 0 | 6 | 1 | 0 | 6 | 2 | 0 | -2 |
| 1 | 0 | 0 | 1 | 1 | 2 | 1 | 1 |
| 1 | 0 | 1 | 1 | 1 | 2 | 1 | 1 |
| 1 | 1 | 0 | 1 | 1 | 2 | 1 | 1 |
| 1 | 1 | 1 | 2 | 2 | 2 | 0 | 0 |
| 1 | 2 | 0 | 2 | 2 | 2 | 0 | 0 |
| 1 | 2 | 1 | 2 | 2 | 2 | 0 | 0 |
| 1 | 3 | 0 | 1 | 4 | 2 | 0 | -1 |
| 1 | 3 | 1 | 1 | 4 | 2 | 0 | -1 |
| 1 | 4 | 0 | 1 | 4 | 2 | 0 | -1 |
| 1 | 4 | 1 | 2 | 5 | 2 | -1 | -2 |
| 1 | 5 | 0 | 2 | 5 | 2 | -1 | -2 |
| 1 | 5 | 1 | 2 | 5 | 2 | -1 | -2 |
| 1 | 6 | 0 | 2 | 5 | 2 | -1 | -2 |
| 1 | 6 | 1 | 2 | 5 | 2 | -1 | -2 |

*Fig.49*

| vp | vq | vr | vpx | vqx | SSux | SSvx | SSwx |
|---|---|---|---|---|---|---|---|
| 2 | 0 | 0 | 3 | 0 | 2 | 0 | 1 |
| 2 | 0 | 1 | 3 | 0 | 2 | 0 | 1 |
| 2 | 1 | 0 | 2 | 2 | 2 | 0 | 0 |
| 2 | 1 | 1 | 2 | 2 | 2 | 0 | 0 |
| 2 | 2 | 0 | 2 | 2 | 2 | 0 | 0 |
| 2 | 2 | 1 | 3 | 3 | 2 | -1 | -1 |
| 2 | 3 | 0 | 3 | 3 | 2 | -1 | -1 |
| 2 | 3 | 1 | 3 | 3 | 2 | -1 | -1 |
| 2 | 4 | 0 | 2 | 5 | 2 | -1 | -2 |
| 2 | 4 | 1 | 2 | 5 | 2 | -1 | -2 |
| 2 | 5 | 0 | 2 | 5 | 2 | -1 | -2 |
| 2 | 5 | 1 | 2 | 5 | 2 | -1 | -2 |
| 2 | 6 | 0 | 2 | 5 | 2 | -1 | -2 |
| 2 | 6 | 1 | 2 | 5 | 2 | -1 | -2 |
| 3 | 0 | 0 | 3 | 0 | 2 | 0 | 1 |
| 3 | 0 | 1 | 4 | 1 | 2 | -1 | 0 |
| 3 | 1 | 0 | 4 | 1 | 2 | -1 | 0 |
| 3 | 1 | 1 | 4 | 1 | 2 | -1 | 0 |
| 3 | 2 | 0 | 3 | 3 | 2 | -1 | -1 |
| 3 | 2 | 1 | 3 | 3 | 2 | -1 | -1 |
| 3 | 3 | 0 | 3 | 3 | 2 | -1 | -1 |
| 3 | 3 | 1 | 4 | 4 | 2 | -2 | -2 |
| 3 | 4 | 0 | 4 | 4 | 2 | -2 | -2 |
| 3 | 4 | 1 | 4 | 4 | 2 | -2 | -2 |
| 3 | 5 | 0 | 4 | 4 | 2 | -2 | -2 |
| 3 | 5 | 1 | 4 | 4 | 2 | -2 | -2 |
| 3 | 6 | 0 | 4 | 4 | 2 | -2 | -2 |
| 3 | 6 | 1 | 4 | 4 | 2 | -2 | -2 |

*Fig.50*

| vp | vq | vr | vpx | vqx | SSux | SSvx | SSwx |
|---|---|---|---|---|---|---|---|
| 4 | 0 | 0 | 4 | 1 | 2 | -1 | 0 |
| 4 | 0 | 1 | 4 | 1 | 2 | -1 | 0 |
| 4 | 1 | 0 | 4 | 1 | 2 | -1 | 0 |
| 4 | 1 | 1 | 5 | 2 | 2 | -2 | -1 |
| 4 | 2 | 0 | 5 | 2 | 2 | -2 | -1 |
| 4 | 2 | 1 | 5 | 2 | 2 | -2 | -1 |
| 4 | 3 | 0 | 4 | 4 | 2 | -2 | -2 |
| 4 | 3 | 1 | 4 | 4 | 2 | -2 | -2 |
| 4 | 4 | 0 | 4 | 4 | 2 | -2 | -2 |
| 4 | 4 | 1 | 4 | 4 | 2 | -2 | -2 |
| 4 | 5 | 0 | 4 | 4 | 2 | -2 | -2 |
| 4 | 5 | 1 | 4 | 4 | 2 | -2 | -2 |
| 4 | 6 | 0 | 4 | 4 | 2 | -2 | -2 |
| 4 | 6 | 1 | 4 | 4 | 2 | -2 | -2 |
| 5 | 0 | 0 | 6 | 0 | 2 | -2 | 0 |
| 5 | 0 | 1 | 6 | 0 | 2 | -2 | 0 |
| 5 | 1 | 0 | 5 | 2 | 2 | -2 | -1 |
| 5 | 1 | 1 | 5 | 2 | 2 | -2 | -1 |
| 5 | 2 | 0 | 5 | 2 | 2 | -2 | -1 |
| 5 | 2 | 1 | 5 | 2 | 2 | -2 | -1 |
| 5 | 3 | 0 | 4 | 4 | 2 | -2 | -2 |
| 5 | 3 | 1 | 4 | 4 | 2 | -2 | -2 |
| 5 | 4 | 0 | 4 | 4 | 2 | -2 | -2 |
| 5 | 4 | 1 | 4 | 4 | 2 | -2 | -2 |
| 5 | 5 | 0 | 4 | 4 | 2 | -2 | -2 |
| 5 | 5 | 1 | 4 | 4 | 2 | -2 | -2 |
| 5 | 6 | 0 | 4 | 4 | 2 | -2 | -2 |
| 5 | 6 | 1 | 4 | 4 | 2 | -2 | -2 |

*Fig.51*

| vp | vq | vr | vpx | vqx | SSux | SSvx | SSwx |
|---|---|---|---|---|---|---|---|
| 6 | 0 | 0 | 6 | 0 | 2 | -2 | 0 |
| 6 | 0 | 1 | 6 | 0 | 2 | -2 | 0 |
| 6 | 1 | 0 | 5 | 2 | 2 | -2 | -1 |
| 6 | 1 | 1 | 5 | 2 | 2 | -2 | -1 |
| 6 | 2 | 0 | 5 | 2 | 2 | -2 | -1 |
| 6 | 2 | 1 | 5 | 2 | 2 | -2 | -1 |
| 6 | 3 | 0 | 4 | 4 | 2 | -2 | -2 |
| 6 | 3 | 1 | 4 | 4 | 2 | -2 | -2 |
| 6 | 4 | 0 | 4 | 4 | 2 | -2 | -2 |
| 6 | 4 | 1 | 4 | 4 | 2 | -2 | -2 |
| 6 | 5 | 0 | 4 | 4 | 2 | -2 | -2 |
| 6 | 5 | 1 | 4 | 4 | 2 | -2 | -2 |
| 6 | 6 | 0 | 4 | 4 | 2 | -2 | -2 |
| 6 | 6 | 1 | 4 | 4 | 2 | -2 | -2 |

*Fig.52*

|    |    |    | VTH = 0 | | | VTH = 1 | | | VTH = 2 | | |
|----|----|----|-----|-----|-----|-----|-----|-----|-----|-----|-----|
| vp | vq | vr | SSu | SSv | SSw | SSu | SSv | SSw | SSu | SSv | SSw |
| 0 | 0 | 0 | 2 | 2 | 2 | -2 | -2 | -2 | 2 | 2 | 2 |
| 0 | 0 | 1 | 2 | 1 | 1 | -1 | -1 | -2 | 1 | 2 | 1 |
| 0 | 1 | 0 | 2 | 1 | 1 | -1 | -1 | -2 | 1 | 2 | 1 |
| 0 | 1 | 1 | 2 | 1 | 1 | -1 | -1 | -2 | 1 | 2 | 1 |
| 0 | 2 | 0 | 2 | 1 | 0 | -1 | 0 | -2 | 0 | 2 | 1 |
| 0 | 2 | 1 | 2 | 1 | 0 | -1 | 0 | -2 | 0 | 2 | 1 |
| 0 | 3 | 0 | 2 | 1 | 0 | -1 | 0 | -2 | 0 | 2 | 1 |
| 0 | 3 | 1 | 2 | 0 | -1 | 0 | 1 | -2 | -1 | 2 | 0 |
| 0 | 4 | 0 | 2 | 0 | -1 | 0 | 1 | -2 | -1 | 2 | 0 |
| 0 | 4 | 1 | 2 | 0 | -1 | 0 | 1 | -2 | -1 | 2 | 0 |
| 0 | 5 | 0 | 2 | 0 | -2 | 0 | 2 | -2 | -2 | 2 | 0 |
| 0 | 5 | 1 | 2 | 0 | -2 | 0 | 2 | -2 | -2 | 2 | 0 |
| 0 | 6 | 0 | 2 | 0 | -2 | 0 | 2 | -2 | -2 | 2 | 0 |
| 0 | 6 | 1 | 2 | 0 | -2 | 0 | 2 | -2 | -2 | 2 | 0 |
| 1 | 0 | 0 | 2 | 1 | 1 | -1 | -1 | -2 | 1 | 2 | 1 |
| 1 | 0 | 1 | 2 | 1 | 1 | -1 | -1 | -2 | 1 | 2 | 1 |
| 1 | 1 | 0 | 2 | 1 | 1 | -1 | -1 | -2 | 1 | 2 | 1 |
| 1 | 1 | 1 | 2 | 0 | 0 | 0 | 0 | -2 | 0 | 2 | 0 |
| 1 | 2 | 0 | 2 | 0 | 0 | 0 | 0 | -2 | 0 | 2 | 0 |
| 1 | 2 | 1 | 2 | 0 | 0 | 0 | 0 | -2 | 0 | 2 | 0 |
| 1 | 3 | 0 | 2 | 0 | -1 | 0 | 1 | -2 | -1 | 2 | 0 |
| 1 | 3 | 1 | 2 | 0 | -1 | 0 | 1 | -2 | -1 | 2 | 0 |
| 1 | 4 | 0 | 2 | 0 | -1 | 0 | 1 | -2 | -1 | 2 | 0 |
| 1 | 4 | 1 | 2 | -1 | -2 | 1 | 2 | -2 | -2 | 2 | -1 |

Fig.53

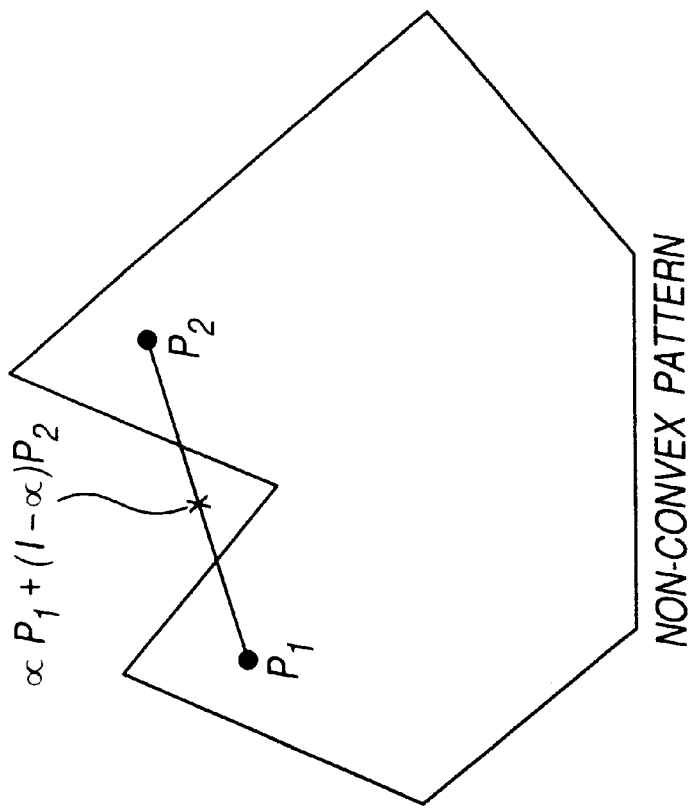
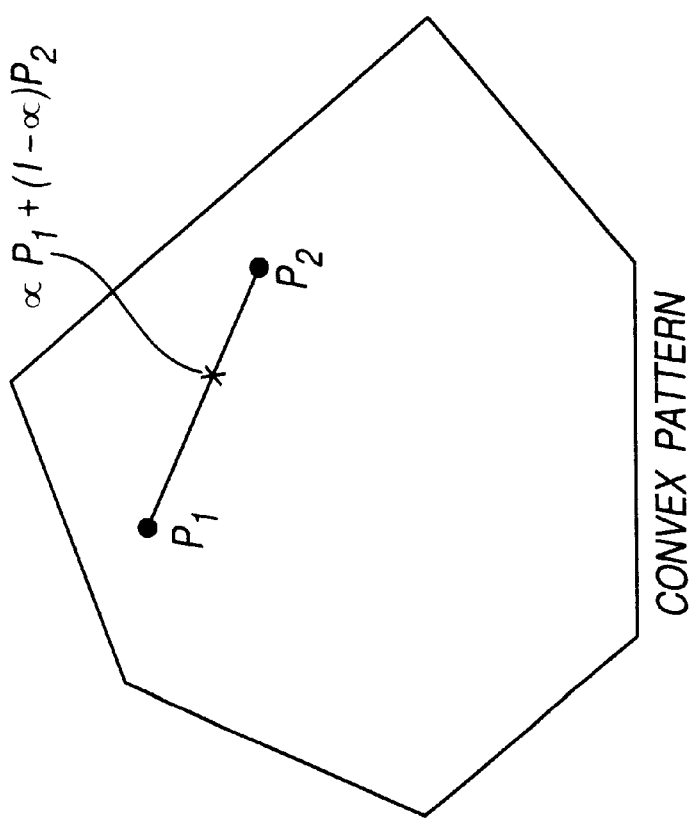
Fig. 71

| Su | Su1 | Su2 | Su3 | Su4 | Su5 | Su6 | Su7 | Su8 |
|---|---|---|---|---|---|---|---|---|
| 2  | on  | on  | on  | on  | off | off | off | off |
| 1  | off | on  | on  | on  | on  | off | off | off |
| 0  | off | off | on  | on  | on  | on  | off | off |
| -1 | off | off | off | on  | on  | on  | on  | off |
| -2 | off | off | off | off | on  | on  | on  | on  |

*Fig.82*

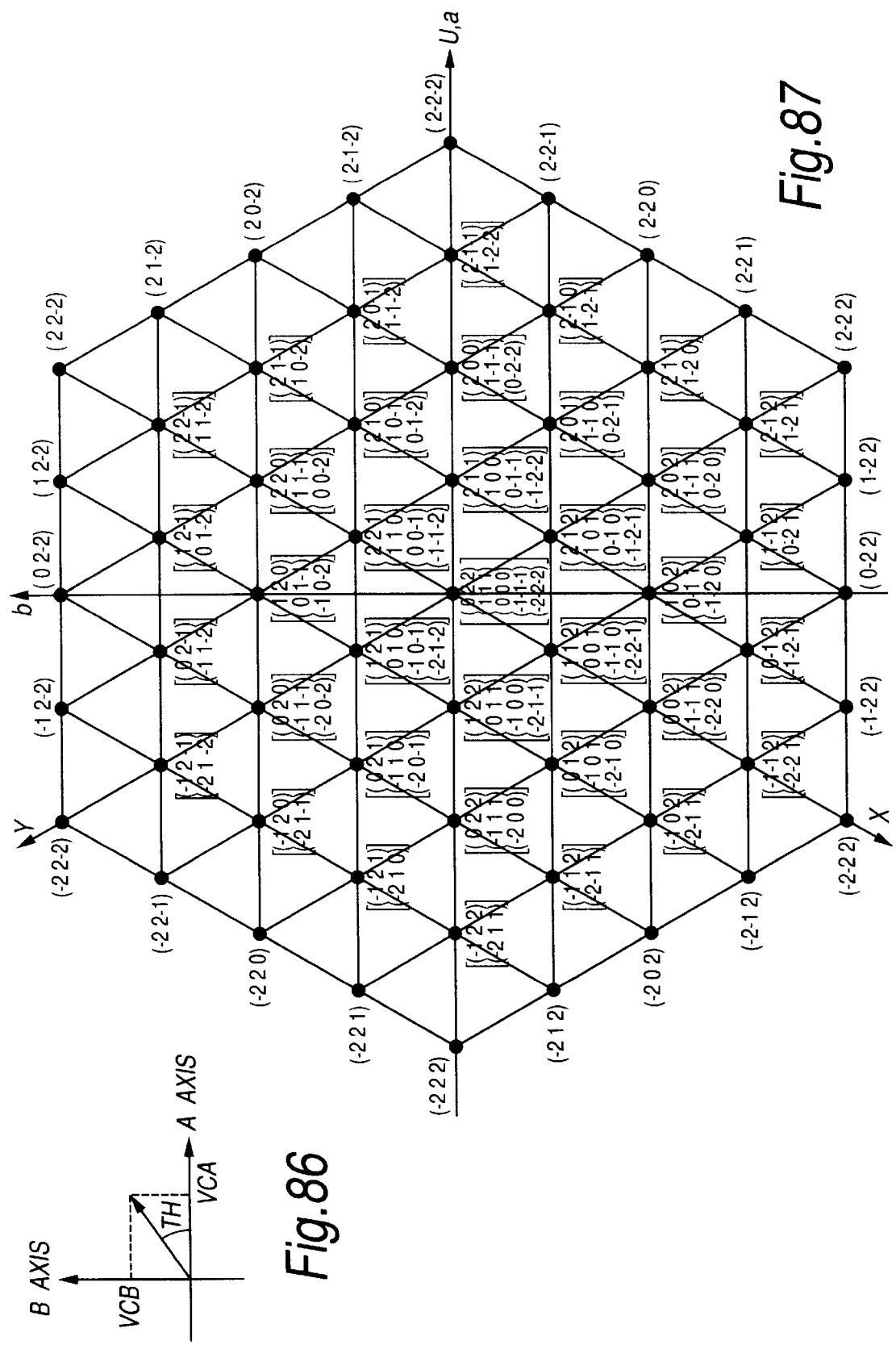

CONTROLLER FOR POWER CONVERTER

BACKGROUND OF THE INVENTION

1. Field of the Invention

The present invention relates to a controller for a power converter constituted by multiplexed converters, and more particularly, to a controller for a multi-level-output power converter capable of outputting four or more voltage levels, which is able to select an output vector closest to a power command vector at high speed and execute pulse width modulation (hereinafter, called PWM) control by spatial vector comparison at high speed, and which comprises means for implementing switching such that the output voltage is controlled to a sinusoidal wave form.

2. Description of the Related Art

FIG. 1 is a block diagram showing an example of the main circuit composition of a power converter comprising multiplexed (in the diagram, tour) voltage-type converters 5, 6, 7, 8. FIG. 2 gives circuit diagrams showing the composition of each converter 5–8.

In FIG. 1 and FIG. 2, the main circuit of the power converter comprises bridge-connected self-extinguishing type switching elements 9–32, and diodes D9–D32, which are connected respectively in antiparallel to each of the switching elements 9–32. A common DC power supply 4 is connected to the input side of each converter 5–8. 3-phase converters 133–136 are connected respectively to the output side of each converter 5–8, the secondary sides of the 3-phase converters 133–136 being connected mutually and also coupled via a successive resistance 137 and inductance to an AC load 139, such as an AC (motor, or the like.

The following description involves an example where gate turn off thyristors brow are used for the self-extinguishing type switching elements 9–32.

Furthermore, each combination of a GTO and a diode D connected in antiparallel to the GTO is termed an "arm". For example, the arm constituted by GTO9 and 9 is called arm 9, and the arm constituted by GTO10 and D10 is called arm 10. Depending on the direction of the AC current in each converter, current may flow on the diode side, even if the GTO is supplied with an ON gate. Whichever side the current flows, the arm is said to be "switched on".

Furthermore, in addition to the composition illustrated in FIG. 1, wherein DC is taken as a power supply 4 for the power converter consisting of multiplexed voltage-type converters, and the AC side comprises inverters carrying a load, a composition may also be adopted, wherein the AC side is taken as a power supply and the DC side comprises converters connected to a load. Since these compositions differ only with respect to terminology, and share many features relating to operation and technical problems, in the following description, both are treated as multiplex voltage-type converters, without a distinction being made therebetween.

On the other hand, in the prior art, there has been proposed a controller for such a power converter consisting of multiplexed voltage-type converters 5–8, which controls the ignition(firing) state of the self-extinguishing type switching elements in accordance with voltage commands.

FIG. 4 is a block diagram showing the function and sequence of a controller for a power converter of this kind.

Before describing the controller for a power converter illustrated in FIG. 4, an explanation will be given with regard to the voltage vectors which can be generated on the AC side by the four multiplexed voltage-type converters in FIG. 1.

FIG. 3 gives an illustration of output vectors which can be generated by the four multiplexed voltage-type converters.

In FIG. 3, the co-ordinate axes are indicated by U, V, W. For example, it arm 9, arm 10 and arm 11 of converter 5 are switched on, or if arm 12, arm 13 and arm 14 of converter 5 are switched on, the output voltage is zero and the voltage vector in this case is V0.

However, if arms 9, 13 and 14 are switched on, the voltage vector will be V1.

If arms 9, 10 and 14 are switched on, the voltage vector will be V2.

If arms 10, 12 and 14 are switched on, the voltage vector will be V3.

If arms 10, 11 and 12 are switched on, the voltage vector will be V4.

If arms 11, 12 and 13 are switched on, the voltage vector will be V5.

If arms 9, 11 and 13 are switched on, the voltage vector will be V6.

As described above, a single converter is capable of generating seven types of voltage vector: V0, V1, V2, V3, V4, V5 and V6.

FIG. 3 shows all the voltage vectors that can be generated by the four multiplexed voltage-type converters depicted in FIG. 2, and by using a combination of the four unit converters 5–8, it is possible to generate 61 different voltage vectors.

For example, vector V111 represents a stare where three of the converters are generating voltage vector V1 and one of the converters is generating vector V0. In the case of four multiplexed voltage-type converters, this may be written as V0111 or V1110, but for the sake of convenience, the foregoing notation is used.

Correspondingly, the vector 6611 represents a state where two converters are generating vector V6 and two converters are generating vector V1. This applies similarly to the other vectors.

Conventionally, when a voltage command vector for the AC output voltage of a power converter is supplied, an output vector which is closest to the voltage command vector is selected and this is generated by the power converter. In order to achieve this, in the prior art, a controller as illustrated in FIG. 4 has been proposed.

In FIG. 4, symbol 45 denotes an AC voltage command value generator, which generates AC voltage command values, and supplies the voltage command vector for the output voltage of a converter as components RVU1, RVV1 and RVW1 with respect to U, V, W co-ordinates. Here, RV stands for "Reference Voltage".

Symbol 46 denotes a 3-phase □ 2-phase converter comprising an adder and a multiplier, which converts the components RVU1, RVV1, RVW1 based on U, V, W co-ordinates to components RVA1, RVB1 based on A, B co-ordinates, by means of the calculations:

$$RVA1 = RVU1 - (RVV1 + RVW1)/2$$

$$RVB1 = (RVV1 - RVW1) * 1.732/2$$

Here, the A axis is parallel to the U axis, and the B axis is advanced by 90° from the A axis.

Furthermore, symbol 168 denotes an outputtable vector generator, which supplies all the output vector values which can be generated by the multiplexed converters, in the form of A axis, B axis co-ordinate value (VnA, VnB). Symbol 170, on the other hand, denotes a vector deviation detection circuit, which calculates the deviation between the $$Vdn = \sqrt{(RVA1 - VnA)^2 + (RVB1 - VnB)^2}$$

voltage command vector and the output vectors by means of the equation.

Moreover, 171 denotes a comparison and selection circuit, which compares the vector deviations calculated by vector deviation detection circuit 170 and selects the output vector Vn corresponding to the smaller of these.

Symbol 53 denotes a vector→3-phase converter, which generates a GTO switching pattern corresponding to the output vector Vn selected by comparison and selection circuit 171.

Furthermore, symbol 54 denotes a gate signal generator circuit, which generates GTO ignition pulses for multiplex converter 55 constituted by converters 5–8 in FIG. 2.

However, in the control device described above, in the case of four multiplexed converters, for example, only V0, V1, V2, V11, V12, V22, V111, V112, V122, V222, V1111, V1112, V1122, V1222, V2222 in the 0–60° angle range of the spatial vector diagram are taken as output vectors, and in the remaining range from 60–360°, it is necessary to calculate the deviation between the 15 output vectors and the voltage command vector, even it the angle is restored to the 0–60° range by rotation through an integral factor of –60°.

In this case, the calculation of the vector deviation involves multiplication and square root derivation, and the circuitry becomes extremely large in size if 15 multiplication, square root derivation and comparison circuits are implemented by hardware.

Furthermore, it these functions are implemented in a microcomputer or DSP (digital signal processor, the calculation time will be extremely long.

Moreover, a distinctive feature of spatial vector comparison PWM is that a low distortion factor, low switching loss and high-speed response are achieved by selecting the output vector closest to the voltage command vector at any one instant, but since the selection of the output vector takes time, there is a risk that performance will decline accordingly.

Moreover, if the multiplex number is increased, the number of output vectors will rise in proportion to the square of the multiplex number, thus presenting a problem in that calculation will take even more time.

As described above, in a prior art controller for a power converter, there has been a problem in that output vector selection requires a large amount of time, and hence performance is poor.

Next, a current-type converter is described. FIG. 5 is a diagram of the composition of a multiplex current-type converter.

In FIG. 5, converters A5–A8 for converting DC power to AC power are connected via capacitors A2–A4 to an AC load A1, their respective AC terminals being connected commonly to the AC load A1 such that they operate in parallel. Capacitors A2–A4 are used for absorbing switching surges in the converters A5–A8, and the converters A5–A8 are constituted by self-extinguishing type switching elements A9–A32. The following description involves a case where gate turn off thyristors (GTC) are used as the self-extinguishing type switching elements. DC power supplies A41–A44 are connected to converters A5–A8 via DC reactors A33–A40 which smooth the DC current. Here, it is assumed that DC power supplies A41–A44 are controlled uniformly.

A control circuit as illustrated in FIG. 6 has been proposed as a means for controlling the ignition state of the elements in such a multiplex current-type converter, as disclosed in the prior art in Japanese Laid-Open Patent Hei No. 7-135776.

Firstly, before describing FIG. 6, the current vectors which can be generated on the AC side by the four multiplexed converters in FIG. 5 are described with reference to FIG. 7.

In FIG. 7, the co-ordinate axes are represented by U, V and W. For example, if GTO A9 and GTO A12 of converter A5 are switched on and current is flowing from the U phase to the X phase, then the output current will be zero, and this is taken as I0. The current vector is taken as I1 when GTO A9 and GTO A14 are switched on and current is flowing from the U phase to Z phase; the current vector is taken as I2 when GTO A10 and GTO A14 are switched on and current is flowing from the V phase to Z phase; the current vector is taken as I3 when GTO A10 and GTO A12 are switched on and current is flowing from the V phase to X phase; the current vector is taken as I4 when STO A11 and GTO A12 are switched on and current is flowing from the W phase to X phase; the current vector is taken as is when GTO A11 and GTO A13 are switched on and current is flowing from the W phase to Y phase; and the current vector is taken as I6 when GTO A9 and CTO A13 are switched on and current is flowing from the U phase to Y phase. In this way, a single converter is capable of generating seven current vectors: I0, I1, I2, I3, I4, I5, I6. FIG. 7 shows all the current vectors that can be generated by the four multiplexed current-type converters illustrated in FIG. 5, and by using a combination of four unit converters, it is possible to generate 61 different current vectors. For example, vector I1111 represents a state where three of the converters are generating current vector I1 and one converter is generating vector I0. Vector I6611 represents a state where two converters are generating vector I6 and two converters are generating vector I1. This applies similarly to the other vectors.

The essence of a prior art multiplex converter is that when a command vector for the AC output current of the converter is supplied, the outputtable current vector which is closest to the command value vector is selected and this is generated by the converter. As illustrated in FIG. 7, selecting the outputtable vector which is closest to the command value vector is equivalent to splitting the spatial vector diagram into hexagonal domains, each surrounding one of the outputtable vectors, and selecting the vector corresponding to the domain in which the command value vector is located. The control circuit shown in FIG. 6 operates in accordance with a vector selection algorithm based on this domain splitting.

In FIG. 6, the AC current command value generator A45 supplies the output current command value vector of the converter in the form of components RIU1, RIV1 and R1W1 based on U, V, W co-ordinates. The 3-phase→2-phase converter A46 constituted by an adder and multiplier converts the components RIU1, RIV1 and R1W1 based on U, V, W co-ordinates to components RIA1, RIB1 based on A, B co-ordinates, by means of the following calculations.

RIA1=RIU1−(RIV1+RIW1)/2

RIB1=(RIV1−RIW1)*1.732/2

Here, the A axis is parallel to the U axis and the B axis is advanced by 90° with respect to the A axis.

Outputtable vector generator A47 supplies all the outputtable vector values which can be generated by the multiplexed converters in the form, of A axis, B axis co-ordinate values (InA,InB). Domain splitting spatial vector diagram generator A48 generates a spatial vector diagram which is split into domains as illustrated in FIG. 7. Domain judgement and vector selection circuit A49 judges which domain of the domain splitting spatial vector diagram contains the command value vector (RIA1,RIB1) and selects the output vector In corresponding to this domain, Vector→3-phase converter A50 generates a GTO switching pattern corresponding to the outputtable vector In selected by the domain judgement and vector selection circuit A49. Gate signal generating circuit A51 generates a GTO ignition pulse for a multiplex converter A52 constituted by converters A5–A8 shown in FIG. 5.

Moreover, in addition to the composition illustrated in FIG. 5 where DC is taken as the power supply and the AC side comprises inverters carrying a load, a composition may also be adopted for the multiplex current-type converter, wherein the AC side is taken as the power supply and the DC side comprises converters connected to a load. These compositions differ only with respect to terminology, and share many features relating to operation and technical problems. Since the problems to be resolved by the present invention are also the same, both are treated as multiplex current-type converters, without a distinction being made therebetween.

The description below refers to FIG. 8, which extracts the 0–60° angle portion of FIG. 7. Here, an "enlarged" view is given to aid visibility, and the generality of the PWM method described below is not reduced in any way thereby.

FIG. 8 relates to a case where a command vector Ir moves from a domain enclosing I111 to a domain enclosing I112.

When the converter output current changes from I111 to I112, the output current will fluctuate with capacitor and motor lag inductance. In a current type inverter, resonance suppression control is usually provided in order to restrict resonance due to capacitor and motor lag inductance. Resonance suppression control seeks to restrict fluctuations in the output current, and therefore it draws back the command vector, which consequently enters the domain of I111. When the converter outputs the current I111 again, the resonance suppression control will act in the opposite direction, causing the current command vector to move in the direction of I112. After repeating this process a number of times, the current command vector stabilizes at I112. This effect is illustrated in FIG. 9.

When "chattering" of this kind occurs, the number of GTO switching operations increases and the power loss associated with switching becomes large.

One method for reducing chattering is to reduce the gain of the resonance suppression control, but if the gain is reduced too far, the original resonance control function will be inadequate and transient response will also deteriorate.

Next, a multi-level-output power converter will be described.

FIG. 10 is a circuit diagram showing one example of the composition of the main circuit of a multi-level-output power converter, to which the present invention applies.

Here, a 5-level-output 3-phase power converter capable of outputting the voltages +2E, +E, 0, −E, −2E is described.

In FIG. 10, U, V and X denote U-phase, V-phase and W-phase single-phase power converters, respectively.

Moreover, Su1–Su8, Sv1–Sv8, Sw1–Sw8 are self-extinguishing elements; Du1–Du8, Dv1–Dv8, Dw1–Dw8 are diodes connected in antiparallel to the self-extinguishing elements Su1–Su8, Sv1–Sv8, Sw1–Sw8; DCu1–Dcu6, Dcv1–Dcv6, Dcw1–Dcw6 are clamping diodes; E1 is a split voltage source between the first terminal and second terminal of a DC voltage source E; E2 is a split voltage source between the second terminal and third terminal of the DC voltage source E, E3 is a split voltage source between the third terminal and fourth terminal of the DC voltage source E; and E4 is a split voltage source between the fourth terminal and fifth terminal of the DC voltage source E.

In a 5-level-output 3--phase power converter constituted as described above, for example, between the self-extinguishing elements Su4 and Su5 of the U-phase power converter in U, a voltage of +E1+E2 (assuming E1=E2=E3=E4=E, then a voltage level of +2E) is output when the self-extinguishing elements Su1–Su4 are on, a voltage of +E2 (assuming same, then a voltage level of E) is output when then self-extinguishing elements su2–Su5 are on, a voltage of 0 is output when the self-extinguishing elements Su3–Su6 are on, a voltage of −E3 (voltage level of −E) is output when self-extinguishing elements Su4–Su7 are on, and a voltage of −E3–E4 (voltage level of −2E) is output when self-extinguishing elements Su5–Su8 are on, thereby enabling five voltage levels, +2E, +E, G, −E, −2E to be output.

In a five-level output inverter, if the self-extinguishing elements Su1–su5 are on simultaneously, for example, then the DC voltage E1 will short between the self-extinguishing elements Su1–Su5 and the clamping diode, and hence an excessive shorting current will flow through the self-extinguishing elements, causing them to break down.

Therefore, in order to prevent this, self-extinguishing elements Su1 and Su5, Su2 and Su6, Su4 and Su8 are controlled such that they operate inversely with respect to each other.

Similar operations are adopted in the V-phase power converter in V and the W-phase power converter in W.

FIG. 11 is a block diagram showing an example of the composition of a prior art controller for controlling a 5-level-output 3-phase power converter as illustrated in FIG. 10.

In FIG. 11, B11–B13 are current detectors for detecting the 3-phase output currents; B14 is a 3-phase load, such as a motor; and B15 is a current controlling circuit, which calculates voltage commands for the power converter for each phase U–W, from current commands and the output currents detected by the current detectors B11–B13.

B16 is a triangular wave generator circuit; and B17 is a comparison circuit, which compares the output from triangular wave generating circuit B16 with the voltage command represented by the output from current control circuit B15, and outputs a command signal switching the self-extinguishing elements constituting the main circuits of the phase power converters U–W on or off. Furthermore, B18 is a gate pulse generator circuit, which uses the command signal from comparison circuit B17 to generate a gate pulse signal for switching the self-extinguishing elements in the phase converters U–W on and off.

FIG. 12 is a wave diagram of a case where a 5-level-output 3-phase power converter is controlled by a control device as shown in FIG. 11.

The following description relates to a case where a 5-level-output 3-phase power converter is controlled by a conventional triangular wave comparison PWM method.

The torque current command corresponding to the 3-phase load B14 in FIG. 11 is taken as the q axis current command Iq*. By performing a 3-phase→2-phase conversion with respect to the output currents Iu, Iv, Iw of phases U, V, W detected by current detectors B11–B13, the final q axis current Iq and d axis current Id are calculated. Current control is applied to the q axis current Tq and the d axis current Id, such that they follow the command values.

Thereby, since the q axis voltage command Vq* and d axis voltage command Vd* are derived, a 2-phase→3-phase conversion is performed to calculate the 3-phase voltage commands Vu*, Vv*, Vw*. A gate signal is obtained by comparing these 3-phase voltage commands Vu*, Vv*, Vw* with the triangular wave carrier signals CAR1–CAR4 from the triangular wave generator 16.

In other words, in the case of the U-phase voltage command Vu*, if Vu*>CAR1, then a gate signal, whereby self-extinguishing elements Su5, Su2, Su3 and Su4 are switched on and self-extinguishing elements Su1, Su6, Su7 and Su8 are switched off, is output.

If CAR1>Vu*>CAR2, then a gate signal, whereby self-extinguishing elements Su2, Su3, Su4 and Su5 are switched on and self-extinguishing elements Su1, Su6, Su7 and Su8 are switched off, is output.

If CAR2>Vu*>CAR3, then a gate signal, whereby self-extinguishing elements Su3, Su4, Su5, Su6 are switched on and self-extinguishing elements Su1, Su2, Su7, Su8 are switched off, is output.

If CAR3>Vu*>CAR4, then a gate signal, whereby self-extinguishing elements Su4. Su5, Su6, 5u7 are switched on and self-extinguishing elements Su1, Su2, Su3, Su8 are switched off, is output.

If CAR4>Vu*, then a gate signal, whereby self-extinguishing elements Su5, Su6, Su7, Su8 are switched on and self-extinguishing elements Su1, Su2, Su3, Su4 are switched off, is output.

Similar switching control to that for the U phase is implemented for the V phase and W phase also.

By implementing switching control as described above, a 3-phase output voltage Vu, Vv, Vw having five levels, +2E, +E, 0, −E, −2E, can be obtained.

FIG. 13 is a circuit diagram showing a further example of the composition of the rain circuit of a multi-level-output 3-phase power converter, to which the present invention applies.

This illustration relates to 7-level-output 3-phase power converter which combines unit cell inverters.

A 7-level-output 3-phase power converter having the composition shown in FIG. 13 is described in P. W. Hammond: "A New Approach to Enhance Power Quality for Medium Voltage AC Drive", IEEE trans. on I.A., 1997.

FIG. 13, B201 is a 3-phase AC power supply; B202 is a power supply switch, such as a contactor, circuit breaker, or the like, for switching AC supply B201 on and off; B203 is a transformer having 9 secondary windings and B204 is a 3-phase multiplexed power converter, which comprises multiplexed single-phase converters 4U, 4V, 4W, each containing three unit cell inverters connected in series, linked by a Y connection B205 is an AC motor forming a load to which power is supplied by the 3-phase multiplex converter B204.

4U1, 4U2, 4U3, 4V1, 4V2, 4V3, 4W1, 4w2, 4W3 are the unit cell inverters forming the basic constituent elements of 3-phase multiplex converter B204, FIG. 14 is a circuit diagram showing a detailed compositional example of a unit cell inverter as illustrated in FIG. 13.

In FIG. 14, B301R, B301S, B301T are AC input terminals for the 3-phase power supply; B302 is a standard diode converter comprising six diodes D1–D6; B303 is a filter capacitor for smoothing the DC power; B304 is a single phase inverter comprising four on/off switchable transistors S1–S4; and B305P, B305N are AC output terminals for inverter B304.

In other words, the 3-phase AC input to AC input terminals B301R. B301S, 3301T is converted to DC by the diode converter B302 and this DC is smoothed by filter capacitor B303, thereby yielding a virtually uniform DC voltage E. The output voltage is obtained by acquiring voltage commands by similar means to those for acquiring the 3-phase voltage commands Vu*, Vv*, Vw* in the aforementioned 5-level-output inverter, and carrying out PWM control by triangular wave comparison.

FIG. 15 is a timing chart showing one example of transistor switching and output voltage for a unit cell inverter as illustrated in FIG. 13.

As shown in FIG. 15, by means of the transistors in single-phase inverter B304 comparing CAR1, which is a triangular wave comparison PWM signal, with voltage command V*, on signals are obtained at S1 and S3, and furthermore, by comparing CAR2, which is displaced by a phase of 180° with respect to CAR1, with voltage command V*, on signals are obtained at S2 and S4.

By a combination of transistors switching on, the voltages given in the following table can be obtained between the AC output terminals B305P, B305N.

|  |  | S1 | S3 |  | S2 | S4 |
|---|---|---|---|---|---|---|
| +E | V* > CAR1 | on | off | V* > CAR2 | off | on |
| 0 |  | on | off | CAR2 > V* | on | off |
| 0 | CAR1 > V* | off | on | V* > CAR2 | off | on |
| −E |  | off | on | CAR2 > V* | on | off |

By implementing switching control in the aforementioned manner, output voltages of the levels +E, 0 and −E can be obtained for the unit cell inverter illustrated in FIG. 14.

In FIG. 13, a 3-phase multiplex power converter B204 is achieved by means of a composition wherein 3-phase AC power is supplied to each unit cell inverter 4U1–4W3 from six isolated secondary windings in transformer B203, and multiplexed single-phase converters 4U, 4V, 4W, each containing three unit cell inverters 4U1–4W3 of each phase whose output terminals are connected in series, are linked in a Y connection.

Each phase output voltage from the multiplexed single-phase power converters 4U, 4V, 4W forms a voltage comprising the sum of the output voltages from the three unit cell inverters, for example, 4U1–4U3 in the case of the U phase, thereby enabling output voltages of seven levels, namely, +3E, +2E, +E, 0, −E, −2E, −3E, to be obtained.

This description relating to the U phase applies similarly to the V and W phases also.

As described above, in a conventional multi-level-output power converter, since the number of switching operations of the self-extinguishing elements is determined by the triangular wave carrier frequency, the loss associated with switching is large and the efficiency of the power converter falls.

Furthermore, natural harmonics of the triangular wave carrier frequency are superimposed on the output current of the power converter.

SUMMARY OF THE INVENTION

Accordingly one object of the present invention is to provide a novel high performance controller for a power converter which is capable of rapidly selecting the closest output vector to the voltage command vector and rapidly executing PWM control through spatial vector comparison.

The above-mentioned object of the present invention can be achieved by providing a controller for power converter having the following composition. That is to say, in a controller for a power converter which is composed of:

n in number converters which convert DC power to AC power, which are composed by bridge-connecting self-extinguishing type switching elements, and in which feedback diodes are respectively connected in antiparallel to each said self-extinguishing type switching element; and n in number transformers, which take as inputs the several outputs of the n in number converters, and which connects with an AC load by connecting in series the secondary sides of the n in number transformers, and is provided with:

a device which provides the voltage command vector of the AC output voltage of the power converter;

a device which provides all the output vectors of the AC output voltages which the power converter can generate;

an output vector selection device which selects the above-mentioned output vectors according to the voltage command vector; and a control device which controls the conductive states of the self-extinguishing type switching elements according to the output vectors selected by the output vector selection device, this is a controller for power converter which, when the spatial vector diagram is split into the 6 ranges of −30 degrees 30 degrees, 30 degrees~90 degrees, 90 degrees~150 degrees, 150 degrees~210 degrees, 210 degrees~270 degrees and 270 degrees~330 degrees and the range numbers 0~5 are assigned to those 6 split ranges, is composed by providing the output vector selection device with:

a device which calculates the range number in which the voltage command vector is present;

a device which rotates the voltage command vector through a specified angle;

a device which performs coordinate transformation of the said rotated voltage command vector to a vector in an oblique coordinate system which takes the vector in the ~30 degrees direction and the vector in the 30 degrees direction of the rectangular coordinate system as two unit vectors;

a device which splits the converter output-enabled portion of the vector diagram which has undergone oblique transformation, using the unit vectors, of the −30 degrees~+30 degrees range of the spatial vector diagram in which output vector is positioned, into square-shape patterns so that the output vector is positioned either in the upper left, the lower right, or both the lower left and upper right of each square-shape pattern, and then splits any square-shape pattern which holds the output vector in both its lower left and its upper right, into two triangular domains by a segment which joins the upper left vertex and the lower right vertex;

a device which judges whether the voltage command vector which has undergone oblique coordinate transformation is present in either a square-shape pattern domain or a triangular domain in the oblique coordinate system diagram which has been split into the domains;

a device, which selects the output vector corresponding to a square-shape pattern domain or a triangular domain according to the result of the judgement; and a device which calculates the selected output vector as an output vector which is rotated through a specified angle.

Consequently, the closest output vector to the voltage command vector can be selected merely by calculating the coordinate values of the voltage command vector in the oblique coordinate system and some slight additional calculation, without calculating the vector deviations between all the output vectors and the output command vector, by:

calculating the range number VTH in which the voltage command vector is present for a multiplex converter;

rotating the voltage command vector through a specified angle:

performing coordinate transformation of the rotated voltage command vector to a vector in an oblique coordinate system which takes the vector in the −30 degree direction and the vector in the +30 degree direction of rectangular coordinate system as unit vectors;

splitting the inverter output enabled-portion of the vector diagram, which has undergone oblique coordinate transformation using the unit vectors of the −30 degree~+30 degree range of the spatial vector diagram in which the output vector is positioned, into square-shape patterns so that the output vector is positioned either in the upper left, the lower right, or both the lower left and the upper right of each square-shape pattern, and then splitting any square-shape pattern which holds the output vector in both its lower left and its upper right into two triangular domains by a segment which joins its upper left vertex and its lower right vertex;

judging whether the voltage command vector which has undergone oblique coordinate transformation is present in any of the square-shape pattern domains or the triangular domains in the oblique coordinate system vector diagram which has been split into domains;

selecting any output vector Vnx corresponding to any domain which accords with that judgement; and calculating output vector Vnx as output vector Vn that has been rotated through the specified angle.

Therefore, high performance can be contrived with the controller for a power converter of the present invention by shortening the computation time required for output vector selection.

Also, the above-mentioned object of the present invention can be achieved by providing a controller for power converter having the following composition. That is to say, in a controller for a power converter which is composed of:

n in number converters which convert DC power to AC power, which are composed by bridge-connecting self-extinguishing type switching elements, and in which feedback diodes are respectively connected in antiparallel to each said self-extinguishing type switching element; and n in number transformers which take as inputs the several outputs of the n in number converters, and which connects with an AC load by connecting in series the secondary sides of the n in number transformers, and is provided with;

a device which provides the voltage command vector of the AC output voltage of the power converter;

a device which provides all the output vectors of the AC output voltages which the said power converter can generate;

an output vector selection device which selects the above-mentioned output vectors according to the voltage command vector; and a control device which controls the conductive states of the said self-extinguishing type switching elements according to the output vectors selected by the output vector selection device, this is a controller for power converter which, when the spatial vector diagram is split into the 6 ranges of −30 degrees~30 degrees, 30 degrees~90 degrees, 90 degrees~150 degrees, 150 degrees~210 degrees, 210 degrees~270 degrees and 270 degrees~330 degrees and the range numbers 0~ 5 are assigned to those 6 split ranges, is composed by providing the output vector selection device with:

- a device which calculates the range number in which the voltage command vector is present;
- a device which rotates the voltage command, vector through a specified angle;
- a device which performs coordinate transformation of the rotated voltage command vector to a vector in an oblique coordinate system which takes the vector in the −30 degrees direction and the vector in the 30 degrees direction of the rectangular coordinate system as two unit vectors;
- a device which splits the converter output-enabled portion of the vector diagram, which has undergone oblique transformation, using the said unit vectors, of the −30 degrees~+30 degrees range of the spatial vector diagram in which said output vector is positioned, into square-shape patterns so that the output vector is placed either in the upper left, the lower right, or both the lower left and upper right of each square-shape pattern, and then splits each square-shape pattern into two triangular domains by a segment which joins the upper left vertex and the lower right vertex;
- a device which judges whether a voltage command vector which has undergone oblique coordinate transformation is present in a triangular domain in the oblique coordinate system diagram which has been split into the domains;
- a device which selects the output vector corresponding to a triangular domain according to the result of the judgement; and
- a device which calculates the selected output vector as an output vector which is rotated through a specified angle.

Consequently, the closest output vector to the voltage command vector can be selected merely by calculating the coordinate values of the voltage command vector in the oblique coordinate system and some slight additional calculation, without calculating the vector deviations between all the output vectors and the output command vector, by:

- splitting the inverter output-enabled portion of the vector diagram, which has undergone oblique coordinate transformation, into square-shape patterns so that the output vector is positioned in the upper left, the lower right, or both the lower left and the upper right of each square-shape pattern, and then splitting each square-shape pattern into two triangular domains by a segment which joins its upper left vertex and its lower right vertex;
- judging whether the voltage command vector which has undergone oblique coordinate transformation is present in any of the triangular domains in the oblique coordinate system vector diagram which has been split into domains;
- selecting any output vector Vnx corresponding to any domain which accords with that judgement; and
- calculating output vector Vnx as output vector Vn that has been rotated through the specified angle.

Therefore, high performance can be contrived with the controller for a power converter of the above-mentioned invention by shortening the computation time required for output vector selection.

Moreover, the above-mentioned object of the present invention can be achieved by providing a controller for power converter having the following composition. That is to say, in a controller for a power converter which is composed of:

- n in number converters which convert DC power to AC power, which are composed by bridge-connecting self-extinguishing type switching elements, and in which feedback diodes are respectively connected in antiparallel to each self-extinguishing type switching element; and
- n in number transformers which take as inputs the several outputs of the said n in number converters, and which connects with an AC load by connecting in series the secondary sides of the said n in number transformers, and is provided with:

- a device which provides the voltage command vector of the AC output voltage of the power converter;
- a device which provides all the output vectors of the AC output voltages which the said power converter can generate;
- an output vector selection device which selects the above-mentioned output vectors according to the said voltage command vector; and
- a control device which controls the conductive states of the said self-extinguishing type switching elements according to the output vectors selected by the output vector selection device, this is a controller for power converter which, when the spatial vector diagram is split into the 6 ranges of −30 degrees~30 degrees, 30 degrees~90 degrees, 90 degrees~150 degrees, 150 degrees~210 degrees, 210 degrees~270 degrees and 270 degrees~330 degrees and the range numbers 0~5 are assigned to those 6 split ranges, is composed by providing the output vector selection device with:

- a device which calculates the range number in which the voltage command vector is present;
- a device which performs coordinate transformation of the command vector to a vector in an oblique coordinate system which takes a vector in a first specified angular direction and a vector in a second specified angular direction as two unit vectors;
- a device which splits the converter output-enabled portion of the vector diagram, which has undergone oblique transformation, using the unit vectors, of the 60-degree range in which the voltage command vector is present within the spatial vector diagram in which said output vector is positioned, into square-shape patterns so that the output vector is positioned either in the upper left, the lower right, or both the lower left and upper right of each square-shape pattern, and then splits each square-shape pattern which holds the output vector in both the lower left and the upper right into two triangular domains by a segment which joins the upper left vertex and the lower right vertex;
- a device which judges whether a voltage command vector which has undergone oblique coordinate transformation is present in either a square-shape pattern domain or a triangular domain in the oblique coordinate system diagram which has been split into the said domains; and a device which selects the output vector corresponding to a square-shape pattern domain or a triangular domain according to the result of the said judgement.

Consequently, the closest output vector to the voltage command vector can be selected merely by calculating the coordinate values of the voltage command vector in the oblique coordinate system and some slight additional calculation, without calculating the vector deviations between all the output vectors and the output command vector, by:

calculating the range number VTH in which the voltage command vector is present for a multiplex converter;

performing coordinate transformation of the voltage command vector to a vector in an oblique coordinate system which takes a vector in a first specified angular direction and a vector in a second specified angular direction as unit vectors;

splitting the inverter output-enabled portion of the vector diagram, which has undergone oblique coordinate transformation using the unit vectors of the 60-degree range in which the voltage command vector is present within the spatial vector diagram in which the output vector is positioned, into square-shape patterns so that the output vector is positioned in the upper left, the lower right, or both the lower left and the upper right of each square-shape pattern, and then splitting any square-shape pattern which holds the output vector in both its lower left and its upper right into two triangular domains by a segment which joins its upper left vertex and its lower right vertex;

judging whether the voltage command vector which has underdone oblique coordinate transformation is present in any of the square-shape pattern domains or the triangular domains in the oblique coordinate system vector diagram which has been split into domains; and selecting any output vector Vn corresponding to a domain which accords with that judgement.

Therefore, high performance can be contrived with the controller for a power converter of the above-mentioned invention by shortening the computation time required for output vector selection.

Furthermore, the above-mentioned object of the present invention can be achieved by providing a controller for power converter having the following composition. That is to say, in a controller for a power converter which is composed of:

n in number converters which convert DC power to AC power, which are composed by bridge-connecting self-extinguishing type switching elements, and in which feedback diodes are respectively connected in antiparallel to each said self-extinguishing type switching element; and n in number transformers which take as inputs the several outputs of the n in number converters, and which connects with an AC load by connecting in series the secondary sides of the n in number transformers, and is provided with:

a device which provides the voltage command vector of the AC output voltage of the power converter;

a device which provides all the output vectors of the AC output voltages which the power converter can generate;

an output vector selection device which selects the above-mentioned output vectors according to the voltage command vector; and a control device which controls the conductive states of the self-extinguishing type switching elements according to the output vectors selected by the output vector selection device, this is a controller for power converter which, when the spatial vector diagram is split into the 6 ranges of 31 30 degrees~30 degrees, 30 degrees~90 degrees, 90 degrees~150 degrees, 150 degrees~210 degrees, 210 degrees~270 degrees and 270 degrees~330 degrees and the range numbers 0~5 are assigned to those 6 split ranges, is composed by providing the output vector selection device with:

a device which calculates the range number in which the voltage command vector exists;

a device which performs coordinate transformation of the said command vector to a vector in an oblique coordinate system which takes a vector in a first specified angular direction and a vector in a second specified angular direction as two unit vectors;

a device which splits the converter output-enabled portion of the vector diagram, which has undergone oblique transformation, using the unit vectors, of the 60-degree range in which the voltage command vector is present within the spatial vector diagram in which output vector is positioned, into square-shape patterns so that the output vector is positioned either in the upper left, the lower right, or both the lower left and upper right of each square-shape pattern, and then splits each square-shape pattern into two triangular domains by a segment which joins the upper left vertex and the lower right vertex;

a device which judges whether a voltage command vector which has undergone oblique coordinate transformation is present in any triangular domain in the oblique coordinate system diagram which has been split into the said domains; and a device which selects the output vector corresponding to a triangular domain according to the result of the judgement.

Consequently, the closest output vector to the voltage command vector can be selected merely by calculating the coordinate values of the voltage command vector in the oblique coordinate system and some slight additional calculation, without calculating the vector deviations between all the output vectors and the output command vector, by:

splitting the inverter output-enabled portion of the vector diagram, which has undergone oblique coordinate transformation, into square-shape patterns so that the output vector is placed in the upper left, the lower right, or both the lower left and the upper right of each square-shape pattern, and then splitting each square-shape pattern into two triangular domains by a segment which joins its upper left vertex and its lower right vertex;

judging whether the voltage command vector which has undergone oblique coordinate transformation is present in any of the triangular domains in the oblique coordinate system vector diagram which has been split into domains; and selecting any output vector Vn corresponding to a domain which accords with that judgement.

Therefore, high performance can be contrived with the controller for a power converter of the above-mentioned invention by shortening the computation time required for output vector selection.

Using the above controllers, it becomes possible rapidly to execute PWM control through spatial vector comparison.

Also, the above-mentioned object of the present invention can be achieved by providing a controller for power converter having the following composition. That is to say, in a controller for a power converter which possesses:

a split power source in which a DC voltage source is split into at least n (n being an integer of 3 or more units, and 3 sets of series circuits, composed by connecting in series (2×n) self-extinguishing type switching elements which are connected in parallel with the DC voltage source and to each of which a diode is connected in anti-parallel, and having converted voltage output terminals which output voltages which are converted from the voltage of the DC voltage source from between the nth self-extinguishing type switching element and the (n+1)th self-extinguishing type switching element from the positive side of the said DC voltage source, and which connects the said converted voltage output terminals to an AC load, and is provided with:

a devise which provides the voltage command vector of the AC output voltage of the power converter;

a device which provides all the output vectors of the AC output voltages which the power converter can generate;

an output vector selection device which selects the above-mentioned output vectors according to the said voltage command vector; and a control device which controls the conductive states of the said self-extinguishing type switching elements according to the output vectors selected by the output vector selection device, this is a controller for power converter which, when the spatial vector diagram is split into the 6 ranges of −30 degrees~30 degrees, 30 degrees~90 degrees, 90 degrees~150 degrees, 150 degrees~210 degrees, 210 degrees~270 degrees and 270 degrees~330 degrees and the range numbers 0–5 are assigned to those 6 split ranges, is composed by providing the output vector selection device with:

a device which calculates the range number in which the voltage command vector is present;

a device which rotates the said voltage command vector, through a specified angle;

a device which performs coordinate transformation of the rotated voltage command vector to a vector in an oblique coordinate system which takes the vector in the −30 degrees direction and the vector in the 30 degrees direction of the rectangular coordinate system as two unit vectors;

a device which splits the converter output-enabled portion of the vector diagram, which has undergone oblique transformation, using the said unit vectors, of the −30 degrees~+30 degrees range of the spatial vector diagram in which the output vector is positioned, into square-shape patterns so that the output vector is positioned either in the upper left, the lower right, or both the lower left and upper right of each square-shape pattern, and then splits any square-shape pattern which holds the output vector in both its lower left and its upper right, into two triangular domains by a segment which joins the upper left vertex and the lower right vertex;

a device which judges whether a voltage command vector which has undergone oblique coordinate transformation is present in either a square-shape pattern domain or triangular domain in the oblique coordinate system diagram which has been split into the domains;

a device which selects the output vector corresponding to a square-shape pattern domain or a triangular domain according to the result of the judgement; and a device which calculates the said selected output vector as an output vector which is rotated through a specified angle.

Consequently, the closest output vector to the voltages command vector can be selected merely by calculating the coordinate values of the voltage command vector in the oblique coordinate system and some slight additional calculation, without calculating the vector deviations between all the output vectors and the output command vector, by:

calculating the range number VTH in which the voltage command vector is present for a multiplex converter;

rotating the voltage command vector through a specified angle;

performing coordinate transformation of the rotated voltage command vector to a vector in an oblique coordinate system which takes the vector in the −30 degree direction and the vector in the +30 degree direction of rectangular coordinate system as unit vectors;

splitting the inverter output enabled portion of the vector diagram, which has undergone oblique coordinate transformation, using the unit vectors, of the −30 degree~+30 degree range of the spatial vector diagram in which the output vector is positioned, into square-shape patterns so that the output vector is positioned in the upper left, the lower right, or both the lower left and the upper right of each square-shape pattern, and then splitting any square-shape pattern which holds the output vector in both its lower left and its upper right into two triangular domains by a segment which joins its upper left vertex and its lower right vertex; judging whether the voltage command vector which has undergone oblique coordinate transformation is present in any of the square-shape pattern domains or the triangular domains in the oblique coordinate system vector diagram which has been split into domains;

selecting any output vector Vnx corresponding to an domain which accords with that judgement; and calculating output vector Vnx as output vector Vn which has been rotated through the specified angle.

Therefore, high performance can be contrived with the controller for a power converter of the above-mentioned invention by shortening the computation time required for output vector selection.

Moreover, the above-mentioned object of the present invention can be achieved by providing a controller for power converter having the following composition. That is to say, in a controller for a power converter which possesses:

a split power source in which a DC voltage source is split into at least n (n being an integer of 3 or more) units, and 3 sets of series circuits, composed by connecting in series (2×n) self-extinguishing type switching elements which are connected in parallel with the said DC voltage source and to each of which a diode is connected in anti-parallel, and having converted voltage output terminals which output voltages which are converted from the voltage of the DC voltage source from between the nth self-extinguishing type switching element and the (n+1)th self-extinguishing type switching element from the positive side of the said DC voltage source,
and which connects the converted voltage output terminals to an AC load, and is provided with:
 a device which provides the voltage command vector of the AC output voltage of the power converter;
 a device which provides all the output vectors of the AC output voltages which the power converter can generate;
 an output vector selection device which selects the above-mentioned output vectors according to the said voltage command vector; and
 a control device which controls the conductive states of the said self-extinguishing type switching elements according to the output selected by the output vector selection device,
 this is a controller for power converter which, when the spatial vector diagram is split into the 6 ranges of −30 degrees~30 degrees, 30 degrees~90 degrees, 90 degrees~150 degrees, 150 degrees~210 degrees, 210 degrees~270 degrees and 270 degrees~330 degrees and the range numbers 0~ 5 are assigned to those 6 split ranges, is composed by providing the said output vector selection device with:
  a device which calculates the range number in which the voltage command vector is present;
  a device which rotates the voltage command vector through a specified angle;
  a device which performs coordinate transformation of the rotated voltage command vector to a vector in an oblique coordinate system which takes the vector in the −30 degrees direction and the vector in the 30 degrees direction of the rectangular coordinate system as two unit vectors;
  a device which splits the converter output-enabled portion of the vector diagram, which has undergone oblique transformation, using the said unit vectors, of the −30 degrees~30 degrees range of the spatial vector diagram in which output vector is positioned, into square-shape patterns so that the output vector is positioned either in the upper left, the lower right, or both the lower left and upper right of each square-shape pattern, and then splits each square-shape pattern into two triangular domains by a segment which joins the upper left vertex and the lower right vertex; a device which judges whether a said voltage command vector which has undergone oblique coordinate transformation is present in a triangular domain in the oblique coordinate system diagram which has been spilt into the domains;
  a device which selects the output vector corresponding to a triangular domain according to the result of the said judgement; and
  a device which calculates the said selected output vector as an output vector which is rotated through a specified angle.
 Consequently, the closest output vector to the voltage command vector can be selected merely by calculating the coordinate values of the voltage command vector in the oblique coordinate system and some slight additional calculation, without calculating the vector deviations between all the output vectors and the output command vector, by:
  splitting the multi-level inverter output-enabled portion of the vector diagram, which has undergone oblique coordinate transformation, into square-shape patterns so that the output vector is positioned in the upper left, the lower right, or both the lower left and the upper right of each square-shape pattern, and then splitting each square-shape pattern into two triangular domains by a segment which joins its upper left vertex and its lower right vertex;
  judging whether the voltage command vector which has undergone oblique coordinate transformation is present in any of the triangular domains in the oblique coordinate system vector diagram which has been split into domains;
  selecting any output vector Vnx corresponding to a domain which accords with that judgement; and
  calculating output vector Vnx as output vector Vn that has been rotated through the specified angle.
 Therefore, high performance can be contrived with the controller for a power converter of the above-mentioned invention by shortening the computation time required for output vector selection.
 Furthermore, the above-mentioned object of the present invention can be achieved by providing a controller for power converter having the following composition. That is to say, in a controller for a power converter which possesses:
  a split power source in which a DC voltage source is split into at least n (n bring an integer of 3 or more) units, and
  3 sets of series circuits, composed by connecting in series (2×n) self-extinguishing type switching elements which are connected in parallel with the DC voltage source and to each of which a diode is connected in anti-parallel, and having converted voltage output terminals which output voltages which are converted from the voltage of the DC voltage source from between the nth self-extinguishing type switching element and the (n+1)th self-extinguishing type switching element from the positive side of the DC voltage source,
 and which connects the converted voltage output terminals to an AC load, and is provided with:
  a device which provides the voltage command vector of the AC output voltage of the power converter;
  a device which provides all the output vectors of the AC output voltages which the power converter can generate;
  an output vector selection device which selects the above-mentioned output vectors according to the voltage command vector; and
  a control device which controls the conductive states of the said self-extinguishing type switching elements according to the output vectors selected by the output vector selection device,
 this is a controller for power converter which, when the spatial vector diagram is split into the 6 ranges of −30 degrees~30 degrees, 30 degrees~90 degrees, 90 degrees~150 degrees, 150 degrees−210 degrees, 210 degrees~270 degrees and 270 degrees~330 degrees and the range numbers 0~5 are assigned to those 6 split ranges, is composed by providing the output vector selection device with:
  a device which calculates the range number in which the voltage command vector is present;
  a device which performs coordinate transformation of the command vector to a vector in an oblique coordinate system which takes a vector in a first specified angular direction and a vector in a second specified angular direction as two unit vectors;

a device which splits the converter output-enabled portion of the vector diagram, which has undergone oblique transformation, using the unit vectors, of the 60-degree range in which the voltage command vector is present within the spatial vector diagram in which said output vector is positioned, into square-shape patterns so that the output vector is positioned either in the upper left, the lower right, or both the lower left and upper right of each square-shape pattern, and then splits each square-shape pattern which holds the output vector in both the lower left and the upper right into two triangular domains by a segment which joins the upper left vertex and the lower right vertex;

a device which judges whether a voltage command vector which has undergone oblique coordinate transformation is present in either a square-shape pattern domain or a triangular domain in the oblique coordinate system diagram which has been split into the domains; and a device which selects the output vector corresponding to a square-shape pattern domain or a triangular domain according to the result of the judgement.

Consequently, the closest output vector to the voltage command vector can be selected merely by calculating the coordinate values of the voltage command vector in the oblique coordinate system and some slight additional calculation, without calculating the vector deviations between all the output vectors and the output command vector, by:

calculating the range number VTH in which the voltage command vector is present for a multi-level converter, performing coordinate transformation of the voltage command vector to a vector in an oblique coordinate system which takes a vector in a first specified angular direction and a vector in a second specified angular direction as unit vectors;

splitting the inverter output-enabled portion of the vector diagram, which has undergone oblique coordinate transformation, using the unit vectors, of the 60-degree range in which the voltage command vector is present within the spatial vector diagram in which the output vector is positioned, into square-shape patterns so that the output vector is positioned in the upper left, the lower right, or both the lower left and the upper right of each square-shape pattern, and then splitting any square-shape pattern which holds the output vector in both its lower left and its upper right into two triangular domains by a segment which joins its upper left vertex and its lower right vertex; judging whether the voltage command vector which has undergone oblique coordinate transformation is present in any of the square-shape pattern domains or the triangular domains in the oblique coordinate system vector diagram which has been split into domains; and selecting any output vector Vn corresponding to a domain which accords with that judgement.

Therefore, high performance can be contrived with the controller for a power converter of the above-mentioned invention by shortening the computation time required for output vector selection.

Still further, the above-mentioned object of the present invention can be achieved by providing a controller for power converter having the following composition. That is to say, in a controller for a power converter which possesses:

a split power source in which a DC voltage source is split into at least n (n being an integer of 3 or more) units, and 3 sets of series circuits, composed by connecting in series (2×n) self-extinguishing type switching elements which are connected in parallel with the DC voltage source and to each of which a diode is connected in anti-parallel, and having converted voltage output terminals which output voltages which are converted from the voltage of the DC voltage source from between the nth self-extinguishing type switching element and the (n+1)th self-extinguishing type switching element from the positive side of the DC voltage source, and which connects the converted voltage output terminals to an AC load, and is provided with:

a device which provides the voltage command vector of the AC output voltage of the power converter;

a device which provides all the output vectors of the AC output voltages which the power converter can generate;

an output vector selection device which selects the above-mentioned output vectors according to the voltage command vector; and a control device which controls the conductive states of the said self-extinguishing type switching elements according to the output vectors selected by the output vector selection device, this is a controller for power converter which, when the spatial vector diagram is split into the 6 ranges of −30 degrees~30 degrees, 30 degrees~90 degrees, 90 degrees~150 degrees, 150 degrees~210 degrees, 210 degrees~270 degrees and 270 degrees~330 degrees and the range numbers 0~5 are assigned to those 6 split ranges, is composed by providing the output vector selection device with:

a device which calculates the range number in which the voltage command vector is present;

a device which performs coordinate transformation of the command vector to a vector in an oblique coordinate system which takes a vector in a first specified angular direction and a vector in a second specified angular direction as two unit vectors;

a device which splits the converter output-enabled portion of the vector diagram, which has undergone oblique transformation, using the unit vectors, of the 60-degree range in which the voltage command vector is present within the spatial vector diagram in which the output vector is positioned, into square-shape patterns so that the output vector is positioned either in the upper left, the lower right, or both the lower left and upper right of each square-shape pattern, and then splits each square-shape pattern into two triangular domains by a segment which joins the upper left vertex and the lower right vertex;

a device which judges whether a said voltage command vector which has undergone oblique coordinate transformation is present in any triangular domain in the oblique coordinate system diagram which has been split into the said domains; and a device which selects the output vector corresponding to a triangular domain according to the result of the judgement.

Consequently, the closest output vector to the voltage command vector can be selected merely by calculating the coordinate values of the voltage command vector in the oblique coordinate system and some slight additional calculation, without calculating the vector deviations between all the output vectors and the output command vector, by:

splitting the multi-level inverter output-enabled portion of the vector diagram, which has undergone oblique coordinate transformation, into square-shape patterns so that the output vector is positioned in the upper left, the lower right, or both the lower left and the upper right of each square-shape pattern, and then splitting each square-shape pattern into two triangular domains by a segment which joins its upper left vertex and its lower right vertex;

judging whether the voltage command vector which has undergone oblique coordinate transformation is present in any of the triangular domains in the oblique coordinate system vector diagram which has been split into domains; and selecting any output vector Vn corresponding to a domain, which accords with that judgement.

Therefore, high performance can be contrived with the controller for a power converter of the above-mentioned invention by shortening the computation rime required for output vector selection.

Using the above controllers, it becomes possible rapidly to execute PWM control through spatial vector comparison.

Another object of the present invention is to provide controller for power converter which can reduce "chattering" without reducing the gain of the resonance suppression control system, and thus can reduce switching loss.

The above-mentioned object of the present invention can be achieved by providing a controller for power converter having the following composition. That is to say, in a controller for a power converter which is:

constructed from multiple converters, composed by bridge-connecting self-extinguishing type switching elements, and multiple DC reactors, which smooth the DC currents of the said multiple converters, and composed by connecting the AC terminals of the multiple converters to an AC load in common, and connecting the multiple DC reactors in series with the positive terminal and negative terminal of each of the multiple converters, the output vector last outputted by the power converter is stored by a selected vector memory device and, when a domain-split vector diagram is generated by a domain-split vector diagram generation device, the area of the domain which contains the last output vector stored in the selected vector memory device is produced as a larger than normal domain-split vector diagram. Then, using this domain-split vector diagram the output-enabled vector corresponding to the domain which contains the voltage command vector is selected as the next output vector. By this means, there is a greater possibility that the vector which the power converter is currently outputting will be re-selected. As a result, the switching frequency is reduced. Thus, there is an action of reducing the switching loss.

Also, the above-mentioned object of the present invention can be achieved by providing a controller for power converter having the following composition. That is to say, in a controller for a power converter which is:

constructed from multiple converters, composed by bridge-connecting self-extinguishing type switching elements, and multiple transformers, to the primary sides of which the AC outputs of the converters are connected, and composed by connecting the secondary terminals of the multiple transformers in common to an AC load, the output vector last outputted by the power converter is stored by a selected vector memory device and, when a domain-split vector diagram is generated by a domain-split vector diagram generation device, the area of the domain which contains the last output vector stored in the selected vector memory device is produced as a larger than normal domain-split vector diagram. Then, using this domain-split vector diagram, the output-enabled vector corresponding to the domain which contains the voltage command vector is selected as the next output vector. By this means, there is a greater possibility that the vector which the power converter is currently outputting will be re-selected. As a result, the switching frequency is reduced. Thus, there is an action of reducing the switching loss.

Moreover, the above-mentioned object of the present invention can be achieved by providing a controller for a power converter having the following composition. That is to say, in a controller for a power converter which controls a multi-level output power converter which outputs multi-level voltages, the output vector last outputted by the power converter is stored by a selected vector memory device and, when a domain-split vector diagram is generated by a domain-split vector diagram generation device, the area of the domain, which contains the last output vector stored in the selected vector memory device is produced as a larger than normal domain-split vector diagram. Then, using this domain-split vector diagram, the output-enabled vector corresponding to the domain which contains the voltage command vector is selected as the next output vector. By this means, there is a greater possibility that the vector which the power converter is currently outputting will be re-selected. As a result, the switching frequency is reduced. Thus, there is an action of reducing the switching loss.

Furthermore, the above-mentioned object of the present invention can be achieved by providing a controller for a power converter having the following composition. That is to say, the domains of the domain-split vector diagram, which contain the output-enabled vectors, are made regular hexagonal domains.

Still further, the above-mentioned object of the present invention can be achieved by providing a controller for a power converter having the following composition. That is to say, the domains of the domain-split vector diagram, which contain the output-enabled vectors, are made rhombiform domains.

Another object of the present invention is to provide a controller for power converter which, with a multi-level output power converter capable of outputting voltages at 4 levels or more, is capable of maintaining the linearity of the output waveform by approximating the output waveform to a sine wave, while restraining the switching frequency of the self-extinguishing elements.

The above-mentioned object of the present invention can be achieved by providing a controller for power converter having the following composition. That is to say, in a controller for a multi-level output power converter capable of outputting voltages at 4 levels or more, providing:

a device which calculates a voltage command vector corresponding to the voltage which the power converter itself should output, based on the output current of that power converter itself;

a device which provides voltage actual vectors of the voltages which the power converter itself is capable of outputting;

a device which selects the voltage actual value vector closest to the calculated voltage command vector; and a device which calculates ON/OFF commands for the self-extinguishing elements which compose the main circuit of the power converter itself according to the selected voltage actual vector.

Consequently, in the controller for a power converter of the above-mentioned invention, control can be exercised so that the power converter generates the voltage vector closest to the voltage command vector by:

calculating, from the output current of the power converter itself, the voltage command vector corresponding to the voltage which the power converter itself should output;

providing the voltage actual vectors of the voltages which the power converter itself is capable of outputting, and selecting the closest voltage actual vector to the above-mentioned command vector; and switching the self-extinguishing elements ON/OFF according to this voltage actual vector.

Also the above-mentioned object of the present invention can be achieved by providing a controller for power converter having the following composition. That is to say, providing:

a device which calculates a voltage command vector corresponding to the voltage which the power converter itself should output, based on the output current of that power converter itself;

a device which splits a plane, which takes the start point of the voltage actual vectors of the voltages which the power converter itself should output as its origin and in which each vector is represented by the end points of the voltage actual vectors, into domains which each contain the end point of one voltage actual vector, and, when the end point of the voltage command vector is contained in any of those split domains, selects the actual voltage vector indicated by its end point being contained in that domain as the voltage actual vector of the voltage which the power converter itself actually outputs; and a device which calculates ON/OFF commands for the self-extinguishing elements which compose the main circuit of the power converter itself according to the selected voltage actual vector.

Consequently, with the controller for a power converter of the above-mentioned invention, the output voltage of the power converter itself can be caused to follow-up commands, and also the voltage actual vector only alters when the voltage command vector shifts from a domain which contains a voltage actual vector to another domain which contains a voltage command vector. Therefore, it is possible to reduce the switching frequency of the switching elements and to exercise control so that the power converter generates the closest voltage vector to the voltage command vector by:

calculating, from the output current of the power converter itself, the voltage command vector which corresponds to the voltage which the power converter itself should output;

discriminating whether this voltage command vector is contained in any domain which contains an end point of a voltage actual vector of the power converter itself;

selecting the voltage actual vector of that domain as the voltage actual value; and switching the self-extinguishing elements ON/OFF according to that selected voltage actual vector.

Moreover, the above-mentioned object of the present invention can be achieved by providing a controller for power converter having the following composition. That is to say, providing:

a device which calculates a voltage command vector corresponding to the voltage which the power converter itself should output, based on the output current of that power converter itself;

a device which splits a plane, which takes the start point of the voltage actual vectors of the voltages which the power converter itself should output as its origin and in which each vector is represented by the end points of the voltage actual vectors, into regular hexagonal domains which each contain the end point of one voltage actual vector, and, when the end point of the voltage command vector is contained in any of those split domains, selects the actual voltage vector indicated by its end point being contained in that domain as the voltage actual vector of the voltage which the power converter itself actually outputs; and a device which calculates ON/OFF commands for the self-extinguishing elements which compose the main circuit of the power converter itself according to the selected voltage actual vector.

Consequently, with the controller for a power converter of the above-mentioned invention, the output voltage of the power converter itself can be caused to follow-up commands, and also the voltage actual vector only alters when the voltage command vector shifts from a domain which contains a voltage actual vector to another domain which contains a voltage command vector. Therefore, it is possible to reduce the switching frequency of the switching elements and to exercise control so that the power converter generates the closest voltage vector to the voltage command vector by:

calculating, from the output current of the power converter itself, the voltage command vector which corresponds to the voltage which the power converter itself should output;

discriminating whether this voltage command vector is contained in any regular hexagonal domain which contains an end point of a voltage actual vector of the power converter itself;

selecting the voltage actual vector of that domain as the voltage actual value; and switching the self-extinguishing elements ON/OFF according to that selected voltage actual vector.

Furthermore, the above-mentioned object of the present invention can be achieved by providing a controller for power converter having the following composition. That is to say, providing:

a device which calculates a voltage command vector corresponding to the voltage which the power converter itself should output, based on the output current of that power converter itself;

a device which splits a plane, which takes the start point of the voltage actual vectors of the voltages which the power converter itself should output as its origin and in which each vector is represented by the end points of the voltage actual vectors, into 6 sections in the directions of the 6 types of voltage vector which the power converter itself is capable of generating, and, using straight lines parallel to the two types of voltage vector in adjacent sections, splits those 6 sections into rhombiform domains which each contain the end point of one voltage actual vector, and, when the end point of a voltage command vector is contained in any of those split domains, selects the actual voltage vector indicated by its end point being contained in that domain as the voltage actual vector of the voltage which the power converter itself actually outputs; and a device which calculates ON/OFF commands for the self-extinguishing elements which compose the main circuit of the power converter itself according to the selected voltage actual vector.

Consequently, with the controller for a power converter of the above-mentioned invention, the output voltage of the power converter itself can be caused to follow-up commands, and also the voltage actual vector only alters when the voltage command vector shifts from a domain which contains a voltage actual vector to another domain which contains a voltage command vector. Therefore, it is possible to reduce the switching frequency of the switching elements and to exercise control so that the power converter generates the closest voltage vector to the voltage command vector by:

calculating, from the output current of the power converter itself, the voltage command vector which corresponds to the voltage which the power converter itself should output;

discriminating whether this voltage command vector is contained in any rhombiform domain which contains an end point of a voltage actual vector of the power converter itself;

selecting the voltage actual vector of that domain as the voltage actual value; and switching the self-extinguishing elements ON/OFF according to that selected voltage actual vector.

The above-mentioned object of the present invention can be achieved by providing a controller for power converter having the following composition. That is to say, with a controller for power converter using, as the above-mentioned multi-level output power converter itself, a multi-level output 3-phase power converter in which the bridge for 1 phase is composed of:

a split voltage source in which a DC voltage source is split into at least n (n being an integer of 3 or more) units;

a series circuit, composed by connecting in series (2×n) self-extinguishing elements which are connected in parallel with the said DC voltage source and to each of which a diode is connected in anti-parallel, which outputs a voltage which is converted from the voltage of the said DC voltage source from between the nth self-extinguishing element and the (n+1)th self-extinguishing element from the positive side of the said DC voltage source;

at least (n−1) first clamp diodes of which the anode sides are connected to the negative sides of each split voltage source up to the (n−1)th split voltage source from the positive side of the DC voltage source, and of which the cathode sides are respectively connected to the negative terminals of each self-extinguishing element up to the (n−1)th self-extinguishing element from the positive side of the DC voltage source; and (n−1) second clamp diodes of which the cathode sides are connected to the negative sides of each split voltage source up to the (n−1)th split voltage source from the positive side of the DC voltage source, and of which the cathode sides are respectively connected to the negative terminals of each self-extinguishing element between the (n+1)th self-extinguishing element and the (2n−1)th self-extinguishing element from the positive side of the DC voltage source.

Consequently, with the controller for a power converter of the above-mentioned invention, in the same way as in the cases of the above-mentioned controller for a power converters, control can be exercised so that the power converter itself generates the voltage vector which is closest to the voltage command vector.

The above-mentioned object of the present invention can be achieved by providing a controller for power converter having the following composition. That is to say, with a controller for power converter using, as the above-mentioned multi-level output power converter, a multi-level output 3-phase phase power converter composed by taking unit converters, composed of converters which convert AC to DC power by rectification, and unit inverters, which convert DC to AC power, as cell inverters, and connecting a number of cell inverters.

Consequently, with the controller for a power converter of the above-mentioned invention, control can be exercised so that the power converter itself generates the voltage vector, which is closest to the voltage command vector.

BRIEF DESCRIPTION OF THE DRAWINGS

A more complete appreciation of the present invention and many of the attendant advantages thereof will be readily obtained as the same becomes better understood by reference to the following derailed description when considered in connection with the accompanying drawings, wherein:

FIG. 20 is divided into square - shape patterns, and (vp,vq) corresponding to (p,q) are written in each square - shape patterns;

FIG. 26 is a diagram showing one example of a vector selection table used in a controller for a power converter according to this third embodiment;

FIG. 27 is a diagram showing one example of a vector selection table used in a controller for a power converter according to this third embodiment;

FIG. 29 is a diagram showing one example of a vector selection table used in a controller for a power converter according to a further modification of the third embodiment;

FIG. 30 is a diagram showing one example of a vector selection table used in a controller for a power converter according to a further modification of the third embodiment;

FIG. 31 is a diagram showing one example of a vector selection table used in a controller for a power converter according to a further modification of the third embodiment;

FIG. 32 is a diagram showing one example of a vector selection table used in a controller for a power converter according to a further modification of the third embodiment;

FIG. 40 is a diagram showing one example of a vector selection table used in a controller for a power converter according to a further modification of the sixth embodiment;

FIG. 42 is a diagram showing the relationship between outputs and the switching elements IGBT of the 5-level inverter of FIG. 41;

FIG. 49 is a diagram showing one example of a vector selection table used in a controller for a power converter according to the eighth embodiment;

FIG. 50 is a diagram showing one example of a vector selection table used in a controller for a power converter according to the eighth embodiment;

FIG. 51 is a diagram showing one example of a vector selection table used in a controller for a power converter according to the eighth embodiment;

FIG. 52 is a diagram showing one example of a vector selection table used in a controller for a power converter according to the eighth embodiment;

FIG. 53 is a diagram showing one example of a vector selection table used in a controller for a power converter according to a modification of the eighth embodiment;

FIG. 71 is a diagram showing an example of a convex diagram and a non-convex diagram;

FIG. 76 is a hexagonal splitting spatial vector diagrams in a case where the previously selected vector is V222;

FIG. 82 is a diagram of the relationship between U phase elements and U phase output Su;

FIG. 86 is a diagram showing voltage vectors for describing the operation in a multi-level-output 3-phase power converter according to the fifteenth embodiment;

FIG. 87 is a diagram showing output voltages which can be generated by a 5-level-output converter;

DESCRIPTION OF THE PREFERRED EMBODIMENTS

Figure 1:
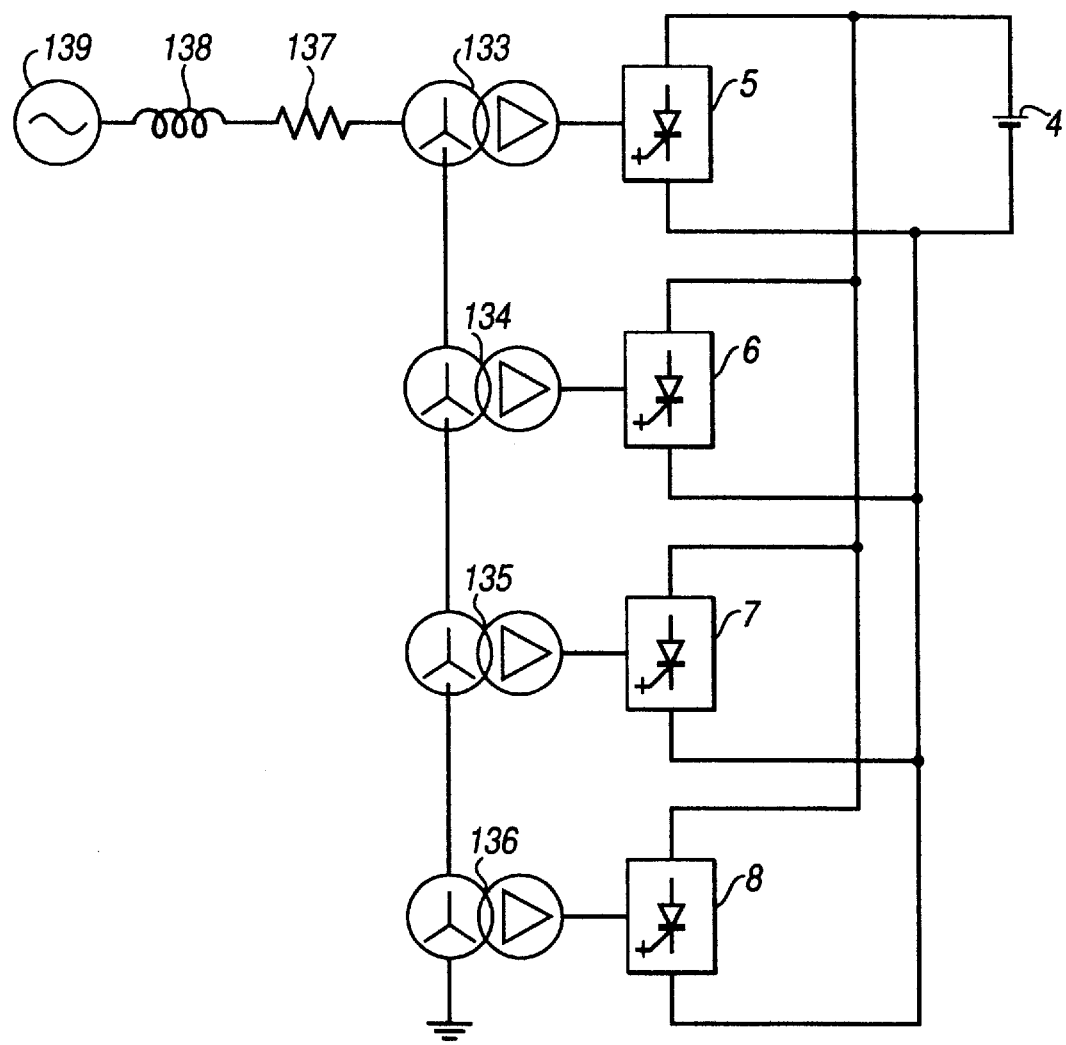
FIG. 1 is a circuit diagram showing the general composition of a prior art multiplex voltage-type power converter.

Referring now to the drawings, wherein like reference labels designate identical or corresponding parts throughout the several views, and more particularly to FIG. 16 thereof, one embodiment of the present invention will be described.

Figure 2:
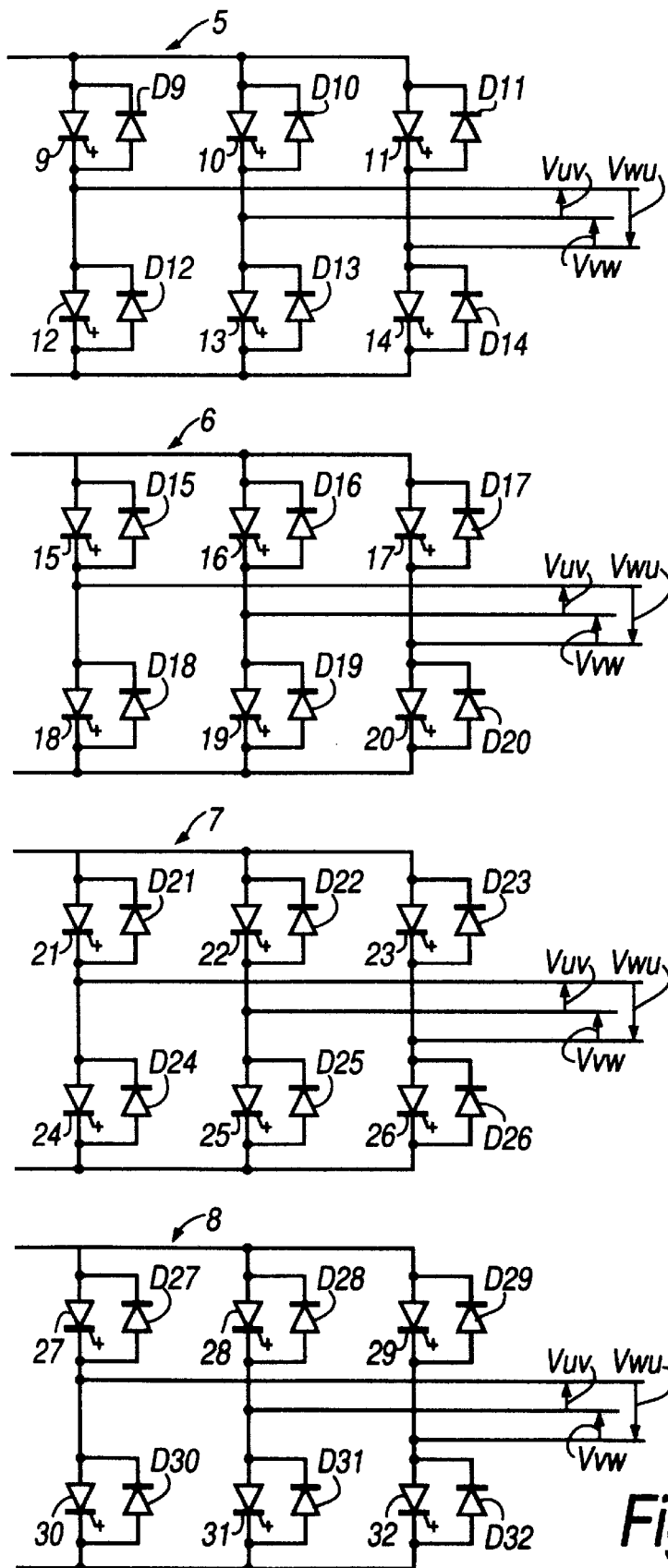
FIG. 2 is a circuit diagram showing the composition of the main circuit of the power converter in FIG. 1.

Since the composition of the main circuit of the multiplex voltage-type converter applying the present invention is the same that illustrated in FIG. 1 and FIG. 2 described above, description thereof is omitted here.

Furthermore, the DC voltages applied to converter 5–converter 8 are respectively equal, or are controlled such chat they are equal.

Figure 4:
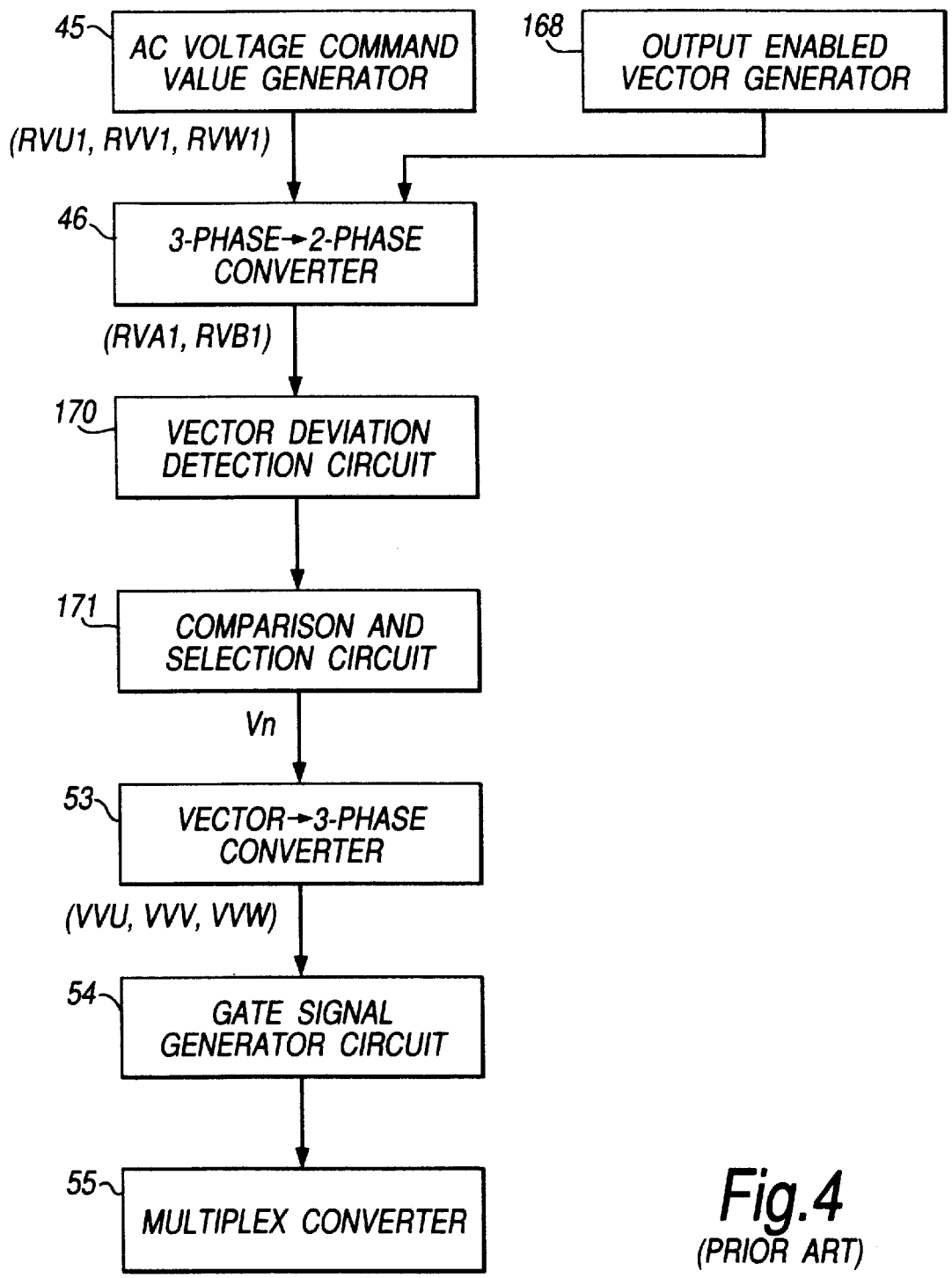
FIG. 4 is a block diagram showing the function and sequence of a controller for the multiplex voltage-type power converter in FIG. 1.
Figure 16:
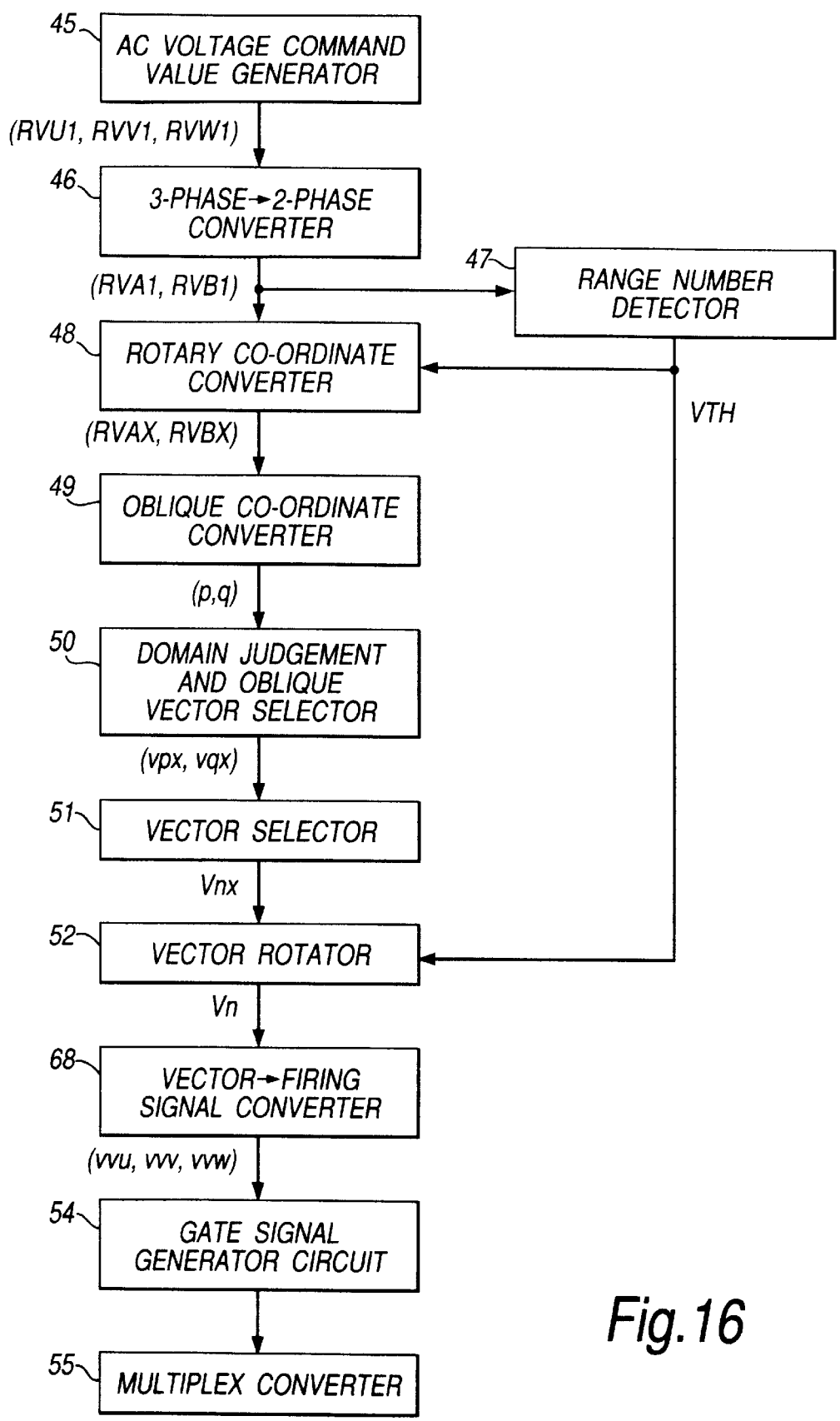
FIG. 16 is a block diagram showing the function and sequence of a first embodiment of a controller for a power converter according to the prevent invention.

FIG. 16 is a block diagram showing the function and sequence of a controller fur a power converter according to the present embodiment. Parts which are the same as FIG. 4 described above are given the same reference labels.

In FIG. 16, an AC voltage command value generator 45 generates AC voltage command values (RVU1, RVV1, RVW1) corresponding to converters 5–8. Here, RV stands for "Reference voltage", and U, V, W stand for the U phase, V phase and W phase which represent the three-phase (voltage).

In order to standardize the description, here, the AC voltage command values (RVU1, RVV1, RVW1) are taken as the U phase, V phase and W phase output voltage command values for the whole converter when the magnitude of the DC input voltage at each bridge is 1.0. Furthermore, if the multiplex number is taken as MLT, then the magnitude of the voltage outputtable in each phase will be MLT or −MLT for the whole converter.

Figure 3:
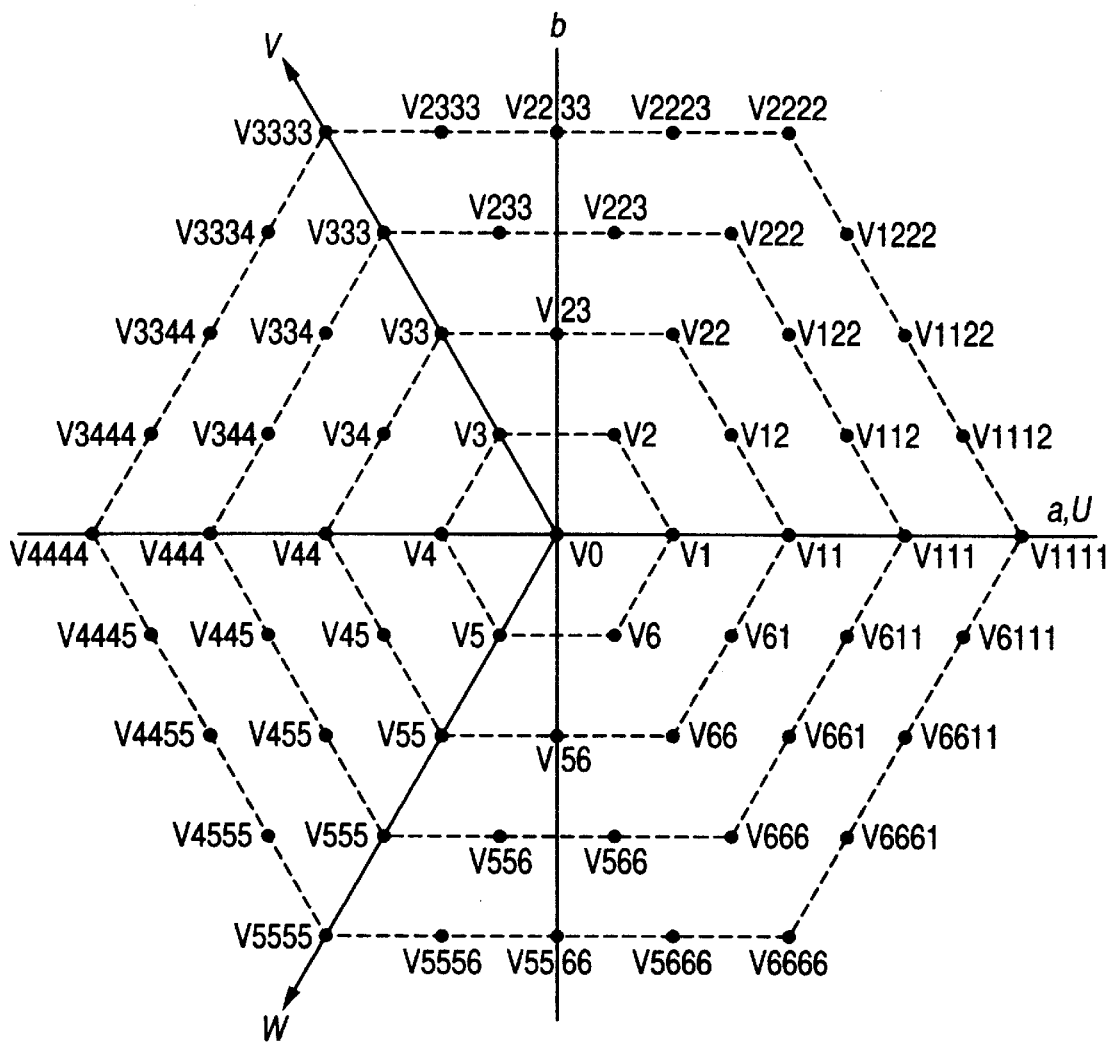
FIG. 3 is a diagram showing one example of output vectors which can be generated by the multiplex voltage-type power converter in FIG. 1.

In an actual device, since voltage commands are generated for converters 5–8 as a result of control calculations for active/reactive power control, motor control, and the like, a transiently large value may be taken as the control calculation result, but by means of appropriate limit processing, the vectors corresponding to the AC voltage command values (RVU1, RVV1, RVW1) are confined within the outputtable region of the aforementioned spatial vector diagram in FIG. 3, in other words, inside the outermost hexagonal shape.

Naturally, $$RVU1+RVV1+RVW1=0$$

Furthermore, 3-phase 2-phase converter 46 converts the AC voltage command value (RVU1, RVV1, RVW1) generated by AC voltage command value generator 45 to rectangular (or orthogonal) co-ordinate system voltage command vectors (RVA1, RVB1), using the equation $$\begin{bmatrix} RVA1 \\ RVB1 \end{bmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} RVU1 \\ RVY1 \\ RVW1 \end{bmatrix} = \frac{3}{2}\begin{bmatrix} 1 & 0 \\ -\frac{1}{\sqrt{3}} & -\frac{2}{\sqrt{3}} \end{bmatrix} \begin{bmatrix} RVU1 \\ RVW1 \end{bmatrix} \quad (1)$$

Moreover, range number detector 47 detects the range number VTH in which the voltage command vector is located, when the spatial vector diagram is divided into six ranges: −30°–+30°, 30°–90°, 90°–150°, 150°–210°, 210°–270°, 270°–330°, and range numbers from 0–5 are assigned to each divided region.

On the other hand, rotation co-ordinates converter 48 rotates the voltage command vector (RVA1, RVB1) converted to 2-phase by the 3-phase→2-phase converter 46 by −60 deg*VTH, using the range number VTH detected by range number detector 47 and the equation $$\begin{bmatrix} RVAX \\ RVBX \end{bmatrix} = \begin{bmatrix} \cos(-60\deg * VTH) & -\sin(-60\deg * VTH) \\ \sin(-60\deg * VTH) & \cos(-60\deg * VTH) \end{bmatrix} \begin{bmatrix} RVA1 \\ RVB1 \end{bmatrix} \quad (2)$$

thereby moving the voltage command vector to the range between angles −30°–+30° in the rectangular (or orthogonal) co-ordinate s system.

Oblique co-ordinates converter 49 executes oblique co-ordinates conversion of the −30°–+30° portion of the spatial vector diagram containing the voltage command vector converted by rotation co-ordinates converter 48, to a vector diagram based on an oblique co-ordinates system where vectors in the 30° direction and the +30° direction of the orthogonal co-ordinates system are taken as unit vectors.

Here, the operation of the aforementioned orthogonal co-ordinates converter 49 is described in detail with reference to FIG. 17 to FIG. 21.

Figure 17:
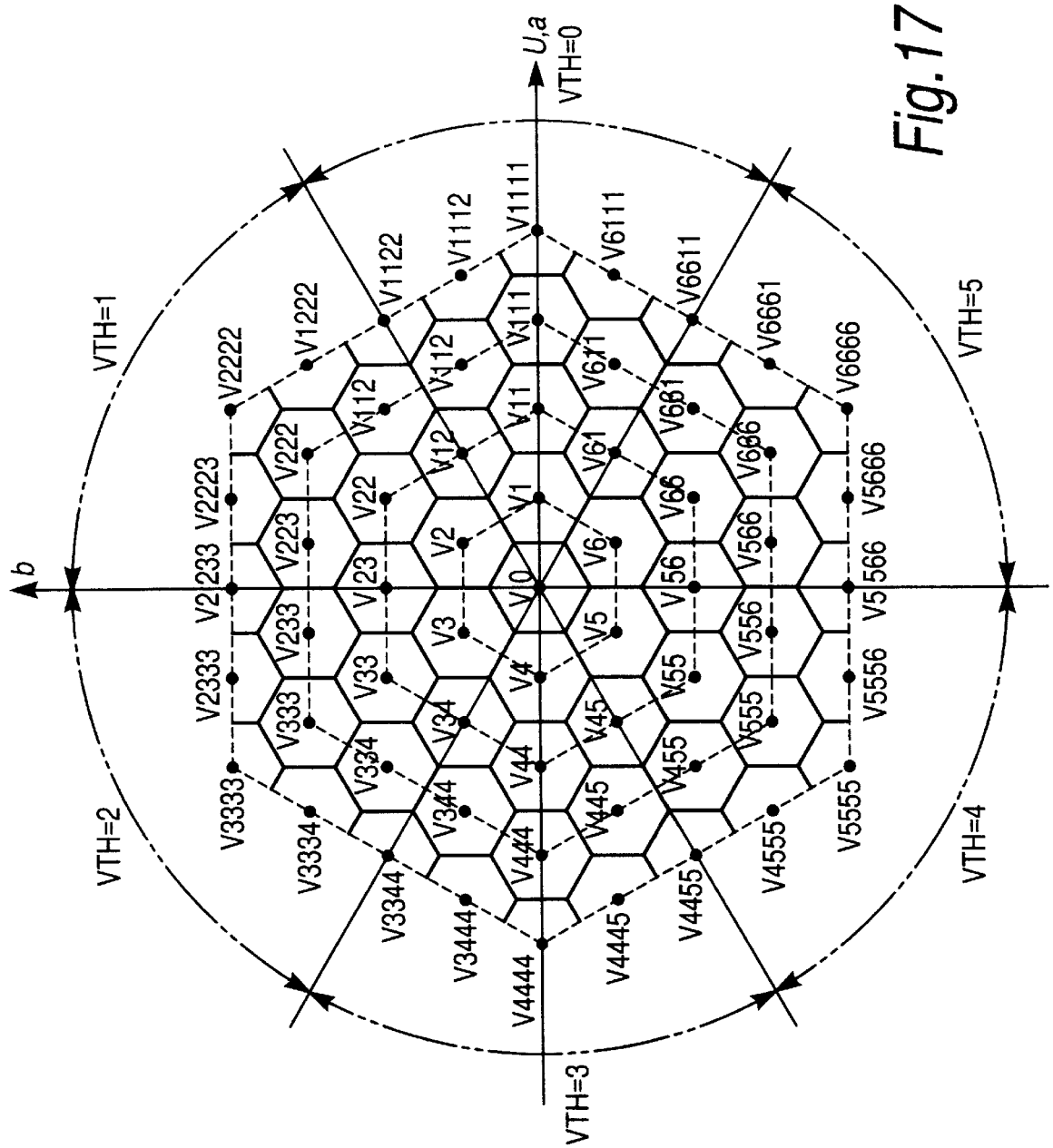
FIG. 17 is a diagram showing a state where the spatial vector diagram in FIG. 40 is divided into small domains in which voltage command vectors can be located, such that each output vector is selected.

FIG. 17 is a diagram where the spatial vector diagram in FIG. 3 is divided into small domains in which voltage command vectors can be located, such that each output vector is selected.

As shown in the diagram, each small domain is a hexagonal shape surrounding an output vector.

Figure 18:
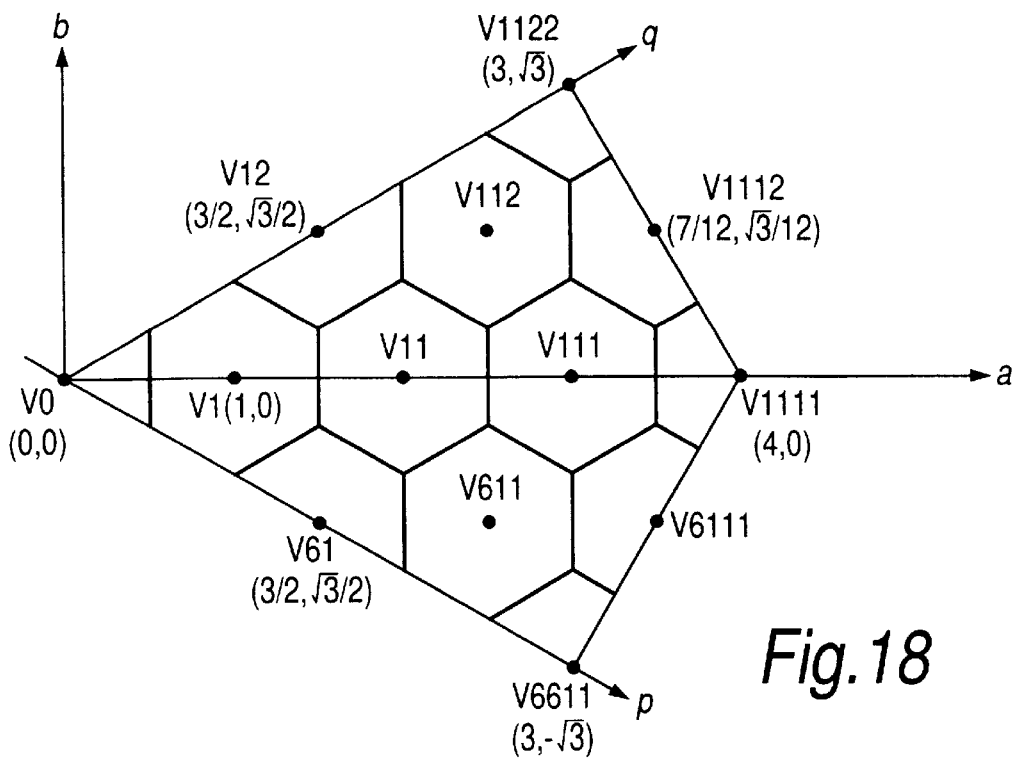
FIG. 18 is a diagram showing an isolated view of the −−30°−+30° angle range of the spatial vector diagram in FIG. 17.

FIG. 18 is an isolated view of the range between angles −30°–++° in FIG. 17.

Figure 19:
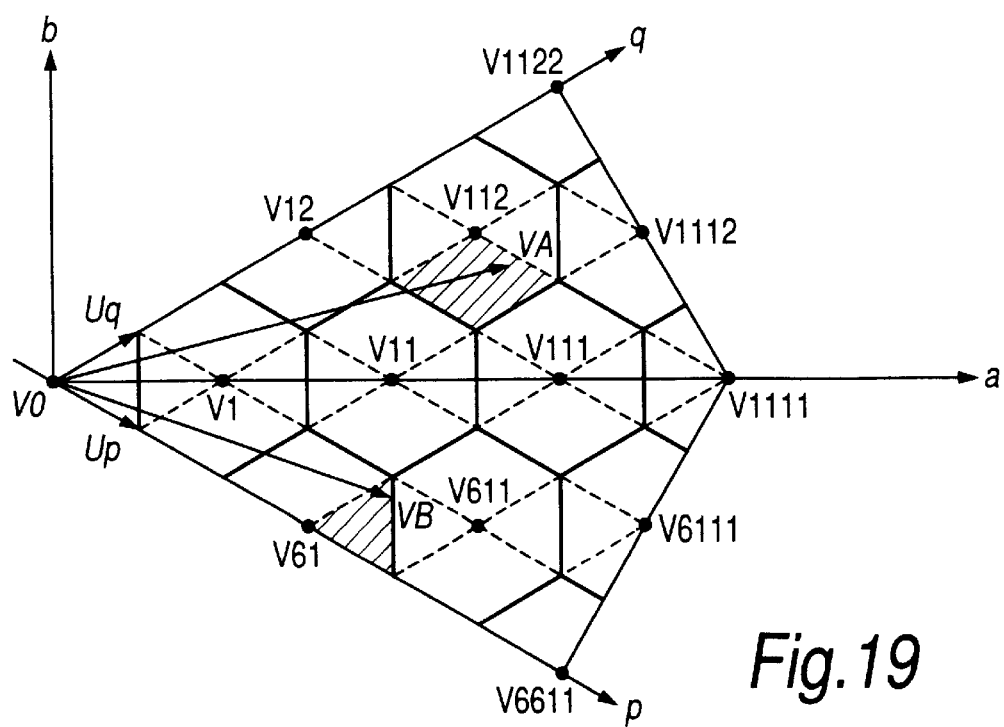
FIG. 19 is a diagram showing a state where supplementary lines are drawn on FIG. 18.

FIG. 19 shows a view where supplementary lines are drawn on FIG. 18 in the direction of the −30° angle and in the direction of the +30° angle.

As shown in the diagram, the small hexagons surrounding each output vector are split into parallelograms and triangles.

For example, if the voltage command vector rotated by rotation co-ordinates converter 48 is vector VA in FIG. 19, then since VA is located within the parallelogram-shaped domain shown in the diagram, it is recognized that the output vector closest to this voltage command vector is V112.

Furthermore, if the voltage command vector rotated by rotation co-ordinates converter 48 is VB, then since VB is located within the triangular-shaped domain shown in the diagram, it is recognized that the output vector closest to this voltage command vector is V61.

Moreover, the vector in the −30° direction in FIG. 19, $$\vec{u_p} = \frac{1}{\sqrt{3}}\begin{bmatrix} \cos(-30°) \\ \sin(-30°) \end{bmatrix} = \frac{1}{\sqrt{3}}\begin{bmatrix} \frac{\sqrt{3}}{2} \\ -\frac{1}{2} \end{bmatrix} \quad (3)$$

and the rector in the +30° direction, $$\vec{u_q} = \frac{1}{\sqrt{3}}\begin{bmatrix} \cos 30° \\ \sin 30° \end{bmatrix} = \frac{1}{\sqrt{3}}\begin{bmatrix} \frac{\sqrt{3}}{2} \\ \frac{1}{2} \end{bmatrix} \quad (4)$$

may be of different magnitudes.

As described below, the vector diagram after oblique co-ordinates conversion should be splittable into square - shape patterns, such that output vectors are positioned at the top left (or upper left), bottom right (or lower right) or both bottom left (or lower left) and top right (or upper right) of each square - shape patterns, but here unit vectors are taken as described above as a typical conversion example.

If the point (a, b) based on orthogonal co-ordinates is expressed by a linear combination of the aforementioned unit vectors up and uq, then it becomes $$\begin{bmatrix} a \\ b \end{bmatrix} = p\frac{1}{\sqrt{3}}\begin{bmatrix} \frac{\sqrt{3}}{2} \\ -\frac{1}{2} \end{bmatrix} + q\frac{1}{\sqrt{3}}\begin{bmatrix} \frac{\sqrt{3}}{2} \\ \frac{1}{2} \end{bmatrix} = \frac{1}{\sqrt{3}}\begin{bmatrix} \frac{\sqrt{3}}{2} & \frac{\sqrt{3}}{2} \\ -\frac{1}{2} & \frac{1}{2} \end{bmatrix}\begin{bmatrix} p \\ q \end{bmatrix} \quad (5)$$

and conversely, $[p\ q]^T$ becomes:

$$\begin{bmatrix} p \\ q \end{bmatrix} = \sqrt{3} \begin{bmatrix} \frac{\sqrt{3}}{2} & \frac{\sqrt{3}}{2} \\ -\frac{1}{2} & \frac{1}{2} \end{bmatrix}^{-1} \begin{bmatrix} a \\ b \end{bmatrix} = \begin{bmatrix} 1 & -\sqrt{3} \\ 1 & \sqrt{3} \end{bmatrix} \begin{bmatrix} a \\ b \end{bmatrix} \quad (6)$$

Figure 20:
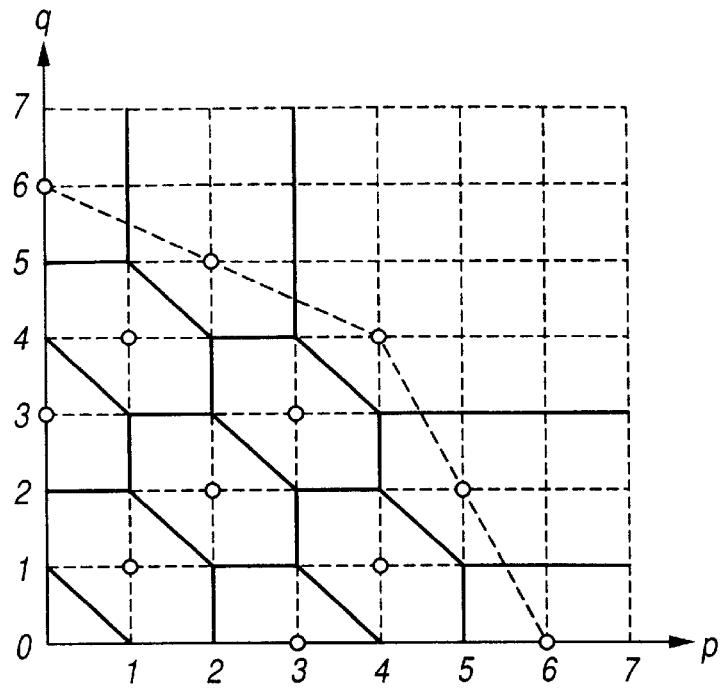
FIG. 20 is a diagram showing a state where the spatial vector diagram in FIG. 19 is converted to oblique co-ordinates.

FIG. 20 shows the state in FIG. 19 after co-ordinates conversion using Equation (6).

The output vectors are represented by the white-centred dots. The parallelogram shapes and equilateral triangular shapes in FIG. 19 have been converted to squares and right-angled triangles, respectively.

Here, the integral values for the real numbers p, q, discarding figures after the decimal point, are taken as vp and vq, respectively.

Figure 21:
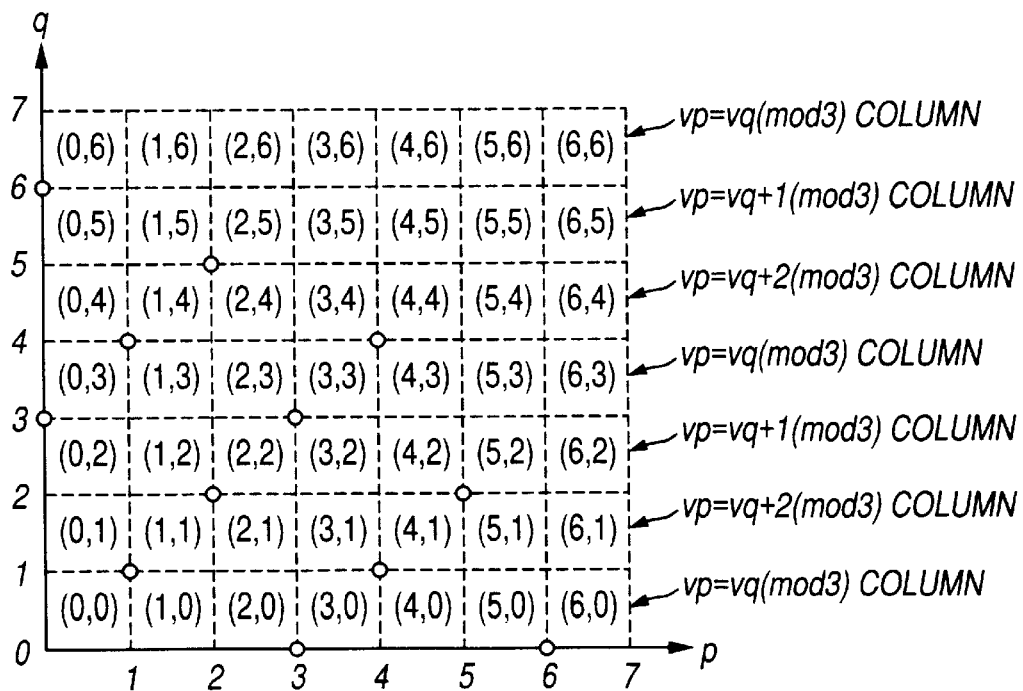
FIG. 21 is a diagram showing a state where

FIG. 21 shows a state where FIG. 20 is divided into square-shaped square - shape patterns, and the (vp,vq) values corresponding to (p,q) are written into each square - shape patterns.

Comparing FIG. 20 and FIG. 21, if, for example, the voltage command vector is located in square - shape patterns (vp,vq)=(1,0), then (1,1) will be selected as the output vector.

Furthermore, if it is located in square - shape patterns (vp,vq)=(2,0), when (3,0) will be selected as the output vector.

Moreover, if it is located in square - shape patterns (vp,vq)=(0,0), then (1,1) or (0,0) will be selected, depending on whether it is located above or below the diagonal line sloping to bottom right.

As is clear from these examples, the square columns leading from bottom left to top right can be divided into three groups.

Group 1

Group containing:
Column {(1,0), (2,1), (3,2), . . . }
Column {(0,2), (1,3), (2,4), . . . } etc.

The relationship between vp and vq in each square - shape patterns in this group is given by vp=vq+1 (mod 3).

Here, "x=y (mod 3)" indicates that x are y are equal if differences which are integral factors of three are discarded.

If the voltage command vector falls into a square - shape patterns in this group, then the co-ordinates at the top left of the square - shape patterns should be selected.

Namely, if the vector to be selected is taken to be (vpx,vqx), then $$(\text{vpx, vqx}) = (\text{vp,vq}+1) \quad (7)$$

Group 2

Group containing:
Column {(2,0), (3,1), (4,2), . . . }
Column {(0,1), (1,2), (2,3), . . . } etc.

The relationship between vp and vq in each square - shape patterns in this group is given by vp=vq+2 (mod 3).

If the voltage command vector falls into a square - shape patterns in this group, then co-ordinates at the bottom right of the square - shape patterns should be output.

Namely, $$(\text{vpx,vqx}) = (\text{vp}+1,\text{vq}) \quad (8)$$

Group 3

Group containing:

Column {(0,0), (1,1), (2,2), . . . }
Column {(3,0), (4,1), (5,2), . . } etc.

The relationship between vp and vq in each square - shape patterns in this group is given by vp=vq (mod 3).

Cases where the -voltage command vector falls into a square - shape patterns in this group are divided into two types, depending on whether it lies below left or above right of the straight line $$p+q=vp+vq+1$$

If it is below left, then the bottom left co-ordinates of the square - shape patterns, and if it above right, then the top right co-ordinates of the square - shape patterns, should be selected as the output vector, respectively.

Namely,

If p+q<vp+vq+1, then $$(\text{vpx,vqx}) = (\text{vp,vq}) \quad (9)$$

and if p+q≧vp+vq+1, then $$(\text{vpx,vqx}) = (\text{vp}+1,\text{vq}+1) \quad (10)$$

On the other hand, in FIG. 16, domain judgement and oblique vector selector 50 determines which square - shape patterns domain or triangular domain contains the voltage command vector converted by oblique co-ordinates converter 49 using the foregoing logic, and it calculates oblique-system output vector co-ordinates (vpx,vqx).

Furthermore, vector selector 51 selects an output vector Vnx in response to the (vpx,vqx) value calculated by domain judgement and oblique vector selector 50.

In this case, one of the output vectors V0, V1, V61, V11, V12, V611, V111, V112, V6611, V6111, V1111, V1112, V1122 is selected.

Moreover, vector rotator 52 rotates the output vector Vnx supplied by vector selector 51 through 60 deg*VTH, thereby calculating the output vector Vn closest to the voltage command vector calculated by 3-phase □ 2-phase converter 46.

For example, if the original voltage command vector calculated by 3-phase→2-phase converter 46 is in the range VTH=1 in FIG. 17, and vector V1112 is selected by vector selector 51, then vector V2223 is obtained by means of the 60° rotation by vector rotator 52.

A vector→ignition signal converter 66 calculates an ignition signal corresponding to the output vector Vn derived by vector rotator 52. For example, for vector V2223, a signal for igniting the U, V and Z phases is generated for three of the four bridges and a signal for igniting the X, V and Z phases is generated for one bridge.

Furthermore, gate signal generator 54 generates ignition pulses for the self-extinguishing type switching elements of the multiplex voltage-type converter 55 constituted by the converters 5–8 in FIG. 1 and FIG. 2.

As described above, in a controller for a power converter according to a first embodiment, since it is determined by simple calculation which domain of an oblique co-ordinates system the voltage command vector is located in, it is possible to select the output vector closest to the voltage command vector quickly, simply by calculation of the co-ordinate values of the voltage command vector in an oblique co-ordinates system, plus some additional calculation, without calculating the vector deviation between all output vectors and the voltage command vector.

Thereby, it is possible to implement PWM control by spatial vector comparison at high speed, and consequently, improvement in the response characteristics and waveform of a power converter can be achieved.

Modification of first embodiment

Figure 22:
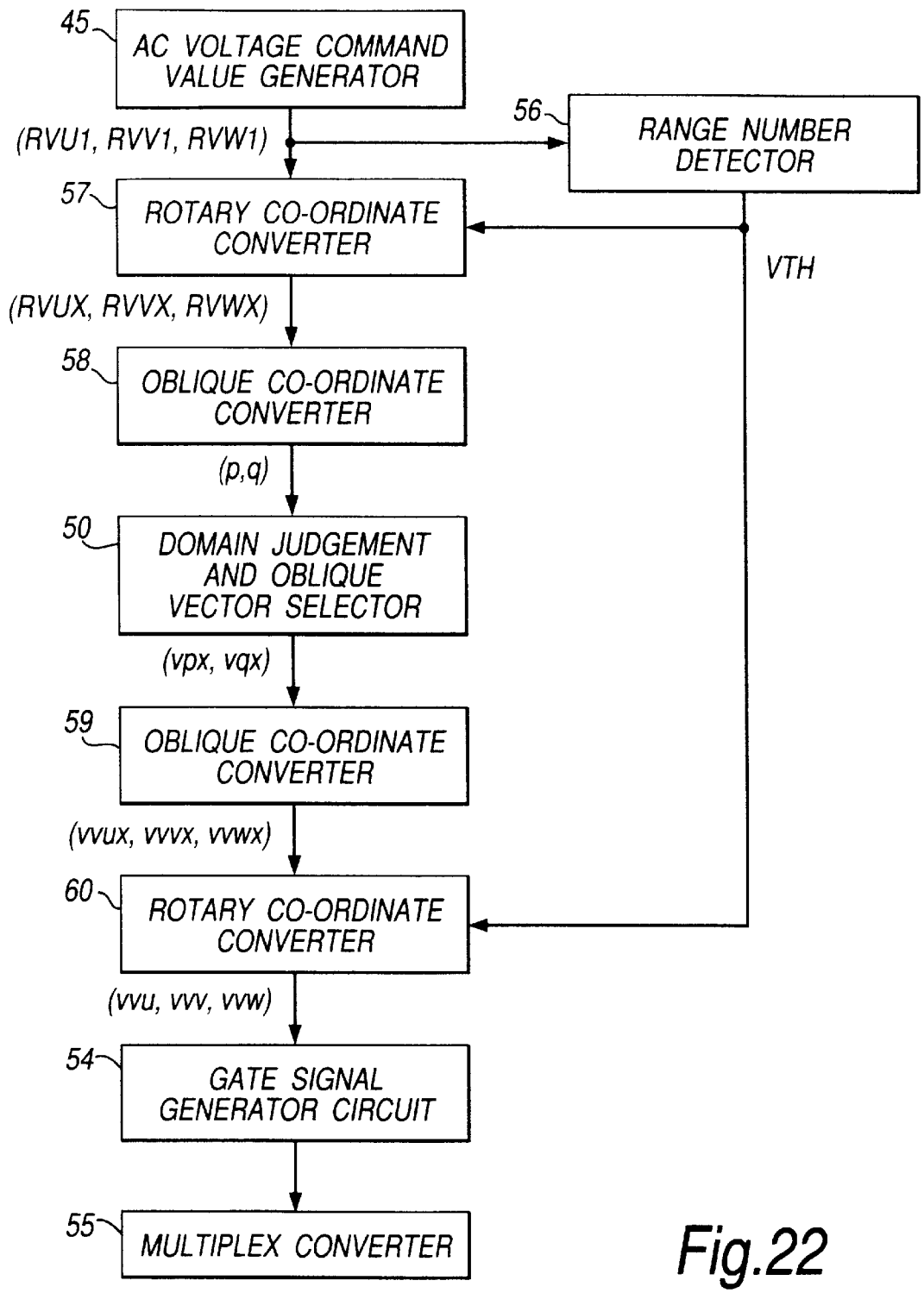
FIG. 22 is a block diagram showing a further modification of the firs: embodiment of a controller for a power converter according to the present invention.

FIG. 22 shows a block diagram of a modification of a controller for a power converter according to the first embodiment. Parts which are the same as parts in FIG. 16 are given the same reference labels.

In FIG. 22, AC voltage command value generator 45 generates an AC voltage command value (RVU1, RVV1, RVW1).

Furthermore, range number detector 56 detects the ranger number VTH of the ranges divided every 60° of the spatial vector diagram in FIG. 17, from the AC voltage command value (RVU1, RVV1, RVW1).

In this case, the logic given below, for example, is used to detect the range number VTH.

if RVU1>0 and RVV1<0 and RVV1<0 then VTH=0 if RVU1>0 and RVV1>0 and RVV1<0 then VTH=1 if RVU1<0 and RVV1>0 and RVV1<0 then VTH=2 if RVU1<0 and RVV1>0 and RVV1>0 then VTH=3 if RVU1<0 and RVV1<0 and RVV1>0 then VTH=4 if RVU1>0 and RVV1<0 and RVV1>0 then VTH=5        (11)

Rotation co-ordinates converter 57, on the other hand, calculates a voltage command vector (RVUX, RVVX, RVWX), wherein the AC voltage command value (RVU1, RVV1, RVW1) generated by AC voltage command value generator 45 is rotated through −60 deg*VTH in accordance with the range number VTH detected by range number detector 56, by means of the following equation.

if VTH=0 then

RVUX=RVU1

RVVX=RVV1

RVVX=RVU1 if VTH=1 then

RVUX=−RVV1

RVVX=−RVU1

RVVX=−RVV1 if VTH=2 then

RVUX=RVV1

RVVX=RVV1

RVVX=RVU1 if VTH=3 then

BVUX=−RVU1

RVVX=−RVV1

RVVX=−RVV1 if VTH=4 then

RVUX=RVU1

RVVX=RVU1

RVVX=RVV1 if VTH=5 then

RVUX=−RVV1

RVVX=−RVV1

RVVX=−RVU1        (12)

Furthermore, by means of the equation $$\begin{bmatrix} p \\ q \end{bmatrix} = \begin{bmatrix} 1 & -\sqrt{3} \\ 1 & \sqrt{3} \end{bmatrix} \cdot \begin{bmatrix} 3 \\ \frac{3}{2} \end{bmatrix} \begin{bmatrix} 1 & 0 \\ -\frac{1}{\sqrt{3}} & -\frac{2}{\sqrt{3}} \end{bmatrix} \begin{bmatrix} RVUX \\ RVWX \end{bmatrix} = 3 \begin{bmatrix} 1 & 1 \\ 0 & -1 \end{bmatrix} \begin{bmatrix} RVUX \\ RVWX \end{bmatrix} \quad (13)$$

oblique co-ordinates converter 58 converts the voltage command vector converted by rotation co-ordinates converter 57 to a vector (p,q) based on an orthogonal co-ordinates system, wherein two vectors, in the −30° direction and in the +30°direction in the spatial vector diagram, are taken as unit vectors.

Thereupon, similarly to the case described in the first embodiment in FIG. 16, domain judgement and oblique vector selector 50 determines the domain in which the oblique co-ordinates system voltage command vector (p,q) is located, and calculates the output vector co-ordinates (vpx,vqx) in the oblique system.

Furthermore, by means of the following equations, if $vpx > vpx$ then        (14)

$$\begin{bmatrix} vvux \\ vvwx \end{bmatrix} = \frac{1}{3} \begin{bmatrix} 2 & 1 \\ 1 & -1 \end{bmatrix} \begin{bmatrix} vpx \\ vqx \end{bmatrix}$$

$vvvx = 0$ else $$\begin{bmatrix} vvux \\ vvvx \end{bmatrix} = \frac{1}{3} \begin{bmatrix} 1 & 2 \\ -1 & 1 \end{bmatrix} \begin{bmatrix} vpx \\ vqx \end{bmatrix} \quad (15)$$

$vvvx = 0$ endif oblique co-ordinates converter 59 calculates provisional ignition bridge numbers (vvux,vvvx,vvwx) for the U phase elements/V phase elements/W phase elements in the co-ordinates system rotated by −60 deg*VTH, from the oblique system output vector co-ordinates (vpx,vqx) derived by domain judgement and oblique vector selector 50.

For example, with four levels, if VTR=0 and vvux=3, then the U elements ignite at three of the bridges, and the X element ignites at 4−3=1 bridge. If vvvx=0, then the Y element ignites at four bridges. This applies similarly to vvwx.

Meanwhile, a rotation co-ordinates converter 60 calculates actual element ignition bridge numbers (vvu,vvv,vvw)

by rotating the aforementioned provisional element ignition bridge numbers (vvux,vvvx,vvwx) through +60 deg*VTH in accordance with the range number VTH detected by range number detector 56, by means of the following equation:

$$
\begin{aligned}
&\text{if VTH} = 0 \quad \text{then} \\
&\quad \text{vvu} = \text{vvux} \\
&\quad \text{vvv} = \text{vvvx} \\
&\quad \text{vvw} = \text{vvwx} \\
&\text{elseif VTH} = 1 \quad \text{then} \\
&\quad \text{if vpx} >= \text{vqx then} \\
&\quad\quad \text{vvu} = \text{vvux} \\
&\quad\quad \text{vvv} = \text{vvux}-\text{vvwx} \\
&\quad\quad \text{vvw} = 0 \\
&\quad \text{else} \\
&\quad\quad \text{vvu} = \text{vvux}-\text{vvvx} \\
&\quad\quad \text{vvv} = \text{vvux} \\
&\quad\quad \text{vvw} = 0 \\
&\quad \text{endif} \\
&\text{elseif VTH} = 2 \quad \text{then} \\
&\quad \text{if vpx} > \text{vqx then} \\
&\quad\quad \text{vvu} = \text{vvwx} \\
&\quad\quad \text{vvv} = \text{vvux} \\
&\quad\quad \text{vvw} = 0 \\
&\quad \text{else} \\
&\quad\quad \text{vvu} = 0 \\
&\quad\quad \text{vvv} = \text{vvux} \\
&\quad\quad \text{vvw} = \text{vvvx} \\
&\quad \text{endif} \\
&\text{elseif VTH} = 3 \quad \text{then} \\
&\quad \text{if vpx} >= \text{vqx then} \\
&\quad\quad \text{vvu} = 0 \\
&\quad\quad \text{vvv} = \text{vvux} \\
&\quad\quad \text{vvw} = \text{vvux}-\text{vvwx} \\
&\quad \text{else} \\
&\quad\quad \text{vvu} = 0 \\
&\quad\quad \text{vvv} = \text{vvux}-\text{vvvx} \\
&\quad\quad \text{vvw} = \text{vvux} \\
&\quad \text{endif} \\
&\text{elseif VTH} = 4 \quad \text{then} \\
&\quad \text{if vpx} >= \text{vqx then} \\
&\quad\quad \text{vvu} = 0 \\
&\quad\quad \text{vvv} = \text{vvwx} \\
&\quad\quad \text{vvw} = \text{vvux} \\
&\quad \text{else} \\
&\quad\quad \text{vvu} = \text{vvvx} \\
&\quad\quad \text{vvv} = 0 \\
&\quad\quad \text{vvw} = \text{vvux} \\
&\quad \text{endif} \\
&\text{elseif VTH} = 5 \quad \text{then} \\
&\quad \text{if vpx} >= \text{vqx then} \\
&\quad\quad \text{vvu} = \text{vvux}-\text{vvwx} \\
&\quad\quad \text{vvv} = 0 \\
&\quad\quad \text{vvw} = \text{vvux} \\
&\quad \text{else} \\
&\quad\quad \text{vvu} = \text{vvux} \\
&\quad\quad \text{vvv} = 0 \\
&\quad\quad \text{vvw} = \text{vvux}-\text{vvvx} \\
&\quad \text{endif} \\
&\text{endif}
\end{aligned}
\tag{16}
$$

Thereupon, similarly to the foregoing description of the first embodiment in FIG. 16, gate signal generator 54 generates ignition pulses for the self-extinguishing type switching elements in multiplex voltage-type converter 55 comprising converters 5–8 in FIG. 1 and FIG. 2, on the basis of the element ignition bridge numbers (vvu, vvv, vvw).

As described above, in a controller for a power converter according to this embodiment, co-ordinates calculation is further simplified in comparison with the first embodiment in FIG. 16, and therefore the output vector closest to the voltage command vector can be selected more quickly.

Thereby, it is possible to implement PWM control by spatial vector comparison more quickly, and consequently, further improvement in the response characteristics and waveform of the power converter can be achieved.

The improvement in response is clear from the above explanation, but waveform improvement is explained further here. That is to say, because the output vector closest to the voltage command vector can be selected quickly, the output vector thus rapidly follows the command vector, so the target waveform also is improved. Hereafter, "waveform improvement" means improvement obtained as described above.

The second embodiment

Figure 23:
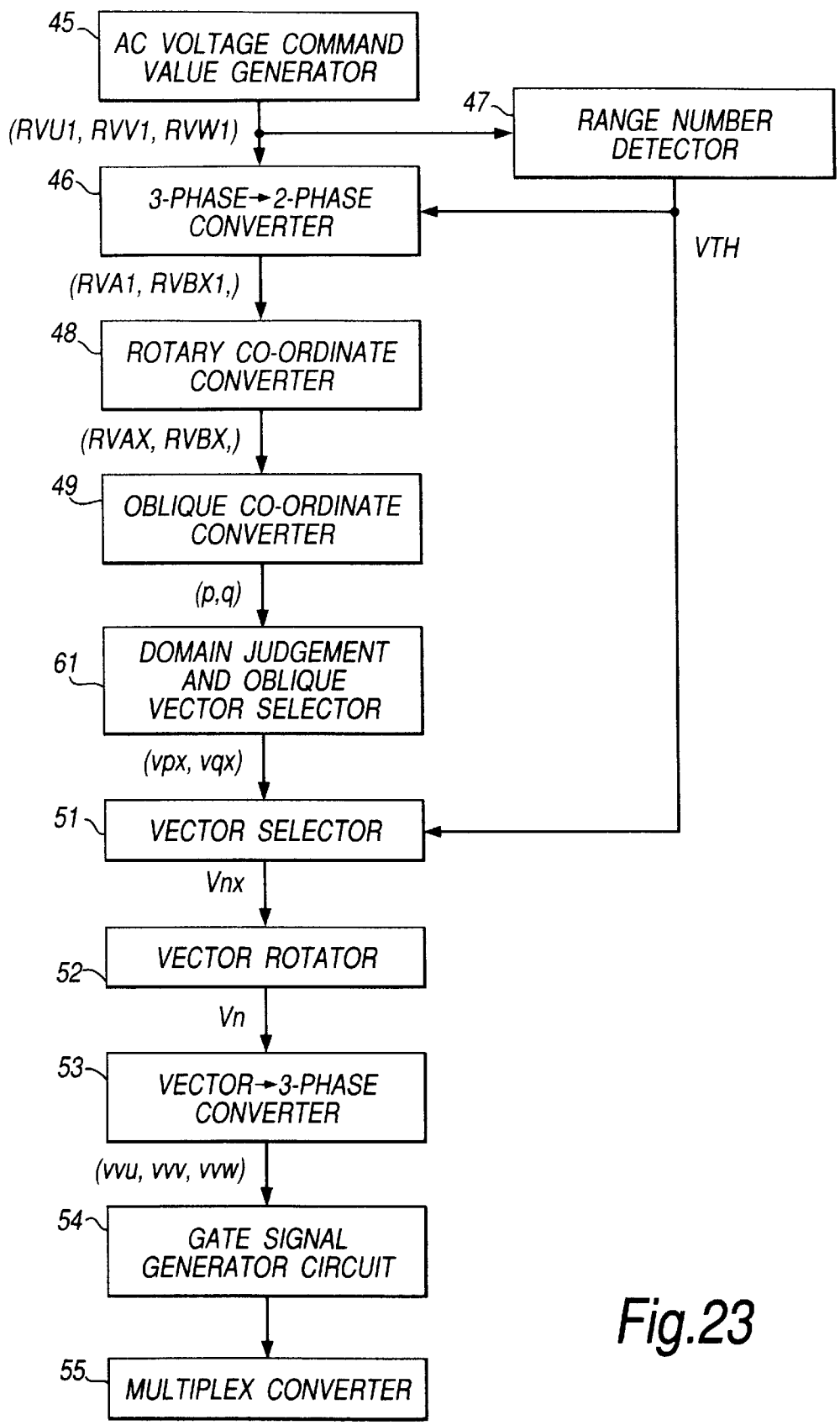
FIG. 23 is a block diagram stowing the function and sequence of a second embodiment of a controller for a power converter according to the present invention.

FIG. 23 is a block diagram showing the function and sequence of a controller for a power converter according to the present embodiment; parts which are the same as FIG. 16 are given similar reference labels and description thereof is omitted, only those parts which are different being described here.

In FIG. 23, domain judgement and oblique vector selector 61 calculates oblique system output vector co-ordinates (vpx,vqx) corresponding to the output vector closest to the voltage command vector, in accordance with the oblique system voltage command vector (p,q) derived by the aforementioned oblique co-ordinates converter 49, but the operation thereof differs somewhat from the domain judgement and oblique vector selector 50 described in the first embodiment in FIG. 16.

Below, the operation of domain judgement and oblique vector selector 61 is described with reference to FIG. 24.

Figure 24:
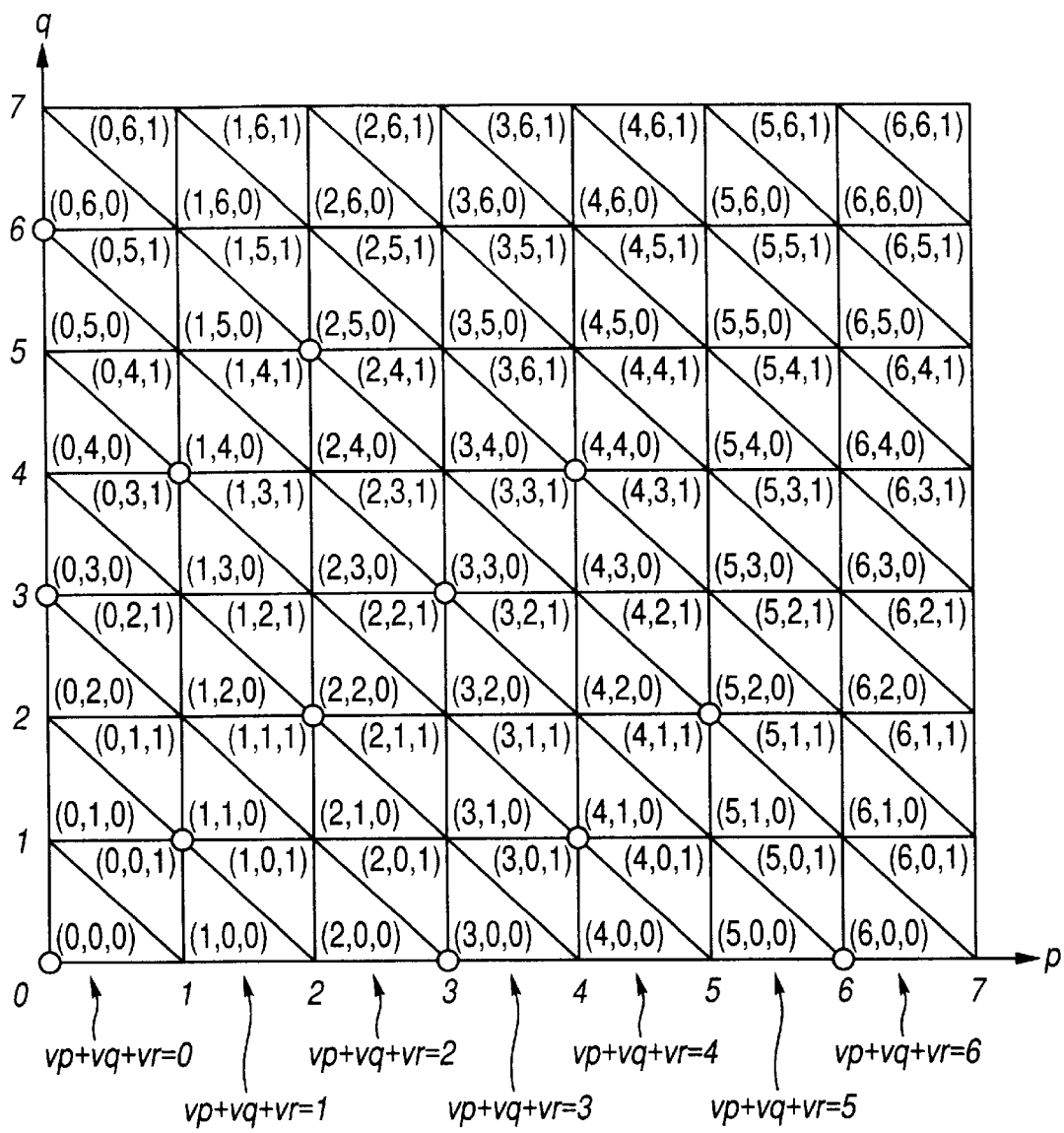
FIG. 24 is a diagram for describing the operation of a controller for a power converter according to this second embodiment.

FIG. 24 shows a state where each square - shape patterns in FIG. 20 is divided into triangular shapes by means of lines connecting the top left vertex and bottom right vertex thereof, the value (vp,vq,vr) being inserted in each square - shape patterns.

Here, "vr" is the value of p+q−vp−vq, discarding any figures after the decimal point; in the bottom left triangle of each square - shape patterns vr=0, whilst in the top right triangle of each square - shape patterns, vr=1.

In FIG. 24, the output vector to be selected is determined automatically depending on which triangular domain the voltage command vector (p,q) is located in.

For example, if (p,q)=(5.5,1.2), then (vp,vq,vr)=(5,1,0), and the output vector to be selected will be (vpx,vqx)=(5,2).

The triangles in FIG. 24 can be divided into groups where vp+vq+vr=constant value.

For example, in the row (0,1,0), (0,0,1), (1,0,0), vp vq+vr=1, in the row (0,2,0), (0,1,1), (1,1,0), (1,0,1), (2,0,0), vp+vq+vrp=2, and in the row (0,3,0), (0,2,1), (3,0,0), vp+vq+vr=3.

In a consecutive row of triangles in a group having the same value for vp+vq+vx, the selected output vector (vpx, vqx) is the same for three triangles at most.

For example, in the group where vp+vq+vr=3, in domains (3,0,0) and (2,0,1), vp=vq≧2, and (vpx,vqx)=(3,0) is selected, in domains (2,1,0), (1,1,1) and (1,2,0), −1<=vp− vq<=1, and (vpx,vqx) =(2,2) is selected.

Furthermore, in the domains (0,2,1) and (0,3,0), vp−vq<=−2, and (vpx,vqx)=(0,3) is selected.

Moreover, for other rows of vp+vq+vr=constant, (vpx, vqx) can be calculated similarly.

Domain judgement and oblique vector selector 61 calculates the output vector (vpx,vqx) from voltage command vector (p,q) at the oblique system as described above.

With the exception of the domain judgement and oblique vector selector 61, the operation of the present embodiment is the same as that described in the first embodiment illustrated in FIG. 16.

As described above, in the controller for a power converter according to the present embodiment, the output vector closest to a voltage command vector can similarly be selected quickly, simply by calculation of co-ordinates values for the voltage command vector in an oblique co-ordinates system, plus some additional calculation, without deriving the vector deviation between the voltage command vector and all output vectors.

Thereby, it is possible to implement PWM control by spatial vector comparison quickly, and consequently, improvement in the response characteristics and waveform of the power converter can be achieved.

Moreover, similarly no the case illustrated in FIG. 22. Embodiments whereby co-ordinates conversion can be implemented even more simply are also possible.

Figure 25:
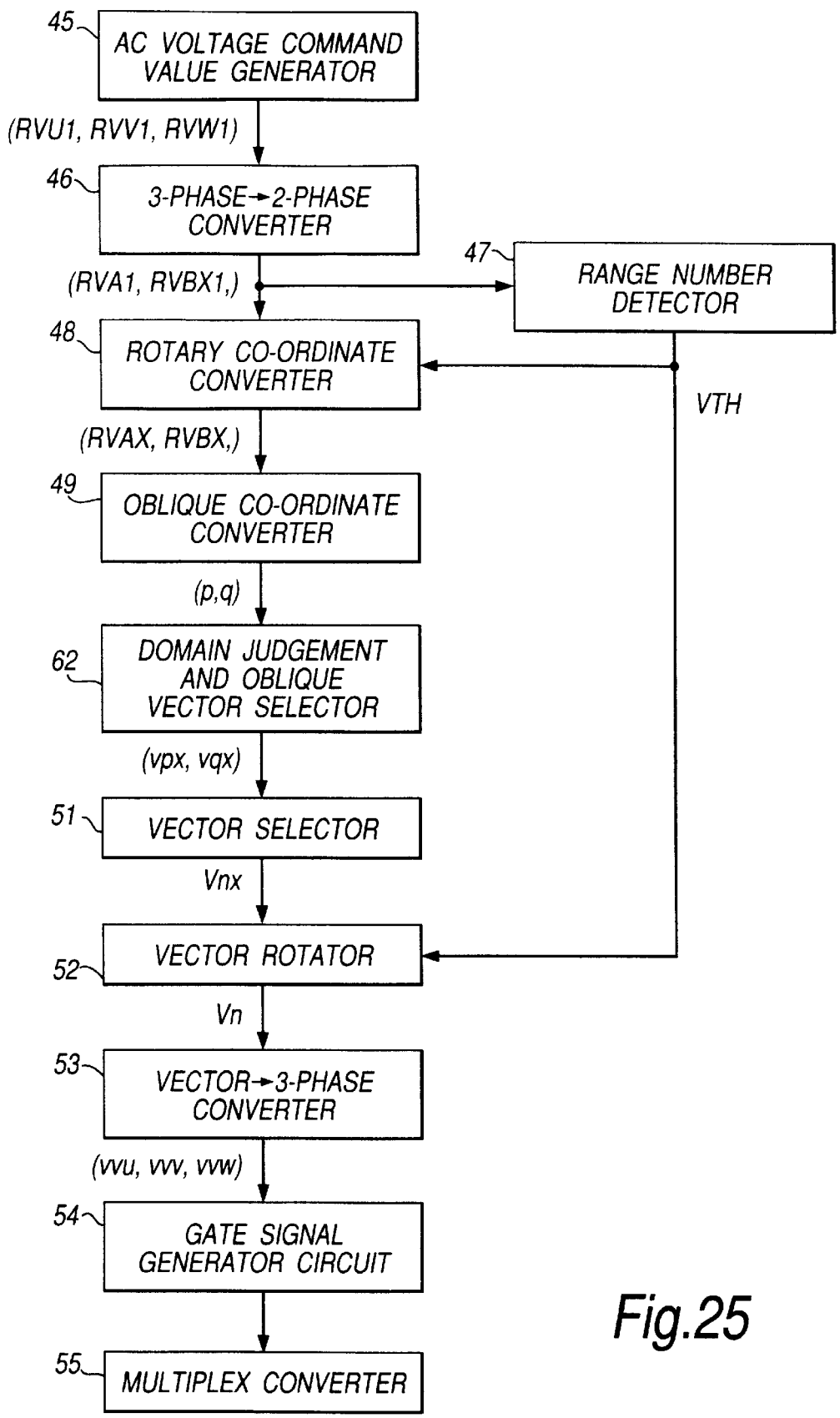
FIG. 25 is a block diagram showing the function and sequence of a third embodiment of a controller for a power converter according to the present invention.

FIG. 25 is a block diagram showing a compositional example of a controller for a power converter according to the present embodiment; parts which are the same as FIG. 16 are given the same reference labels and description thereof is omitted, only those parts which are different being described here.

In FIG. 24 described above, the vector diagram converter to an oblique co-ordinates system is split into triangular shapes, and output vectors can be selected in accordance with the triangular shape which contains the voltage command vector; and FIG. 26 and FIG. 27 show the correspondence between output vector (vpx,vqx) and co-ordinates (vp,vq,vr) in the form of vector selection tables.

In FIG. 25, domain judgement and oblique vector selector 62 calculates (vp,vq,vr) from the oblique system voltage command vector (p,q) derived by the aforementioned oblique co-ordinates converter 49, and using the vector selection tables in FIG. 26 and FIG. 27, it calculates output vector (vpx,vqx) based on the oblique co-ordinates system.

With the exception of domain judgement and oblique vector selector 62, the operation of this embodiment is the same as that described in the first embodiment illustrated in FIG. 16.

As described above, in the controller for a power converter according to the present embodiment, the output vector closest to a voltage command vector can similarly be selected quickly, simply by calculation of co-ordinates values for the voltage command vector in an oblique co-ordinates system, plus some additional calculation, without deriving the vector deviation between the voltage command vector and all output vectors, Thereby, it is possible to implement PWM control by spatial vector comparison quickly, and consequently, improvement in the response characteristics and waveform of the power converter can be achieved.

Modification of third embodiment

Figure 28:
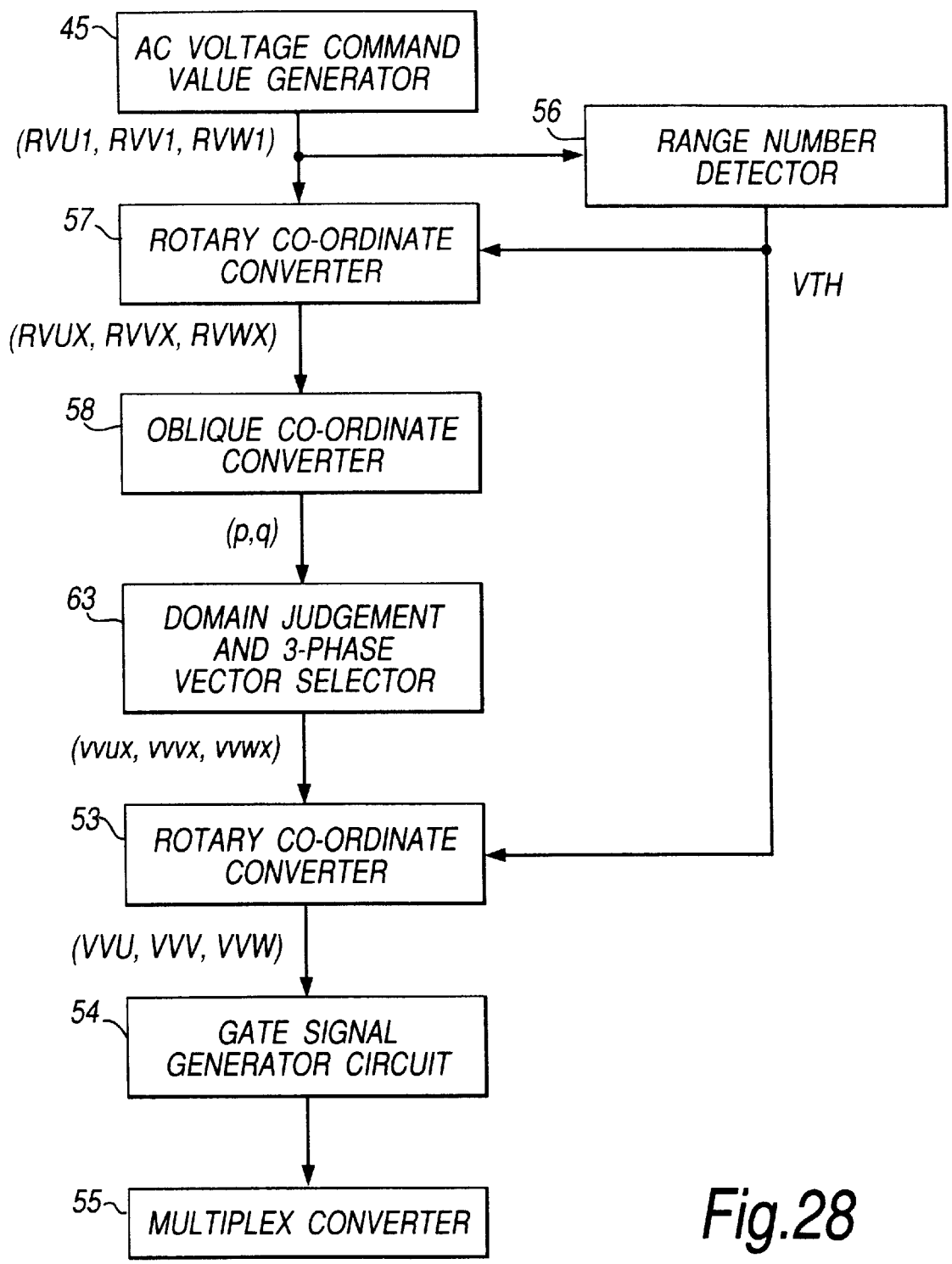
FIG. 28 is a block diagram showing a further modification of the third embodiment of a controller for a power converter according to the present invention.

FIG. 28 is a block diagram showing a modification of a controller for a power converter according to the third embodiment; parts which are the same as FIG. 16 and FIG. 22 are given the same reference labels and description thereof is omitted, only those parts which are different being described here.

The vector selection tables in FIG. 29–FIG. 32 comprise the vector selection tables in FIG. 26 and FIG. 27 with additional values calculated for (vvux,vvvx,vvwx) corresponding to (vpx,vqx), by means of the foregoing Equations (14) and (15).

In FIG. 28, domain judgement and 3-phase vector selector 63 calculates (vp,vq,vr) from the voltage command vector (p,q) converted by the aforementioned oblique co-ordinates converter 58, and determines (vvux, vvvx, vvwx) directly using the vector selection tables in FIG. 29–FIG. 32.

With the exception of domain judgement and oblique vector selector 63, the operation of the present embodiment is the same as that in the previous embodiment illustrated in FIG. 22.

As described above, in the controller for a power converter according to the present embodiment, the output vector closest to a voltage command vector can similarly be selected quickly, simply by calculation of co-ordinates values for the voltage command vector in an oblique co-ordinates system, plus some additional calculation, without deriving the vector deviation between the voltage command vector and all output vectors.

Thereby, it is possible to implement PWM control by spatial vector comparison quickly, and consequently, improvement in the response characteristics and waveform of the power converter can be achieved.

Fourth embodiment

Figure 33:
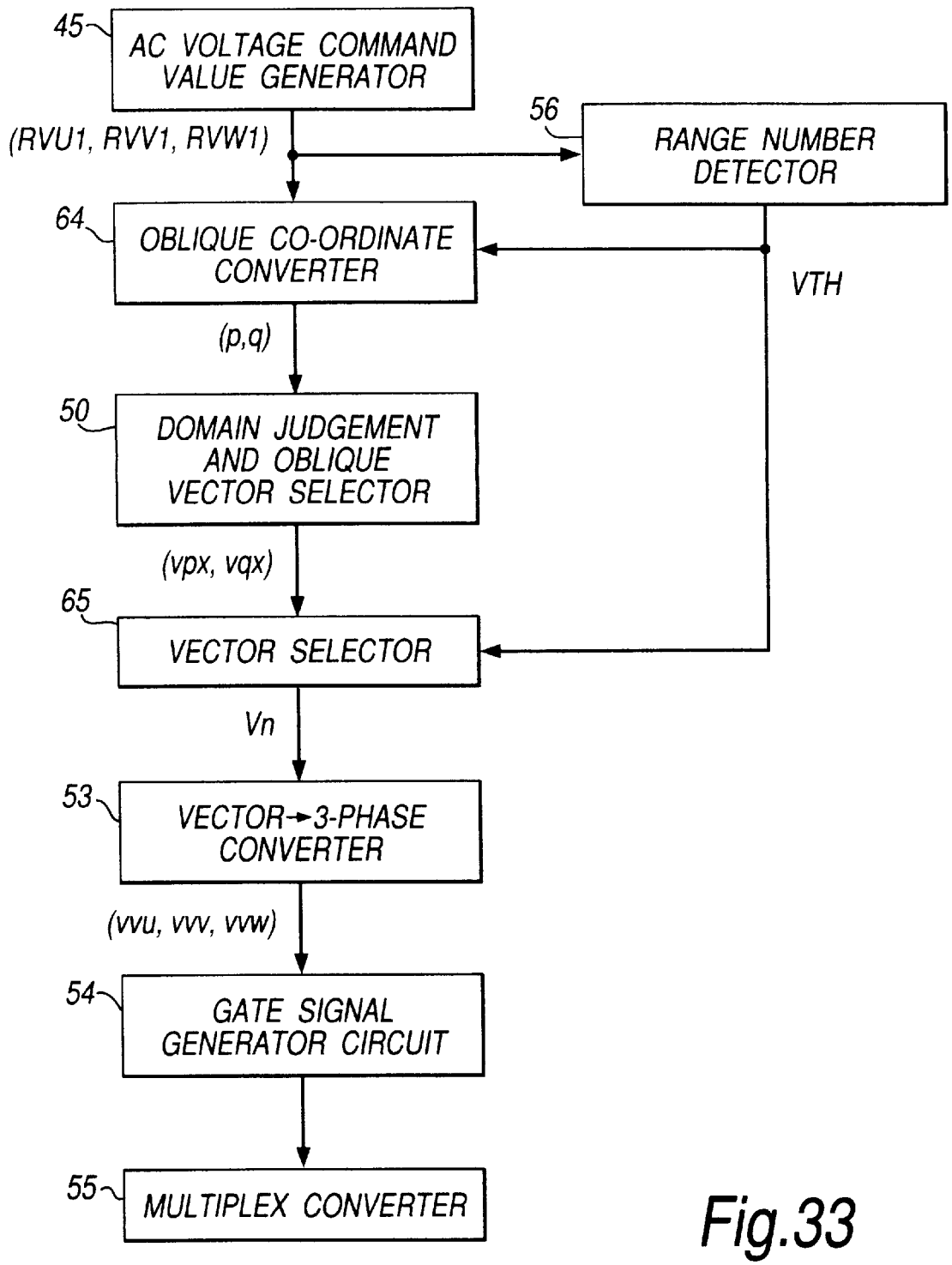
FIG. 33 is a block diagram showing the function and sequence of a fourth embodiment of a controller for a power converter according to the present invention.

FIG. 33 is a block diagram showing the function and sequence of a controller for a power converter according to this embodiment; parts which are the same as FIG. 16 and FIG. 22 are given the same reference labels and description thereof is omitted, only those parts which are different being described here.

In FIG. 33, oblique co-ordinates converter 64 converts the 60° range of range number VTH on the spatial vector diagram corresponding to the range number VTH derived by range number detector 56, which contains the AC voltage command value (RVU1,RVV1,RVW1) generated by the AC voltage command value generator 45, to an oblique co-ordinates system, wherein a vector in the direction of angle (VTH−0.5)*60 deg and a vector in the direction of angle (VTH+0.5)*60 deg are taken as unit vectors.

Below, the operation of oblique co-ordinates converter 64 is described using FIG. 34 and FIG. 35 as examples.

Here, a case where the voltage command vector is in the range of range number VTH=1 shall be considered. FIG. 34 shows an isolated view of the range number VTH=1 portion of the spatial vector diagram in FIG. 17, and supplementary lines have been added.

Figure 34:
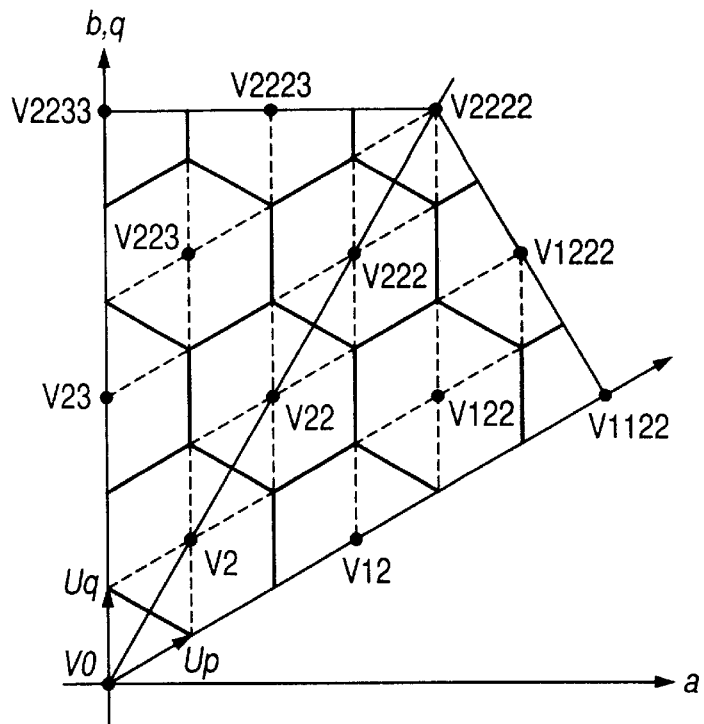
FIG. 34 is a diagram for describing the operation of the oblique co-ordinates converter in FIG. 33.

Here, an oblique co-ordinates system taking the vector in the 30° direction in FIG. 34

$$\vec{u_p} = \frac{1}{\sqrt{3}} \begin{bmatrix} \cos 30° \\ \sin 30° \end{bmatrix} = \frac{1}{\sqrt{3}} \begin{bmatrix} \frac{\sqrt{3}}{2} \\ \frac{1}{2} \end{bmatrix} \qquad (17)$$

and the vector in the 90° direction $$\vec{u_q} = \frac{1}{\sqrt{3}} \begin{bmatrix} \cos 90° \\ \sin 90° \end{bmatrix} = \frac{1}{\sqrt{3}} \begin{bmatrix} 0 \\ 1 \end{bmatrix} \qquad (18)$$

as unit vectors is considered.

Since $$\begin{bmatrix} a \\ b \end{bmatrix} = p \frac{1}{\sqrt{3}} \begin{bmatrix} \frac{\sqrt{3}}{2} \\ \frac{1}{2} \end{bmatrix} + q \frac{1}{\sqrt{3}} \begin{bmatrix} 0 \\ 1 \end{bmatrix} = \frac{1}{\sqrt{3}} \begin{bmatrix} \frac{\sqrt{3}}{2} & 0 \\ \frac{1}{2} & 1 \end{bmatrix} \begin{bmatrix} p \\ q \end{bmatrix} \qquad (19)$$

then, conversely, $[p\ q]^T$ will be $$\begin{bmatrix} p \\ q \end{bmatrix} = \sqrt{3} \begin{bmatrix} \frac{\sqrt{3}}{2} & 0 \\ \frac{1}{2} & 1 \end{bmatrix}^{-1} \begin{bmatrix} a \\ b \end{bmatrix} = \begin{bmatrix} 2 & 0 \\ -1 & \sqrt{3} \end{bmatrix} \begin{bmatrix} a \\ b \end{bmatrix} \quad (20)$$

From Equations (1) and (20) above, the equation for converting the AC voltage command value (RVU1,RVV1, RVW1) to a point (p,q) in the oblique co-ordinates system will be $$\begin{bmatrix} p \\ q \end{bmatrix} = 3 \begin{bmatrix} 1 & 0 \\ -1 & -1 \end{bmatrix} \begin{bmatrix} RVU1 \\ RVW1 \end{bmatrix} \quad (21)$$

Figure 35:
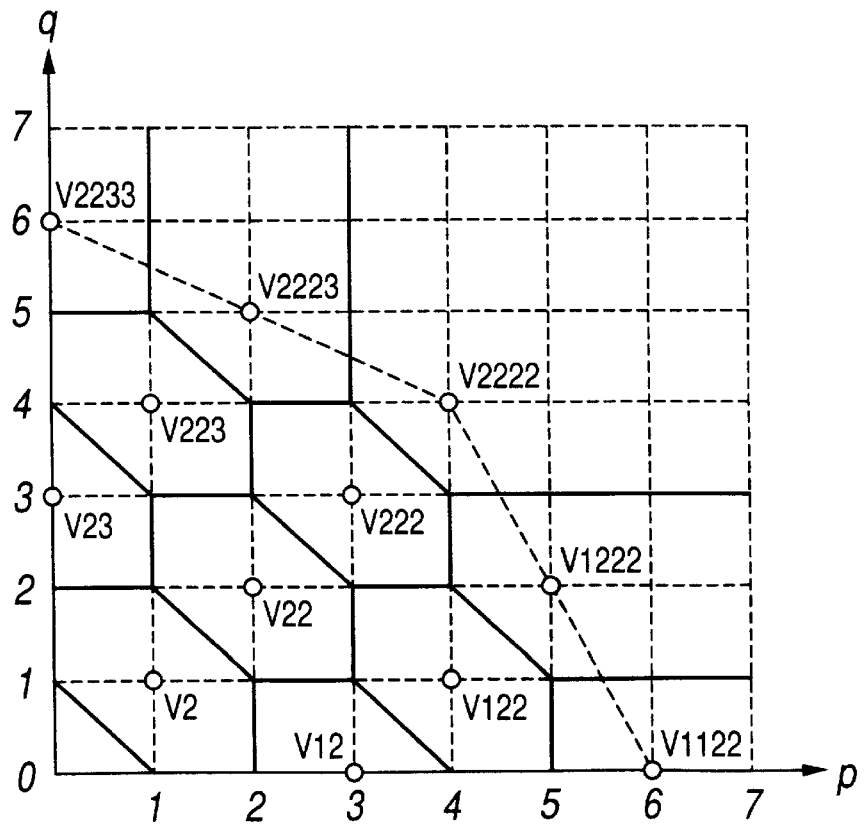
FIG. 35 is a diagram for describing the operation of the oblique co-ordinates converter in FIG. 33.

If FIG. 34 is actually converted to oblique co-ordinates, FIG. 35 is obtained. With the exception of the vector numbers, V2, V12, V22, ..., FIG. 35 is exactly the same as FIG. 20.

Here, the description was related to a case where VTH=1, but the operation of oblique co-ordinates converter 64, including cases involving other values of VTH, can be expressed by the following logic.

```
if VTH=0 then
  p=3*RVU1+3*RVW1
  q=-3*RVW1
elseif VTH=1 then
  p=3*RVU1
  q=-3*RVU1-3*RVW1
elseif VTH=2 then
  p=-3*RVW1
  q=-3*RVU1
elseif VTH3 then
  p=-3*RVU1-3*RVW1
  q=3*RVW1
elseif VTH=4 then
  p=-3*RVU1
  q=3*RVU1+3*RVW1
elseif VTH=5 then
  p=3*RVW1
  q=3*RVU1
endif                                             (22)
```

Whatever the value of VTH, a diagram containing the portion of the spatial lector diagram corresponding to the range number VTH, converted to oblique co-ordinates, will be exactly the same as FIG. 20, with the exception of the vector numbers.

Thereafter, the square-shape patterns domain or triangular domain in which the voltage command vector (p,q) in the oblique co-ordinates system is located can be determined, and the output vector co-ordinates (vpx,vqx) in the oblique co-ordinates system can be calculated, by means of exactly the just same operation as that described in relation to domain judgement and oblique vector selector 50 according to the first embodiment in FIG. 16.

Domain judgement and oblique vector selector 50 in FIG. 33 calculates (vpx,vqx) by executing the operation described above.

Furthermore, a vector selector 65 selects a vector number Vn in accordance with (vpx,vqx) and the range number VTH.

For example, if the range number VTH=1, then vector selector 65 selects a vector number corresponding to (vpx, vqx) from the vectors V2, V12, V22, V23, V122, V222, V223. V1122, V1222, V2222, V2223, V2233.

Vector→3-phase converter 53 is the same as the vector→3-phase converter 53 in the first embodiment in FIG. 16, and it calculates the 3-phase element ignition bridge number (vvu,vvv,vvw) from the vector number Vn.

The 3-phase element ignition bridge number (vvu,vvv, vvw) output by vector→3-phase converter 53 is supplied to gate signal generator 54, which generates ignition signals to the self-extinguishing type switching elements in multiplex voltage-type converter 55.

As described above, in the controller for a power converter according to the present embodiment, the output vector closest to a voltage command vector can similarly be selected quickly, simply by calculation of co-ordinates values for the voltage command vector in an oblique co-ordinates system, plus some additional calculation, without deriving the vector deviation between the voltage command vector and all output vectors.

Thereby, it is possible to implement PWM control by spatial vector comparison quickly; and consequently, improvement in the response characteristics and, waveform of the power converter can be achieved.

(Modification of fourth embodiment)

Figure 36:
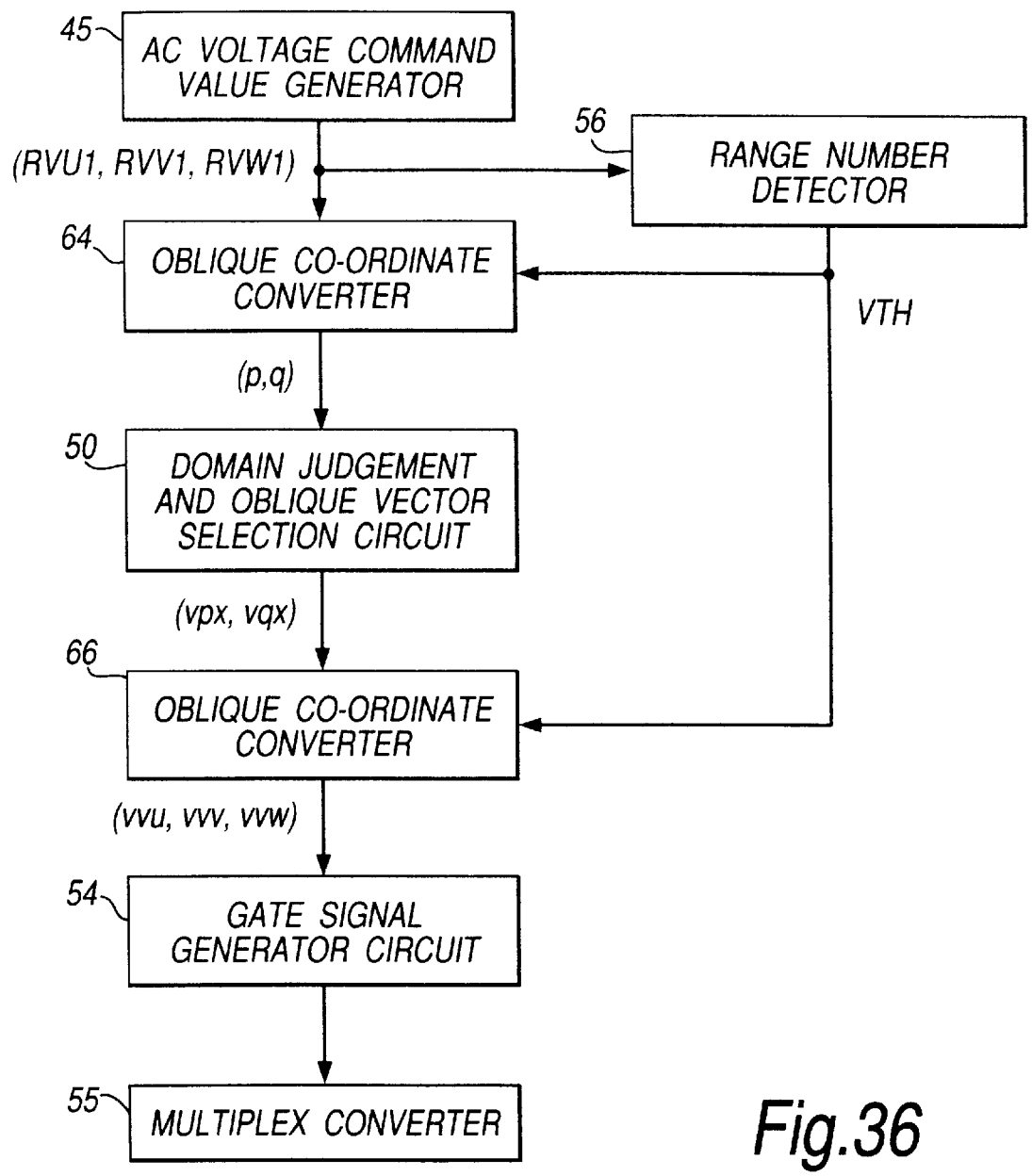
FIG. 36 is a block diagram showing a modification of the fourth embodiment of a controller for a power converter according to the present invention.

FIG. 36 is a block diagram showing a modification of a controller for a power converter according to the fourth embodiment; parts which are the same as FIG. 33 are given the same reference labels and description thereof is omitted, only those parts which are different being described here.

In FIG. 36, oblique co-ordinates converter 66 converts the output vector co-ordinates (vpx,vqx) in the oblique co-ordinates system to a 3-phase element ignition bridge number (vvu,vvv,vvw) in accordance with the range number VTH. In practical terms, it implements the logic calculations given below.

```
if VTH = 0 then
  if vpx >= vqx then
    vvu = (2*vpx + vqx) /3
    vvv = 0
    vvw = (vpx–vqx) /3
  else
    vvu = (vpx + 2*vqx) /3
    vvv = (-vpx + vqx) /3
    vvw = 0
  endif
elseif VTH = 1 then
  vvu = (2*vpx + vqx) /3
  vvv = (vpx + 2*vqx) /3
  vvw = 0
elseif VTH = 2 then
  if vpx >= vqx then
    vvu = (vpx–vqx) /3
    vvv = (2*vpx + vqx) /3
    vvw = 0
  else
    vvu = 0
    vvv = (vpx + 2*vqx) /3
    vvw = (-vpx + vqx) /3
  endif
elseif VTH = 3 then
  vvu = 0
  vvv = (2*vpx + vqx) /3
  vvw = (vpx + 2*vqx) /3
elseif VTH = 4 then
  if vpx >= vqx then
    vvu = 0
    vvv = (vpx–vqx) /3
    vvw = (2*vpx + vqx) /3
  else
    vvu = (-vpx + vqx) /3
    vvv = 0
    vvw = (vpx + 2*vqx) /3
  endif
elseif VTH = 5 then
  vvu = (vpx + 2*vqx) /3
  vvv = 0
  vvw = (2*vpx + vqx) /3
endif
```
(23)

The 3-phase element ignition bridge number (vvu,vvv, vvw) output by the oblique co-ordinates converter 66 is supplied to gate signal generator 54, which generates ignition signals for the self-extinguishing type switching elements in multiplex voltage-type converter 55.

As described above, in the controller for a power converter according to the present embodiment, the output vector closest to a voltage command vector can similarly be selected quickly, simply by calculation of co-ordinates values for the voltage command vector in an oblique co-ordinates system, plus some additional calculation, without deriving the vector deviation between the voltage command vector and all output vectors.

Thereby, it is possible to implement PWM control by spatial vector comparison quickly, and consequently, improvement in the response characteristics and waveform of the power converter can be achieved.

(Fifth embodiment)

Figure 37:
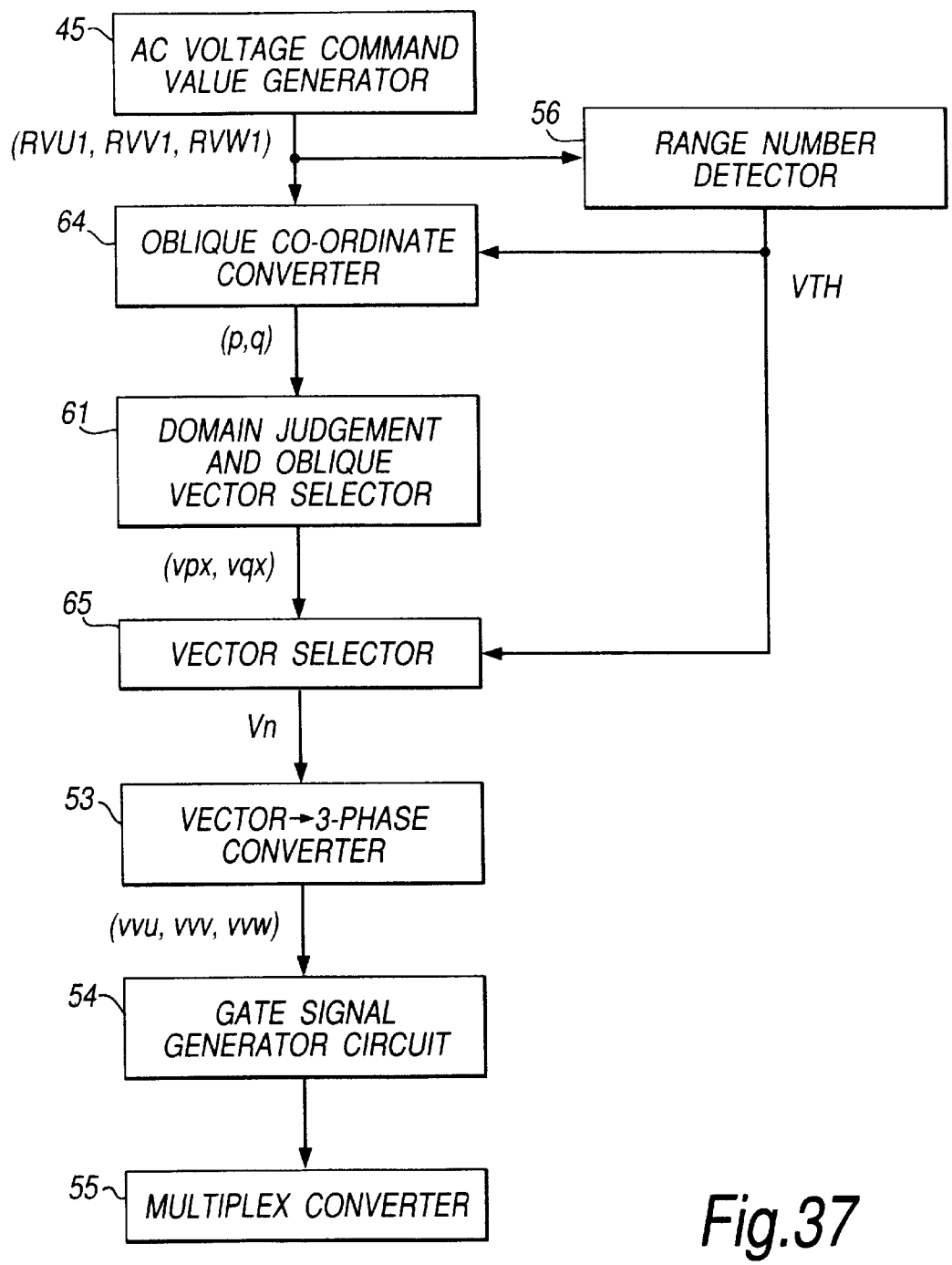
FIG. 37 is a block diagram showing the function and sequence of a fifth embodiment of a controller for a power converter according to the present invention.

FIG. 37 is a block diagram showing the function and sequence of a controller for a power converter according to this embodiment; parts which are the same as FIG. 33 are given the same reference labels and description thereof is omitted, only those parts which are different being described here.

In the present embodiment, as illustrated in FIG. 37, a diagram is used wherein the portion of the spatial vector diagram corresponding to the range number VTH is converted to oblique co-ordinates, taking vectors at angle 60 deg* (VTH−0.5) and angle 60 deg* (VTH+0.5) as unit vectors, similarly to the case described in the fourth embodiment shown in FIG. 33, and all the square-shape patterns in the resulting diagram are split into triangles. This is executed in exactly the same way as the case illustrated in FIG. 24, with the exception of the vector numbers.

In other words, (vp,vq,vr) is calculated from the voltage command vector co-ordinates (p,q) in the oblique co-ordinates system, the triangular domain which contains the voltage command vector is determined, and the oblique system co-ordinates (vpx, vqx) for the output vector ate calculated, by means of exactly the sane operation as that described in relation to domain judgement and oblique vector selector 61 according to the second embodiment in FIG. 23.

Thereafter, vector selector 65 selects vector Vn corresponding to (vpx,vqx) and the range number VTH, and vector→3-phase co-ordinates converter 53 calculates the 3-phase element ignition bridge number (vvu,vvv,vvw), in a similar manner to that described in relation to the fourth embodiment illustrated in FIG. 33.

As described above, in the controller for a power converter according to the present embodiment, the output vector closest to a voltage command vector can similarly be selected quickly, simply by calculation of co-ordinates values for the voltage command vector in an oblique co-ordinates system, plus some additional calculation, without deriving the vector deviation between the voltage command vector and all output vectors.

Thereby, it is possible to implement PWM control by spatial vector comparison quickly, and consequently, improvement in the response characteristics and waveform of the power converter can be achieved.

(Sixth embodiment)

Figure 38:
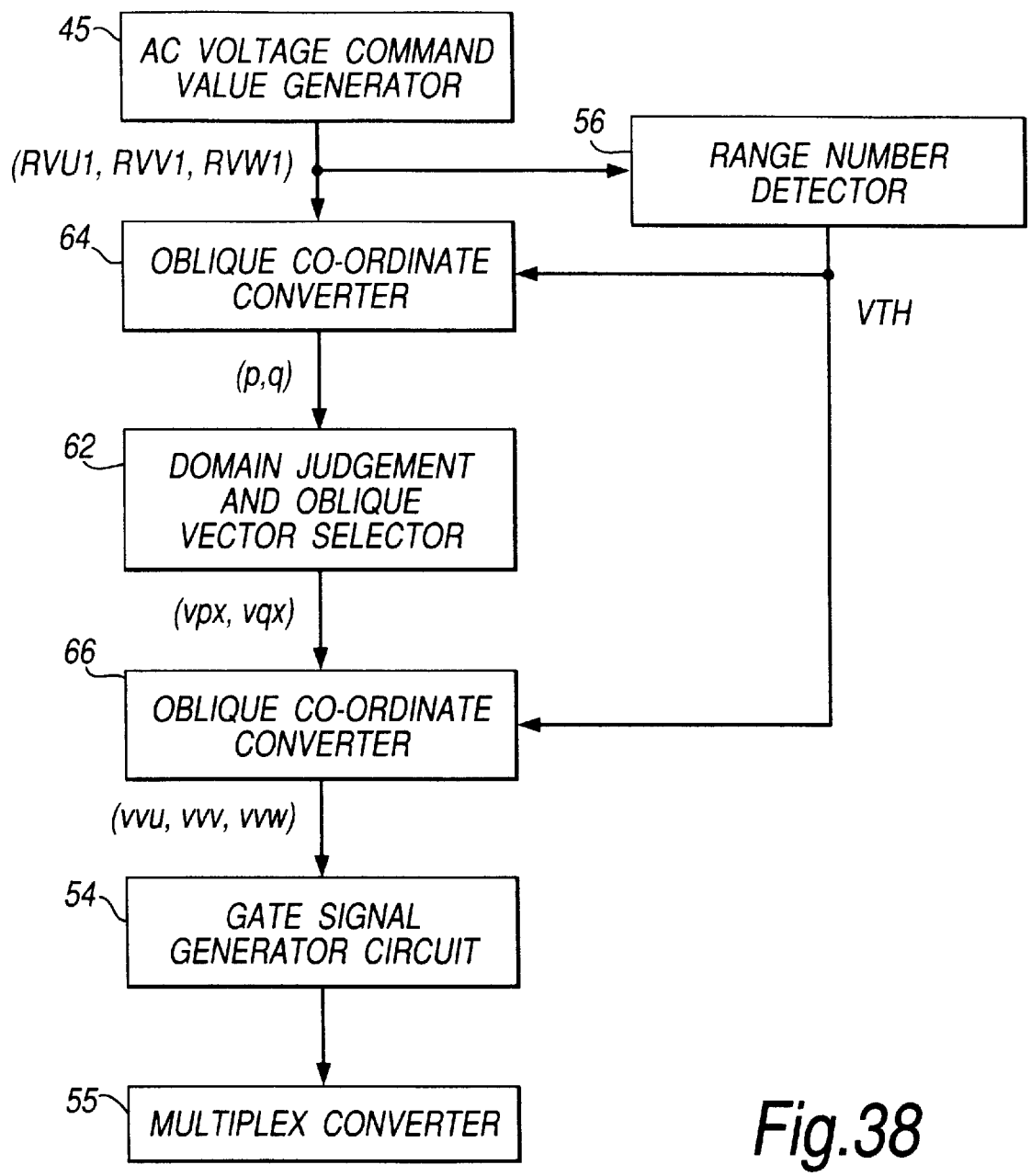
FIG. 38 is a block diagram showing the function and sequence of a sixth embodiment of a controller for a power converter according to the present invention.

FIG. 38 is a block diagram showing the function and sequence of a controller for a power converter according to this embodiment; parts which are the same as FIG. 33 are given the same reference labels and description thereof is omitted, only those parts which are different being described here.

In FIG. 38, domain judgement and oblique vector selector 62 calculates (vp,vq,vr) from the voltage command vector co-ordinates (p,q) based on the oblique co-ordinates system, by means of a vector diagram converted to an oblique co-ordinates system and split into triangular domains, and it calculates the oblique system co-ordinates (vpx,vqx) of the output vector using the vector selection tables in FIG. 26 and FIG. 27.

Moreover, oblique co-ordinates converter 66 calculates the 3-phase element ignition bridge number (vvu,vvv,vvw) from (vpx,vqx) and the range number VTH, similarly to oblique co-ordinates converter 66 in the embodiment illustrated in FIG. 36.

The 3-phase element ignition bridge number (vvu,vvv, vvw) output by the oblique co-ordinates converter 66 is supplied to gate signal generator 54, which generates ignition signals to the self-extinguishing type switching elements of multiplex voltage-type converter 55.

As described above, in the controller for a power converter according to the present embodiment, the output vector closest to a voltage command vector can similarly be selected quickly, simply by calculation of co-ordinates values for the voltage command vector in an oblique co-ordinates system, plus some additional calculation, without deriving the vector deviation between the voltage command vector and all output vectors.

Thereby, it is possible to implement PWM control by spatial vector comparison quickly, and consequently, improvement in the response characteristics and waveform of the power converter can be achieved.

(Modification of sixth embodiment)

Figure 39:
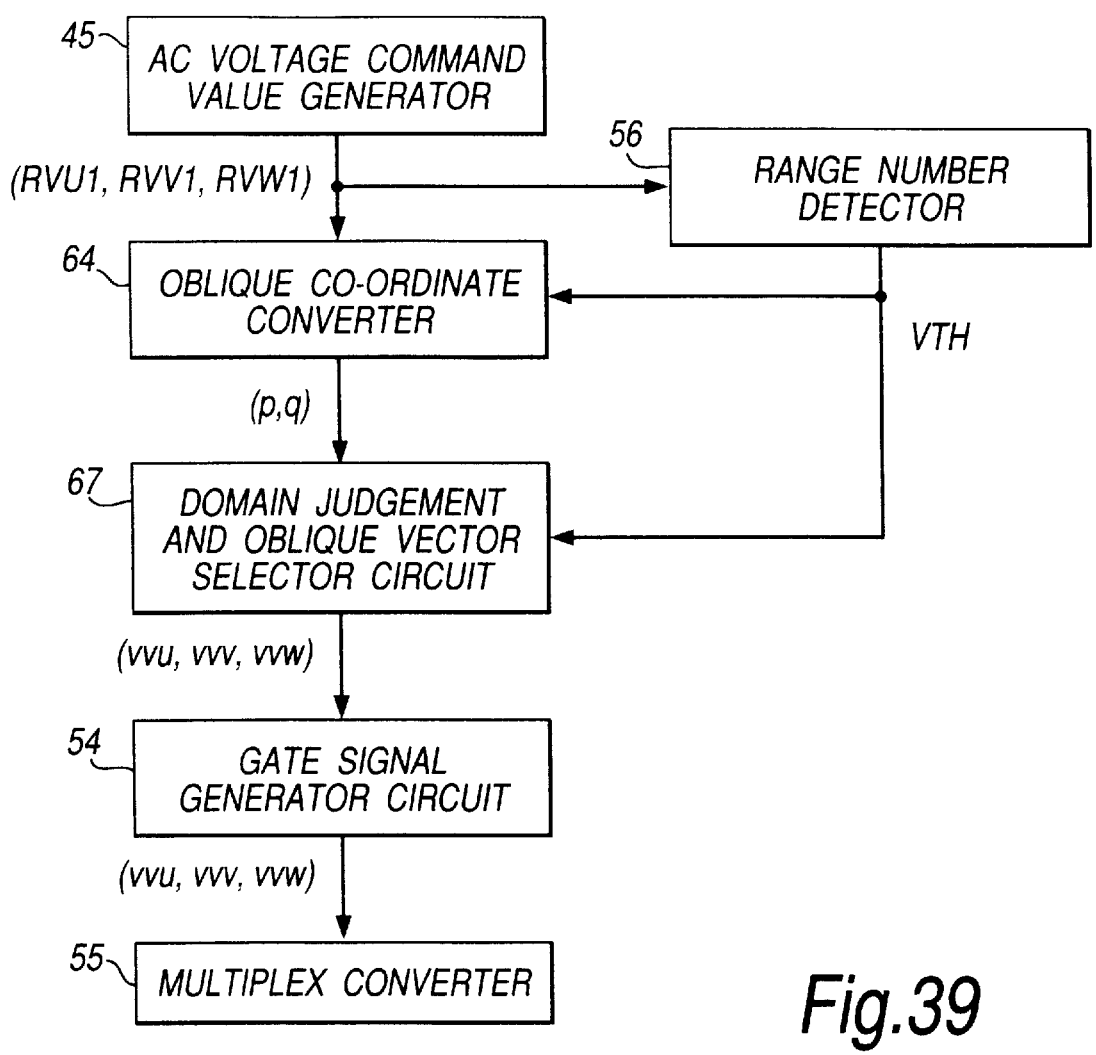
FIG. 39 is a block diagram showing a modification of the sixth embodiment of a controller for a power converter according to the present invention.

FIG. 39 is a block diagram showing a modification of a controller for a power converter according to a sixth embodiment; parts which are the same as FIG. 33 are given the same reference labels and description thereof is omitted, only those parts which are different being described here.

In FIG. 39, domain judgement and 3-phase vector selector 67 calculates the 3-phase element ignition bridge number (vvu,vvv,vvw) for the output vector, from the voltage command vector (p,q) in the oblique co-ordinates system and the range number VTH.

Below, the operation of the domain judgement and 3-phase vector selector 67 is described using FIG. 26, FIG. 27 and FIG. 40.

FIG. 26 and FIG. 27 were vector selection tables where (vpx,vqx) values corresponding to (vp,vq,vr) values are listed, and by using Equation (23) also, it is possible to create a vector selection table wherein (vvu,vvv,vvw) values obtained by co-ordinates conversion of (vpx,vqx) in accordance with the range number VTH are also listed.

FIG. 40 is a diagram showing an initial portion of such a vector selection table.

By using this vector selection table, it is possible to determine the 3-phase element ignition bridge number for the output vector closest to the voltage command vector directly from (vp,vq,vr) and the range number VTH.

As described above, in the controller for a power converter according to the present embodiment, since 3-phase co-ordinates for the output vector closest to the voltage command vector can be determined directly from (vp,vq,vr) and the range number VTH, the output vector closest to the voltage command vector can be selected even more quickly.

Thereby, it is possible to implement PWM control by spatial vector comparison even more quickly, and consequently, improvement in the response characteristics and waveform of the power converter can be achieved.

(Seventh embodiment)

Each of the foregoing embodiments related to cases where the present invention is applied to a vector selection algorithm for a multiplex voltage-type converter comprising four converters. Obviously, the present invention may also be applied in a similar manner to a selection algorithm for a multi-level converter, as described below. The multi-level converter comprises a split voltage source, wherein a DC voltage source is split into n (where n is an integer above three), and three series circuits, wherein (2·n) self-extinguishing type switching elements are connected in series with each other and in parallel to the aforementioned DC voltage source, diodes being connected respectively thereto in antiparallel configuration, and each series circuit has an output terminal for outputting a voltage, obtained by converting the voltage of the aforementioned DC voltage source, from between the nth self-extinguishing switching element and the (n+1)th self-extinguishing switching element from the anode side of the DC voltage source, aforementioned conversion voltage output terminals being connected to an AC load.

Figure 41:
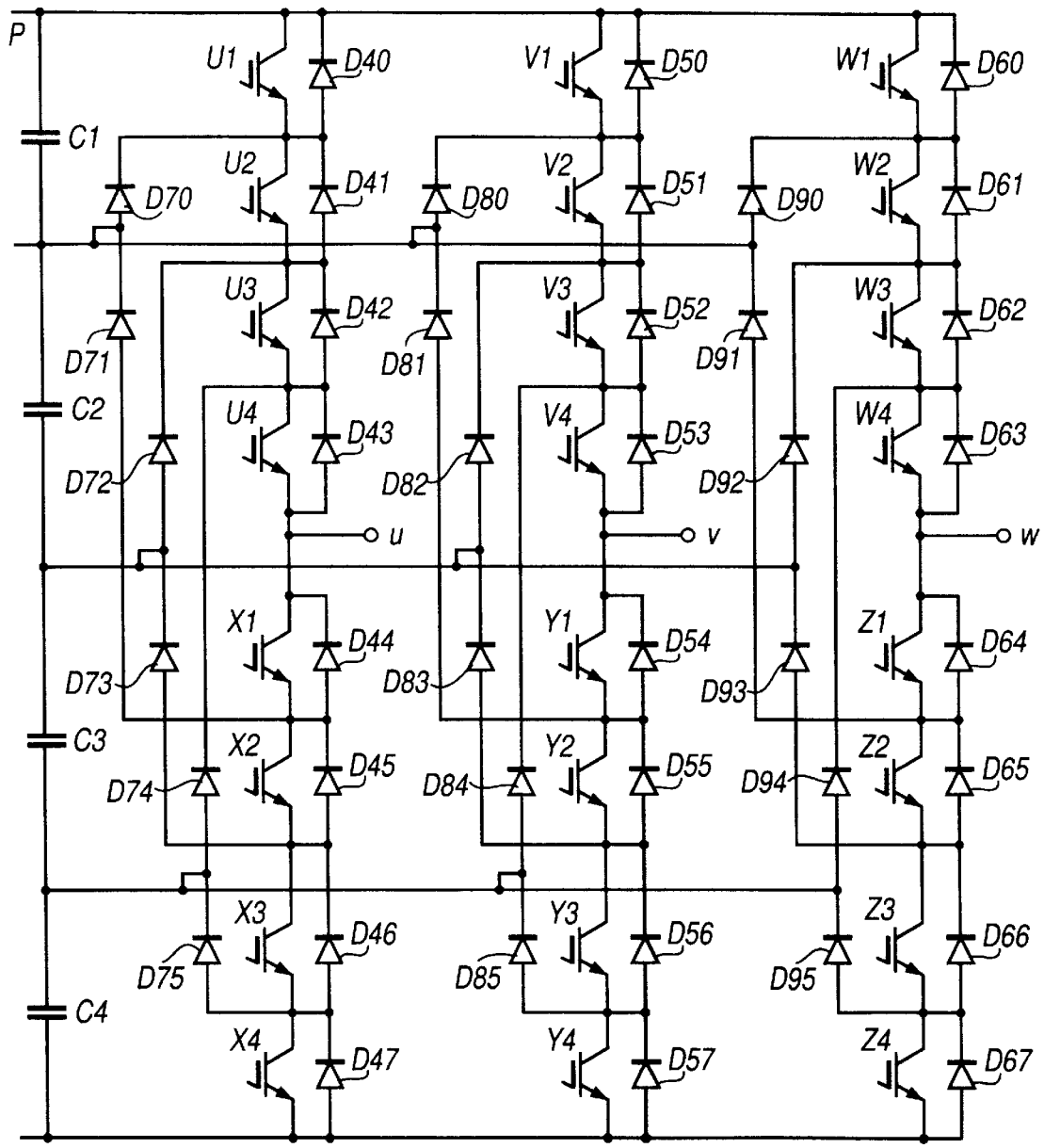
FIG. 41 is a main circuit diagram of a 5-level inverter for describing a seventh embodiment of a controller for a power converter according to the present invention.

This indicates, for example, a 5-level inverter, which is one example of the multi-level converter shown in FIG. 41. Below, the main circuit of a 5-level inverter is described. In the diagram, P and N are DC input terminals; u, v, w are AC output terminals; C1–C4 are capacitors; U1–U4, V1–4, W1–W4, X1–X4, Y1–Y4, Z1–Z4 are switching elements, for example, IGBT, and D40–D47, D50–D57, D60–D67, D70–D75, D80–D85, D90–D95 are diodes.

FIG. 42 shows the relationship between the element switching state of the u, v or w phase arms (strictly speaking, the ignition signal state) and the arm output. If the electric potential at the point between the second and third capacitors C2, C3 on the DC terminal side is taken to be 0 and the voltage of each capacitor C1–C4 is taken as E, then the phase output voltage is given by multiplying Sx by E. In this case, the output voltage of the whole inverter can be expressed by (Su,Sv,Sw).

Figure 43:
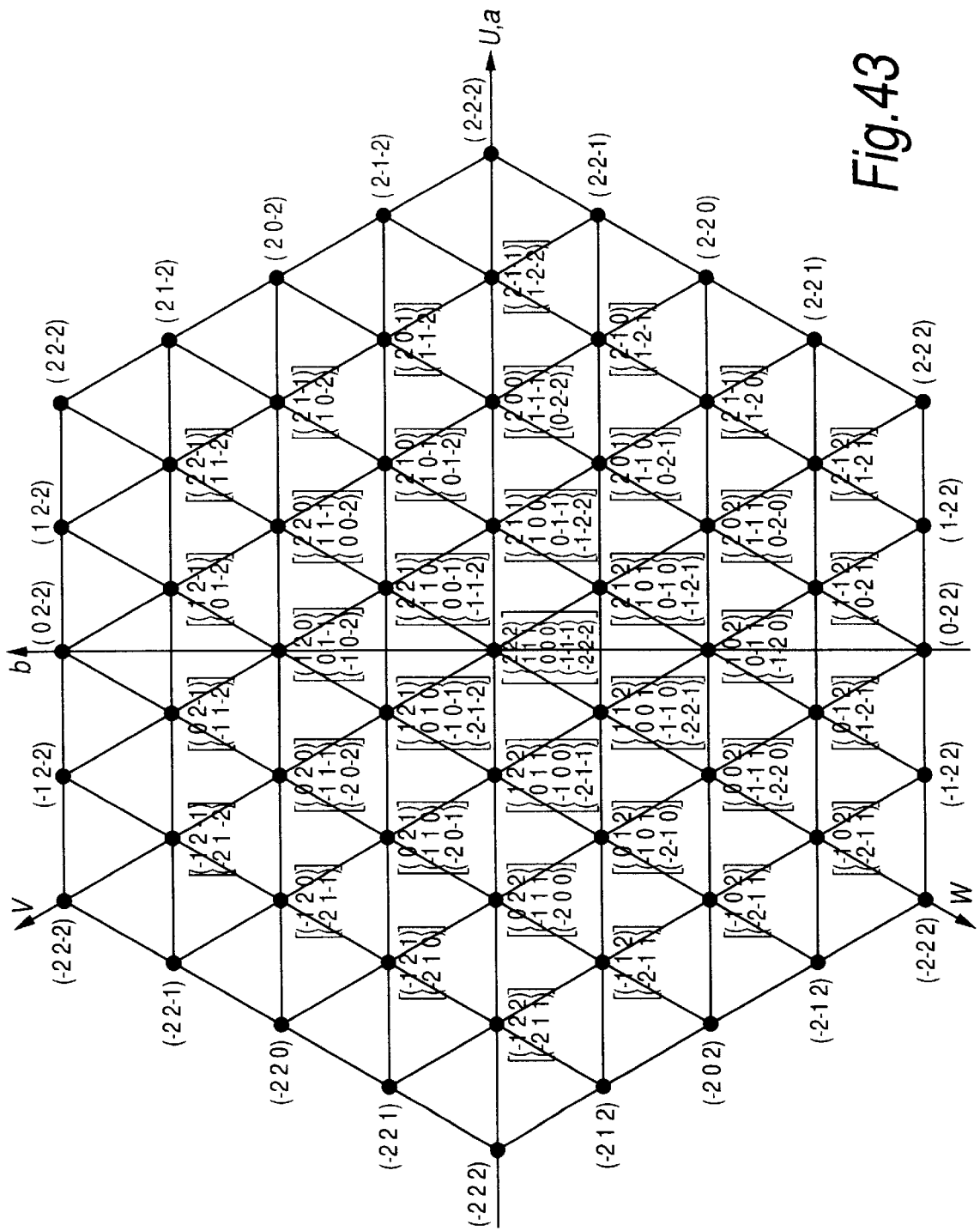
FIG. 43 is a spatial vector diagram for the 5-level inverter in FIG. 41.

FIG. 43 shows spatial vectors for a 5-level inverter, and in this case, the fact that tour stages of hexagonal shapes are used is the same as the aforementioned embodiments, but in terms of "variety" in the method for realizing vectors, there is a difference. For example, in order to realize vector V1122 in FIG. 17, in a multiplex inverter, vector V1 is assigned to two of the four bridges, and vector V2 is assigned to the remaining two bridges, making six possible combinations.

However, in the 5-level inverter in FIG. 43, (Su,Sv,Sw)= (2,0,−2) is the only single way of realizing a vector corresponding to V1122 in FIG. 17.

Figure 44:
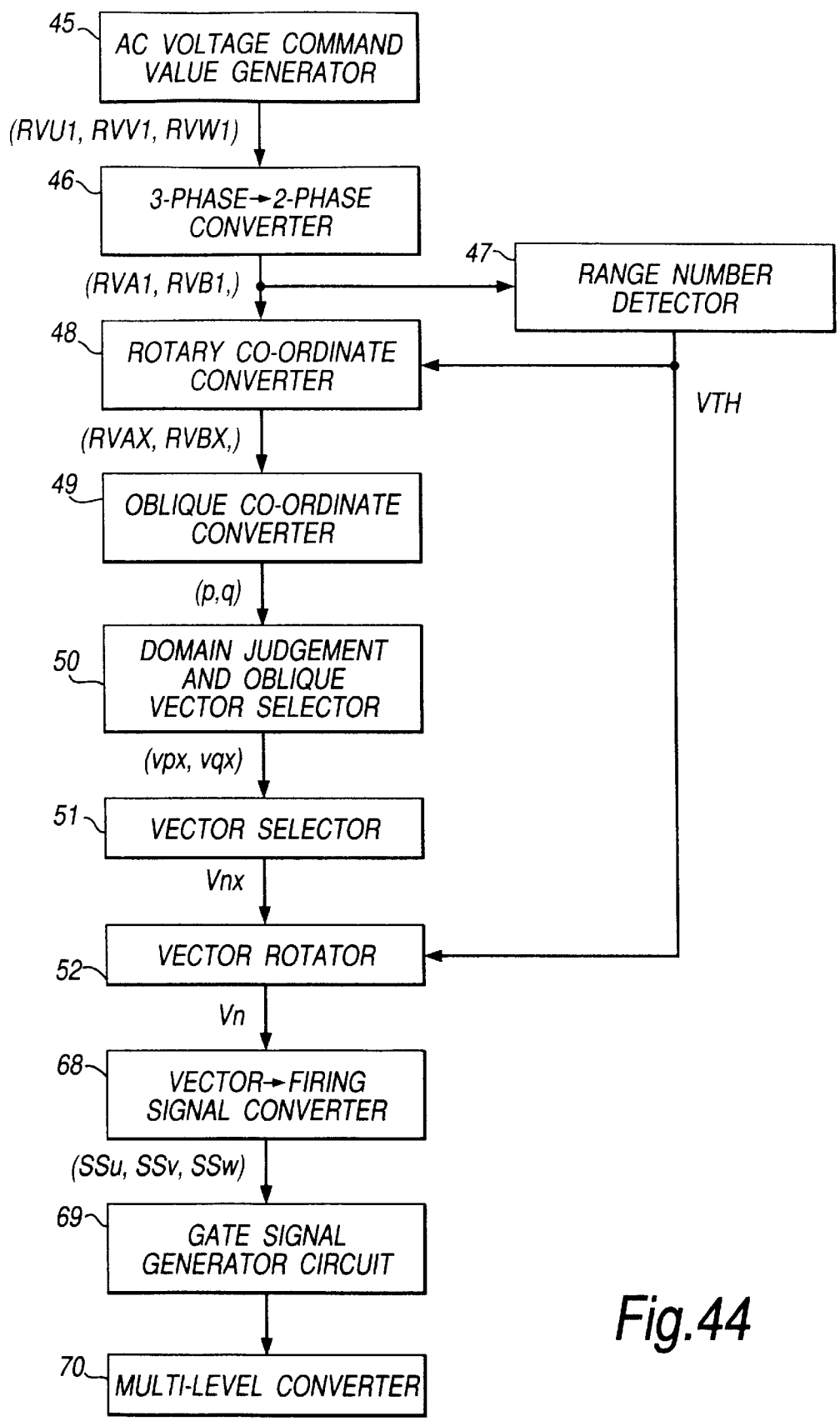
FIG. 44 is a block diagram showing the function and sequence of the seventh embodiment of a controller for a power converter according to the present invention.

FIG. 44 shows the function and sequence of a controller for a multi-level controller. In FIG. 44, the embodiment in FIG. 16 relating to a multiplex voltage-type converter is applied to a multi-level converter. Parts which are the same as FIG. 16 are given the same reference labels and description thereof is omitted. After generating the AC voltage command (RVU1,RVV1,RVW1) by means of AC voltage command value generator 45, calculation proceeds successively in the same manner as FIG. 16 until vector rotator 52 outputs vector Vn.

In FIG. 44, vector→ignition signal converter 68 outputs the ignition state signal (SSu,SSv,SSw) to be taken by the multi-level converter 70, in accordance with the selected vector Vn. For example, for vector V611, it outputs (2,−2,−1). Furthermore, if the vector V611 is selected, then (2,−1,0) is output. Since the converter can have two ignition states which correspond to vector V611, namely (2,−1,0) and (1,−2,−1), then vector→ignition signal converter 68 outputs only one representative ignition state.

The same applies for other vectors. The process of selecting the actual ignition state from a plurality of ignition states, taking suppression of neutral point potential fluctuation, reduction of the number of switching operations, and the like, into consideration, is carried out by gate signal generator 69. Gate signal generator 69 generates a gate signal in accordance with the ignition state signal (SSu,SSv, SSw), and it generates an ignition pulse for the self-extinguishing type switching elements in the multi-level converter 70 shown in FIG. 41.

According to the seventh embodiment described above, the range number VTH containing the voltage command vector corresponding to the multi-level converter is calculated, the voltage command vector is rotated through a prescribed angle, the co-ordinates of the rotated voltage command vector are converted to a vector in an oblique co-ordinates system, wherein a vector in the −30° direction of the orthogonal co-ordinates system and a vector in the +30° direction thereof are taken as unit vectors, the region outputtable by the converter of a vector diagram, wherein the −30°−+30° range of a spatial vector diagram on which output vectors are arranged is converted to oblique co-ordinates using the unit vectors, is split into square-shape patterns, such that output vectors are positioned at the top left, or bottom right, or both bottom left and top right of each square-shape patterns, square-shape patterns having output vectors at both the bottom left and top right thereof are further split into two triangular domains by lines connecting the top left vertex and bottom right vertex thereof, it is judged which of the square-shape patterns domains or triangular domains of the oblique co-ordinates system vector diagram split into domains contains the voltage command vector converted to oblique co-ordinates, an output vector Vnx corresponding to the domain is selected according to the judgement result, and an output vector Vn is calculated by rotating output vector Vnx through a prescribed angle. Thereby, since it is possible to select the output vector closest to the voltage command vector, simply by calculation of co-ordinate values for the voltage command vector in the oblique co-ordinates system, plus some additional calculation, without deriving the vector deviation between the voltage command vector and all the output vectors, the calculation time required for selection of the output vector is shortened and higher performance can be achieved.

(Modification of seventh embodiment)

Figure 45:
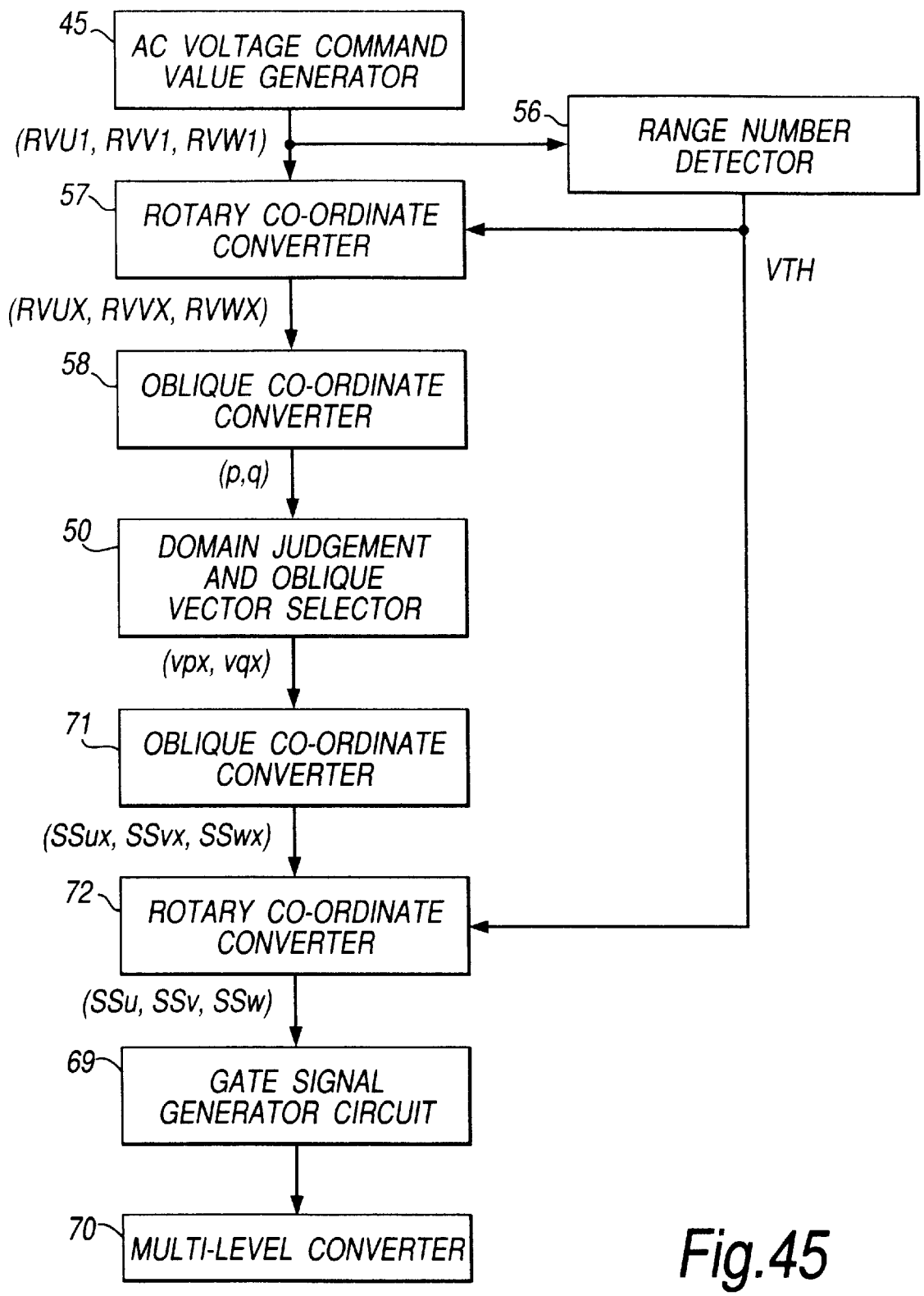
FIG. 45 is a block diagram showing a modification of the seventh embodiment of a controller for a power converter according to the present invention.

FIG. 45 is a block diagram showing a modification of a controller for a multi-level converter according to the seventh embodiment; parts which are the same as FIG. 44 are given the same reference labels. This corresponds to FIG. 22, depicting an embodiment relating to a multiplex voltage-type converter.

In the present embodiment, similarly to the embodiment shown in FIG. 22, the range number VTH is detected using Equation (11) with respect to the AC voltage command value (RVU1,RVV1,RVW1), the co-ordinates of AC voltage command value (RVU1,RVV1,RVW1) are converted by rotation to (RVUX,RVVX,RVWX) using Equation (12), the voltage command vector (RVUX,RVVX,RVWX) is converted to oblique co-ordinates (p,q) using Equation (13), and oblique system output vector co-ordinates (vpx,vqx) are calculated by domain judgement and oblique vector selector 50.

In FIG. 45, oblique co-ordinates converter 71 calculates a provisional ignition state signal (SSux,SSvx,SSwx) in a co-ordinates system rotated through −60 deg*VTH, from the output vector co-ordinates (vpx,vqx) in the oblique system, using the following equation.

$$\begin{bmatrix} SSux=2 \\ SSvx \\ SSwx \end{bmatrix} = \begin{bmatrix} 2 \\ 2 \\ 2 \end{bmatrix} - \frac{1}{3}\begin{bmatrix} 2 & 1 \\ 1 & 2 \end{bmatrix}\begin{bmatrix} vpx \\ vQx \end{bmatrix} \quad (24)$$

Meanwhile, by means of the following equation, rotation co-ordinates converter 72 rotates the aforementioned provisional ignition state signal (SSux,SSvx,SSwx) through +60 deg*VTH in accordance with the range number VTH detected by range number detector 56, to derive an ignition state signal (SSu,SSv,SSw).

```
if VTH=0 then
  SSu=SSux
  SSv=SSvx
  SSw=SSwx
elseif VTH=1 then
  SSu=-SSvx
  SSv=-SSwx
  SSw=-SSux
elseif VTH=2 then
  SSu=SSwx
  SSv=SSux
  SSw=SSvx
elseif VTH=3 then
  SSu=-SSux
  SSv=-SSvx
  SSw=-SSwx
elseif VTH-4 then
  SSu=SSvx
  SSv=SSwx
  SSw=SSux
elseif VTH=5 then
  SSu=-SSwx
  SSv=-SSux
  SSw=-SSvx
endif                                          (25)
```

Thereafter, similarly to the case described in relation to the embodiment in FIG. 44, gate signal generator 69 generates an ignition pulse for the self-extinguishing type switching elements of the multi-level converter 70 shown in FIG. 41, on the basis of the ignition state signal (SSu, SSv, SSw).

As described above, in the controller for a power converter according to the present embodiment, since the domain of the oblique co-ordinates system which contains the voltage command vector is determined by simple calculation, and an output vector is derived from this calculated valve, it is possible to select the output vector closest to the voltage command vector quickly, simply by calculation of the co-ordinate values of the voltage command vector in the oblique co-ordinates system., plus some additional calculation, without deriving the deviation between the voltage command vector and all the output vectors.

(Eighth embodiment)

Figure 46:
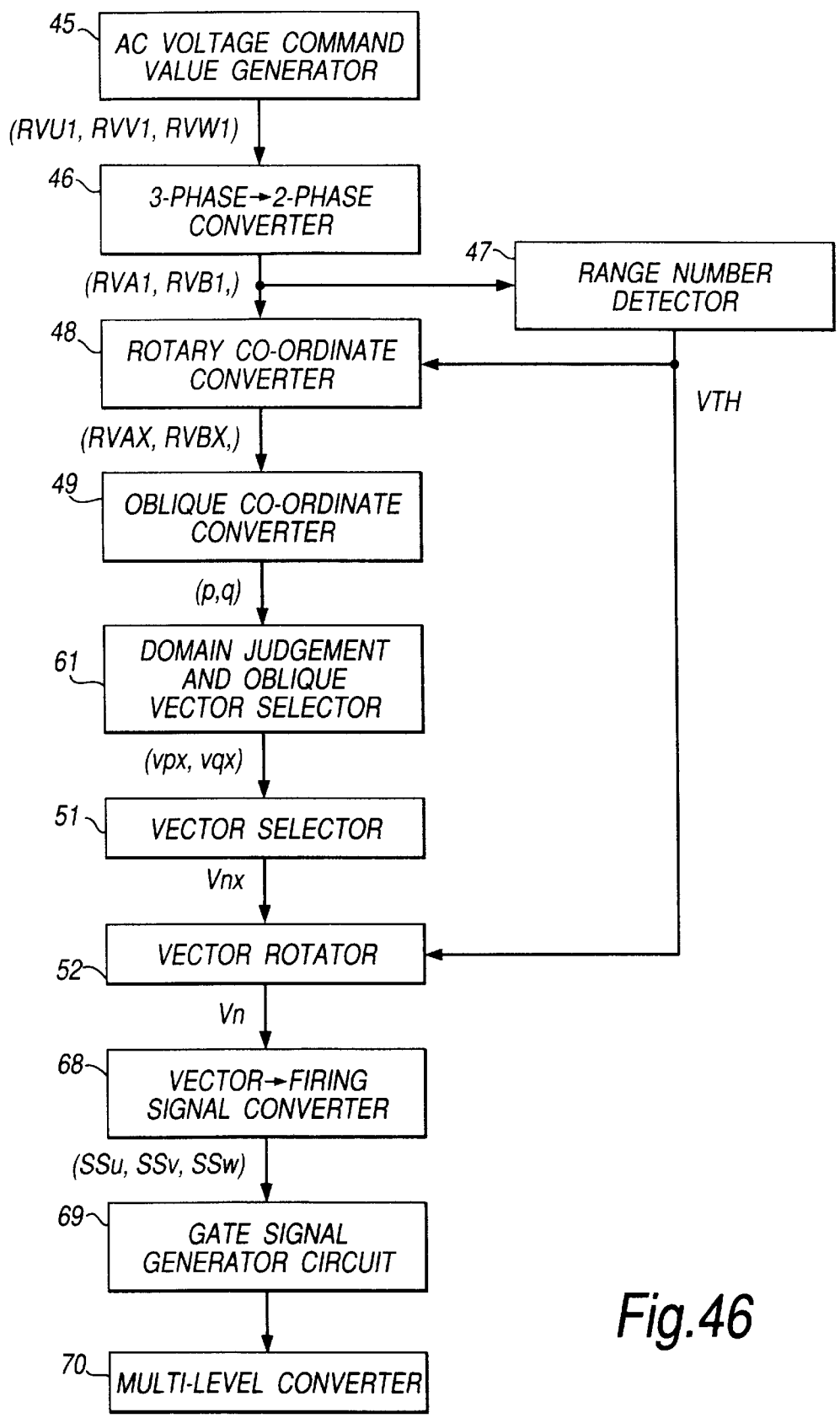
FIG. 46 is a block diagram showing the function and sequence of an eighth embodiment of a controller for a power converter according to the present invention.
Figure 47:
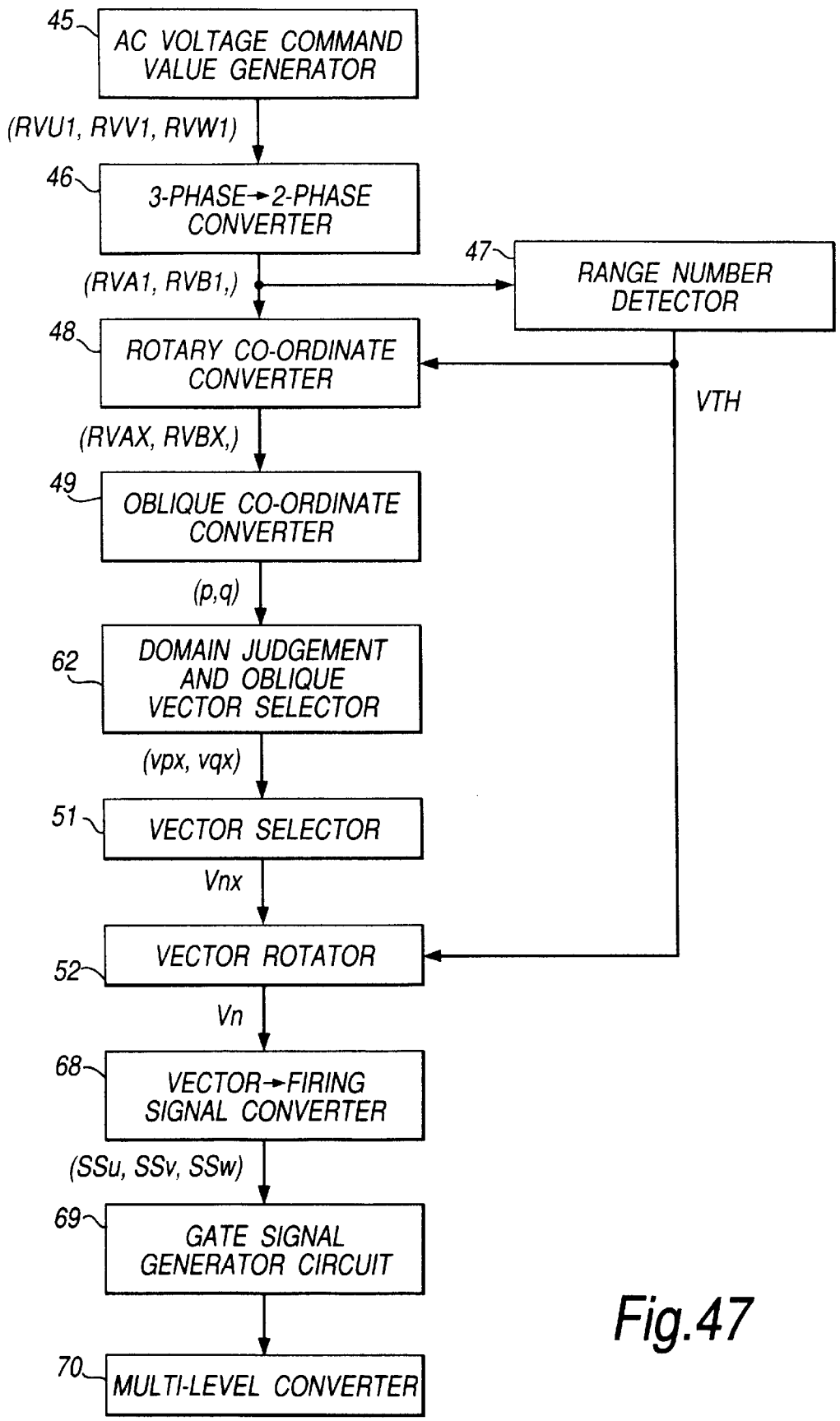
FIG. 47 is a block diagram showing a modification of the eighth embodiment of a controller for a power converter according to the present invention.
Figure 48:
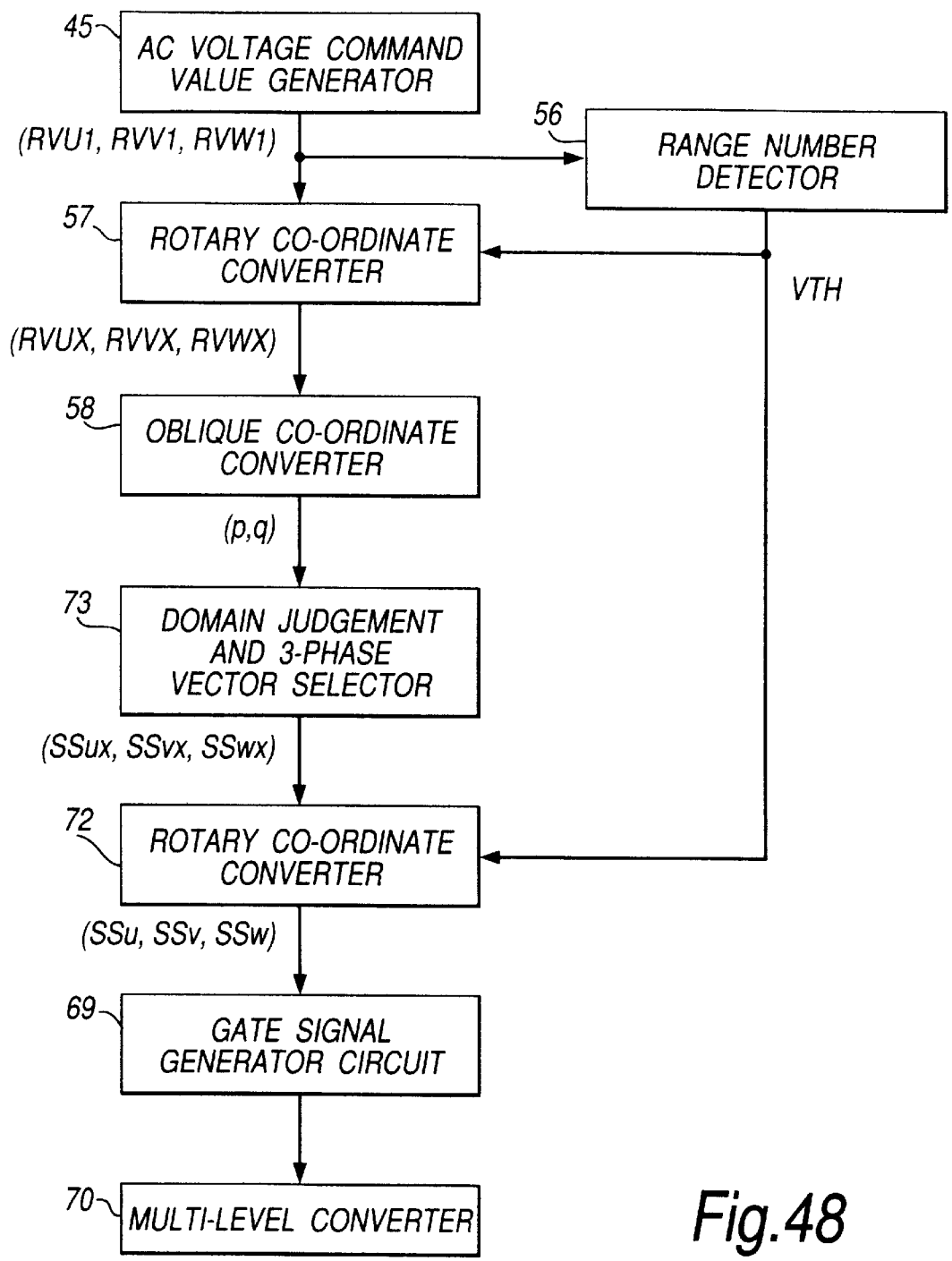
FIG. 48 is a block diagram showing a further, different modification of the eighth embodiment of a controller for a power converter according to the present invention.

In FIG. 46 and FIG. 48, the embodiment illustrated in FIG. 23 and FIG. 25 in relation to a multiplex voltage-type converter is applied to a multi-level converter. In FIG. 46 and FIG. 47, an ignition state signal (SSu,SSv,SSw) is output by vector→ignition signal converter 68, from the vector Vn output by vector rotator 52, and gate signal generator 69 generates an ignition pulse for the self-extinguishing type switching elements in multi-level converter 70 on the basis of the ignition state signal (SSu,SSv, SSw).

In FIG. 48, the embodiment shown in FIG. 28 in relation to a multiplex voltage-type converter is applied to a multi-level converter. The vector selection tables in FIG. 49–FIG. 52 depict the vector selection tables in FIG. 26 and FIG. 27 with additional values for provisional ignition states (SSux, SSvx,SSwx) corresponding to (Vpx,Vqx) values, as calculated by means of Equation (24) above.

In FIG. 48, a domain judgement and 3-phase vector selector 73 calculates (vp,vq,vr) from the voltage command vector (p,q) converted by oblique co-ordinates converter 58, and it determines (SSux,SSvx,SSwx) directly by using the vector selection table in FIG. 49–FIG. 52. Thereafter, similarly to the case described in the embodiment illustrated in FIG. 45, rotation co-ordinates converter 72 calculates the ignition state signal (SSu,SSv,SSw) from the provisional ignition state signal (SSux,SSvx,SSwx) in accordance with the range number VTH, and gate signal generator 69 generates a gate signal.

According to the eighth embodiment described above, the portion of a vector diagram converted to oblique co-ordinates which is outputtable by the multi-level converter is split into square-shape patterns, such that an output vector is positioned at the top left, or bottom right, or both bottom left and top right of each square-shape patterns, each square-shape patterns is further split into two triangular domains by a line connecting the top left vertex to the bottom right vertex thereof, it is judged which triangular domain in the oblique co-ordinates vector diagram split into domains contains the voltage command vector converted to oblique co-ordinates, and an output vector Vn corresponding to the domain is selected according to the judgement result. Thereby, since the output vector closest to the voltage command vector can be selected simply by calculation of the co-ordinate values of the voltage command vector in an oblique co-ordinates system, plus some additional calculation, without deriving the vector deviation between the voltage coimnand vector and all output vectors, the calculation time required for selecting output vectors is shortened, so higher performance can be achieved. By means of the above, PWM control by spatial vector comparison can be implemented at high speed.

(Ninth embodiment)

Figure 54:
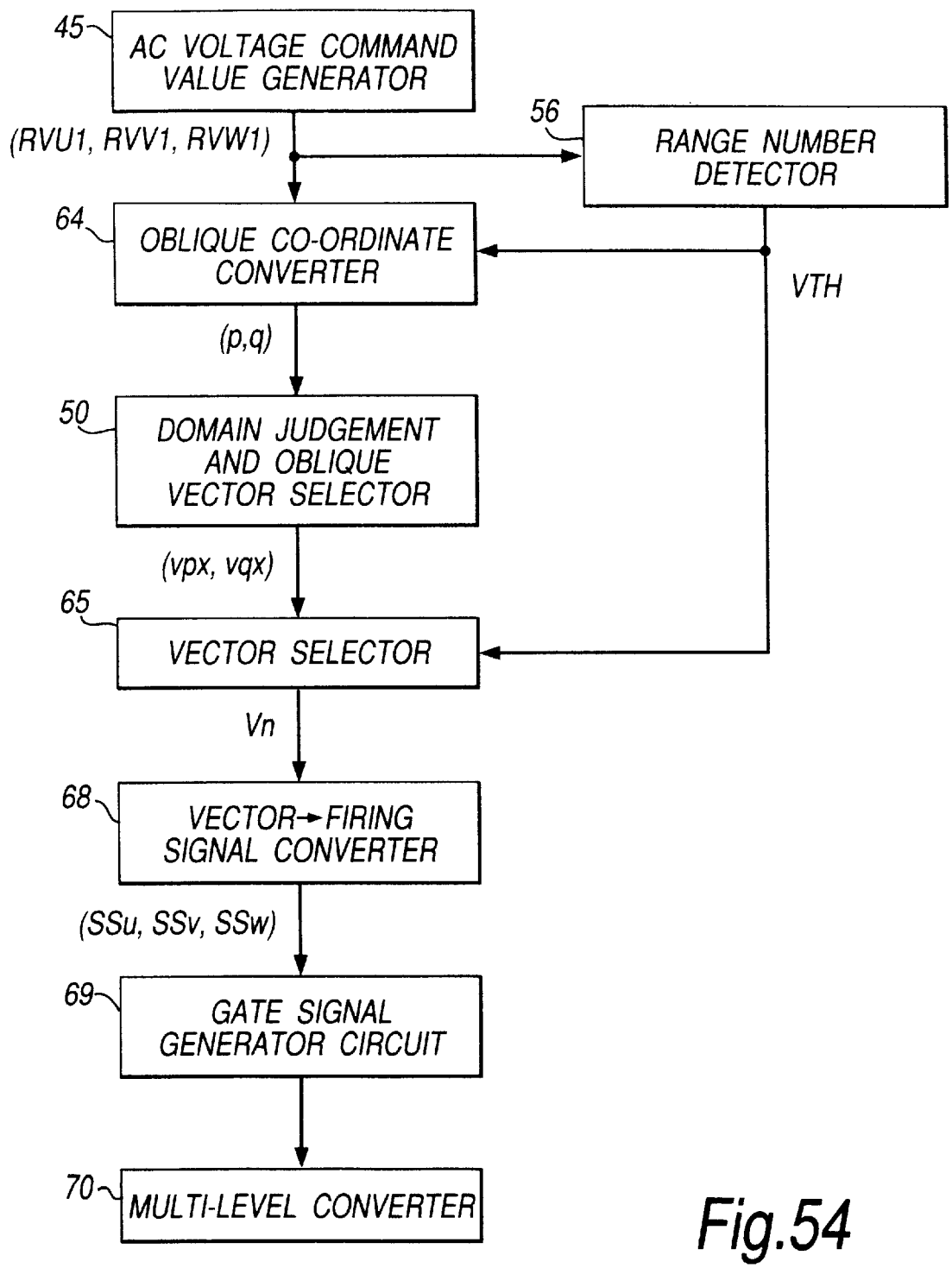
FIG. 54 is a block diagram showing the function and sequence of a ninth embodiment of a controller for a power converter according to the present invention.

In FIG. 54, the embodiment shown in FIG. 33 in relation to a multiplex voltage-type converter is applied to a multi-level converter 70. In FIG. 54, vector→ignition signal converter 68 derives an ignition state signal (SSu,SSv,SSw) from the vector Vn selectee by vector selector 65, and gate signal generator 69 generates an ignition pulse for the self-extinguishing type switching elements of multi-level converter 70 on the basis of this ignition state signal (SSu, SSv,SSw).

According to the ninth embodiment described above, the range number VTH containing the voltage command vector corresponding to the multi-level converter is calculated, the co-ordinates voltage command vector are converted to a vector in an oblique co-ordinates system, wherein a vector in the direction of a first prescribed angle and a vector in the direction of a second prescribed angle are taken as unit vectors, the region outputtable by the converter of a vector diagram, wherein the 60° range containing the voltage command vector in a spatial vector diagram on which output vectors are arranged is converted to oblique co-ordinates using the unit vectors, is split into square-shape patterns, such that output vectors are positioned at the top left, or bottom right, or both bottom left and top right of each square-shape patterns, square-shape patterns having output vectors at both the bottom left and top right thereof are further split into two triangular domains by lines connecting the top left vertex and bottom right vertex thereof, it is judged which of the square-shape patterns domains or triangular domains of the oblique co-ordinates system vector diagram split into domains contains the voltage command vector converted to oblique co-ordinates, and an output vector Vn corresponding to the domain is selected according to the judgement result. Thereby, since it is possible to select the output vector closest no the voltage command vector, simply by calculation of co-ordinate values for the voltage command vector in the oblique co-ordinates system, plus some additional calculation, without deriving the vector deviation between the voltage command vector and all the output vectors, the calculation time required for selection of the output vector is shortened and higher performance can be achieved.

(Modification of ninth embodiment)

Figure 55:
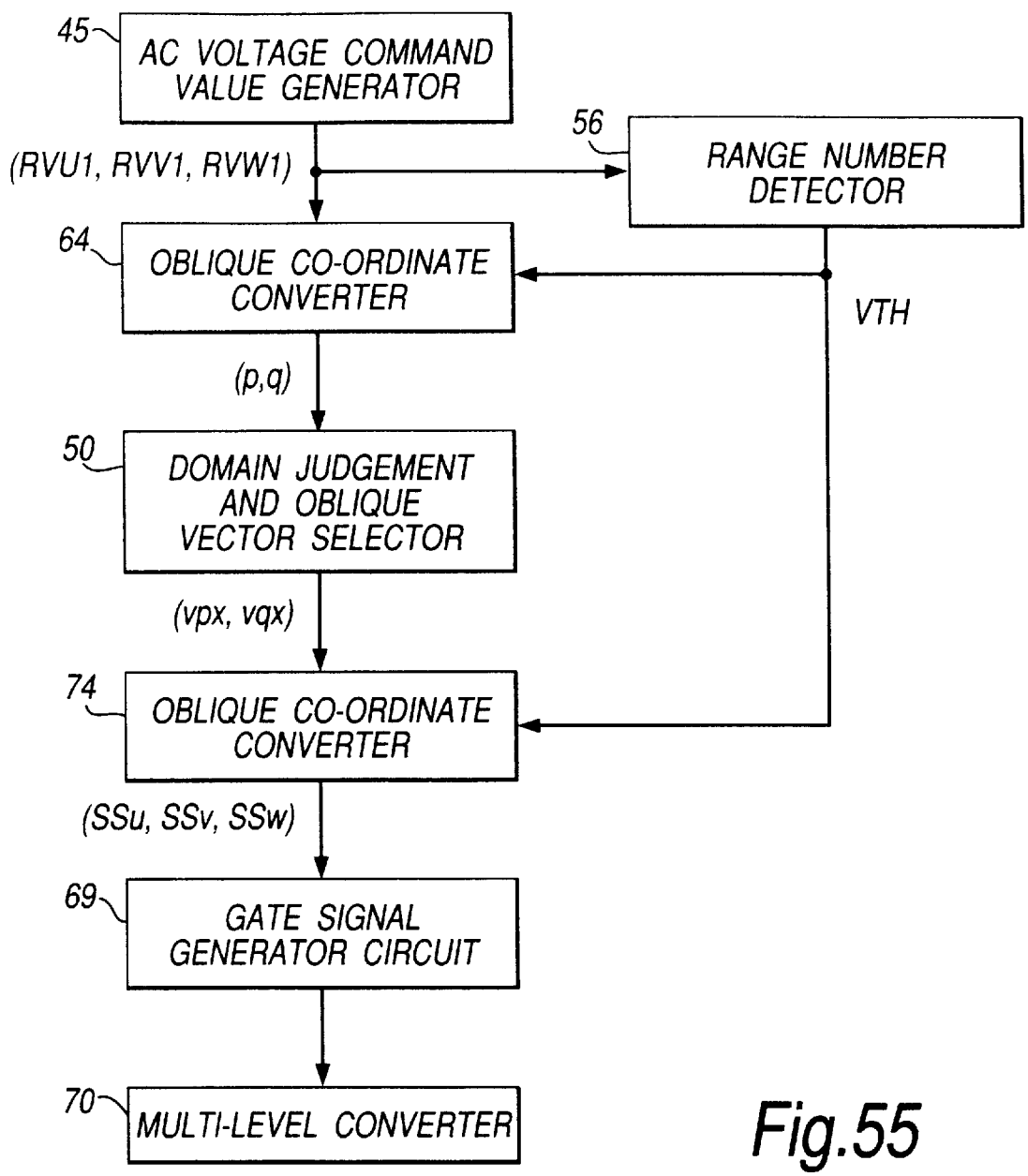
FIG. 55 is a block diagram showing a modification of the ninth embodiment of a controller for a power converter according to the present invention.

FIG. 55 is a block diagram showing a modification of a controller for a multi-level converter according to the ninth embodiment, and it depicts the embodiment illustrated in FIG. 36 in relation to a multiplex voltage-type converter, as applied to a multi-level converter. In FIG. 55, oblique co-ordinates converter 74 converts the output vector co-ordinates (vpx,vqx) in the oblique co-ordinates system to an ignition state signal (SSu,SSv,SSw) in accordance with the range number VTH. In practical terms, it implements logic calculations as given in Equation (26) below.

$$
\begin{aligned}
&\text{if VTH=0 then} \\
&\quad SSu=2 \\
&\quad SSv=2-(2*vpx+vqx)/3 \\
&\quad SSw=2-(vpx+2*vqx)/3 \\
&\text{elseif VTH=1 then} \\
&\quad SSu=-2+(2*vpx+vqx)/3 \\
&\quad SSv=-2+(vpx+2*vqx)/3 \\
&\quad SSw=-2 \\
&\text{elseif VTH=2 then} \\
&\quad SSu=2-(vpx+2vqx)/3 \\
&\quad SSv=2 \\
&\quad SSw=2-(2*vpx+vqx)/3 \\
&\text{elseif VTH=3 then} \\
&\quad SSu=-2 \\
&\quad SSv=-2+(2*vpx+vqx)/3 \\
&\quad SSw=-2+(vpx+2*vqx)/3 \\
&\text{elseif VTH=4 then} \\
&\quad SSu=2-(2*vpx+vqx)/3 \\
&\quad SSv=2-(vpx+2*vqx)/3 \\
&\quad SSw=2
\end{aligned}
$$

```
elseif VTH=5 then

SSu=-2+(vpx+2*vqx)/3

SSv=-2

SSw=-2+(2*vpx+vqx)/3 endif                                                    (26)
```

The ignition state signal (SSu,SSv,SSw) output by the oblique co-ordinates converter 74 is supplied to gate signal generator 69, which generates an ignition signal for the self-extinguishing type switching elements in multi-level converter 70.

In this embodiment also, since the output vector closest to the voltage command vector can be selected simply by calculation of the co-ordinate values of the voltage command vector in an oblique co-ordinates system, plus some additional calculation, the calculation time required for selection of output vectors is shortened, and higher performance can be achieved.

(Tenth embodiment)

Figure 56:
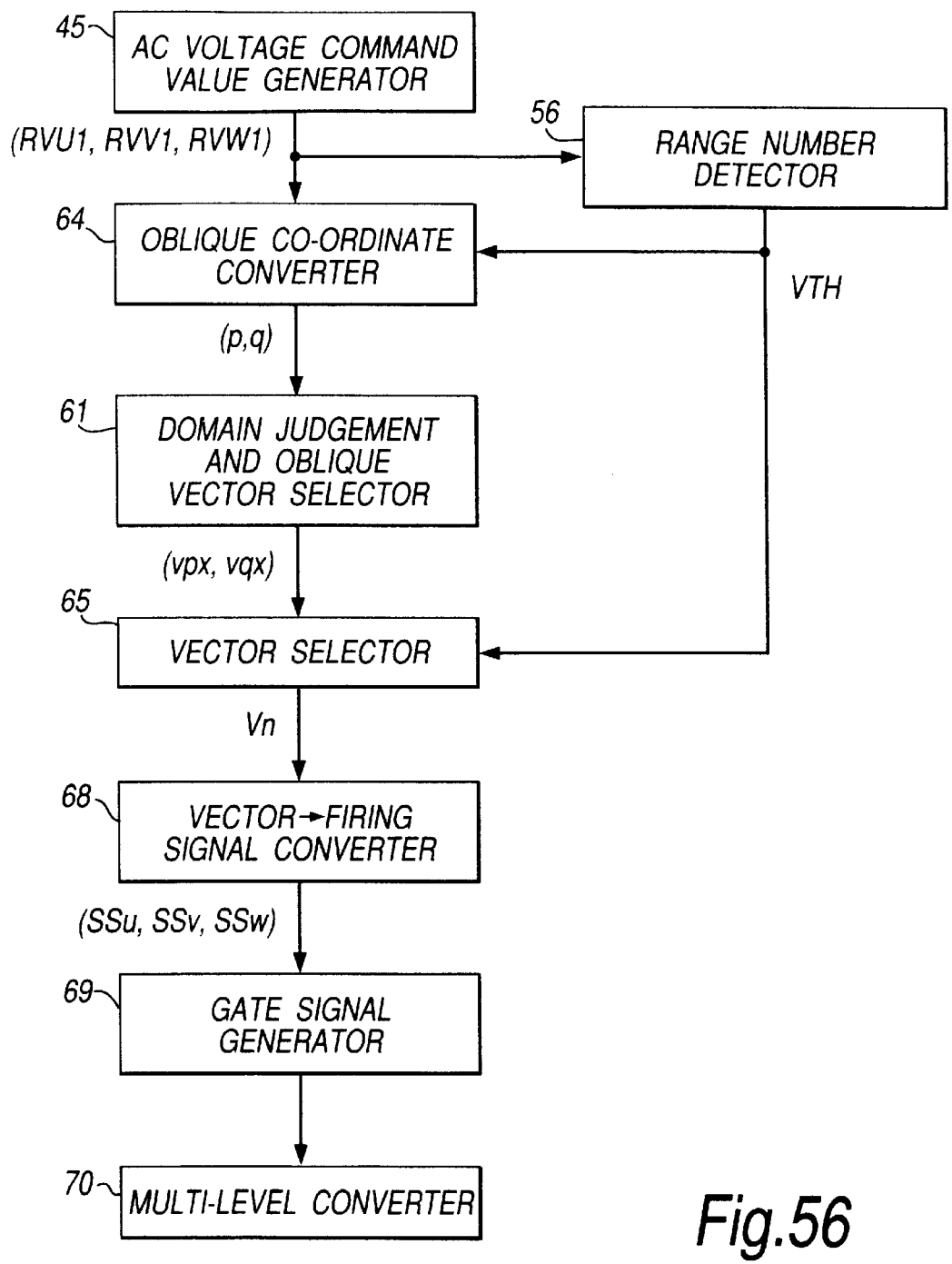
FIG. 56 is a block diagram showing the function and sequence of a tenth embodiment of a controller for a power converter according to the present invention.

In FIG. 56, the embodiment illustrated in FIG. 37 in relation to a multiplex voltage-type converter is applied to a multi-level converter. In the diagram, vector→ignition signal converter 68 calculates an ignition state signal (SSu,SSv, SSw) in accordance with the vector Vn selected by vector selector 65. This ignition state signal (SSu,SSv,SSw) is supplied to gate signal generator 69, which generates an ignition signal for the self-extinguishing type switching elements in the multi-level converter 70.

According to the tenth embodiment described above, the portion of a vector diagram converted to oblique co-ordinates which is outputtable by the multi-level converter is split into square-shape patterns, such that an output vector is positioned at the top left, or bottom right, or both bottom left and top right of each square-shape patterns, each square-shape patterns is further split into two triangular domains by a line connecting the top left vertex to the bottom right vertex thereof, it is judged which triangular domain in the oblique co-ordinates vector diagram split into domains contains the voltage command vector converted to oblique co-ordinates, and an output vector Vn corresponding to the domain is selected according to the judgement result. Thereby, since the output vector closest to the voltage command vector can be selected simply by calculation of the co-ordinate values of the voltage command vector in an oblique co-ordinates system, plus some additional calculation, without deriving the vector deviation between the voltage command vector and all output vectors, the calculation time required for selecting output vectors is shortened, so higher performance can be achieved.

(Eleventh embodiment)

Figure 57:
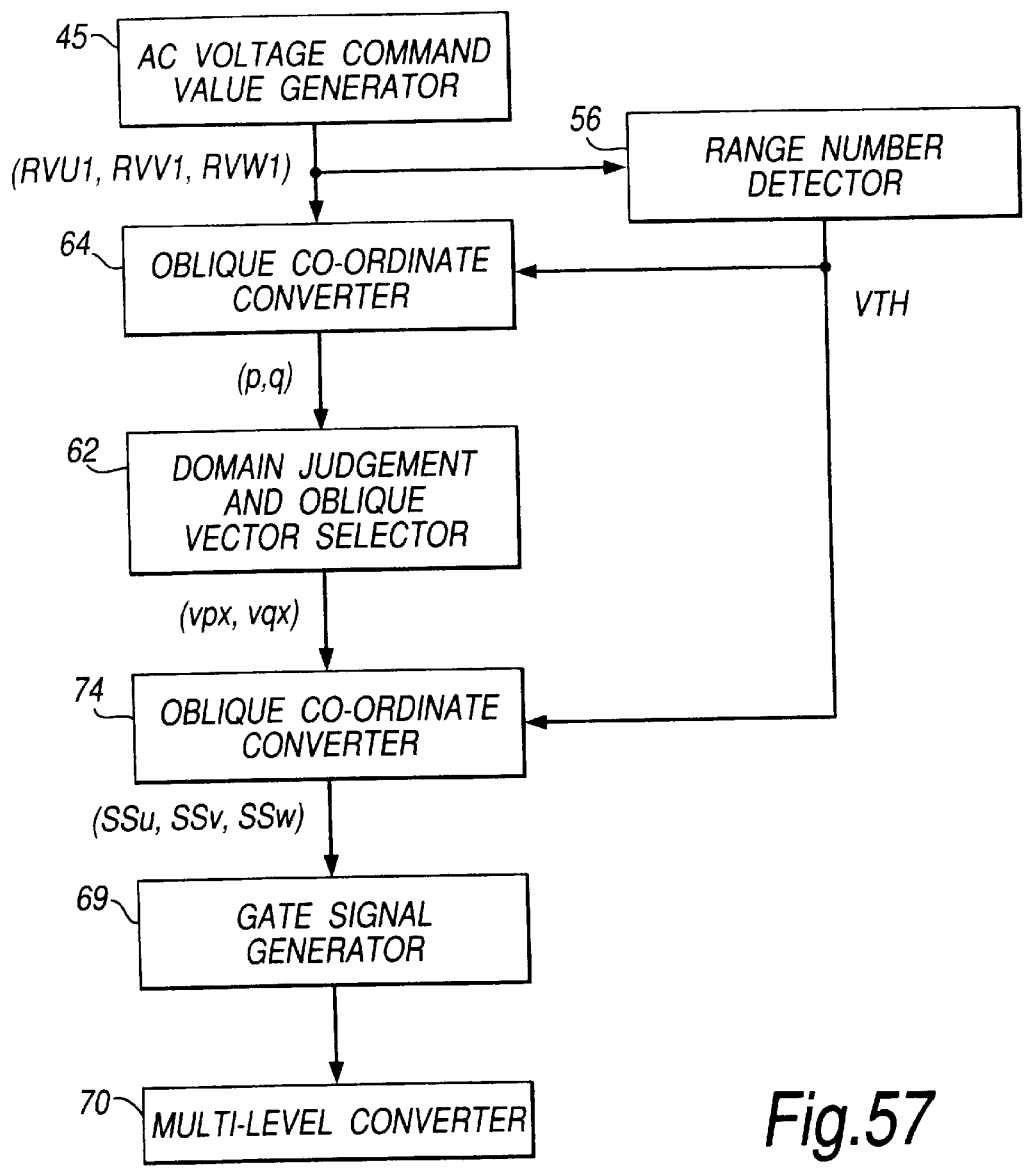
FIG. 57 is a block diagram showing the function and sequence of a eleventh embodiment of a controller for a power converter according to the present invention.

In FIG. 57, the embodiment illustrated in FIG. 38 in relation to a multiplex voltage-type converter is applied to a multi-level converter. In the diagram, domain judgement and oblique vector selector 62 calculates (vp,vq,vr) from the voltage command vector co-ordinates (p,q) in an oblique co-ordinates system, by means of a vector diagram which is converted to the oblique co-ordinates system and split into triangular domains, and derives the oblique system co-ordinates (vpx,vqx) for the output vector using vector selection tables in FIG. 26 and FIG. 27, similarly to the domain judgement and oblique vector selector illustrated in FIG. 25.

Moreover, oblique co-ordinates converter 74 calculates an ignition state signal (SSu,SSv,SSw) from (vpx,vqx) and the range number VTH, similarly to oblique co-ordinates converter 74 in the embodiment shown in FIG. 55. This ignition state signal (SSu,SSv,SSw) is then supplied to a gate signal generator 69, which generates an ignition signal for the self-extinguishing type switching elements in multi-level converter 70.

(Modification of eleventh embodiment)

Figure 58:
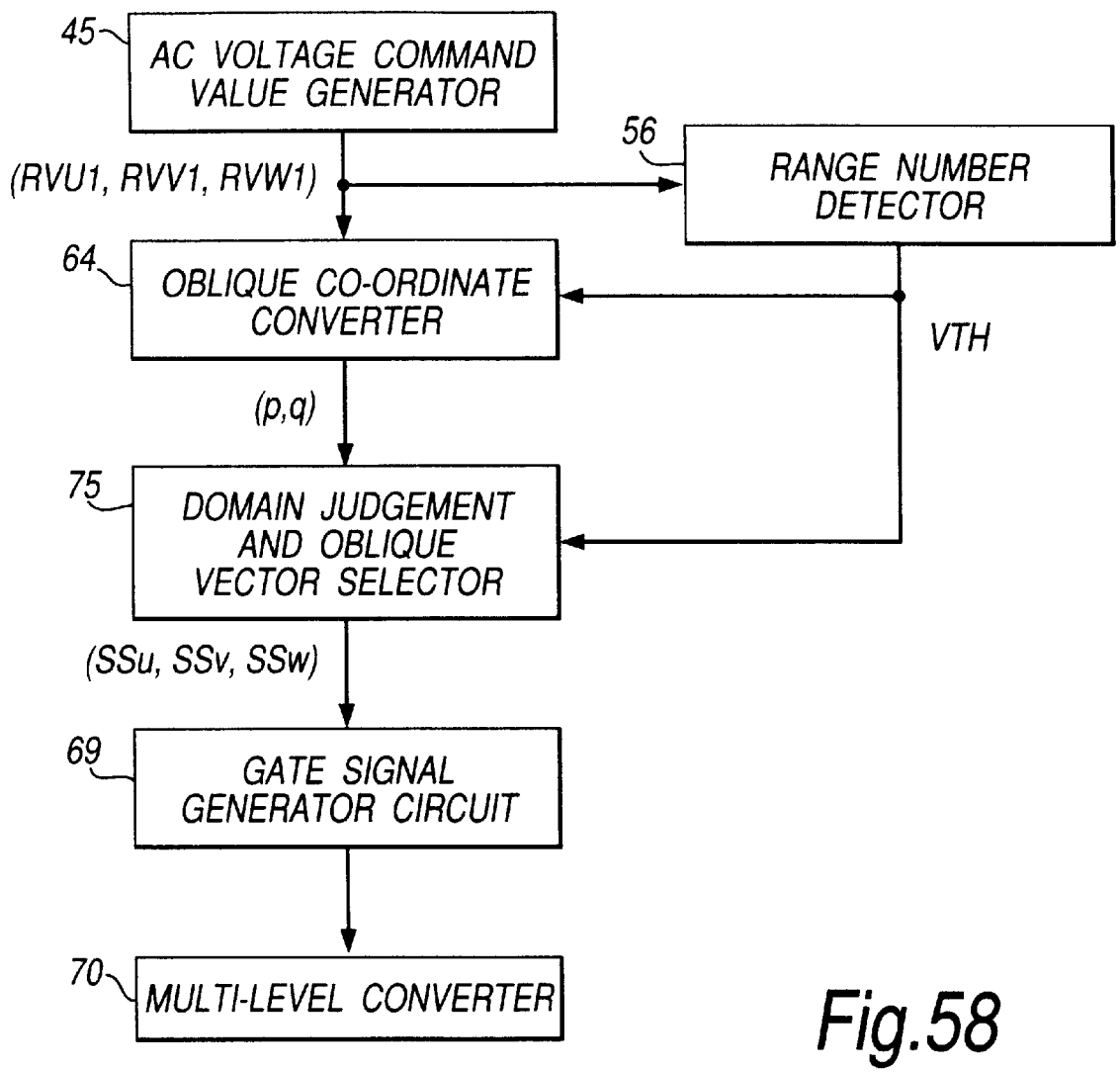
FIG. 58 is a block diagram showing a modification of the eleventh embodiment of a controller for a power converter according to the present invention.

In FIG. 58, the embodiment illustrated in FIG. 39 in relation to a multiplex voltage-type converter is applied to a multi-level converter. In FIG. 58, domain judgement and 3-phase vector selector 75 derives an ignition state signal (SSu,SSv,SSw) for the output vector from the voltage command vector (p,q) in the oblique co-ordinates system and the range number VTH.

FIG. 26 and FIG. 27 were vector selection tables showing (vpx,vqx) values corresponding to (vp,vq,vr) values, but it is also possible to create a table containing (SSu,SSv,SSw) values obtained by co-ordinates conversion of (vpx,vqx) with respect to the range number VTH, using Equation (26) above.

FIG. 53 is a diagram illustrating an initial portion of such a vector selection table. Using this vector selection table, it is possible to determine an ignition state signal for the output vector closest to the voltage command vector directly from (vp,vq,vr) and the range number VTH.

In the present embodiment, similarly, since the output vector closest to the voltage command vector can be selected simply by calculation of the co-ordinate values of the voltage command vector in an oblique co-ordinates system, plus some additional calculation, the calculation time required for selection of output vectors is shortened, so higher performance can be achieved. By means of the above, PWM control by spatial vector comparison can be implemented at high speed.

As described above, according to the present invention, it is possible to provide a high-performance controller for a power converter, whereby the output vector closest to the voltage command vector is selected quickly, simply by calculation of the co-ordinate values of the voltage command vector in an oblique co-ordinates system, plus some additional calculation, without deriving the vector deviation between the voltage command vector and all the output vectors, such that PWM control by spatial vector comparison can be implemented at high speed.

Next, a controller for a multiplex current-type power converter is described.

(Twelfth embodiment)

Figure 5:
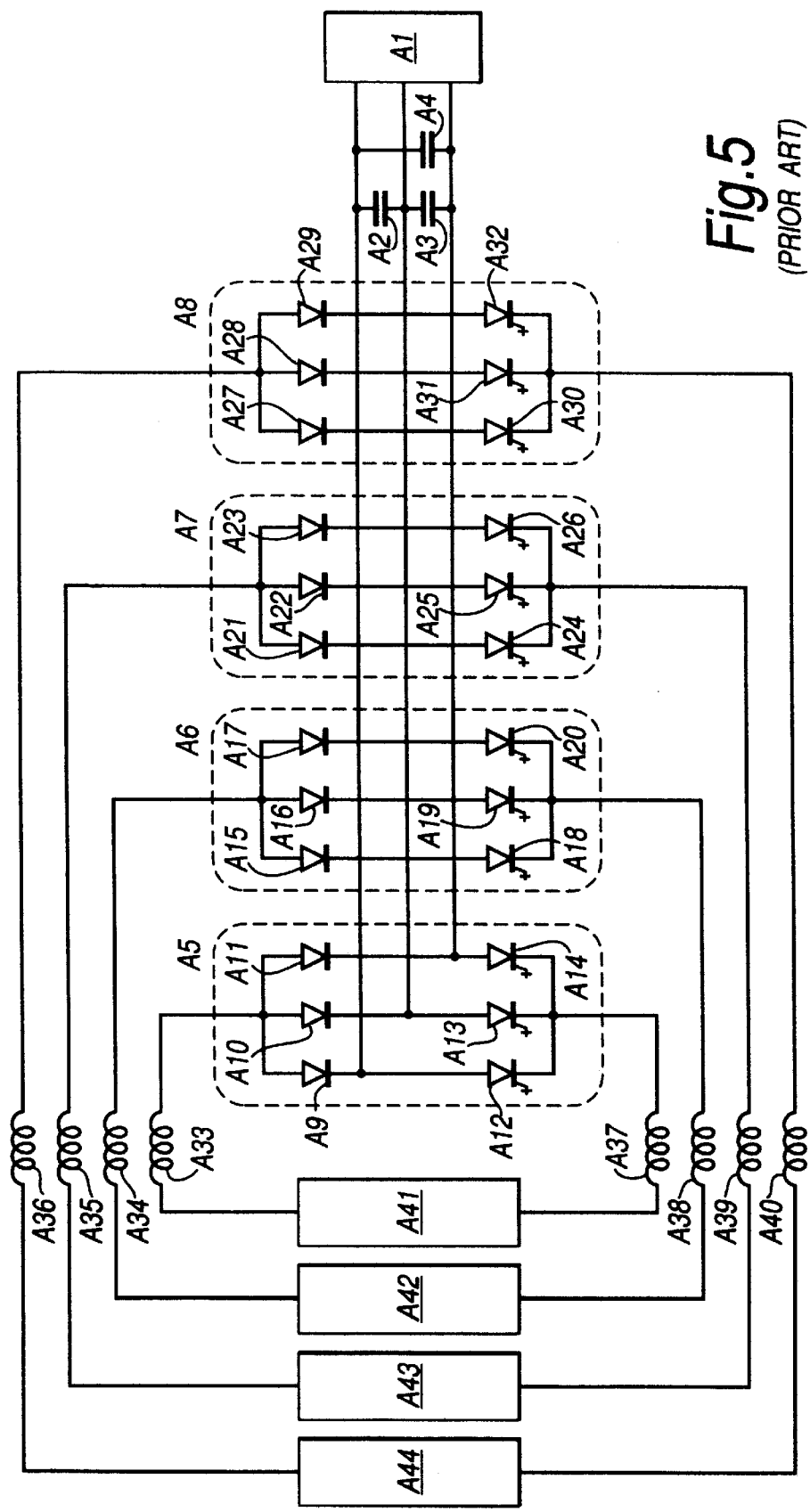
FIG. 5 is a compositional diagram of the main circuit of a multiplex current-type converter.
Figure 6:
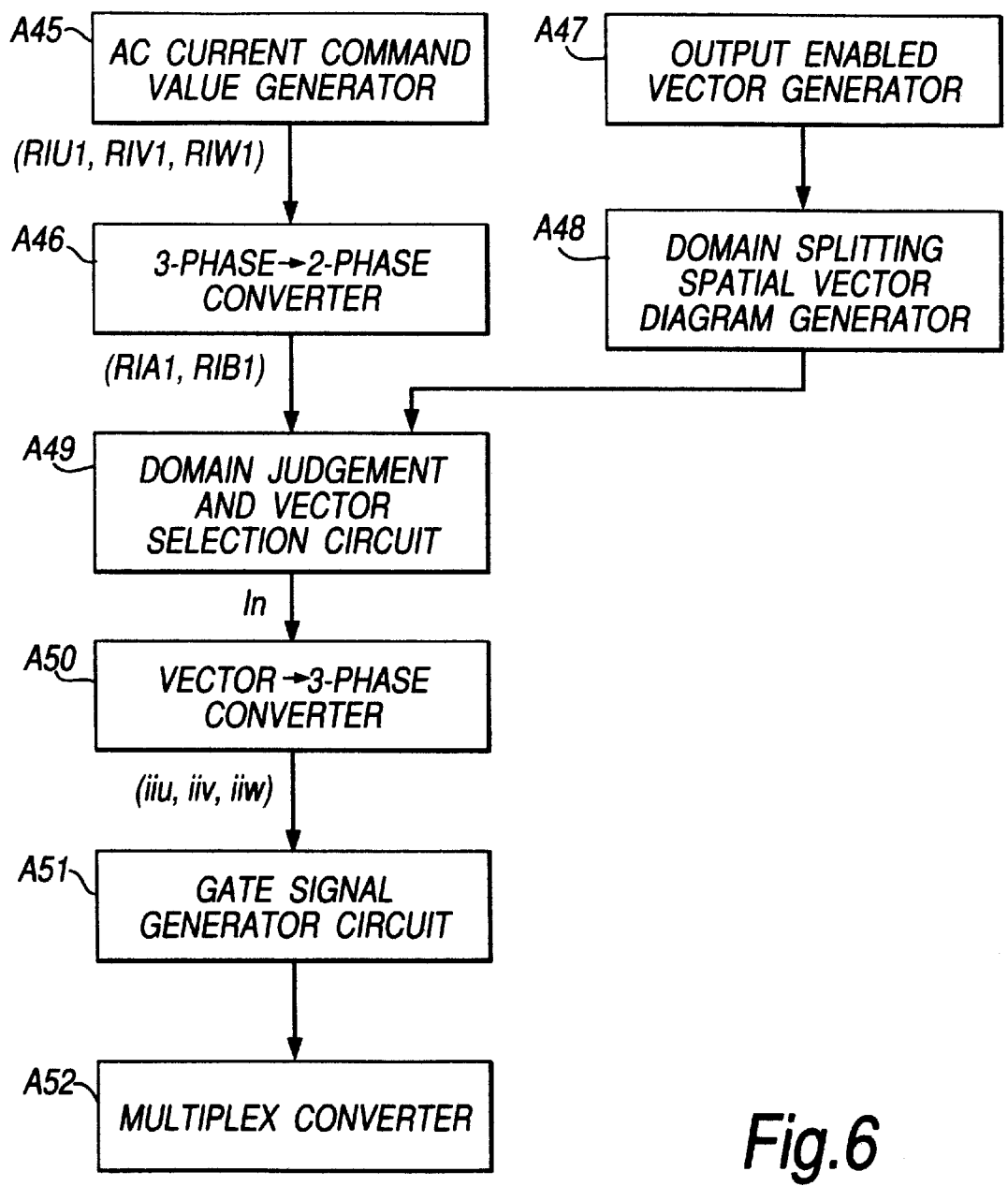
FIG. 6 is a block diagram showing the function and sequence of a prior art control circuit.
Figure 7:
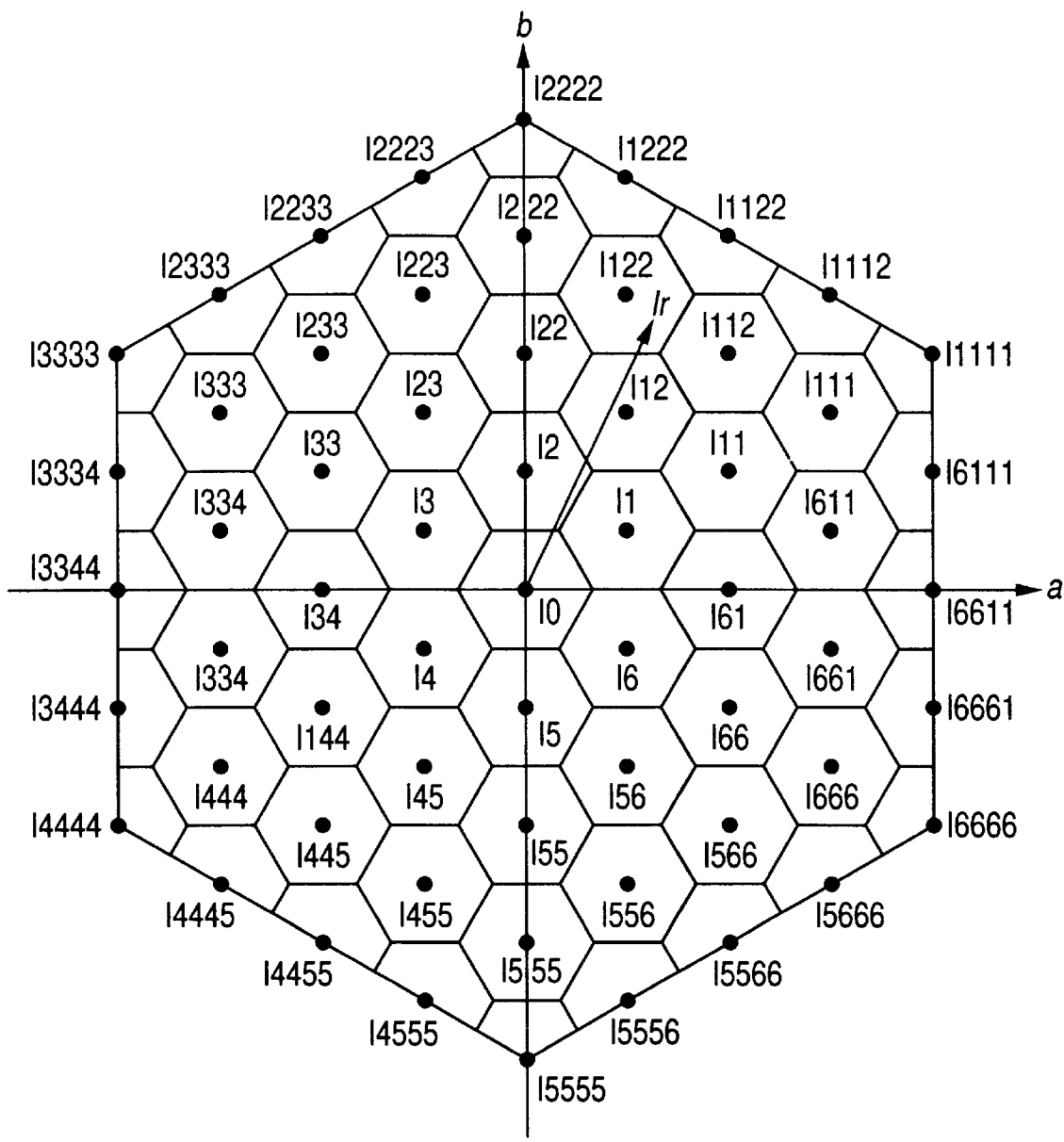
FIG. 7 is a diagram showing current vectors which can be generated on the AC side by the four-level current-type converter shown in FIG. 59.
Figure 8:
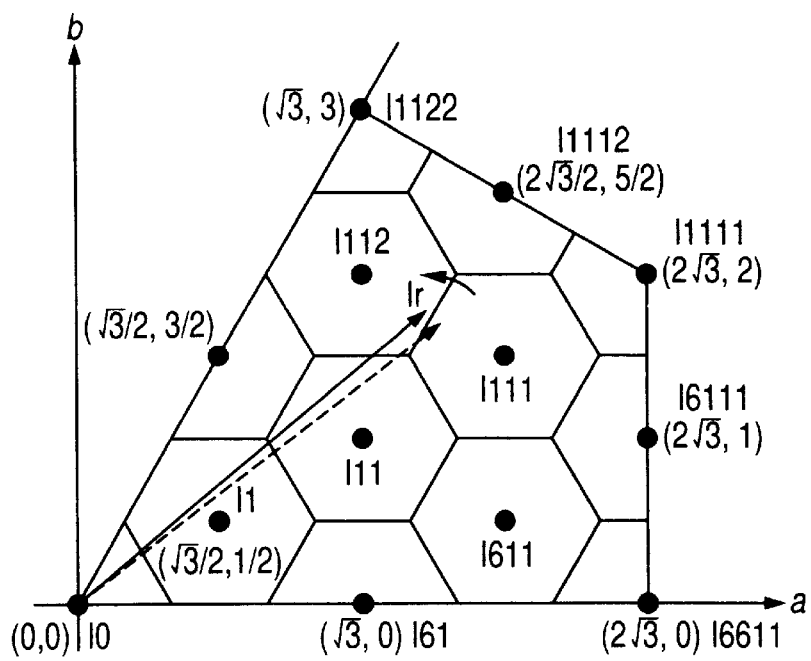
FIG. 8 is a diagram for describing a chattering effect.
Figure 9:
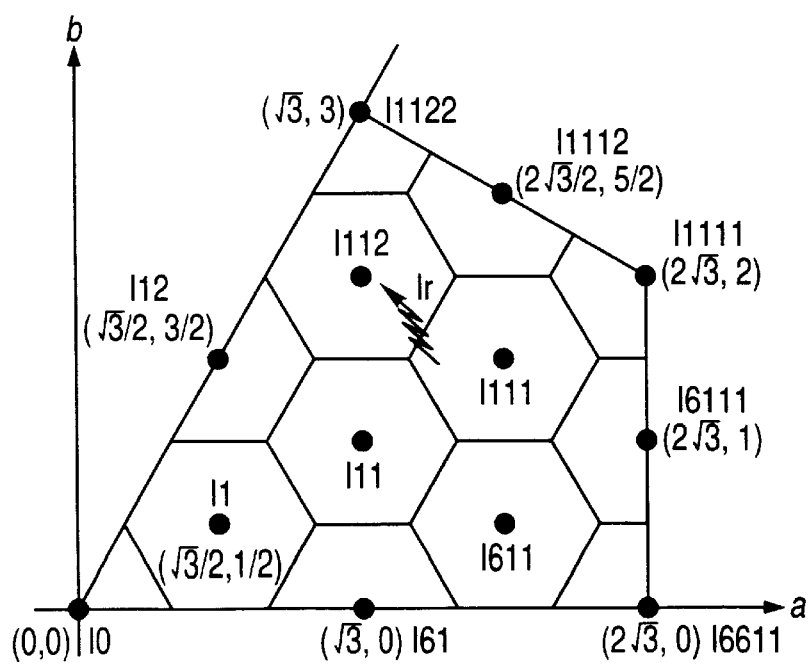
FIG. 9 is also a diagram for describing a chattering effect.

Since the composition of the main circuit of the multiplex current-type converter according to a twelfth embodiment of the present invention is the same as the prior art composition illustrated in FIG. 5, description thereof is omitted here.

Furthermore, the DC currents flowing in converter A5—converter A8 are controlled such they are equal to each other.

Figure 59:
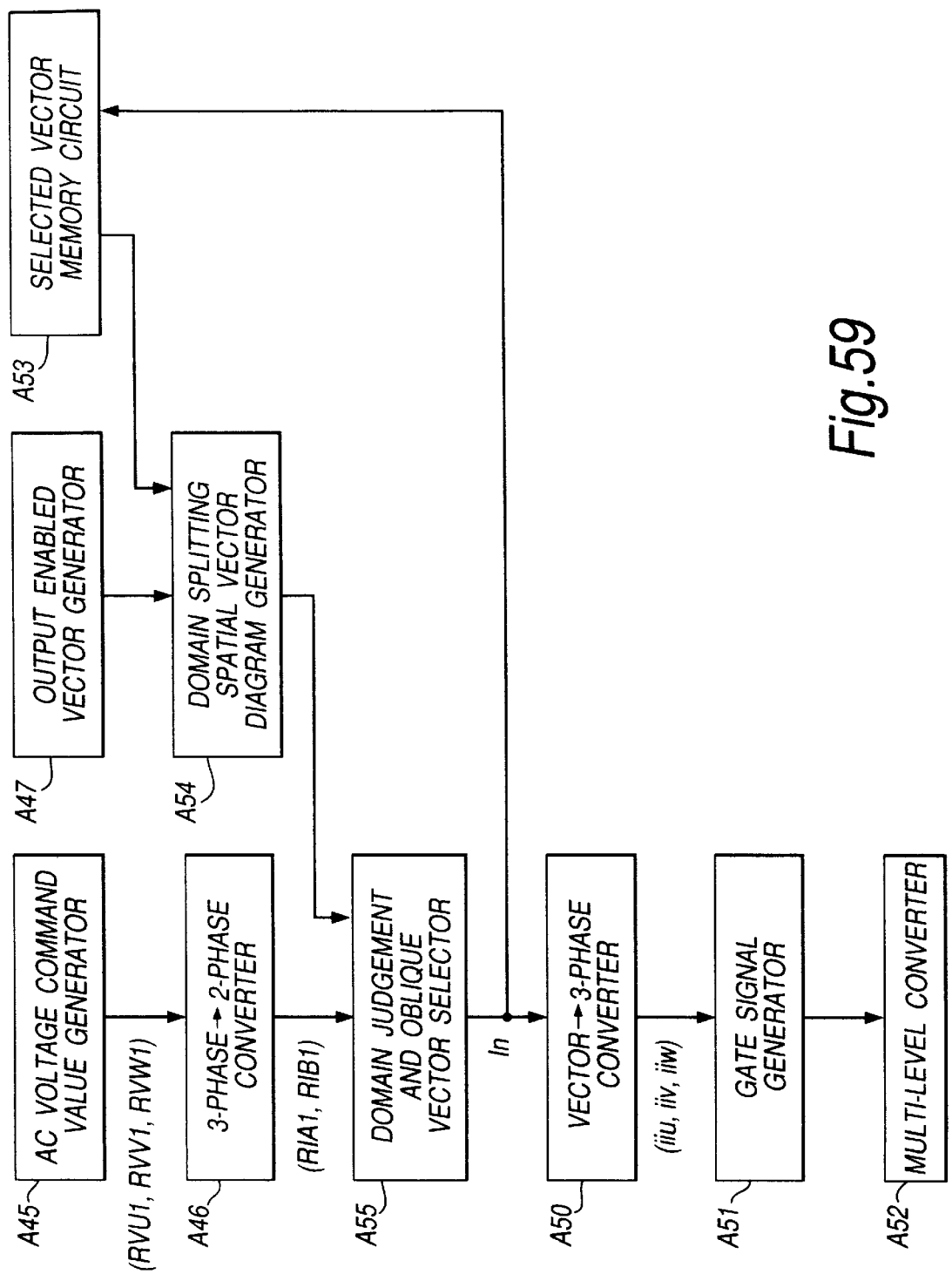
FIG. 59 is a block diagram showing the function and sequence of a control circuit according to a twelfth embodiment of the present invention.

FIG. 59 shows the function and sequence of a control circuit according to the twelfth embodiment of the present invention, which is characterized in that a domain splitting spatial vector diagram is modified in accordance with the immediately previous output vector.

In FIG. 59, AC current command generator A45 generates AC current commands (R1U1, R1V1, R1W1) relative to the converter, and 3-phase→2-phase converter A46 converts the AC current commands (R1U1, R1V1, R1W1) generated by current command generator A45 into rectangular (or orthogonal) co-ordinate current commands (RIA1, RIB1). Outputable vector generator A47 converts all outputable vector values that can be generated by the multiplex converter into the form of A axis and B axis coordinate values (InA, InB), and selected vector memory circuit A53 memorises the vector selected in the previous vector selection calculation. This vector is the vector (output from the domain judgement and vector selection circuit A55 described previously) actually output by the converter until immediately before the vector selected by the present selection calculation is actually output.

Domain splitting spatial vector diagram generator A54 generates the domain splitting spatial vector diagram used for current vector selection from the previously selected vector obtained from the outputable vector generated by outputable vector generator A47 and selected vector memory circuit A53.

Domain judgement and vector selection circuit A55 judges in which domain of the domain splitting spatial vector diagram the command value vector (RIA1, RIB1) is contained, and selects output vector In corresponding to that domain.

Vector→3-phase converter A50 generates a GTO switching pattern corresponding to outputable vector In selected by domain judgement and vector selection circuit A55, and gate signal generator circuit A51 generates the GTO ignition pulse for multi-level converter A52 consisting of converters A5~A8 in FIG. 5.

Figure 60:
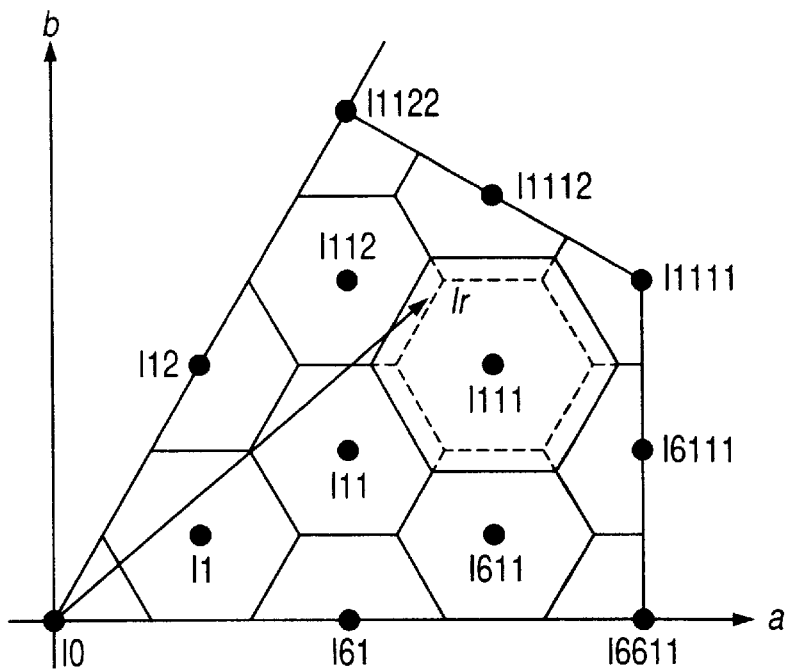
FIG. 60 is a hexagonal splitting spatial vector diagram in a case where the previously selected vector is I111.
Figure 61:
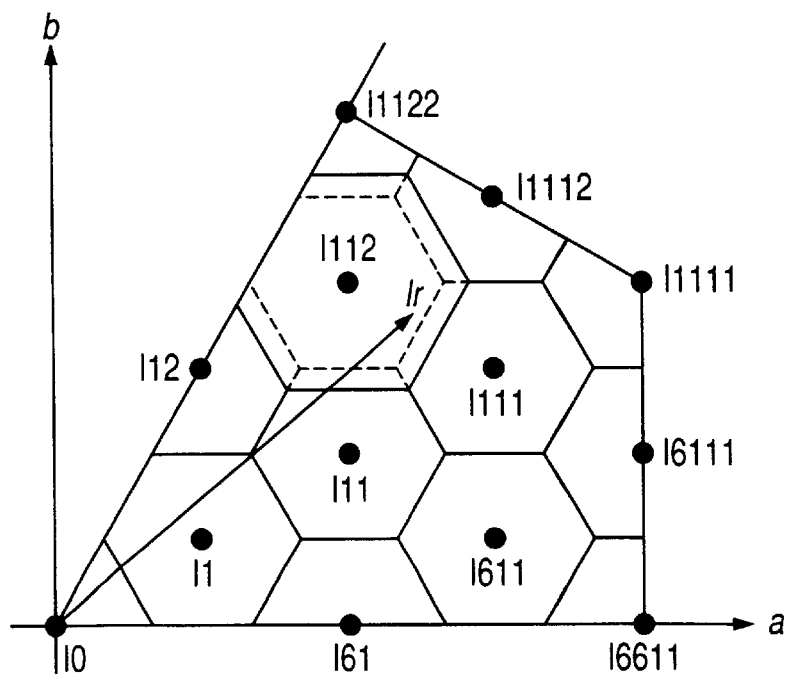
FIG. 61 is a hexagonal splitting spatial vector diagram in a case where the previously selected vector is I112.

Here, FIG. 60 and FIG. 61 are used to describe the operation of the main features of the present embodiment, which are the domain splitting spatial vector diagram generator A54 and domain judgement and vector selection circuit A55.

FIG. 60 illustrates part of the spatial vector diagram when the previously selected vector is I111. Domain splitting spatial vector diagram generator A54 generates a widened domain splitting spatial vector diagram which contains output enabled vector vector I111 of the outputable vectors from outputable vector generator A47, based on vector I111 being output by the converter immediately before memorisation in selection vector memory circuit A53. That is to say, the shape is a regular hexagonal area that containing vector I111 which is wider than for normal domain splitting (indicated by the dotted lines).

Domain judgement and vector selection circuit A55 judges in which domain of the domain splitting spatial vector diagram the command value vector is contained, and selects the output vector corresponding to that domain, however, as the domain containing vector I111 is widened, I111 continues to be selected for some time even if command vector Ir exceeds the normal domain splitting boundary (dotted line). When the boundary indicated by the solid line in FIG. 60 is exceeded and vector I112 is selected, a domain splitting spatial vector diagram with a wider domain for vector I112 is employed, as shown in FIG. 61. This means that even if resonance suppression control operates, vector I111 will not be selected immediately.

In this way, in the present embodiment, by using a widened domain split of the domain area containing the vector currently being selected, as the vector currently being selected can also be selected easily the next time, this reduces chattering and enables switching cycles to be reduced.

Figure 62:
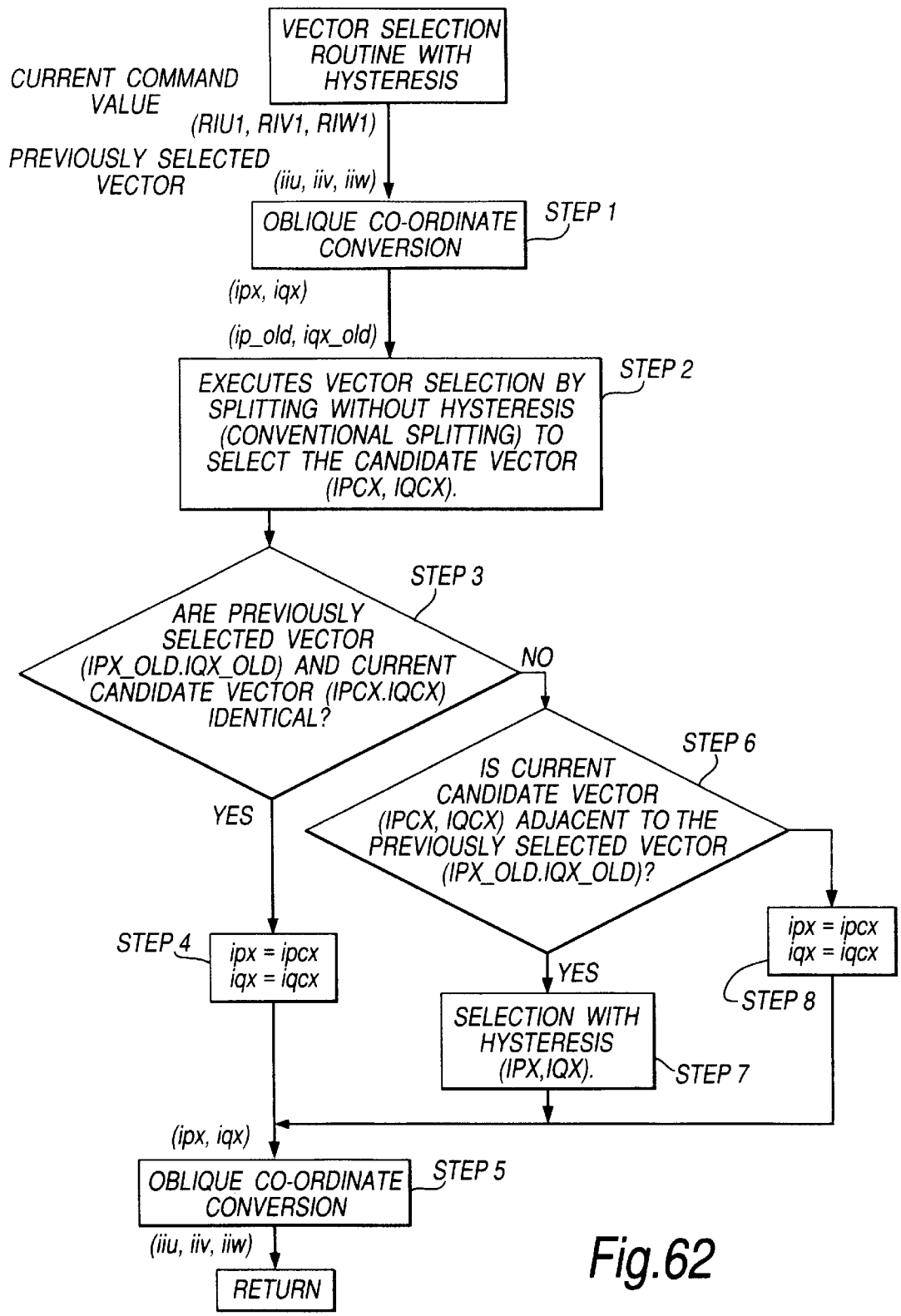
FIG. 62 is a flowchart of a case where the twelfth embodiment is processed by software.

Next, the software processing flow for the example of a twelfth embodiment is described with reference to FIG. 62. However, an explanation is given only of the portion corresponding to the main features of the present embodiment, which are domain splitting spatial vector diagram generator A54 and domain judgement and vector selection circuit A55 shown in FIG. 59.

First, in STEP 1, the current command value and the previously selected vector are converted to the orthogonal coordinate system, and in STEP 2 the vector corresponding to the domain containing the command value vector is selected as the candidate vector by domain splitting, the same as before.

In STEP 3, the previously selected vector and the candidate vector are compared, and if they are the same, the process jumps to STEP 4; if they are different, to STEP 6. In STEP 4, the candidate vector is set as the current selected vector In STEP 5, the selected vector is converted to components on the U, V and W coordinates.

In STEP 6, whether or not the candidate vector is in an adjacent domain to the previously selected vector is determined, and if it is in an adjacent domain, the process jumps to STEP 7; if not it jumps to STEP 8.

In STEP 7, the vector corresponding to the domain containing the command vector is set as the current selected vector by widened domain splitting of the domain containing the previously selected vector.

In STEP 8, the candidate ,rector is set as the current selected vector.

That is to say that firstly the candidate vector for the current selected vector is determined by the same split domain as before, and only when that candidate vector is in a domain adjacent to the previously selected vector, the current selected vector is determined by widening domain splitting of the domain containing the previously selected vector.

In this way, when processing with software, there is no need always to calculate the widened domain splitting of the domain area containing the previously selected vector.

Next a thirteenth embodiment of the present invention is explained.

Figure 63:
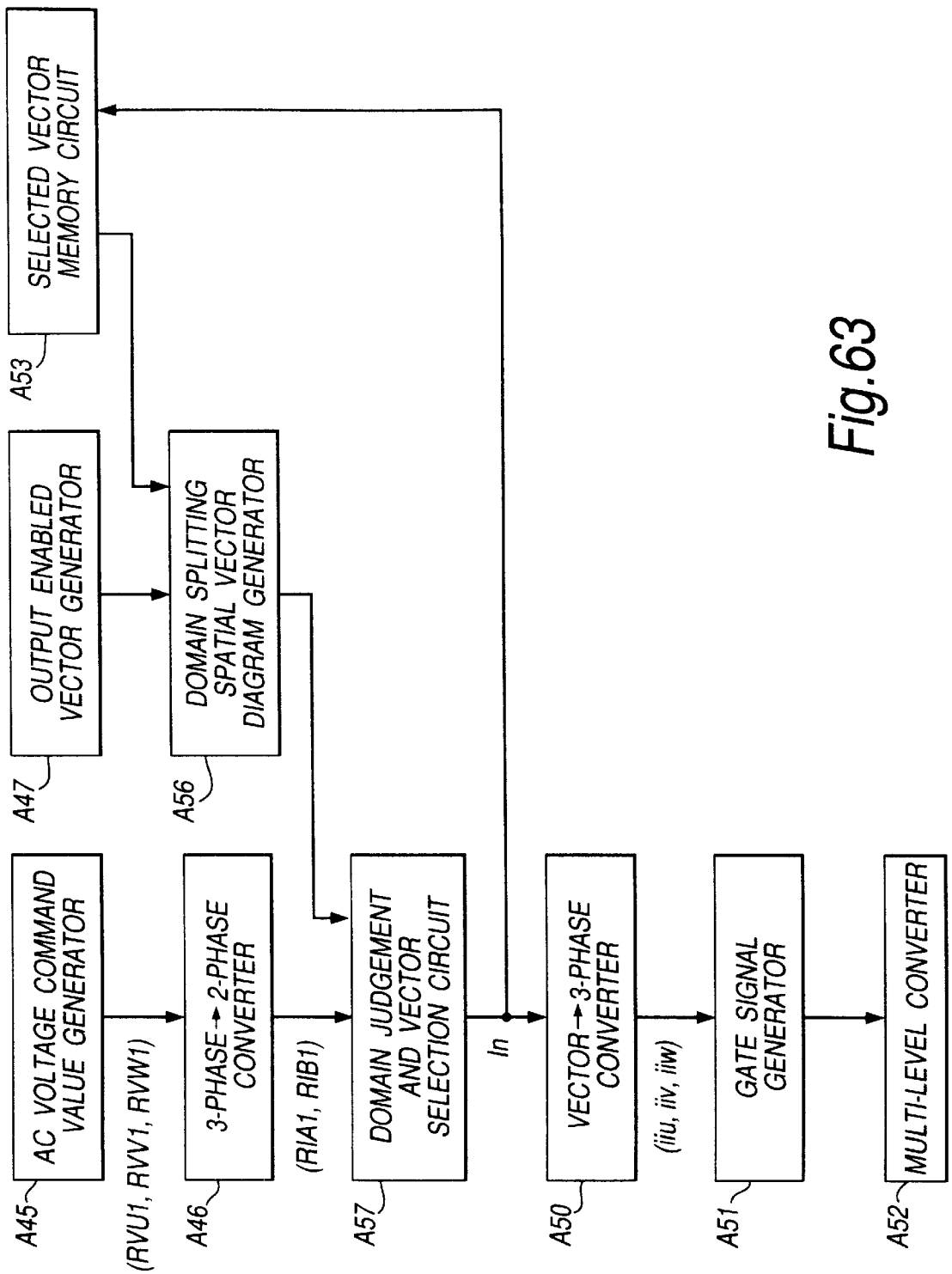
FIG. 63 is a block diagram showing the function and sequence of a control circuit according to a thirteenth, embodiment.

FIG. 63 is a function and sequence diagram of the control circuit in a thirteenth embodiment of the present invention. As FIG. 63 is the same as the example of a twelfth embodiment shown in FIG. 59, except for domain splitting spatial vector diagram generator A56 and domain judgement and vector selection circuit A57, identical reference numbers are used and some explanations are omitted.

Figure 64:
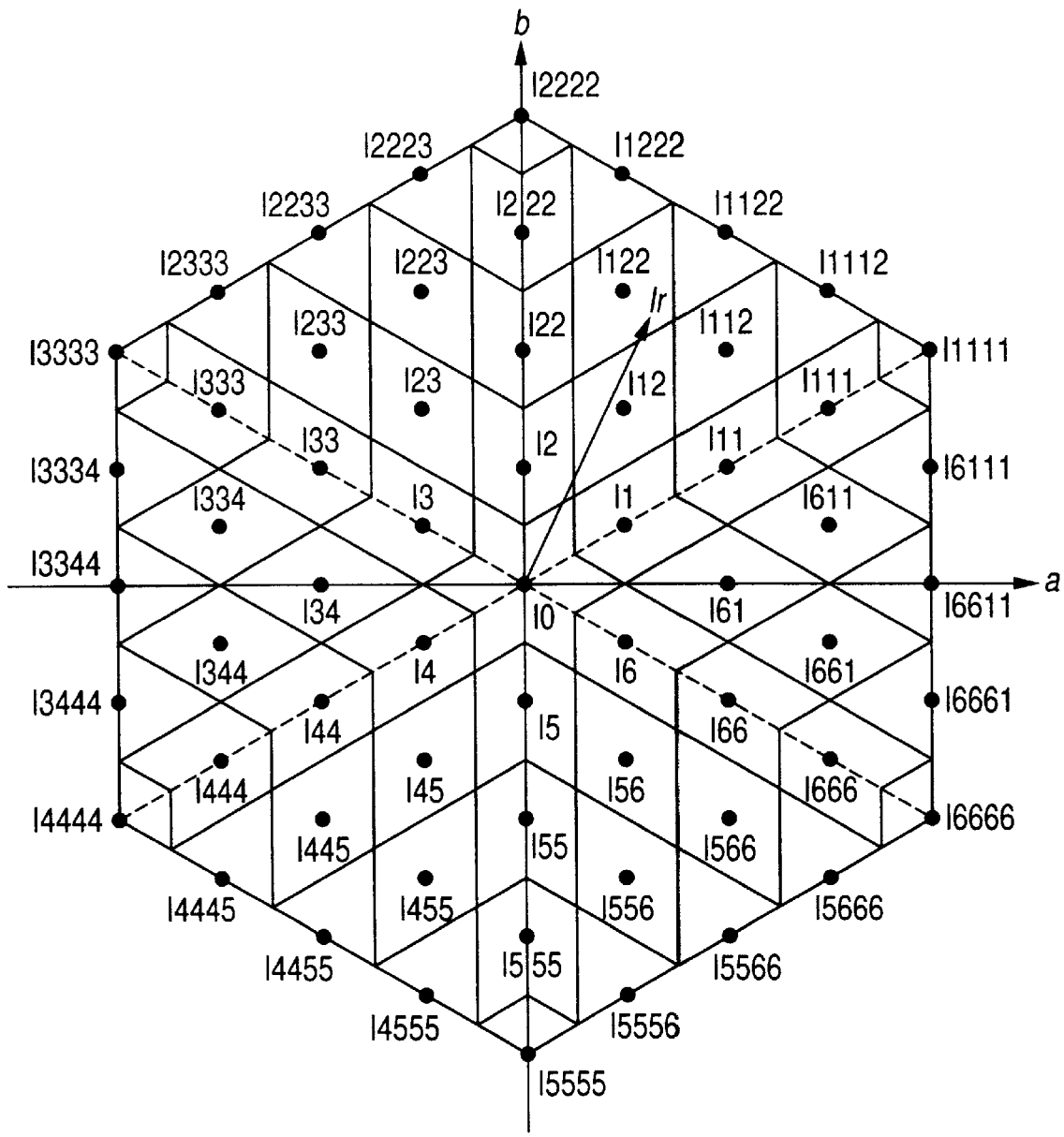
FIG. 64 is a spatial vector diagram, wherein the output-table vectors of a four-level current-type converter are, split into rhombiform domains.

The thirteenth embodiment illustrated in FIG. 63 is based on the spatial vector diagram shown in FIG. 64. This shows the domain surrounding each outputable vector as a rhombus. However, the domains surrounding the outputable vectors on the 30 degree, 90 degree, 150 degree, 210 degree, 270 degree and 330 degree lines are halves of rhombic shapes put together. For vector selection using the domain splitting spatial vector diagram as is, in this way, the same as for hexagonal splitting, chattering due to resonance suppression control and current control may occur.

Figure 65:
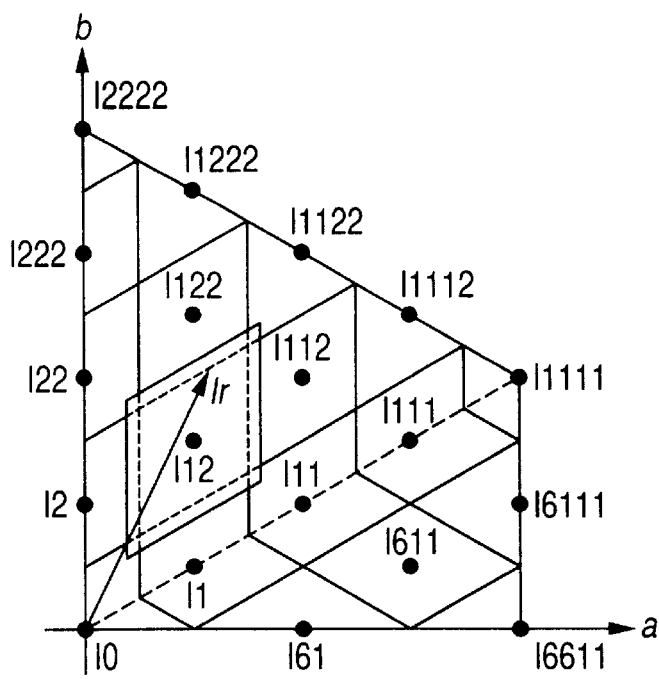
FIG. 65 is a rhombiform splitting spatial vector diagram in a case where the previously selected vector is I112.
Figure 66:
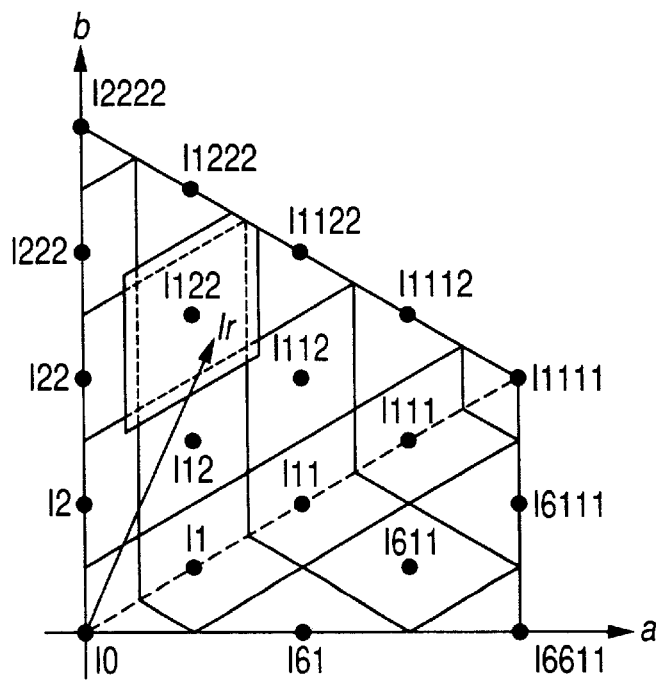
FIG. 66 is a rhombiform splitting spatial vector diagram in a case where the previously selected vector is I122.

Here, FIG. 65 and FIG. 66 are used to explain the operation of the main features of the present embodiment, which are domain splitting spatial vector diagram generator A56 and domain judgement and vector selection circuit A57.

FIG. 65 shows one part of the spatial vector diagram when the previously selected vector is I12. Domain splitting spatial vector diagram generator A56 generates a widened domain splitting spatial vector diagram of the domain containing vector I12 of the outputable vectors from outputable vector generator A47, based on vector I12 output from the converter immediately before being memorized in selected vector memory circuit A53. That is to say that the rhombic area containing vector I12 is widened more than for normal domain splitting indicated by dotted line).

Domain judgement and vector selection circuit A57 judges in which domain of the domain splitting spatial vector diagram the command value vector is contained and selects the output vector corresponding to that domain. However, because the domain containing vector I12 is widened, I12 continues to be selected for some time even if command vector Ir exceeds the normal domain splitting boundary (dotted line). When the boundary indicated by the solid line in FIG. 65 is crossed and vector I1112 is selected, from the next control calculation a domain splitting spatial vector diagram with a wider domain for vector I1112 is employed, as shown in FIG. 66. This means that even if resonance suppression control operates, vector I12 will not be selected immediately.

In this way, in the present embodiment, by using a widened domain split of the domain area that contains the vector currently being selected, the vector currently being selected can also be selected easily the next time, and this reduces chattering and enables the switching cycles to be reduced.

Next, in the thirteenth embodiment, another example is described for widening the domain containing the previously selected vector.

Figure 67:
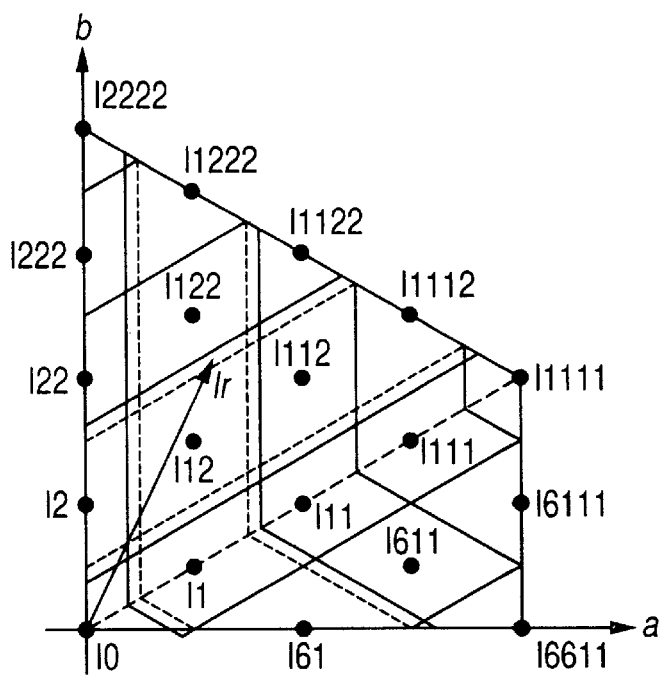
FIG. 67 is a diagram showing a further example of splitting in a rhombiform splitting spatial vector diagram.
Figure 68:
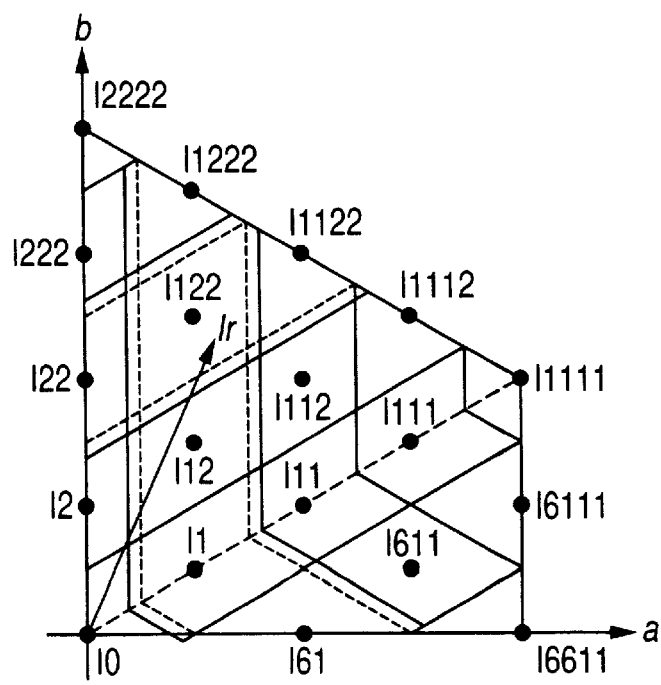
FIG. 68 is a diagram showing a further example of splitting in a rhombiform splitting spatial vector diagram.

FIG. 67 and FIG. 68 show widening of not only the domain containing the previously selected vector, but also of the domains in the two lateral directions of that domain's rhombic shape.

Figure 69:
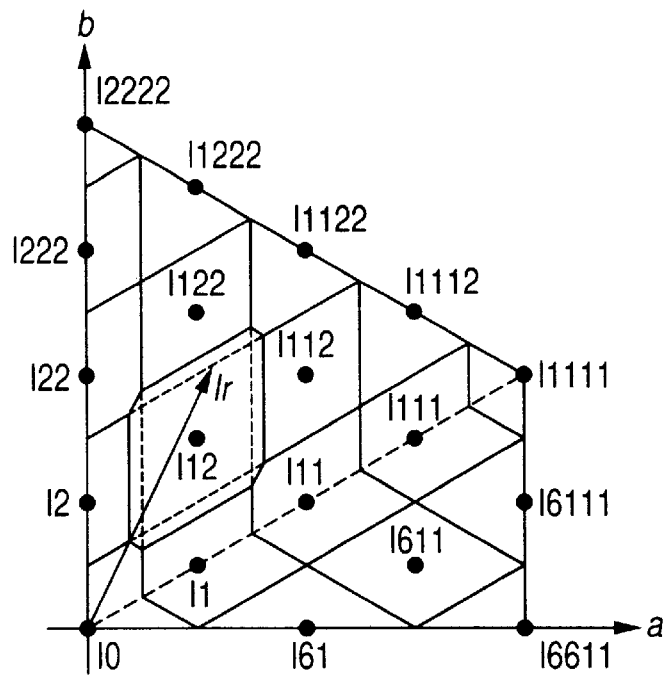
FIG. 69 is a diagram showing a further example of splitting in a rhombiform splitting spatial vector diagram.
Figure 70:
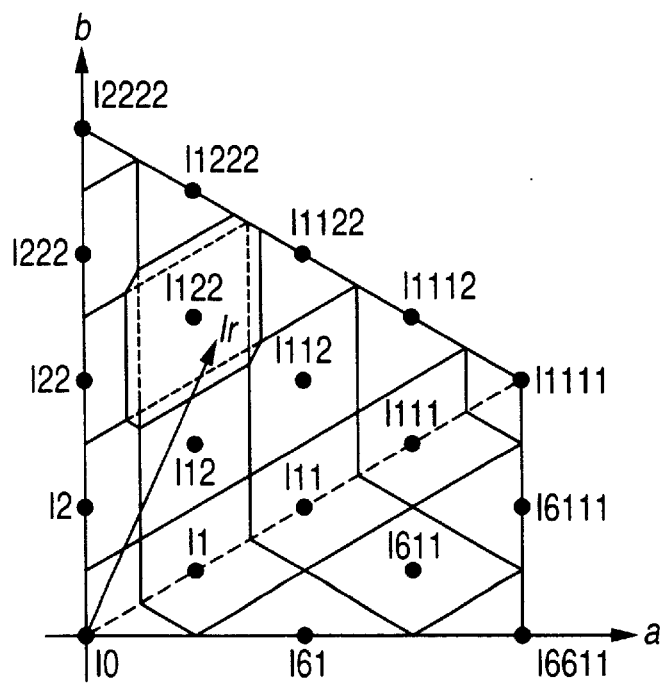
FIG. 70 is a diagram showing a further example of splitting in a rhombiform splitting spatial vector diagram.

In FIG. 69 and FIG. 70, the four corners of the widened rhombic view of the domain containing the previously selected vector are cut off, and the whole is shown as a convex view, Each of these are intended to show the domain containing the command vector or the domain adjacent to that domain as a convex shape.

For example, in FIG. 65 the domain containing vector I1122 is not convex. Convex means, mathematically, that relative to two optional points P1 and P2 belonging to domain A, $$\alpha \cdot P1 + (1-\alpha) \cdot P2 (0 \leq \alpha \leq 1)$$

also belongs to domain A. Examples of convex views and non-convex views are shown in FIG. 71. In the non-convex view, even some of the points on a line with the optional two points belonging to domain A do not belong to domain A.

When there is a non-convex domain, the possibility of increased switching and distorted waveforms arises. Therefore, when widening the domain that contains the previously selected vector and by making a domain convex after the change, excessive switching increase and waveform distortion can be suppressed.

The cases of splitting a spatial vector diagram into a regular hexagon and splitting into a rhombus are described above, but even for splitting into an optional view, it goes without saying that the method whereby the area of the domain containing the previously selected vector is widened aids in the reduction of unwanted chattering and reduce the number of switching cycles.

Next, the application of the present invention to multi-level voltage type converters is explained, however, first the basic structure of a multi-level voltage converter is described.

Figure 72:
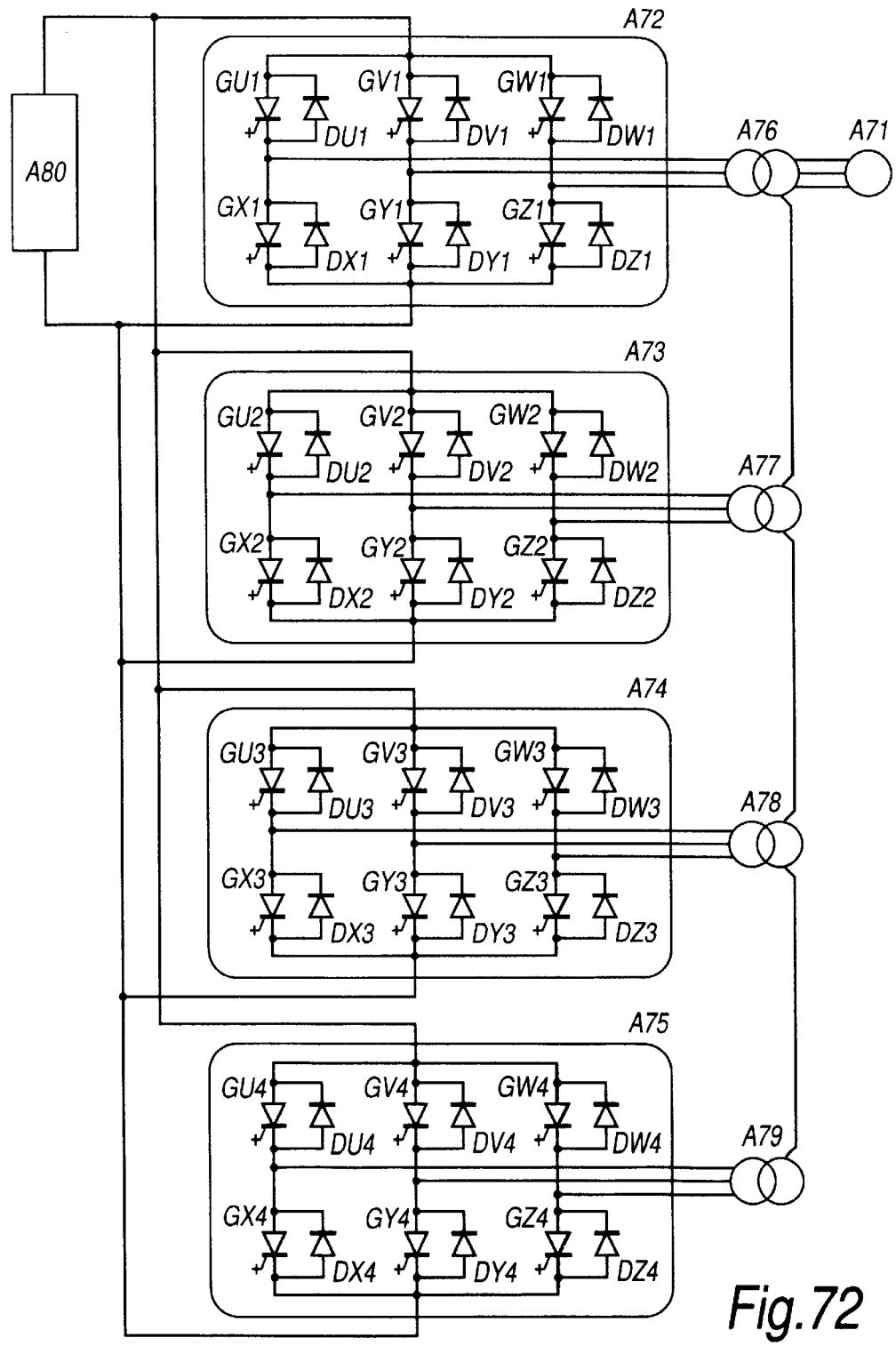
FIG. 72 is a compositional diagram of the main circuit of a multiplex voltage-type converter, to which the present invention is applied.

FIG. 72 is a block diagram of the main circuits in a multi-level voltage type converter. In FIG. 72, A71 is AC load and A72~A75 are voltage type Converters that convert DC power into AC power. Each AC pin is connected to the primary pin of transformers A76~A79. The secondary sides of transformers A76~A79 are coupled in series, and mix output voltage from each converter. The mixed output voltage is connected to AC load A71. Each converter's DC input is connected in common to DC voltage source A80. The figure here shows the common connection, but a voltage source for each individual converter can also be used.

GU1~GZ4 are self-extinguishing type switching elements that form converters A72~A75. Also, DU1~DZ4 are free-wheeling diodes that are connected in antiparallel to the self-extinguishing type switching elements. An example of using a gate turn-off thyristor (GTO) for the self-extinguishing type switching elements is described below.

Figure 73:
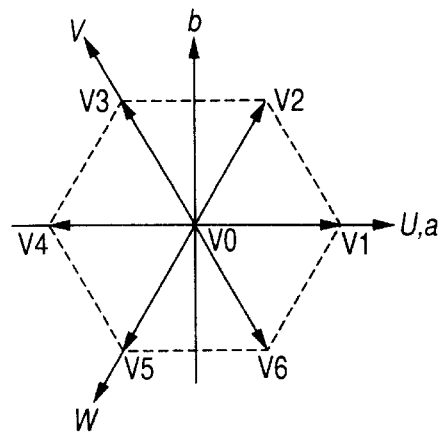
FIG. 73 is a diagram for describing voltage vectors which can be generated on the AC side by a single voltage-type converter used in the composition of a multiplex voltage-type converter.

The voltage vectors that con be generated on the AC side of a single voltage type converter are explained with reference to FIG. 73.

Here, the vectors and output voltages correspond as follows:

V1 vector is output voltage when U, Y, Z are ignited,
V2 vector is output voltage when U, V, Z are ignited,
V3 vector is output voltage when X, V, Z are ignited,
V4 vector is output voltage when X, V, W are ignited,
V5 vector is output voltage when X, Y, W are ignited,
V6 vector is output voltage when U, Y, W are ignited, and
V0 vector is output voltage (zero voltage) when U, V, W or X, Y, Z are ignited.

Figure 74:
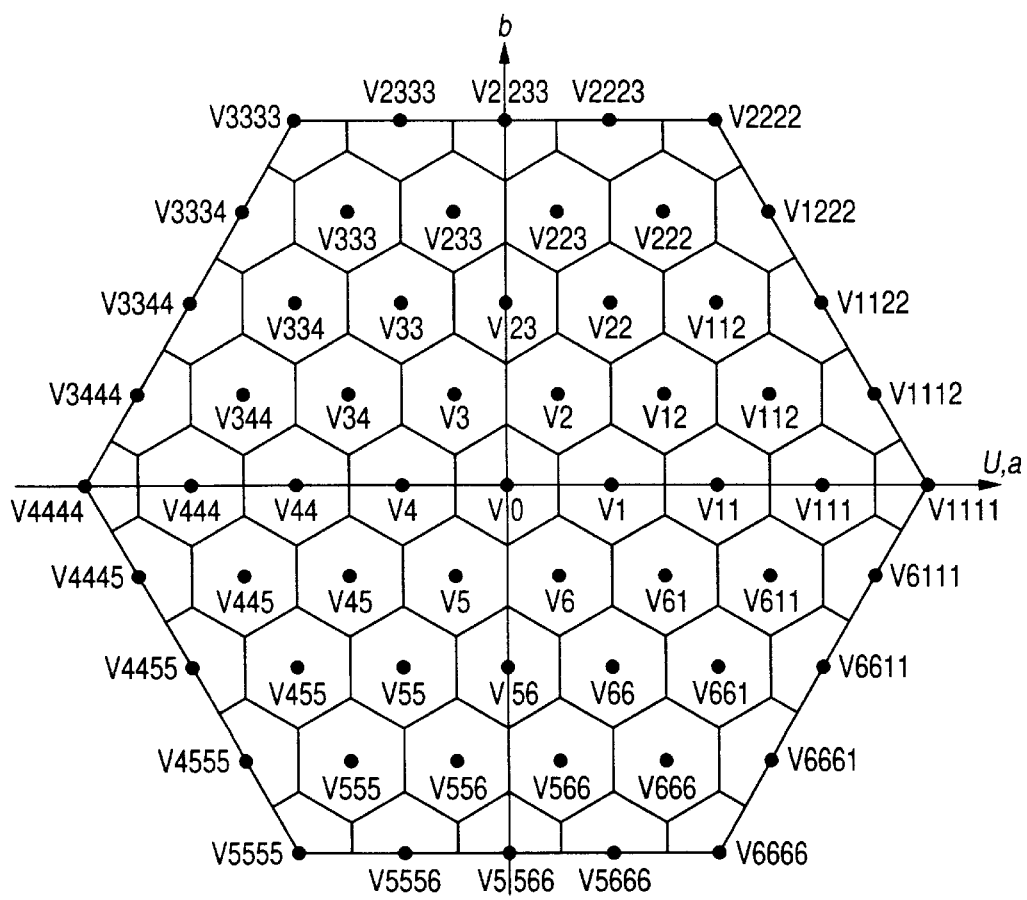
FIG. 74 is a diagram showing voltage vectors which can be generated by a 4-level voltage-type converter.

FIG. 74 shows the voltage vectors that can be generated by a 4-level voltage converter. Here, for example, V1122 is a vector realised by two of the four converter units outputting V1 vector and the remaining two outputting V2 vector.

Figure 75:
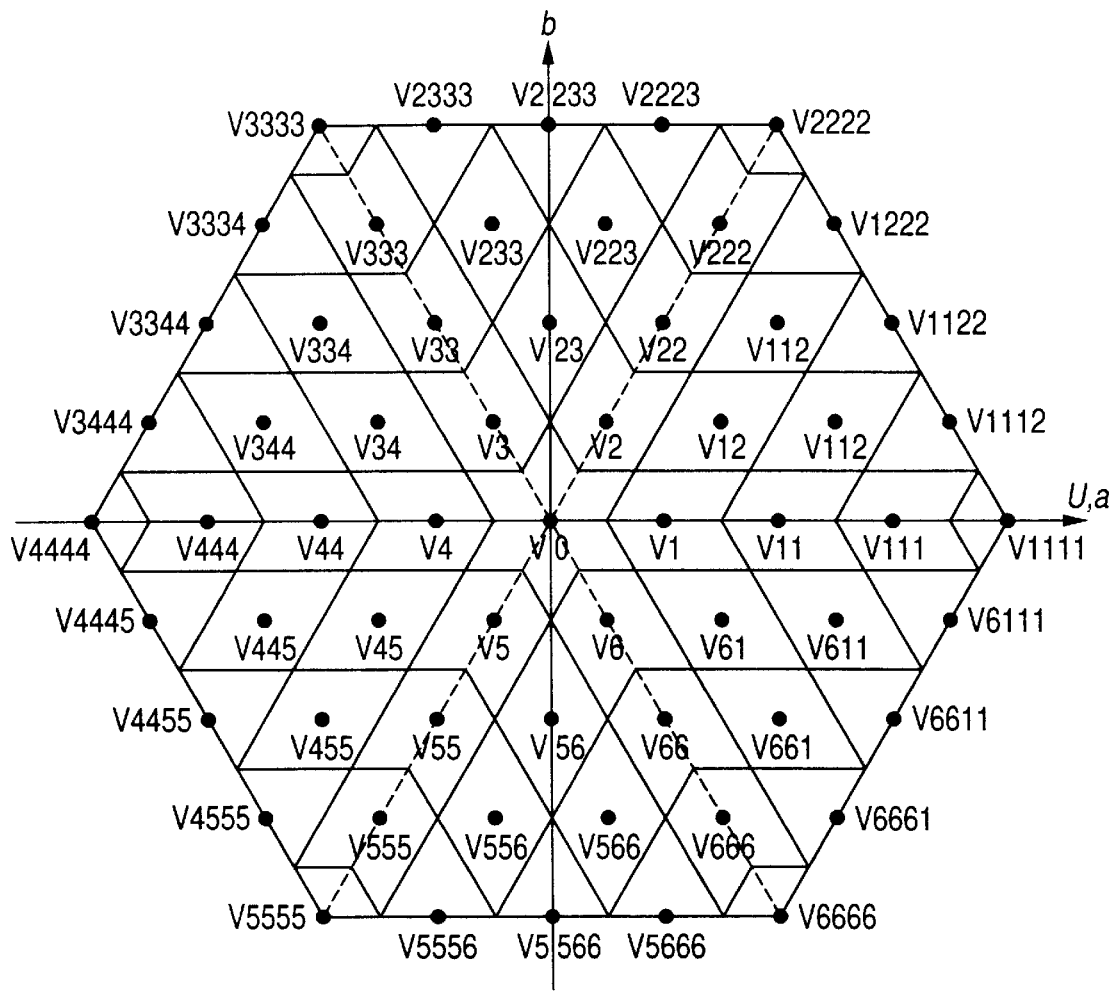
FIG. 75 is a spatial vector diagram, wherein the output-table vectors of a 4-level voltage-type converter are split into rhombiform-shaped domains.

Even on a multiplex converter, the method whereby the spatial vector diagram is split into regular hexagonal domains, and the domain in which a voltage command vector exists is determined, then the outputable vector corresponding to that domain is selected has been proposed (Patent application No. Hei9-43515). The regular hexagonal domain split is written into FIG. 74. Also, the same patent proposes vector selection by rhombic splitting or optional domain splitting. FIG. 75 is an example of splitting the spatial vector diagram into rhombic domains.

Figure 76:
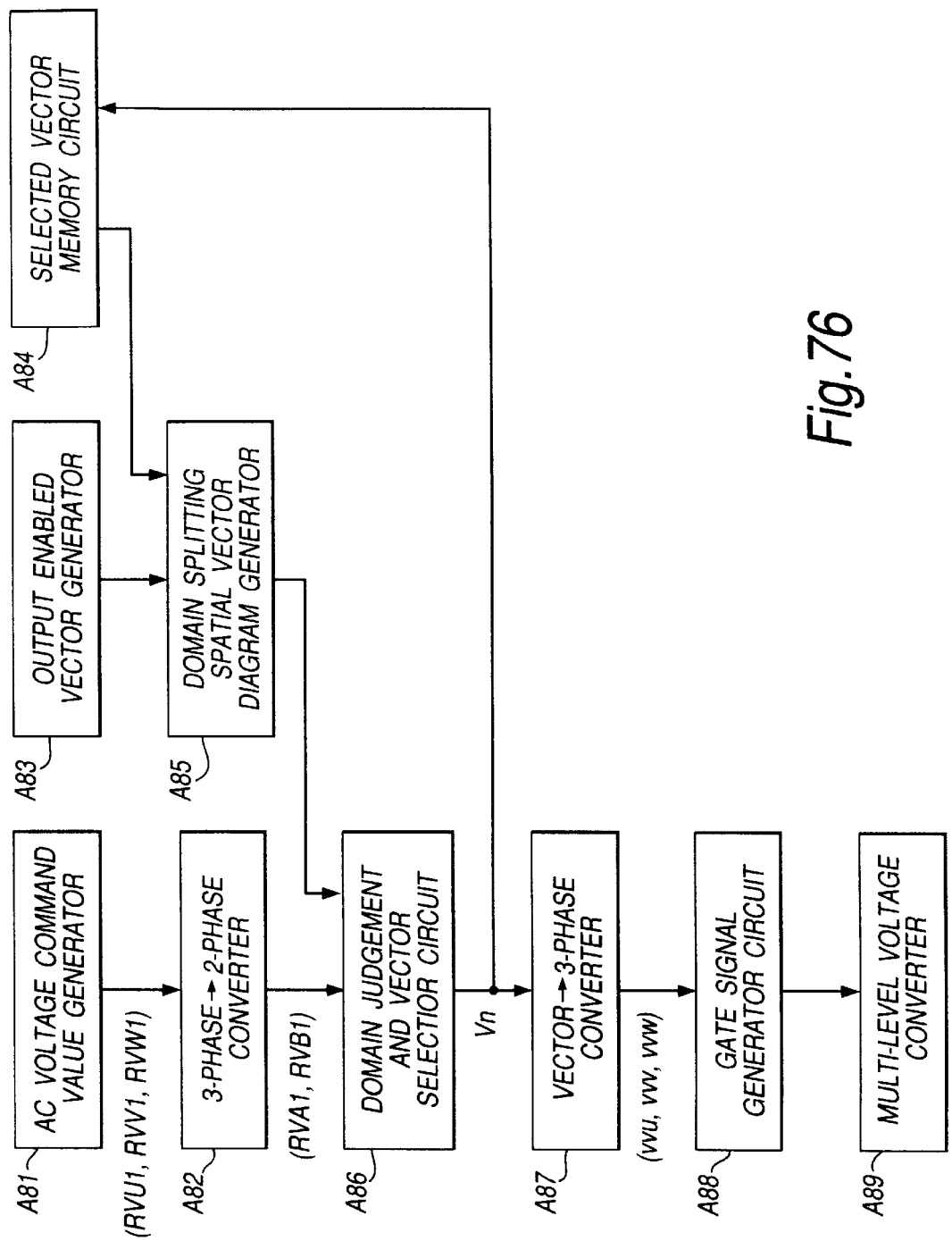
FIG. 76 is a block diagram showing the function and sequence of a control circuit according to a fourteenth embodiment of the present invention.

FIG. 76 is a function and sequence diagram of the control Circuit in a fourteenth embodiment of the present invention. Its main feature is the changing of the domain splitting spatial vector diagram according to the vector output immediately before.

In FIG. 76, AC voltage command generator A81 generates AC voltage commands (RVU1, RVV1RVW1) relative to the converter, and 3-phase→2-phase converter A82 converts the AC voltage commands (RVU1, RVV1, RVW1) generated by AC voltage command generator A81 into rectangular (or orthogonal) co-ordinate system current commands (RVA1, RVB1). Outputable vector generator A83 converts all of the outputable vector values that can be generated by the multiplex converter into the form of A axis and B axis coordinate values (VnA, VnB), and selected vector memory circuit A84 memorises the vector selected in the previous vector selection calculation. This vector is the vector (output from the domain judgement and vector selection circuit A86 described previously) actually output by the converter until immediately before the vector selected by the present selection calculation is actually output.

Domain splitting spatial vector diagram generator A85 generates the domain splitting spatial vector diagram used for the current vector selection from the outputable vector generated by outputable vector generator A83 and the previously selected vector obtained from selected vector memory circuit A84.

Domain judgement and vector selection circuit A86 judges in which domain of the domain splitting spatial vector diagram the command value vector (RVA1, RVB1) is contained, and selects the output vector In corresponding to that domain.

Vector→3-phase converter A87 generates a GTO switching pattern corresponding to the outputable vector Vn selected by domain judgement and vector selection circuit A86, and gate signal generator circuit A88 generates the GTO ignition pulse for multiplex converter A89 consisting of converters A72~A75 in FIG. 72.

Figure 77:
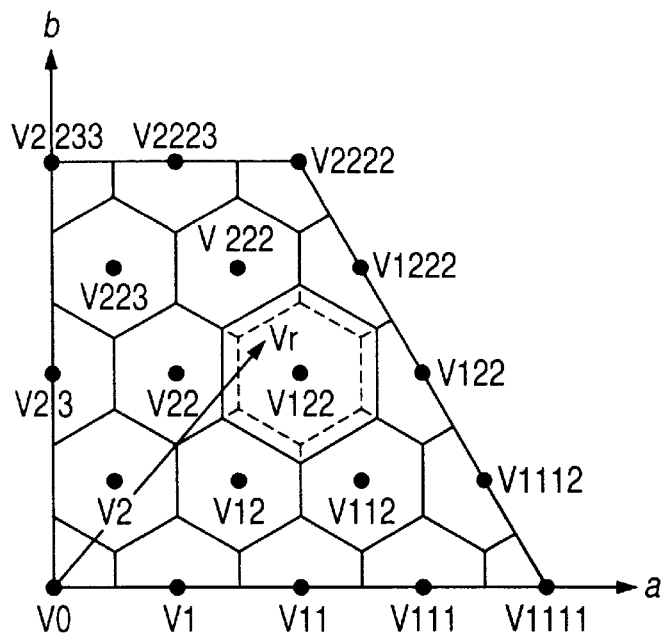
FIG. 77 is a hexagonal splitting spatial vector diagram in a case where the previously selected vector is V122.
Figure 78:
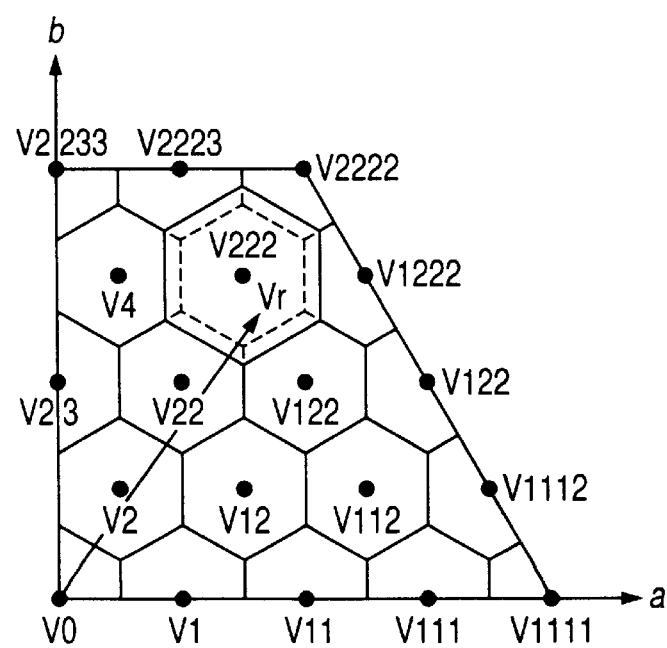

Here, FIG. 77 and FIG. 78 are used to describe the operation of the main features of this embodiment example, which are domain splitting spatial vector diagram generator A85 and domain judgement and vector selection circuit A86.

FIG. 77 illustrates part of the spatial vector diagram when the previously selected vector is V122. Domain splitting spatial vector diagram generator A85 generates a widened domain splitting spatial vector diagram which contains vector V122 of the outputable vectors from outputable vector generator A83, based on vector V122 being output by the converter immediately before memorisation in selected vector memory circuit A84. In other words, the shape is a regular hexagonal area that contains vector V122 and is wider than for normal domain splitting (indicated by the dotted lines).

Domain judgement and vector selection circuit A86 decides the domain of the domain splitting spatial vector diagram in which the command value vector is contained and selects the output vector corresponding to that domain, but because the domain containing vector V122 is widened, V122 continues to be selected for some time even if command vector Vr exceeds the normal domain splitting boundary (dotted line). When the boundary indicated by the solid line in FIG. 77 is exceeded and vector V122 is selected, a domain splitting spatial vector diagram with a wider domain for vector V222 is employed, as shown in FIG. 78. This means that even if current control or other controls operate, vector V122 will not be selected immediately.

In this way, in the present embodiment example, by using a widened domain split of the domain area that contained the vector currently being selected, the vector currently being selected can be selected easily the next time, and this reduces chattering and enables switching cycles to be reduced.

Figure 79:
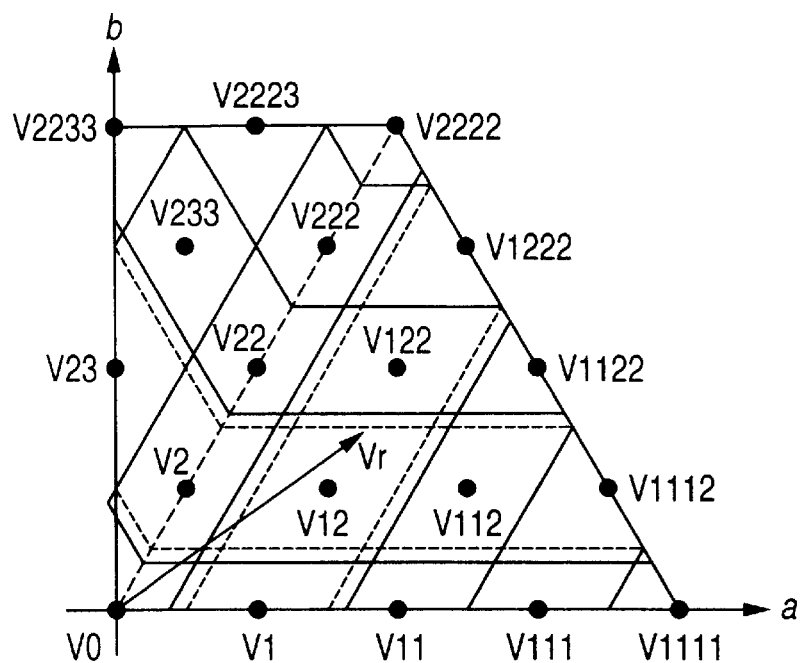
FIG. 79 is a rhombiform splitting spatial vector diagram in a case where the previously selected vector is V12.
Figure 80:
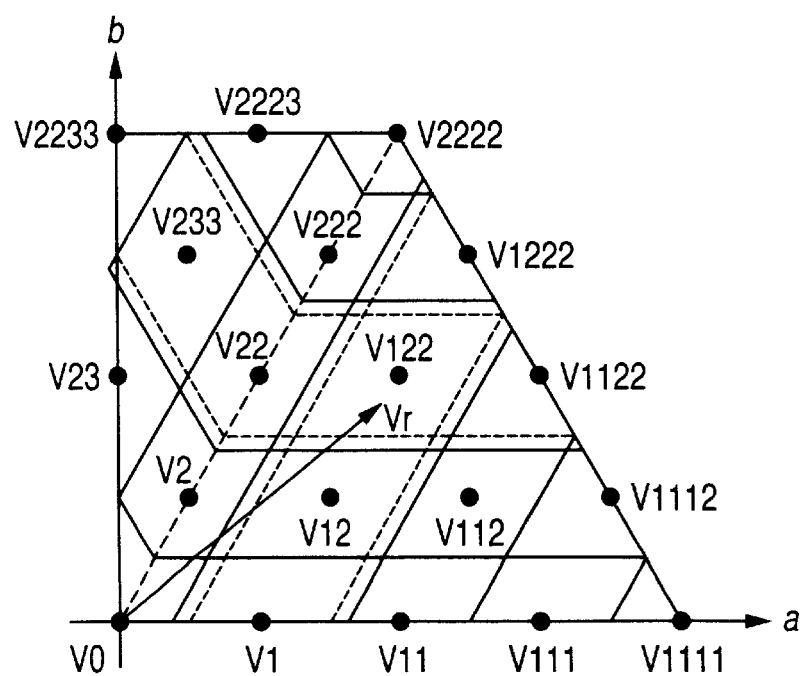
FIG. 80 is a rhombiform splitting spatial vector diagram in a case where the previously selected vector is V122.

Also, as shown in the current type as well, the same can be done with rhombic domain splitting. FIG. 79 and FIG. 80 show a portion of the domain splitting for rhombic splitting.

FIG. 79 shows part of the spatial vector diagram for the case when the previously selected vector is V12, and shows widening of not only the domain containing the previously selected vector, but also of the domains in the two lateral directions of that domain's rhombic shape.

In FIG. 79, as the domain containing vector V12 is widened, vector V12 continues to be selected for some time even when command vector Vr exceeds the normal domain splitting boundary (dotted line). When the boundary indicated by the solid line in FIG. 79 is exceeded and vector V122 is selected, from the next control calculation a domain splitting spatial vector diagram with a wider domain for vector V122 is employed, as shown in FIG. 80. This means that even if current control or other controls operate, vector V12 will not be selected immediately.

The cases of splitting a spatial vector diagram into a regular hexagon and splitting into a rhombus are described above, but even for splitting into an optional view, the method whereby the area of the domain containing the previously selected vector is widened is useful in the same way in reducing unwanted chattering and reducing the number of switching cycles.

Next, application of the present invention to multi-level output converters is explained, but first the basic structure of a multi-level output converter is described.

Figure 81:
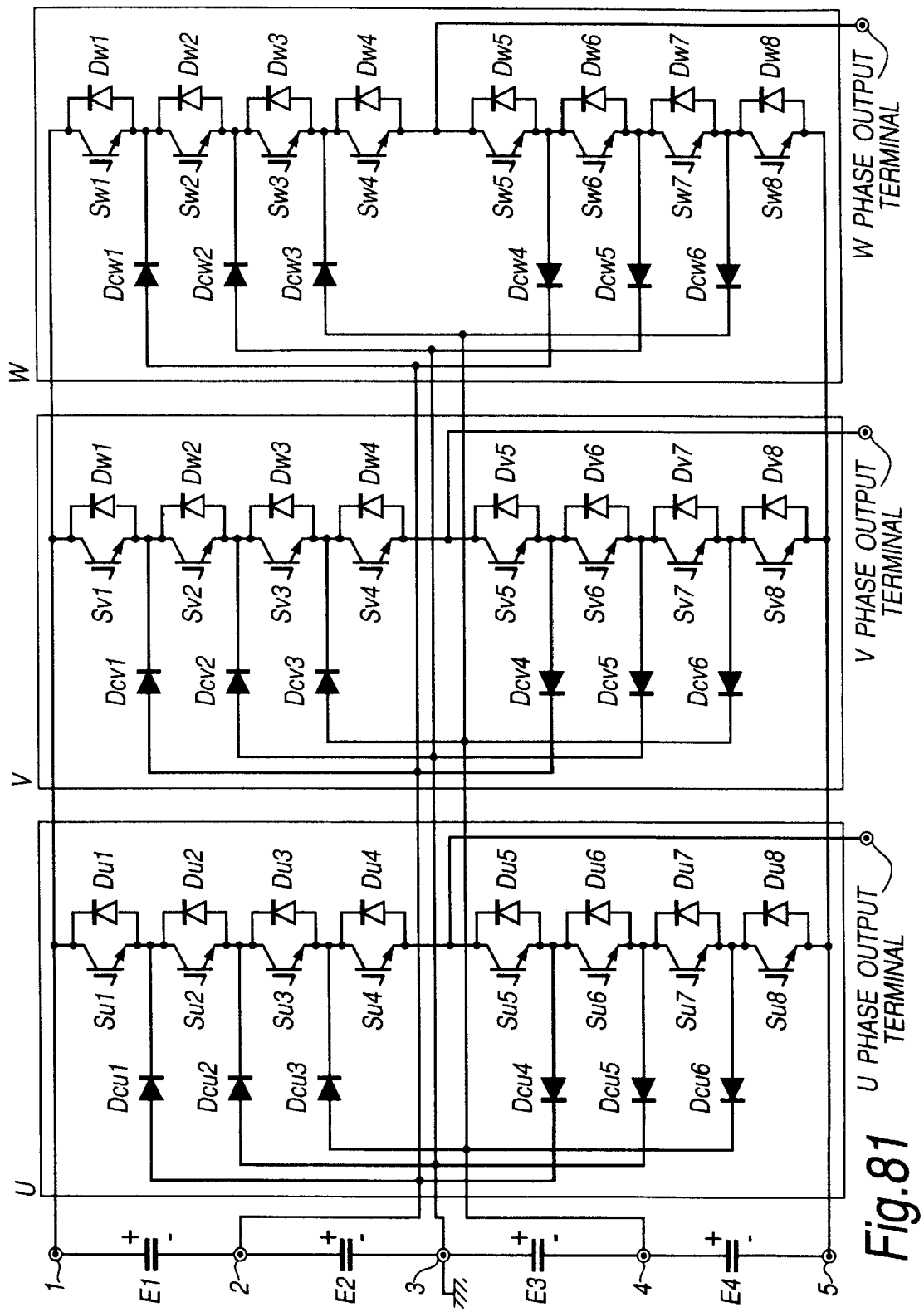
FIG. 81 is a compositional diagram of the main circuit of a multi-level-output power converter to which the present invention is applied.

FIG. 81 shows part of the main circuit structure of a multi-level voltage converter which is a 5-level output power converter that can output +2E, +E, 0, −E and −2E voltages. In the figure, U, V and W indicate U phase, V phase and W phase of single phase power converters, respectively. Also, Su1~Su8, Sv1~Sv8 and Sw1~Sw8 are self-extinguishing elements, and Du1~Du8, Dv1~Dv8 and Dw1~Dw8 are diodes connected in antiparallel to the self-extinguishing elements. Dcu1~Dcu6, Dcv1~Dcv6 and Dcw1~Dcw6 are clamping diodes, and E1 is the split voltage source between DC voltage source E first and second terminals, while E2 is the split voltage source between DC voltage source E second and third terminals, and E3 is the split voltage source between DC voltage source E third and fourth terminals, and E4 is the split voltage source between DU voltage source E fourth and fifth terminals.

For a 5-level output power converter configured in this way, five levels of voltage, namely +2E, +E, 0, −E and −2E can be output. For example, +E1 +E2 voltage (if E1=E2=E3=E4=E, then +2E voltage level) is output from between the U phase converter self-extinguishing elements Su4 and Su5 when self-extinguishing elements Su1~Su4 are ON; +E2 voltage (in the same way, E voltage level) is output when self-extinguishing elements Su2~Su5 are ON; 0 voltage is output when self-extinguishing elements Su3~Su6 are ON; −E3 voltage (−E voltage level) is output when self-extinguishing elements Su4~Su7 are ON; and −E3 −E4 voltage (−2E voltage level) is output when self-extinguishing elements Su5~Su8 are ON.

FIG. 82 illustrates the relationship between U phase elements Su1, . . . Su8 switch state and U phase output Su. The U phase output terminal taken from between elements Su4 and Su5 outputs Su * E voltage. In the same way for V phase and W phase, tables showing the relationships between Sv and Sw and each element switch state can be made, and output voltage for the converter overall can be expressed as (Su, Sv, Sw).

Figure 83:
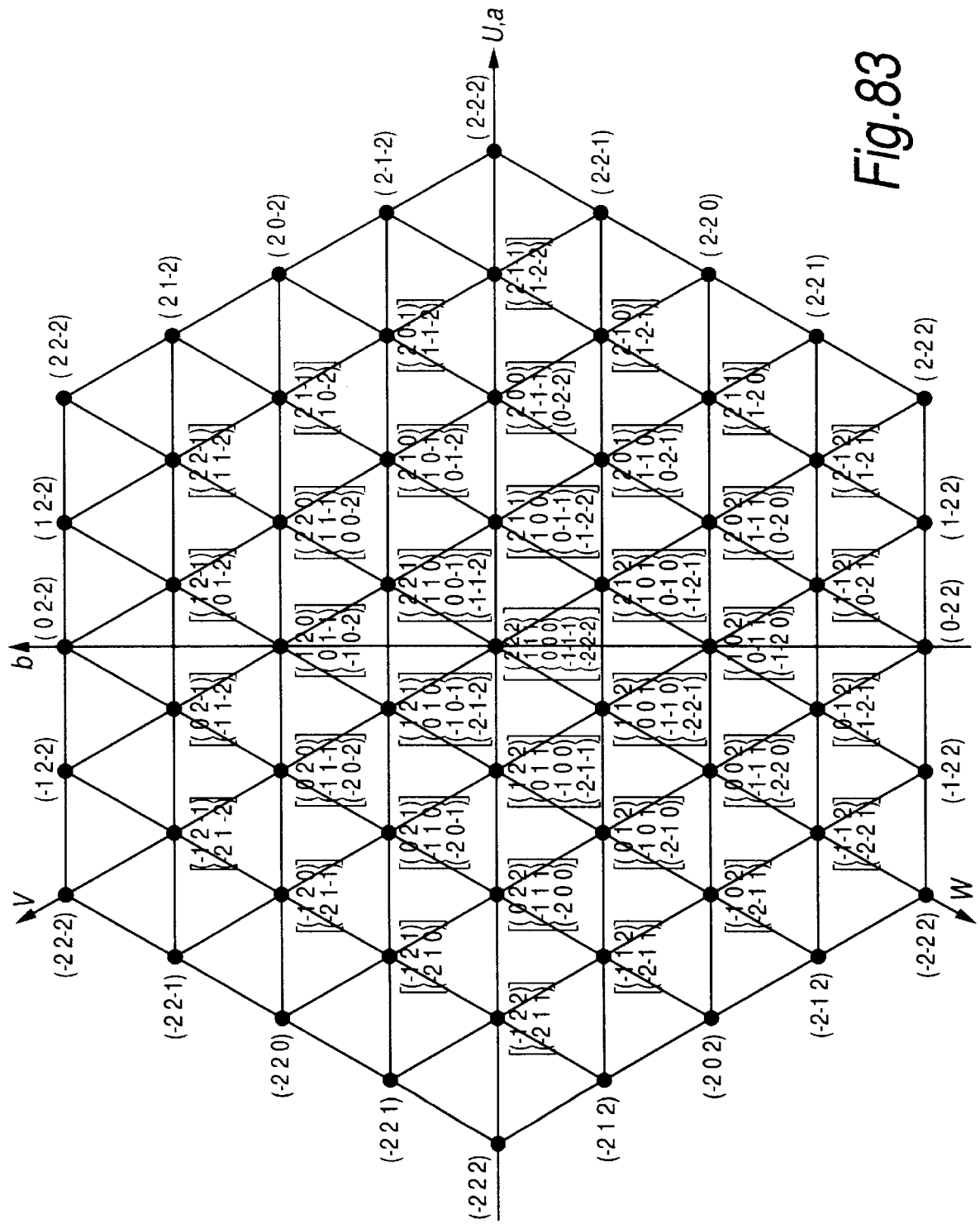
FIG. 83 is a diagram showing voltage vectors which can be generated by the multi-level-output power converter shown in FIG. 81.

FIG. 83 illustrates the voltage vectors that can be generated by the 5-level output converter. (Su, Sv, Sw) that can output that vector is written in each vector. Depending on the vector, it can be realised at two or more ignition (firing) states.

Even on a multi-level output converter, the method whereby the spatial vector diagram is split into domains containing each outputable vector, and the domain in which a voltage command vector exists is determined, and the outputable vector corresponding to that domain is selected has been proposed.

Then, even on a multi-level converter, the same as for the previously described current type converter and voltage type converter, by memorising the previously selected vector, and determining (judging) the domain in which a voltage command vector exists based on the widened domain splitting spatial vector diagram of the domain containing the previously selected vector to select the current vector, unwanted chattering can be reduced and the number of switching cycles also can be reduced.

As described above, the present invention used in multi-level current type converters, multi-level voltage type converters and multi-level output converters enables reduction of unwanted chattering and reduces switching, so switching loss can be kept low. In conjunction, the heat sink and other components can be made smaller so that the size of the device as a whole can be made smaller.

Next, a controller for a multi-level output power converter is explained.

(Fifteenth embodiment)

Figure 84:
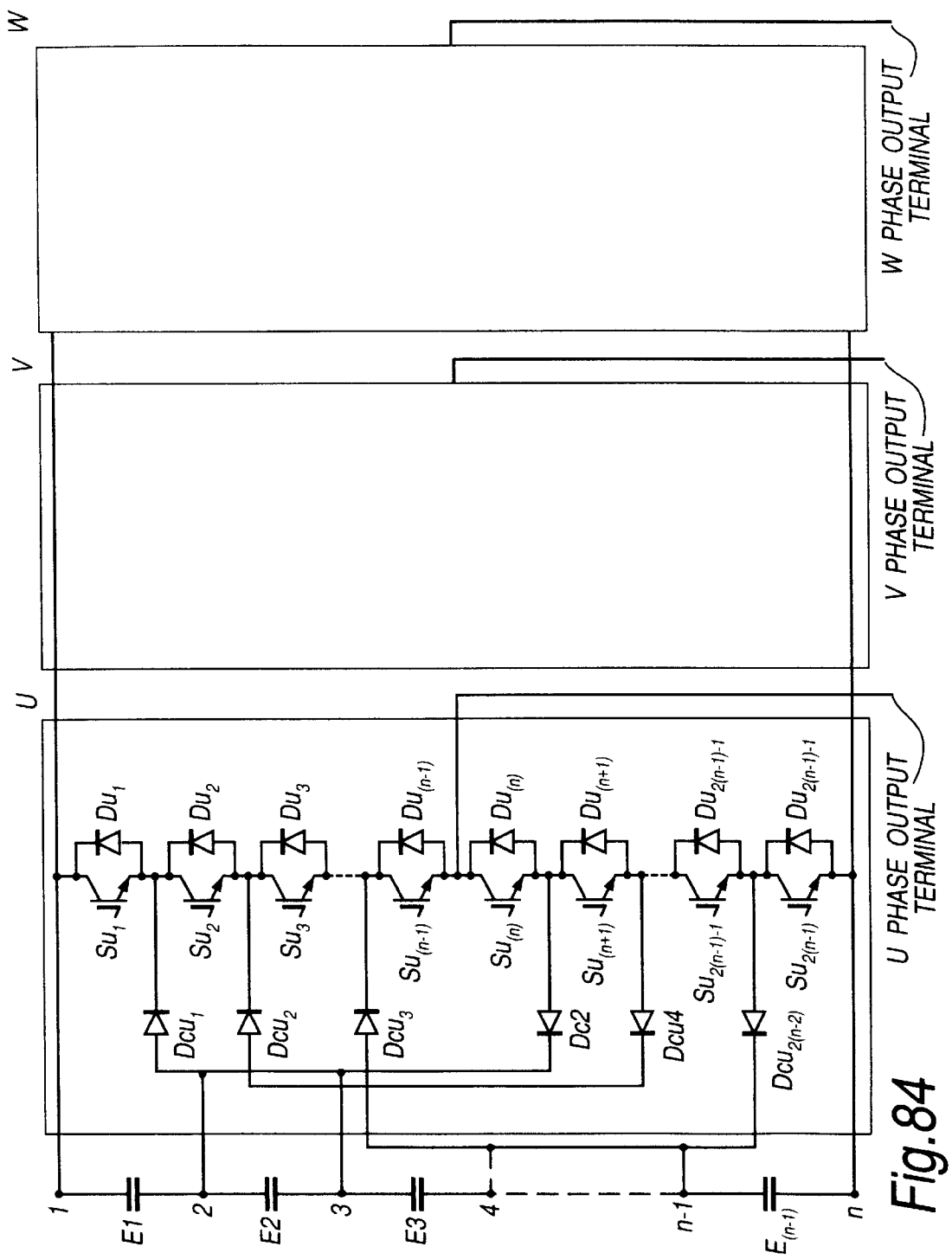
FIG. 84 is a circuit diagram showing one example of the composition of the main circuit of a multi-level-output power converter, to which the present invention applies.

FIG. 84 is a circuit diagram of an example of the main circuit structure of a multi-level output power converter to which the present invention is applied.

In FIG. 84, 1~n indicate DC voltage source terminals. Also, E1~E (n−1) are DC voltage source input capacitors.

For U phase, Su1~Su (2 (n−1)) are self-extinguishing elements and Du1~Du (2 (n−1)) are free-wheeling diodes connected in antiparallel to self-extinguishing elements Su1~Su (2 (n−1)).

Clamping diodes Dcu (2 * j−1) (j=2, 3, . . . , (n−2)) connect cathode terminals to self-extinguishing elements Su (j) cathode terminals, and DC voltage source (j+1) to the anode terminals.

Also, clamping diodes Dcu (2 * j) connect self-extinguishing elements Su (n+j) anode terminals to anode terminals, and cathode terminals to DC voltage source terminals (j+1).

The same type of structure as for U phase described above applies to V and W phases.

Figure 85:
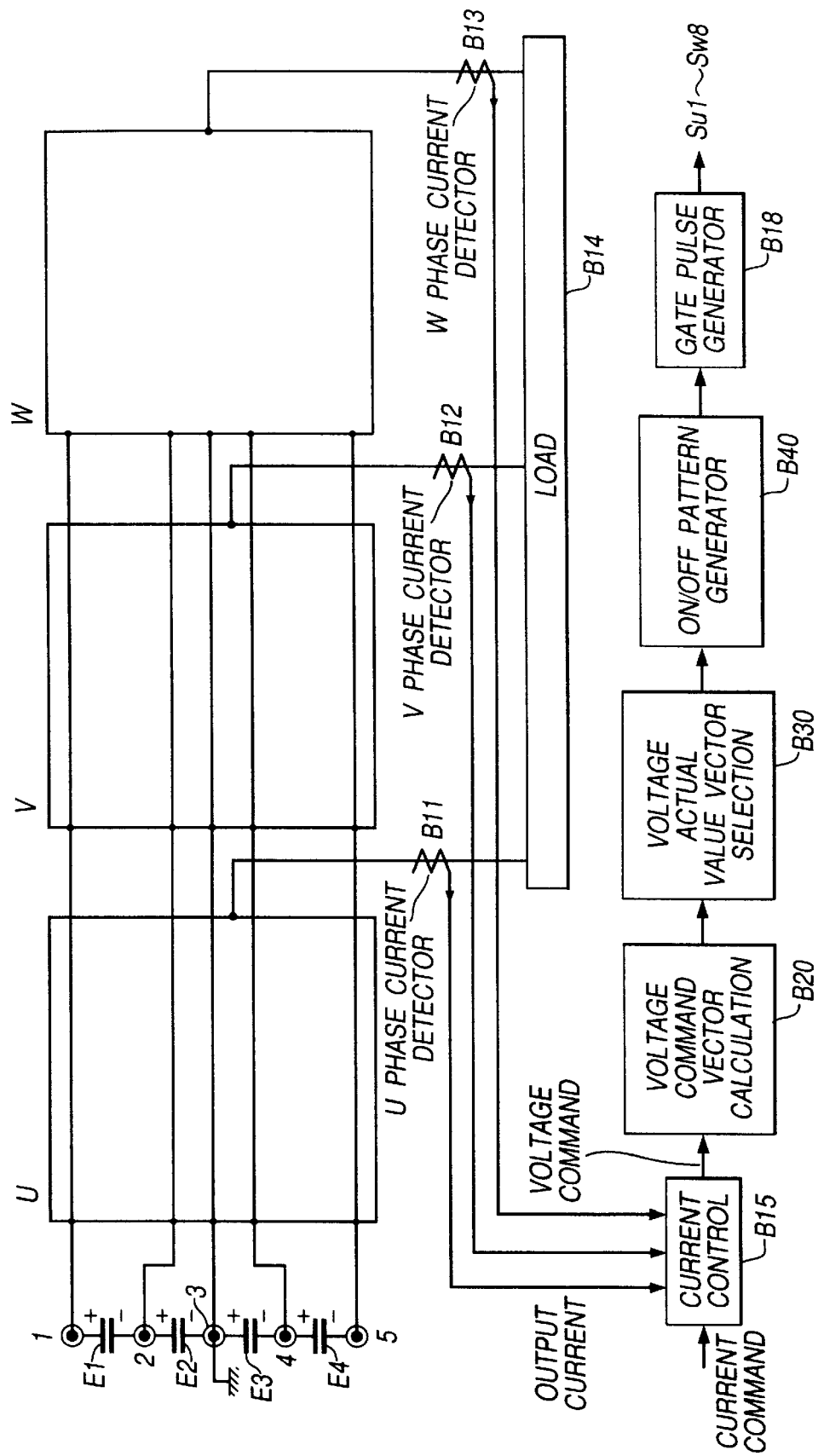
FIG. 85 is a block diagram showing an example of the composition of a multi-level-output 3-phase power converter according to a fifteenth embodiment.

FIG. 85 is a circuit diagram illustrating an example of a multi-level output 3-phase power converter configuration for the present embodiment.

The following explanation is for a 5-level output 3-phase power converter.

Also, as detailed explanations have already been given for DC power sources E1~E4, each single phase power converter U, V and W, current detectors B11~B13, load B14, current control circuit B15 and gate pulse generator circuit B18, these explanations are omitted here.

In FIG. 85, voltage command vector calculation circuit B20 inputs the output from current control circuit B15, which controls the 3-phase power converter unit output current to a prescribed value, and calculates the voltage command value vector corresponding to the voltage that should be output by the 3-phase power converter unit.

Voltage actual value vector selection circuit B30 selects the voltage actual value vector corresponding to the voltage actually output by the 3-phase power converter unit from the voltage command value vectors calculated by the voltage command value vector calculation circuit B20.

ON/OFF pattern generator circuit B40 generates command signals that perform ON/OFF for the self-extinguishing elements Su1~Su (2 (n−1)) of each single phase power converter U, V and W, according to the state of the voltage actual value vector output from voltage actual value vector selection circuit B30.

Next, the operation of a 5-level output 3-phase power converter configured as described above for the present embodiment is explained with reference to FIG. 85~FIG. 89.

Voltage vectors as shown in FIG. 86 are determined from outputs VCA and VCB from current control circuit B15.

FIG. 87 illustrates the output voltages that can be generated by the 5-level output 3-phase power converter. In FIG. 87, the voltage actual value is expressed by the vector joining the point of origin and the black dots. In other words, for 5-level output 3-phase power converter 5, for 3 phases there are $5^3$=125 switching modes, but since the same vector can express different modes, there are 61 vectors.

In FIG. 87, (2, 2, −2) express (U phase output voltage level, V phase output voltage level, W phase output voltage level) respectively, and "2" means that the DC voltage (E1+E2) shown in FIG. 85 is output.

In the same way for the following, "1" means DC voltage E1, "0" means 0V output, "−1" means DC voltage −E3, and "−2" means DC voltage−(E3+E4) output.

Figure 10:
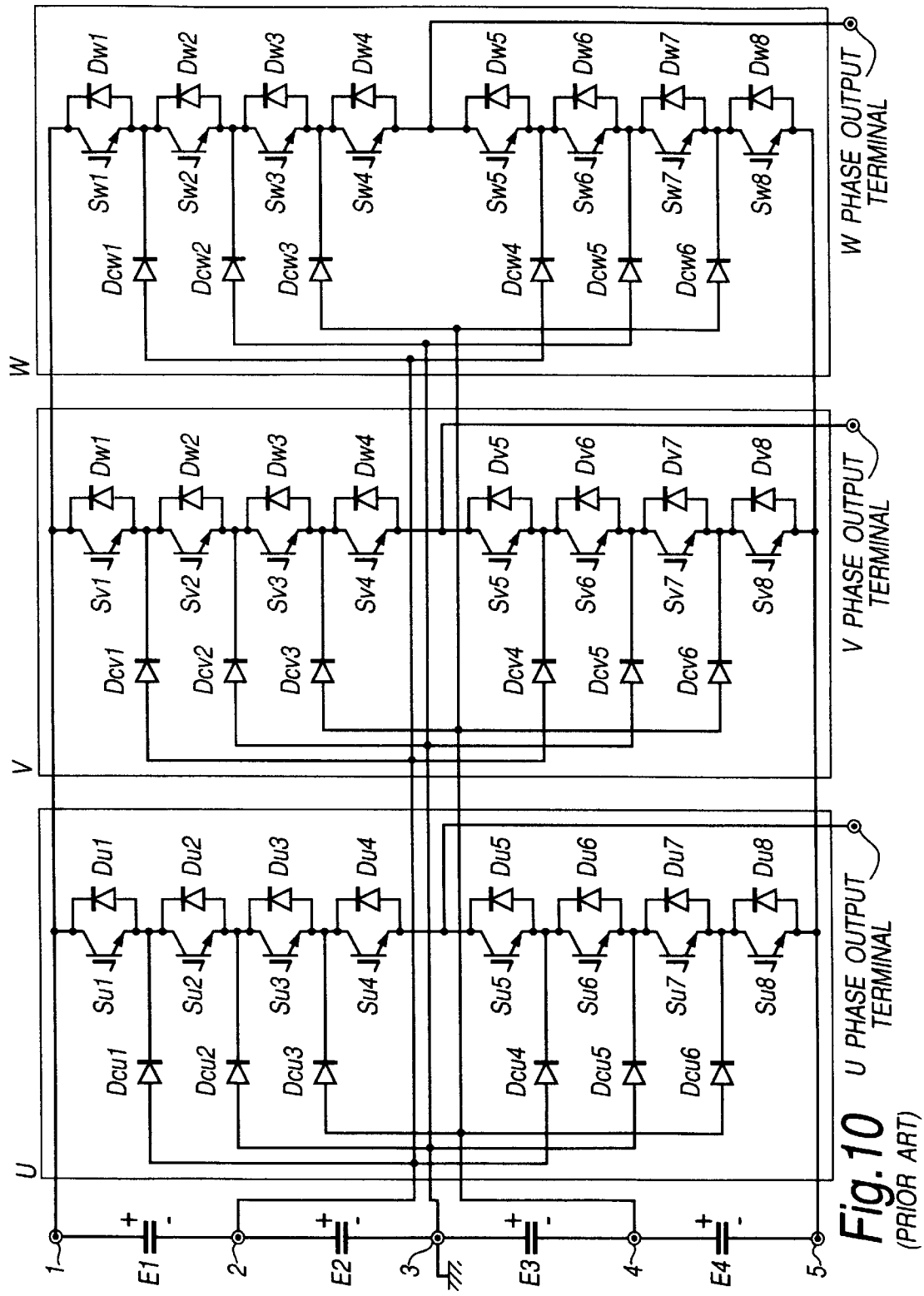
FIG. 10 is a circuit diagram showing one example of the composition of the main circuit of a prior art multi-level-output power converter, to which the present invention applies.
Figure 11:
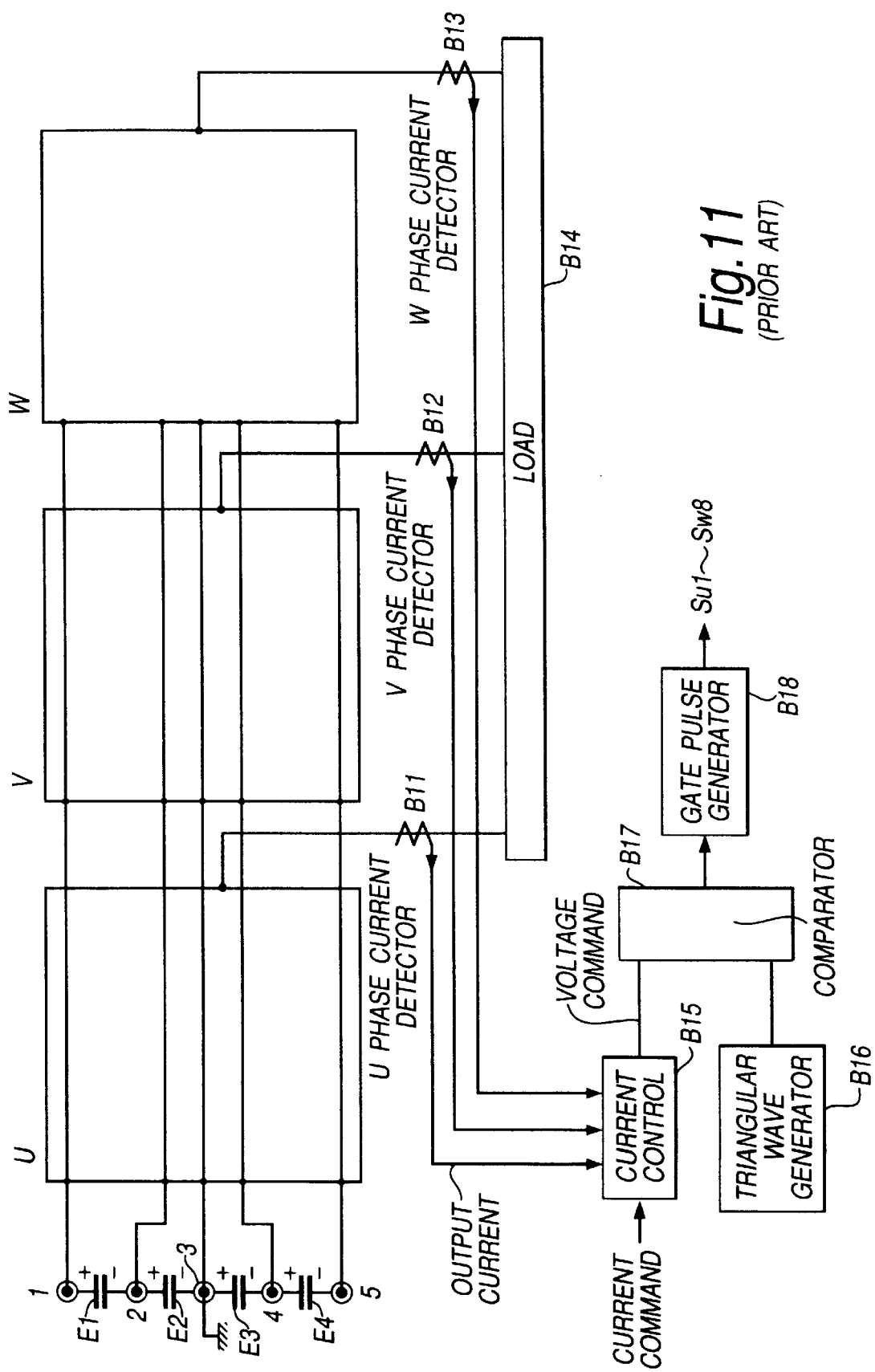
FIG. 11 is a block diagram showing an example of the composition of a conventional controller for controlling the 5-level-output 3-phase power converter shown in FIG. 10.
Figure 12:
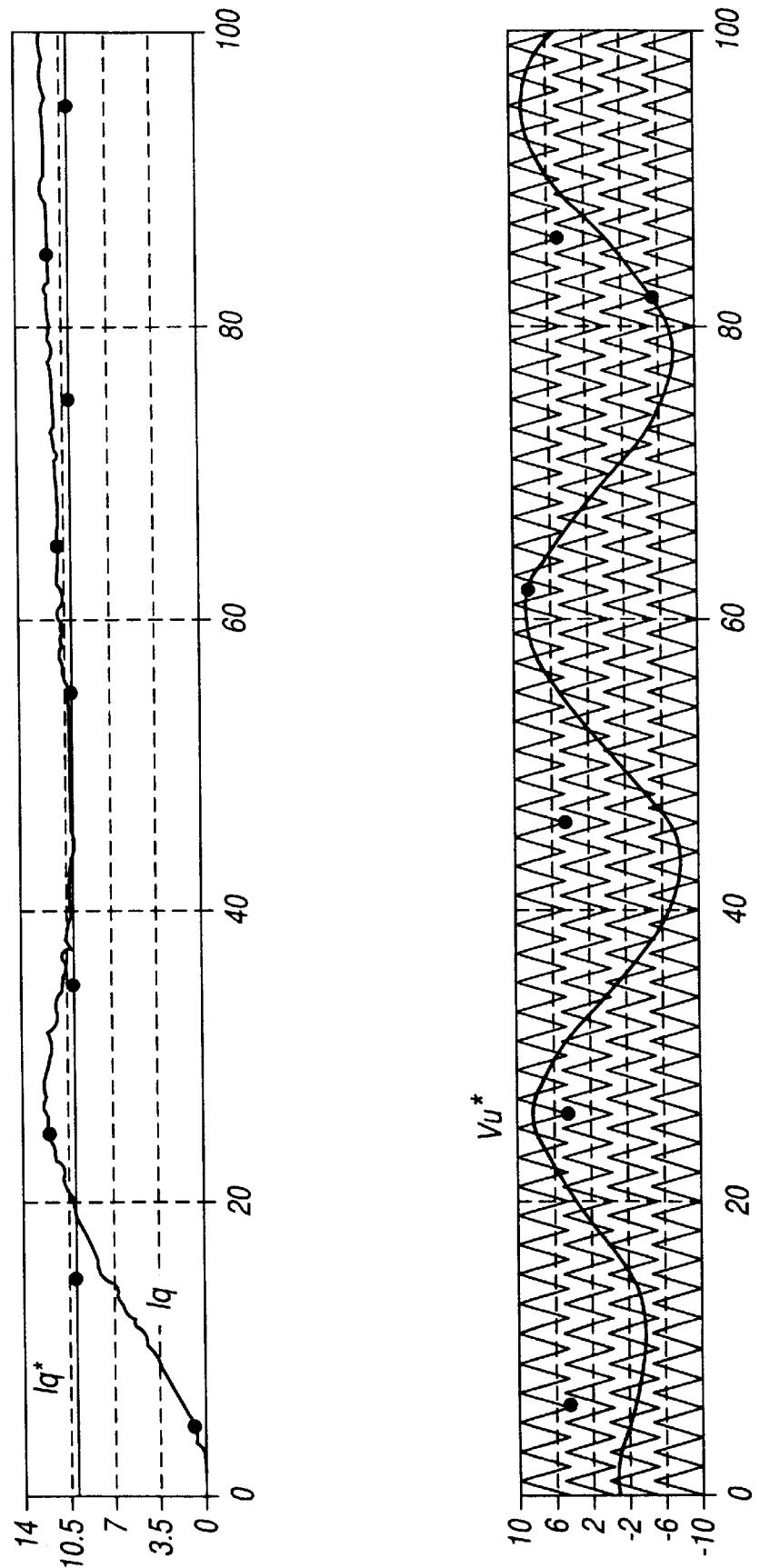
FIG. 12 is a waveform diagram of a case where a 5-level-output 3-phase power converter is controlled by the controlled shown in FIG. 10.
Figure 12:
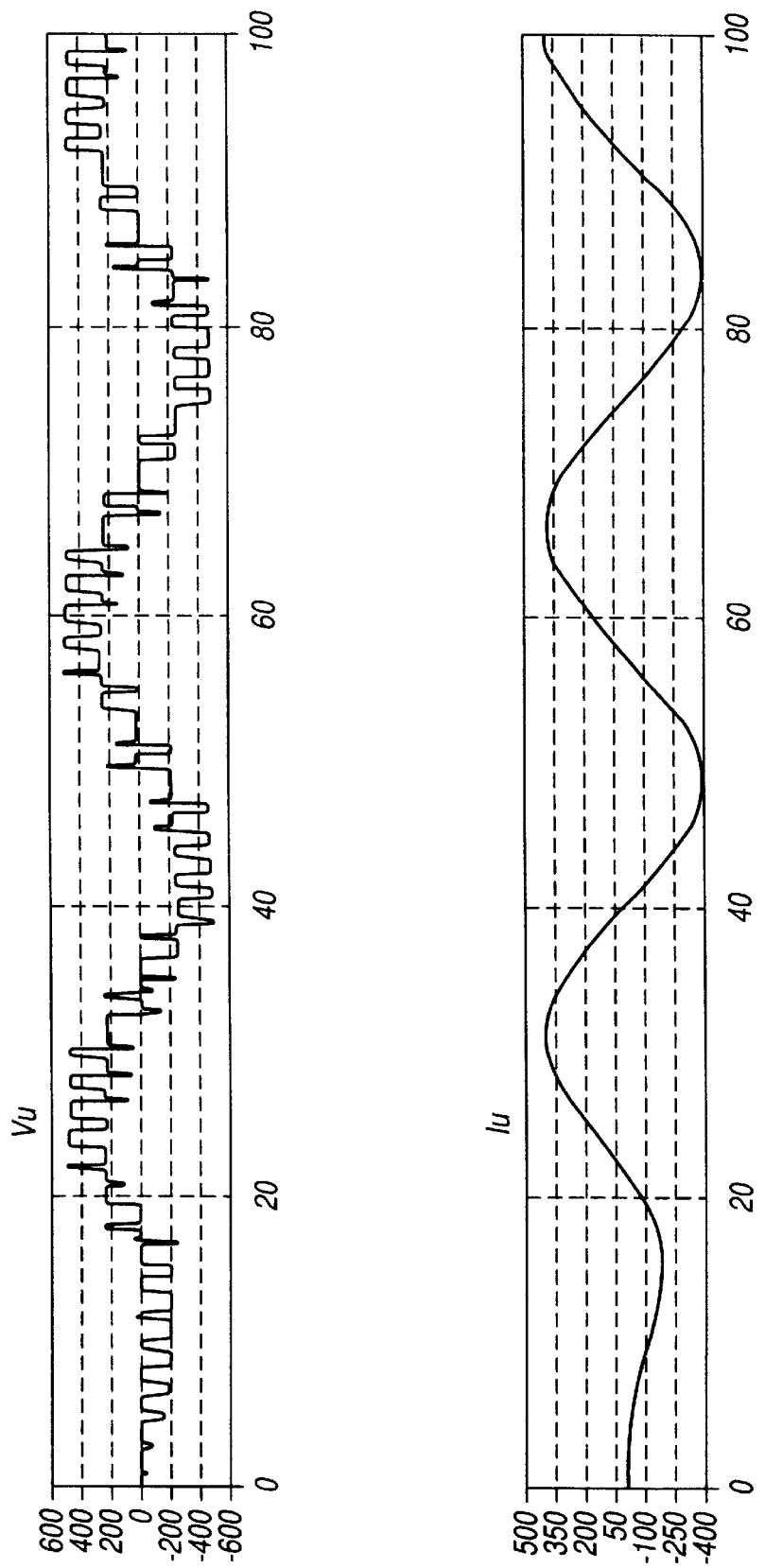
Figure 13:
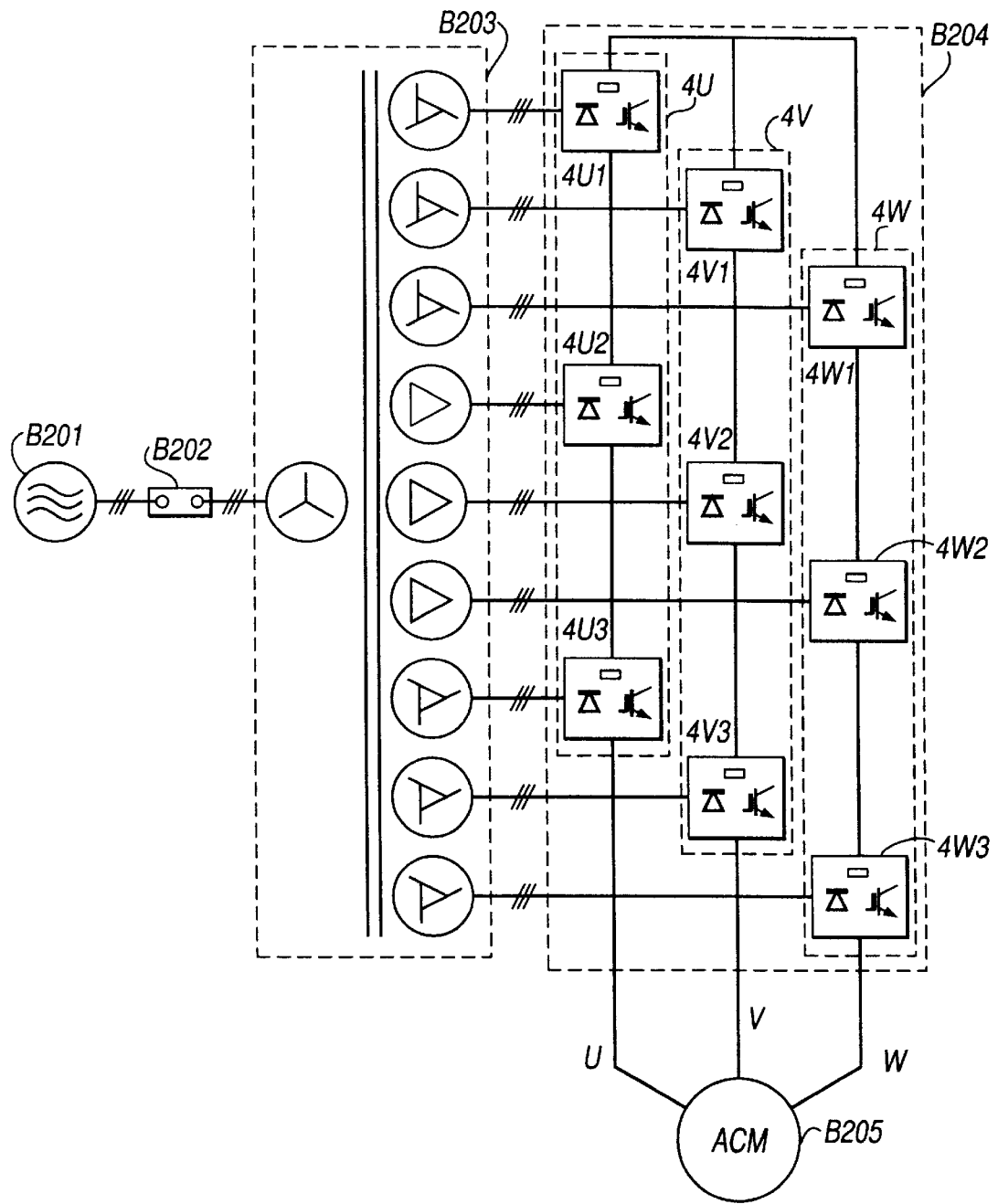
FIG. 13 is a circuit diagram showing a further example of the composition of the main circuit of a prior art multi-level-output 3-phase power converter, to which the present invention applies.
Figure 14:
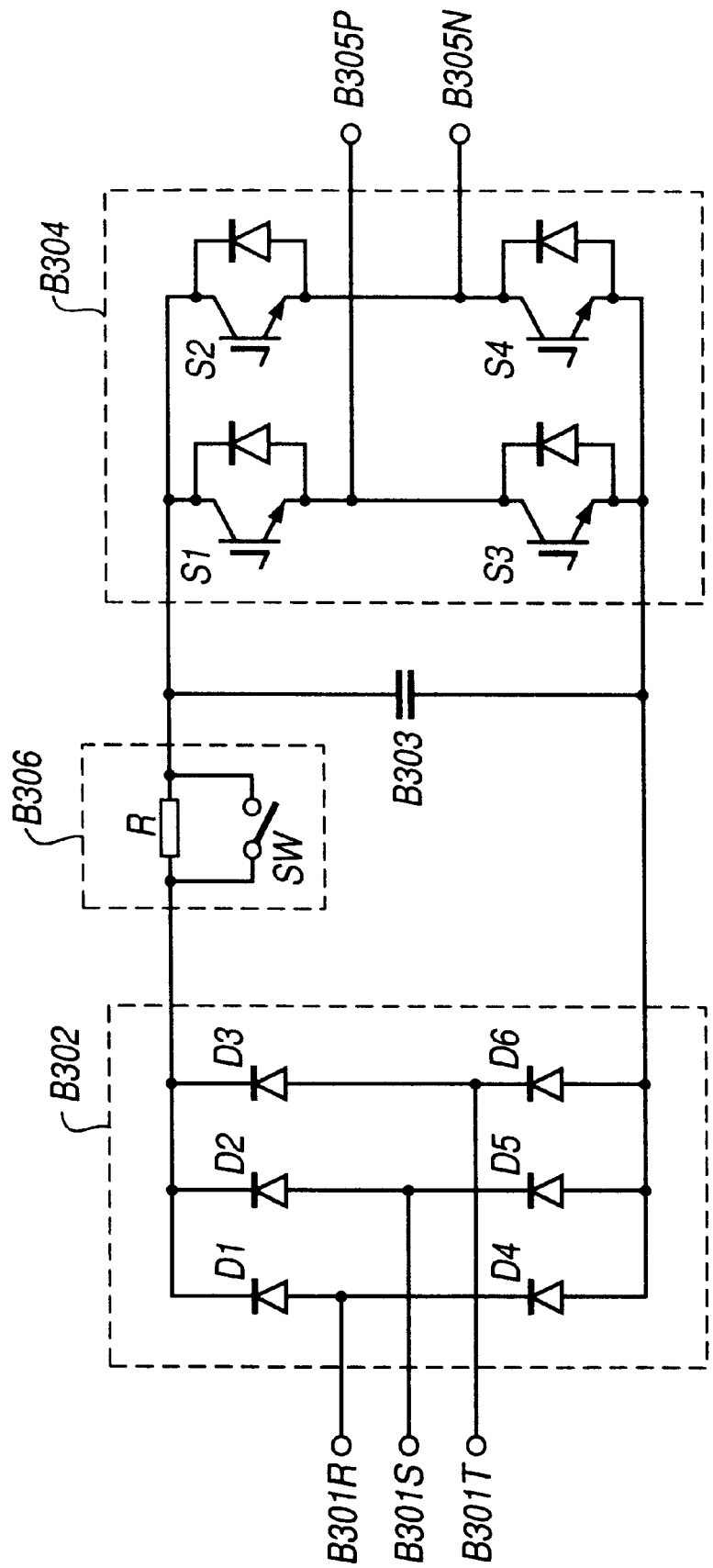
FIG. 14 is a circuit diagram showing an example of the detailed composition of a unit cell inverter shown in FIG. 14.
Figure 15:
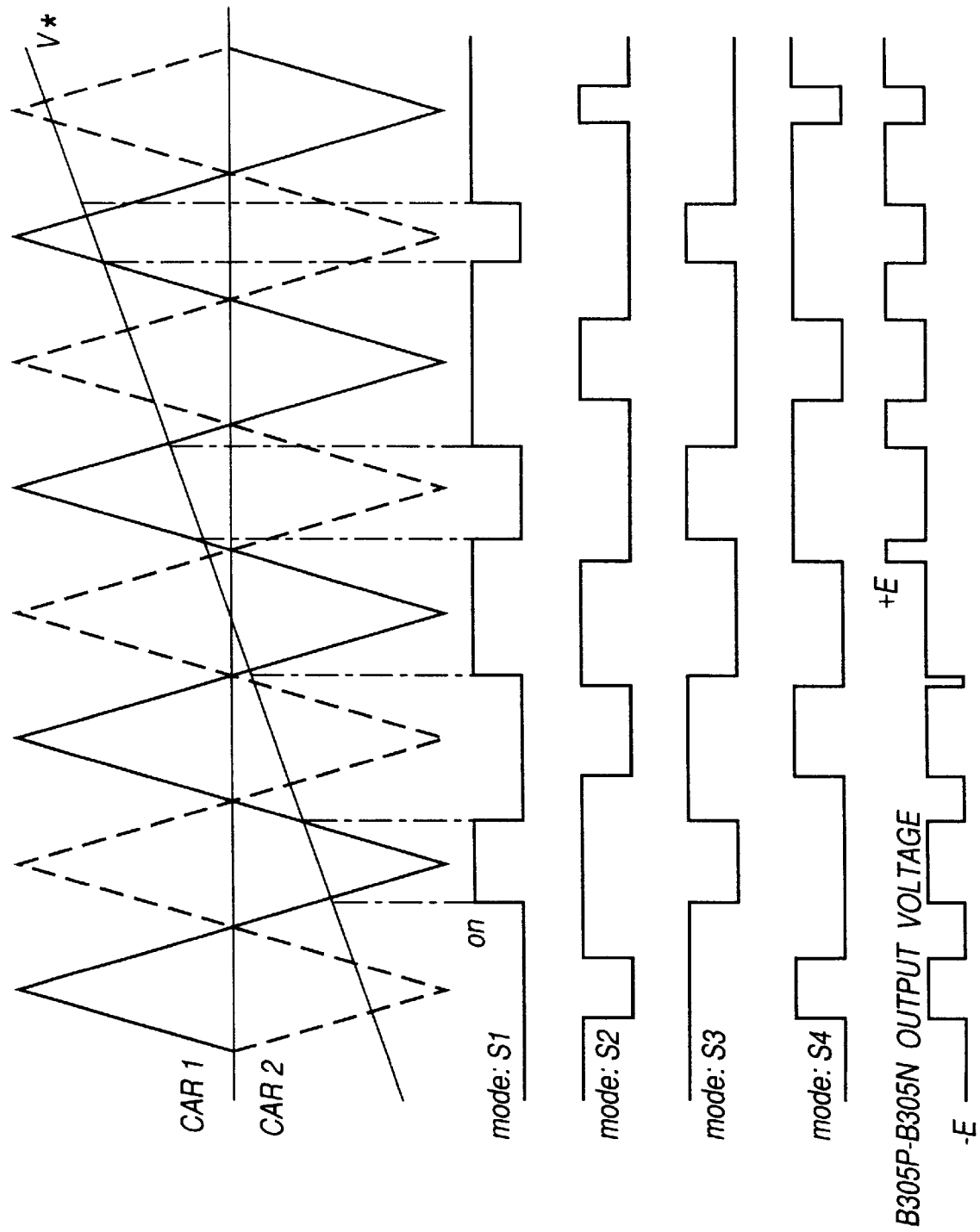
FIG. 15 is a timing chart showing one example of transistor switching and output voltage in a single cell inverter shown in FIG. 13.

For example, the self-extinguishing element switching statees for U phase single phase power converter to output voltage levels from "2" to "−2" are shown below. The same applies to V and W phase single phase power converters. Also, the reference numbers for the self-extinguishing elements are the same as in FIG. 10. Further, even if the outputable voltage levels are other than 5, the rector can be expressed in the same kind of diagram as in FIG. 87.

TABLE 2

| | Su1 | Su2 | Su3 | Su4 | Su5 | Su6 | Su7 | Su8 |
|---|---|---|---|---|---|---|---|---|
| 2 | on | on | on | on | off | off | off | off |
| 1 | off | on | on | on | on | off | off | off |
| 0 | off | off | on | on | on | on | off | off |
| −1 | off | off | off | on | on | on | on | off |
| −2 | off | off | off | off | on | on | on | on |

Figure 88:
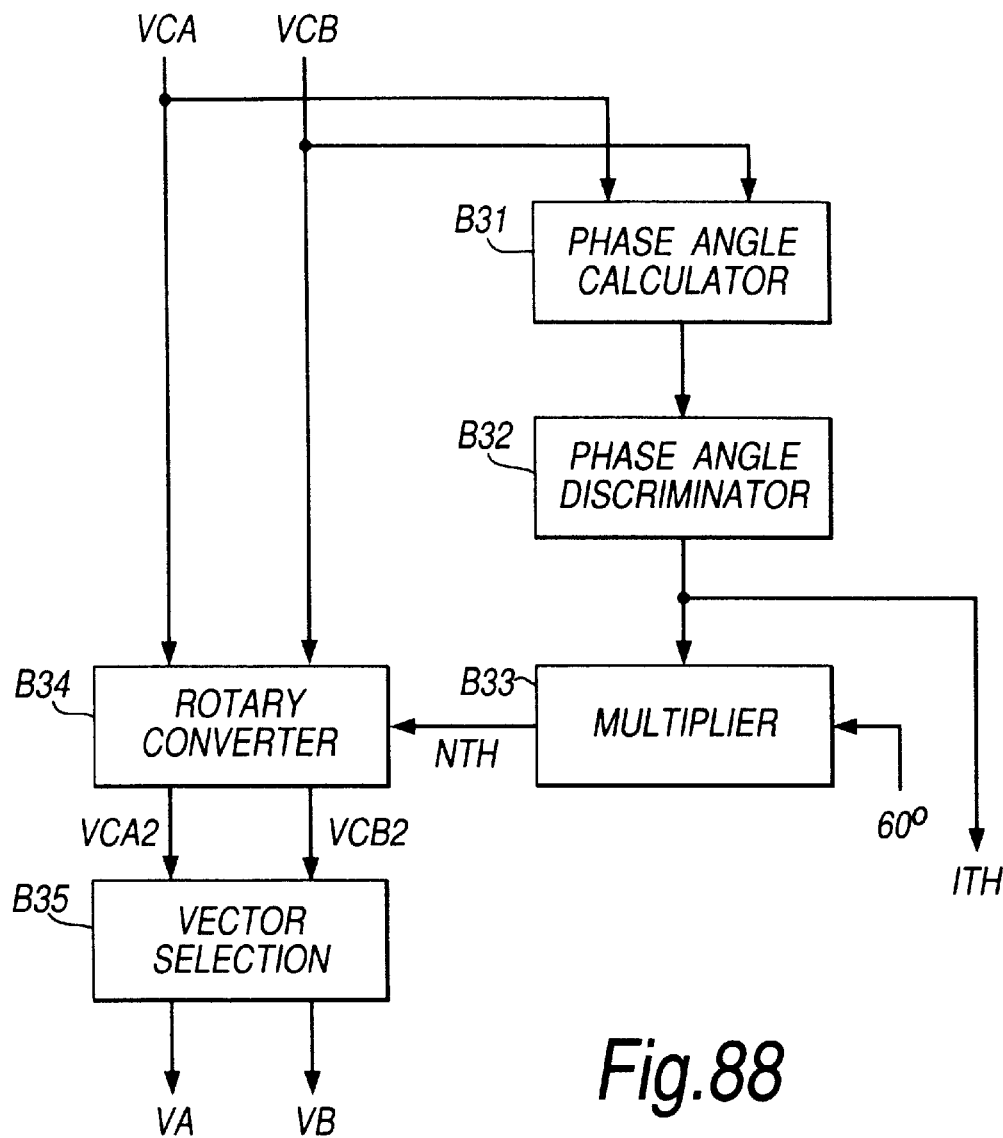
FIG. 88 is a block diagram showing the function and sequence of an actual voltage value vector selection circuit in the multi-level-output 3-phase power converter according to the fifteenth embodiment.

FIG. 88 is used to explain the operation of the above voltage actual value vector selection circuit B30.

In FIG. 88, voltage command value vector A axis component VCA and B axis component VCB output from voltage command vector calculation circuit B20 are input to phase angle calculation circuit B31, and voltage command value vector phase angle TH is computed as follows.

That is to say,

When B axis component VCB is positive, and A axis component VCA is larger than (VCB absolute value), then $$TH=\tan^{-1}(VCB/VCA)$$

When B axis component VCB is larger than (VCA absolute value), then $$TH=\tan^{-1}(VCB/VCA)+90°$$

When A axis component VCA is larger than −(VCB absolute value), then $$TH=\tan^{-1}(VCB/VCA)+180°$$

When B axis component VCB is larger than −(VCA absolute value), then $$TH=\tan^{-1}(VCB/VCA)+270°$$

When B axis component VCB is negative, and A axis component VCA is larger than (VCB absolute value), then $$TH=\tan^{-1}(VCB/VCA)+360°$$

Next, phase angle discrimination circuit B32 calculates the ITH indicating the 60° section to which the voltage command value vector belongs, by comparing the voltage command value vector phase angles TH, as shown below.

When 0°≧TH<60° ITH=0
When 60°≧TH<120° ITH=1
When 120°≧TH<180° ITH=2
When 180°≧TH<240° ITH=3
When 240°≧TH<300° ITH=4
When 300°≧TH<360° ITH=5

Figure 89:
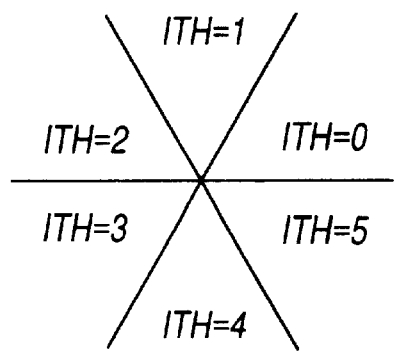
FIG. 89 is a diagram showing the output ITH, and corresponding sectors, from a phase angle discriminator circuit of the actual voltage value vector selection circuit in the multi-level-output 3-phase power converter according to the fifteenth embodiment.

FIG. 89 shows the 60° sections corresponding to output ITH from phase angle discrimination circuit B32.

Output ITH becomes voltage actual value vector selection circuit B30 output, and also inputs to multiplier B33, so that NTH is calculated according to the following formula.

$$NTH = 60° \times ITH$$

Rotary conversion circuit B34 coordinate converts voltage command value vectors (VCA, VCB) by the following formulae, according to output NTH from multiplier B33.

$$VCA2 = VCA \times \cos(NTH) + VCB \times \sin(NTH)$$

$$VCB2 = VCA \times \sin(NTH) + VCB \times \cos(NTH)$$

Voltage actual value selection circuit B35 selects the voltage actual value vector end coordinate (VA, VB) closest to the end of the voltage command value vector expressed by output VCA2, VCB2 from rotary conversion circuit B34.

ON/OFF pattern generator circuit B40 converts the voltage vector pair output by voltage actual value vector selection circuit B30 described above to self-extinguishing element ON/OFF patterns, according to the correspondence between the aforementioned voltage vector and the switching state of the self-extinguishing elements of each single phase power converter U, V, W.

Then, the ON/OFF pattern of each self-extinguishing element is sent to gate pulse generator circuit B18 to turn ON/OFF each self-extinguishing element of each single phase power converter U, V and W.

As explained above, on a 5-level output 3-phase power converter in the present embodiment, the voltage command value vectors corresponding to the voltage that should be output from the power converter unit are calculated from the power converter unit output current, and the power converter unit applies the voltage actual value vector of outputable voltage and selects the voltage actual value vector closest to the above voltage command value vector, and turns the self-extinguishing elements ON/OFF in accordance with this voltage actual value vector, so control is possible so that voltage vectors near the voltage vector that changes to a sine wave are output.

That is to say, the power converter unit output voltage can follow the corn-and value and be controlled to a staircase wave, so that sine wave output voltage having little distortion can be obtained.

(Sixteenth embodiment)

Figure 90:
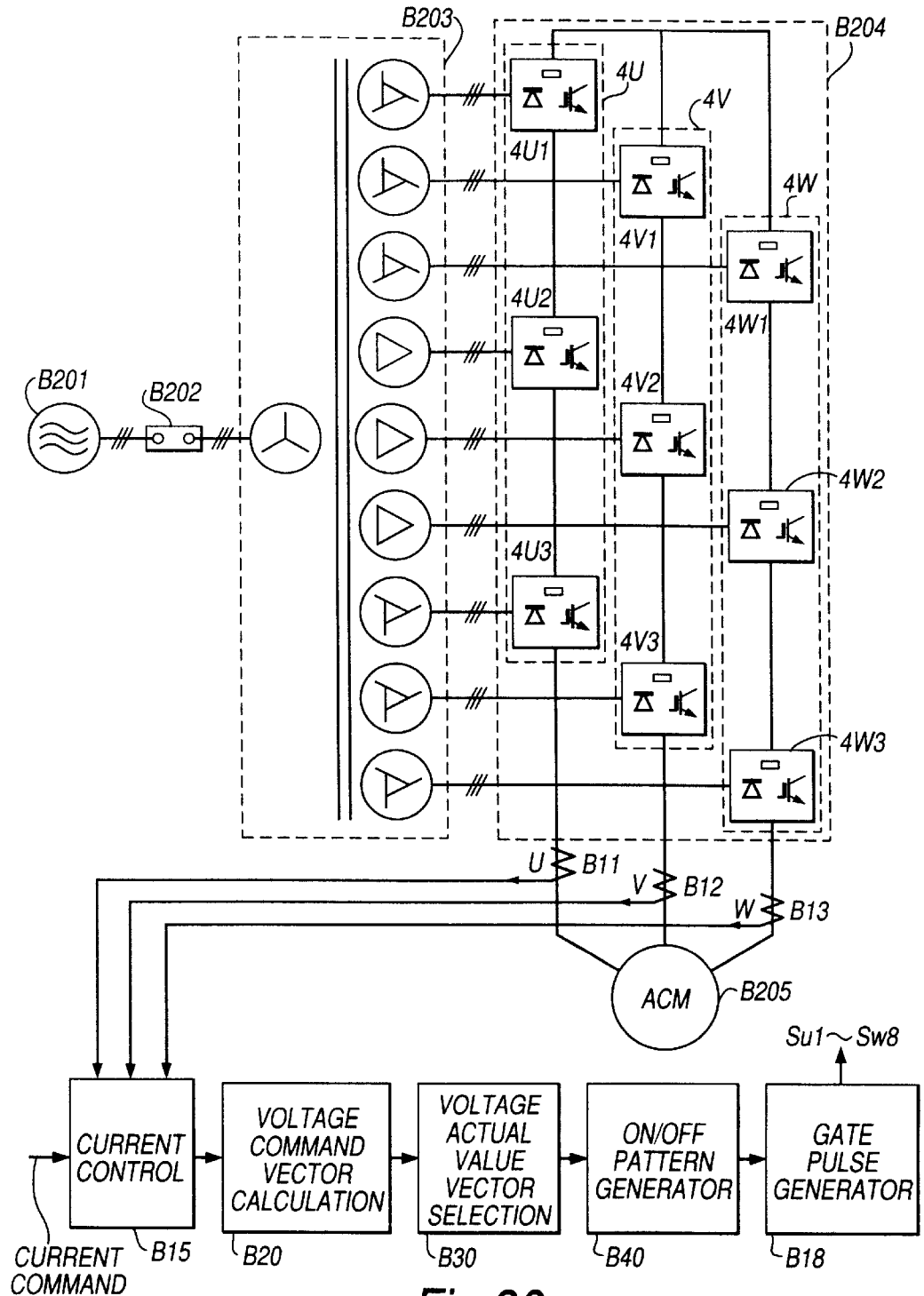
FIG. 90 is a circuit diagram showing an embodiment of a multi-level-output 3-phase power converter according to a sixteenth embodiment.

FIG. 90 is a circuit diagram showing an example of multi-level output 3-phase power converter structure for the present embodiment.

Here, a unit cell inverter is added to the main circuits in the fifteenth embodiment described above and a 7-level output 3-phase power converter (7-level inverter) is explained below.

Also, 3-phase AC power supply B201, power supply switch B202, transformer B203 with 9 pairs of secondary windings, 3-phase multi-level power converter B204, load B205, current control circuit B15 and gate pulse generator circuit B18 in FIG. 90 already have been described in detail, so explanations are omitted here.

In FIG. 90, voltage command vector calculation circuit B20 inputs the output from current control circuit B15, which controls the 3-phase power converter unit output current to a prescribed value, and calculates the voltage command value vector corresponding to the voltage that should be output by the 3-phase power converter unit.

Voltage actual value vector selection circuit B30 selects the voltage actual value vector corresponding to the voltage actually output by the 3-phase power converter unit from the voltage command value vectors calculated by voltage command value vector calculation circuit B20.

ON/OFF pattern generator circuit B40 generates command signals that perform ON/OFF for self-extinguishing elements Su1~Su (2 (n–1)) of each single phase power converter U, V and W, according to the state of the voltage actual value vector output from voltage actual value vector selection circuit B30.

Next, the operation of a 7-level output 3-phase power converter configured as described above for the present embodiment is explained with reference to FIG. 91.

Figure 91:
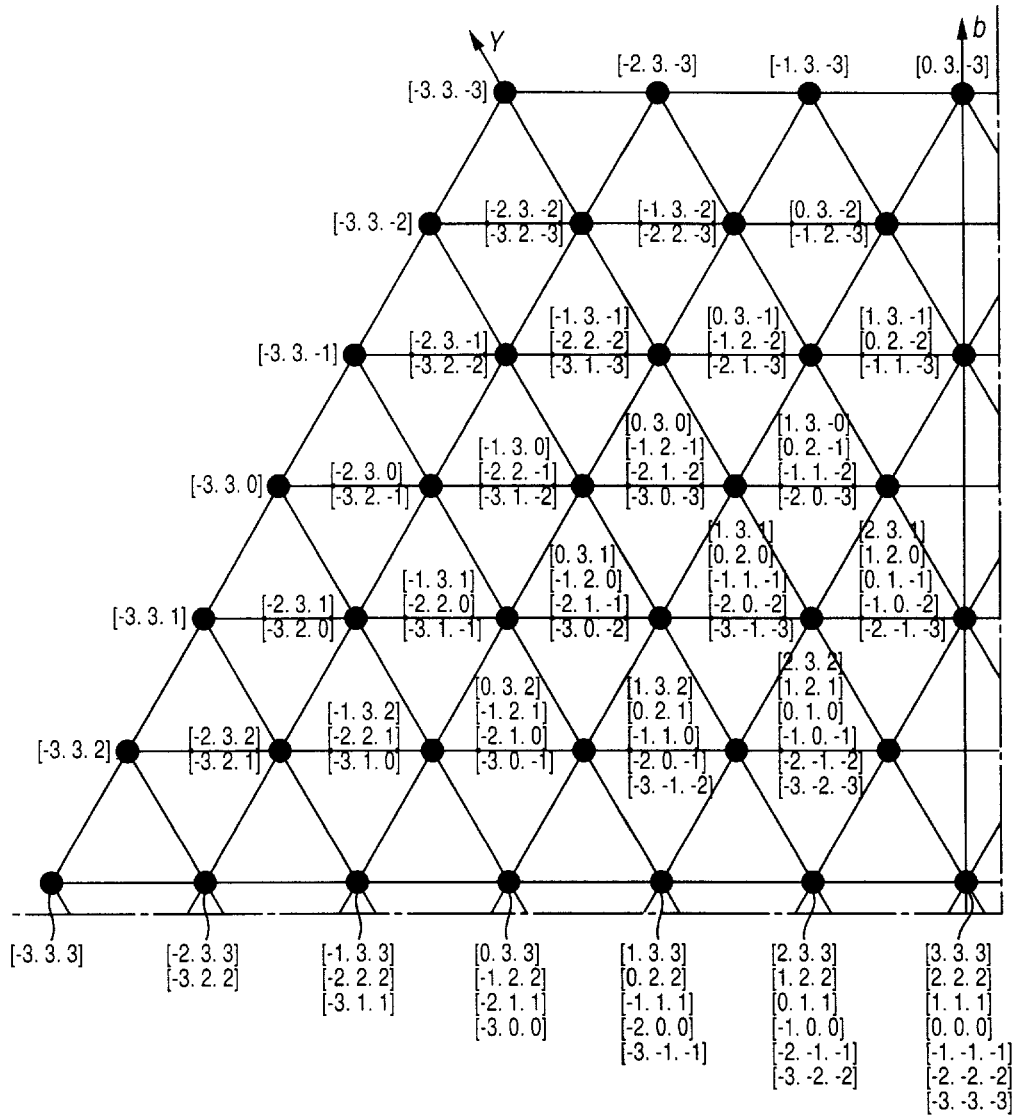
FIG. 91 is a circuit diagram showing output voltages which can be generated by a 7-level-output 3-phase power converter according to a sixteenth embodiment.
Figure 91:
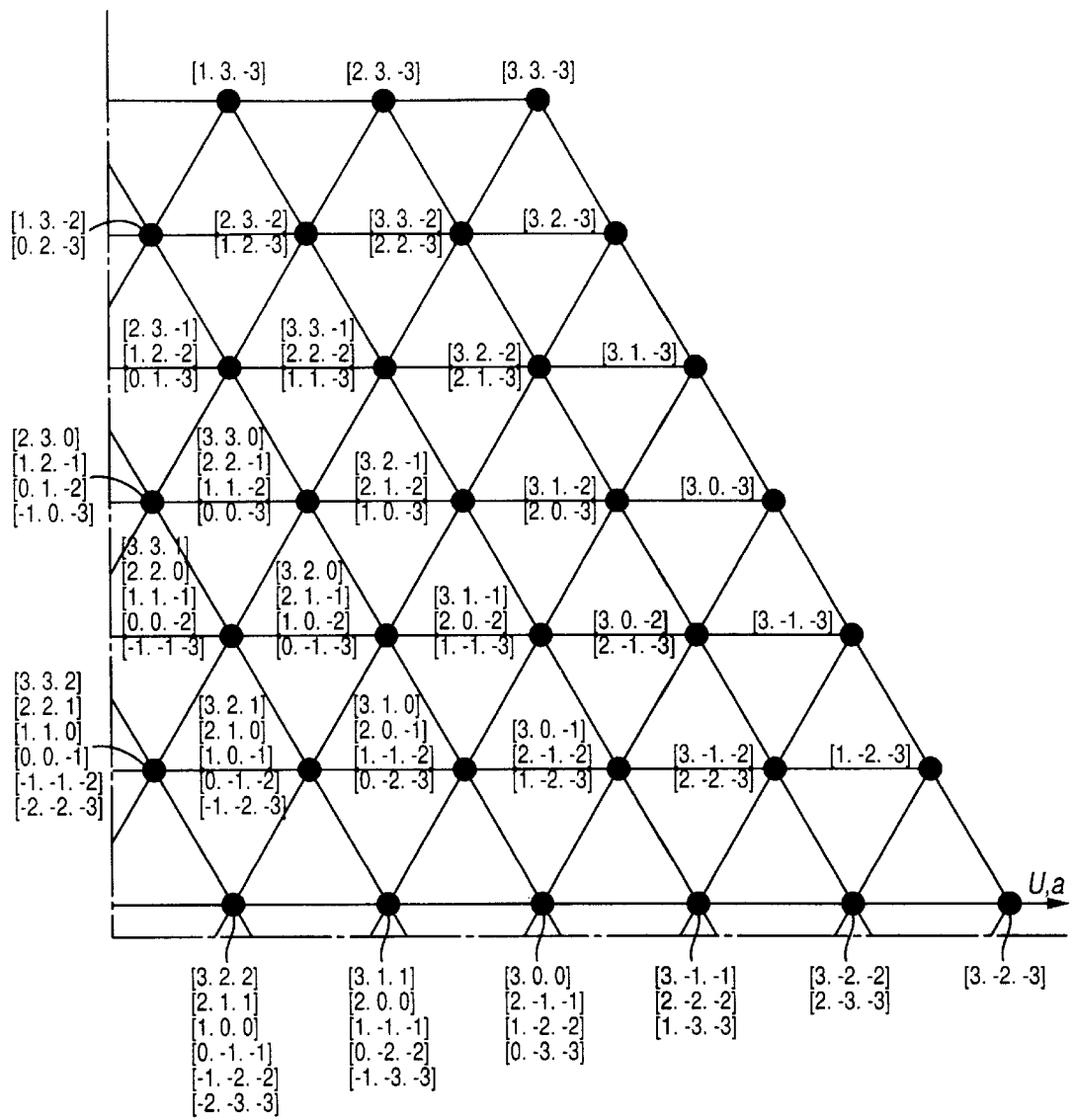
Figure 91:
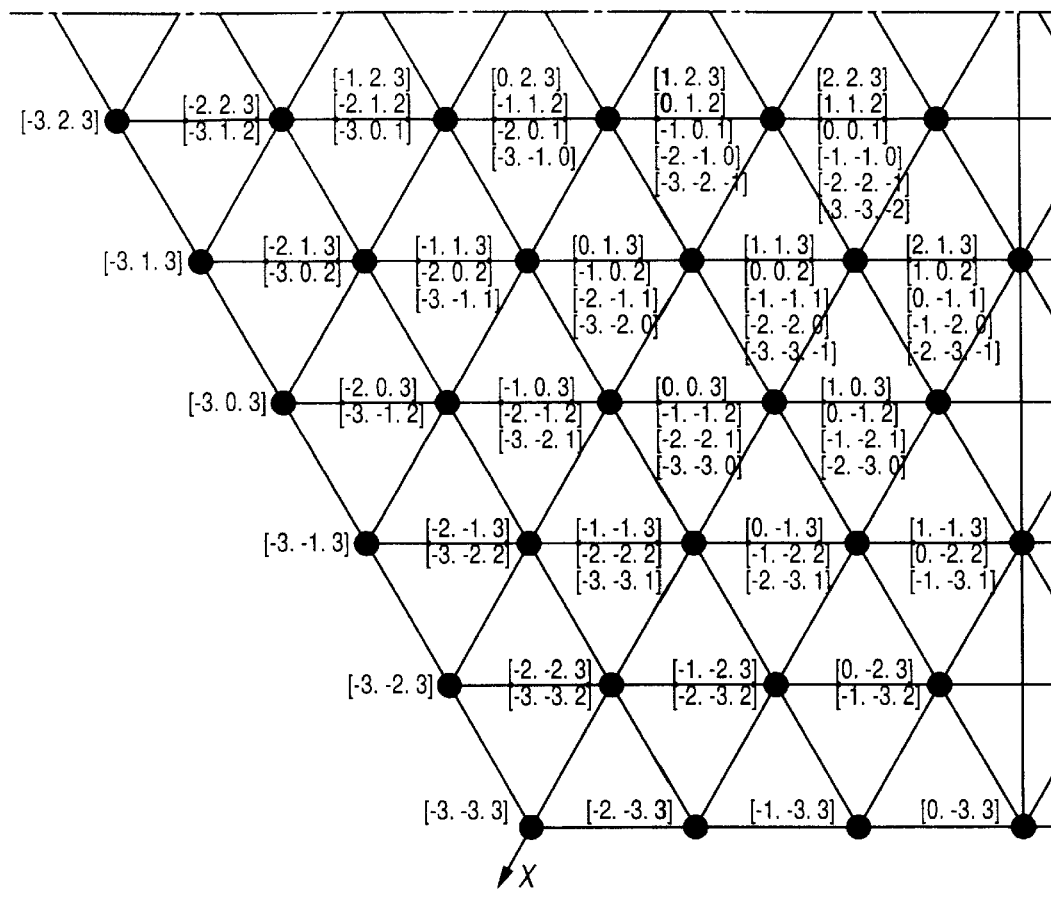
Figure 91:
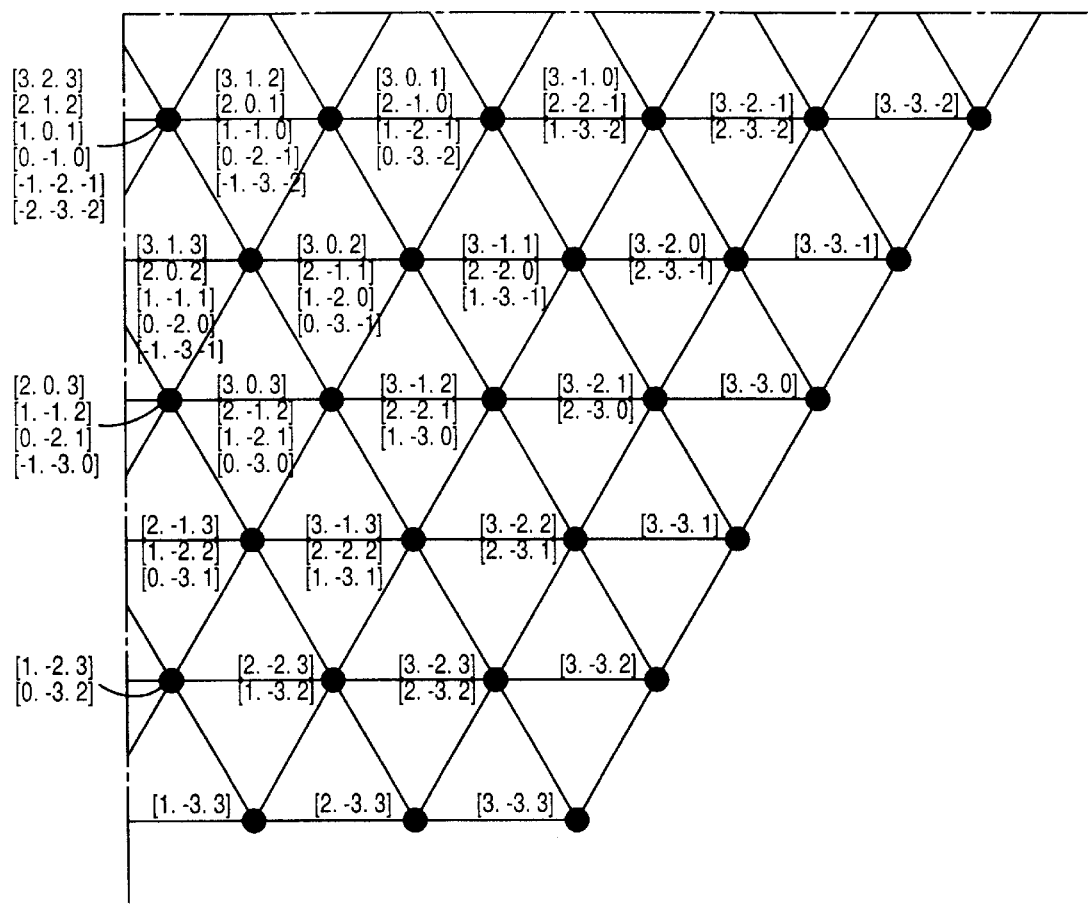

FIG. 91 illustrates the output voltage that can be output by the 7-level output 3-phase power converter. Voltage vector actual values are indicated by the black dots.

The 7-level output 3-phase output converter has $7^3 = 343$ switching modes for 3 phases, but since the same vector can express different: modes, there are 127 vectors.

In FIG. 91, (3, 3, 3) express (U phase output voltage level, V phase output voltage level, W phase output voltage level) respectively, and "3" means that U phase output voltage is +3E, or the sum of the three when U phase three cell inverters all output +E.

In the same way for the following, "2" indicates that one of the three cell inverters is outputting 0, and the remaining two are outputting +E, while "1" indicates that two of the cell inverters are outputting 0 and the remaining one is outputting +E, or that two of the cell inverters are outputting +E and the remaining one is outputting –E. In the same way, modes exist from "–1" to "–3".

Next, the operation of voltage actual value vector selection circuit B30 in FIG. 90 is the same as that in the previously explained example of a fifteenth embodiment, where voltage command value vector A axis component VCA and B axis component VCB output from voltage command vector calculation circuit B20 are input to phase angle calculation circuit B31 described in FIG. 88 above, and voltage command value vector phase angle is calculated in the same way as described previously.

Then, finally, voltage actual value selection circuit B35 selects the voltage actual value vector end coordinate (VA, VB) closest to the end of the voltage command value vector expressed by output VCA2, VCB2 from rotary conversion circuit B34.

ON/OFF pattern generator circuit B40 converts the voltage vector pair output by voltage actual value vector selection circuit B30 described above to self-extinguishing element ON/OFF patterns, according to the correspondence between the aforementioned voltage vector and the switching state of the self-extinguishing elements of each single phase power converter U, V, W.

Then, the ON/OFF pattern of each self-extinguishing element is sent to gate pulse generator circuit B18 to turn ON/OFF each self-extinguishing element of each single phase power converter U, V and W.

As explained above, on a 7-level output 3-phase power converter in the present embodiment, even for combinations of single phase cell inverters, control is possible so that voltage vectors near the voltage vector that changes to a sine wave are output.

That is to say, the same as for the fifteenth embodiment described previously, power converter unit output voltage can follow the command value and be controlled to a staircase wave, so that sine wave output voltage having little distortion can be obtained.

(Seventeenth embodiment)

The structure of the multi-level output 3-phase power converter in the present embodiment is similar to that shown in FIG. 85 for the fifteenth embodiment. As only the operation of previously described voltage actual value vector selection circuit B30 is different, only the differing sections are explained here, while explanations of the same parts are omitted and identical reference numbers are used for the same sections.

Figure 92:
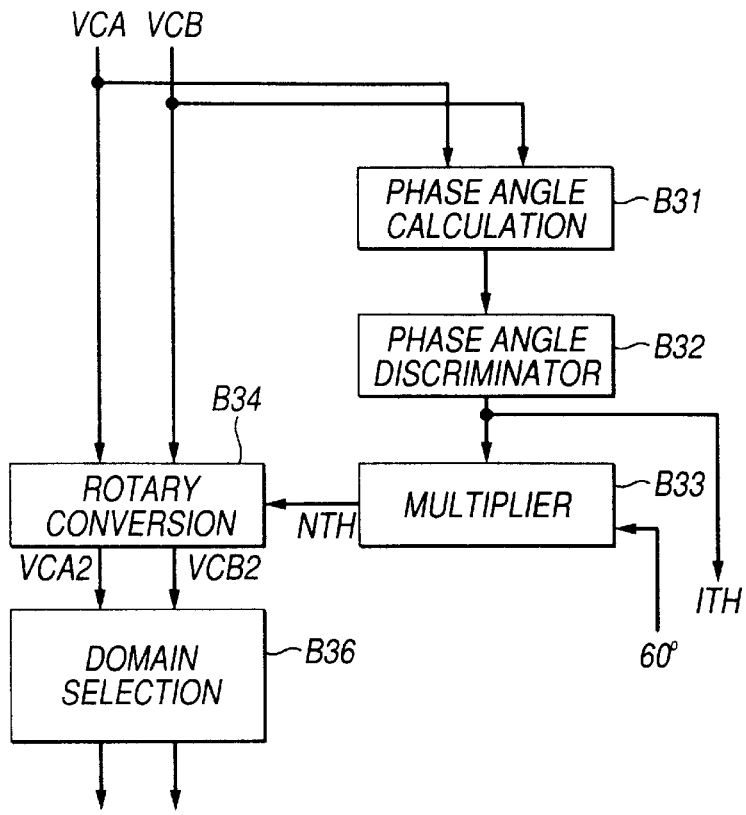
FIG. 92 is a block diagram showing the function and sequence of an actual voltage value vector selection circuit in a multi-level-output 3-phase power converter according to a seventeenth embodiment.

The operation of voltage actual value vector selection circuit B30 in the present embodiment is explained here with reference to FIG. 92.

In FIG. 92, the operation of phase angle calculation circuit B31, phase angle discrimination circuit B32, multiplier B33 and rotary converter circuit B34 are the same as for the previously described fifteenth embodiment.

Domain judgement circuit B36 sets the domain containing the end point of the voltage actual value vector, and selects the actual value vector due to the fact that the vector output from rotary conversion circuit B34 is contained in the domain containing the end point.

Next, the operation of a 5-level output 3-phase power converter for an embodiment configured as described above is explained.

The operation from the calculation of voltage command value vector phase angle TH by phase angle calculation circuit B31 to the calculation of voltage command value vector (VCA2, VCB2) by rotary converter circuit B34 is the same as described previously, and is omitted here.

Domain judgement circuit B36 judges to which domain, sectioned so that one voltage actual value vector end point is contained in each, the end point of voltage command value vector expressed by VCA2, VCB2 output from rotary converter circuit B34 belongs.

Figure 93:
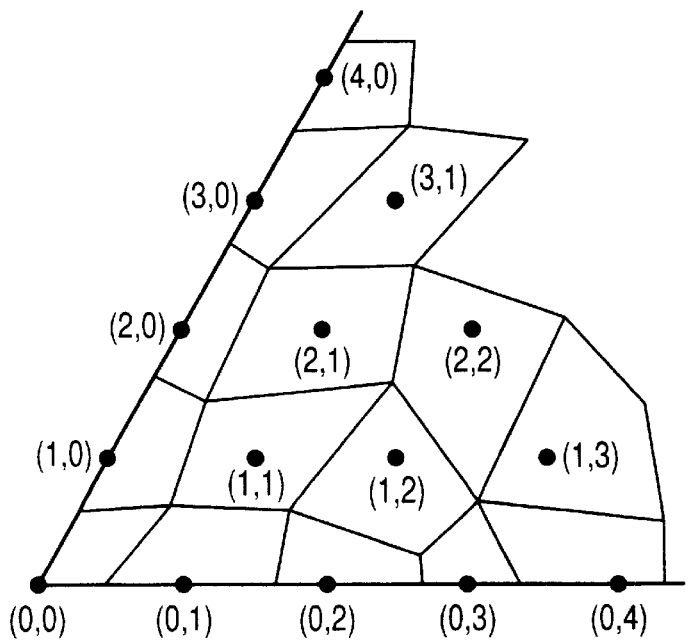
FIG. 93 is a diagram showing sector domains for actual voltage value vectors used in a multi-level-output 3-phase power converter according to a seventeenth embodiment.

FIG. 93 illustrates voltage actual value end points allocated to domains.

As shown in FIG. 93, coordinates (0, 0), (0, 1), . . . , (i, j), . . . are assigned to each end point in order from the point of origin, and the lines sectioning the domains to which the points belong are expressed by the following formulae.

$$ai \times A + bi \times B = 0$$

$$ai \times A + 1 \times bi + 1 \times B = 0$$

$$aj \times A + bj \times B = 0$$

$$aj + 1 \times bj + 1 \times B = 0$$

The lines dividing the boundaries for each domain, and the positions of (VCA2, VCB2) are computed as follows.

Relative to $ai \times A + bi \times B = 0$:

If ai×VCA2+bi×VCB2 is greater than 0, then (VCA2, VCB2) is above the boundary line.

If ai×VCA2+bi×VCB2 is less than 0, then (VCA2, VCB2) is below the boundary line.

The above processing is repeated for each boundary line to identify on which side of each domain (VCA2, VCB2) is located, and finally the domain to which (VCA2, VCB2) belongs is determined. Then, the coordinates (VA, VB) of the end point of voltage actual value vector contained in that domain are output as selection results.

Subsequently, the same as for the previously described example of a fifteenth embodiment, the self-extinguishing elements of each single phase power converter U, V and W are turned ON/OFF by VA, VB and ITH, via ON/OFF pattern generator circuit B40 and gate pulse generator circuit B18.

The above explanation is an example where the boundaries are straight lines, and each end point is sectioned by four boundary lines, however the boundary lines also can be curved, and the number of boundary lines sectioning each end point is not limited to four.

As explained above, on the 5-level output 3-phase power converter in the present embodiment, control is possible so that voltage vectors near the voltage vector that changes to a sine wave are output.

That is to say, the same as in the fifteenth embodiment previously described, the power converter unit output voltage can follow the command value and be controlled to a staircase wave, so that sine wave output voltage having little distortion can be obtained.

Also, power converter unit switching operation occurs only when the voltage vector end point corresponding to voltage command moves from the domain sectioning the voltage actual valve vector end point to a domain sectioning a different voltage actual value vector end point. In other words, during steady operation, since each self-extinguishing element on the power converter unit repeats ON/OFF only one time in one cycle, the number of switching operations is kept to the required minimum, and this reduces switching loss and enables the realization of a high efficiency power converter.

(Eighteenth embodiment)

The multi-level output 3-phase power converter in the present embodiment has a voltage actual value vector selection circuit as shown in FIG. 92 applied to voltage actual value vector selection circuit B30 in the 7-level output 3-phase output converter (7-level inverter) shown in FIG. 90.

The operation of phase angle calculation circuit B31, phase angle discrimination circuit B32, multiplier B33 and rotary converter circuit B34 are the same as for the previously described fifteenth embodiment, so identical reference numbers are used for the same sections, and only the sections that differ are described here.

Domain selection circuit B36 sets the domain containing the voltage actual value vector end point and selects the actual value vector due to the fact that the vector output from rotary converter circuit B34 is contained in the domain containing the end point.

ON/OFF pattern generator circuit B40 generates command signals that perform ON/OFF for the self-extinguishing elements Su1~Su (2 (n–1)) of each single phase power converter U, V and W, according to the state of the voltage actual value vector output from voltage actual value vector selection circuit B30.

Next, the operation of a multi-level output 3-phase power converter configured as described above for the present embodiment is explained.

As in the example of a sixteenth embodiment, domain selection circuit B36 decides to which domain, sectioned so that one voltage actual value vector end point is contained in each, the end point of voltage command value vector expressed by VCA2 and VCB2 output from rotary converter circuit B34 belongs.

This identifies on which side of each domain (VCA2, VCB2) is located, and finally the domain to which (VCA2, VCB2) belongs is determined. Then, the coordinates (VA, VB) of the end point of voltage actual value vector contained in that domain are output as selection results.

Subsequently, the same as for the previously described example of a fifteenth embodiment, the self-extinguishing elements of each single phase power converter U, V and W are turned ON/OFF by VA, VB and ITH, via ON/OFF pattern generator circuit B40 and gate pulse generator circuit B18.

The above explanation is an example where the boundaries are straight lines, and each end point is sectioned by four boundary lines, but the boundary lines also can be curved, and the number of boundary lines sectioning each end point is not limited to four.

As explained above, on the multi-level output 3-phase power converter in the present embodiment, control is possible so that voltage vectors near the voltage vector that changes to a sine wave are output.

That is to say, the same as in the example of a fifteenth embodiment previously described, the power converter unit output voltage can follow the command value and be controlled to a staircase wave, so that sine wave output voltage having little distortion can be obtained.

Also, power converter unit switching operation occurs only when the voltage vector end point corresponding to voltage command moves from the domain sectioning the voltage actual value vector end point to a domain sectioning a different voltage actual value vector end point. In other words, during steady operation, since each self-extinguishing element on the power converter unit repeats ON/OFF only one time in one cycle, the number of switching operations is kept to the required minimum, and this seduces switching loss and enables realisation of a high efficiency power converter.

(Nineteenth embodiment)

The multi-level output 3-phase power converter in the present embodiment has the same configuration as for the previously described fifteenth embodiment, except for the operation of previously described voltage actual value vector selection circuit B30, so identical reference numbers are used for the same sections, and only the sections that differ are described here.

Figure 94:
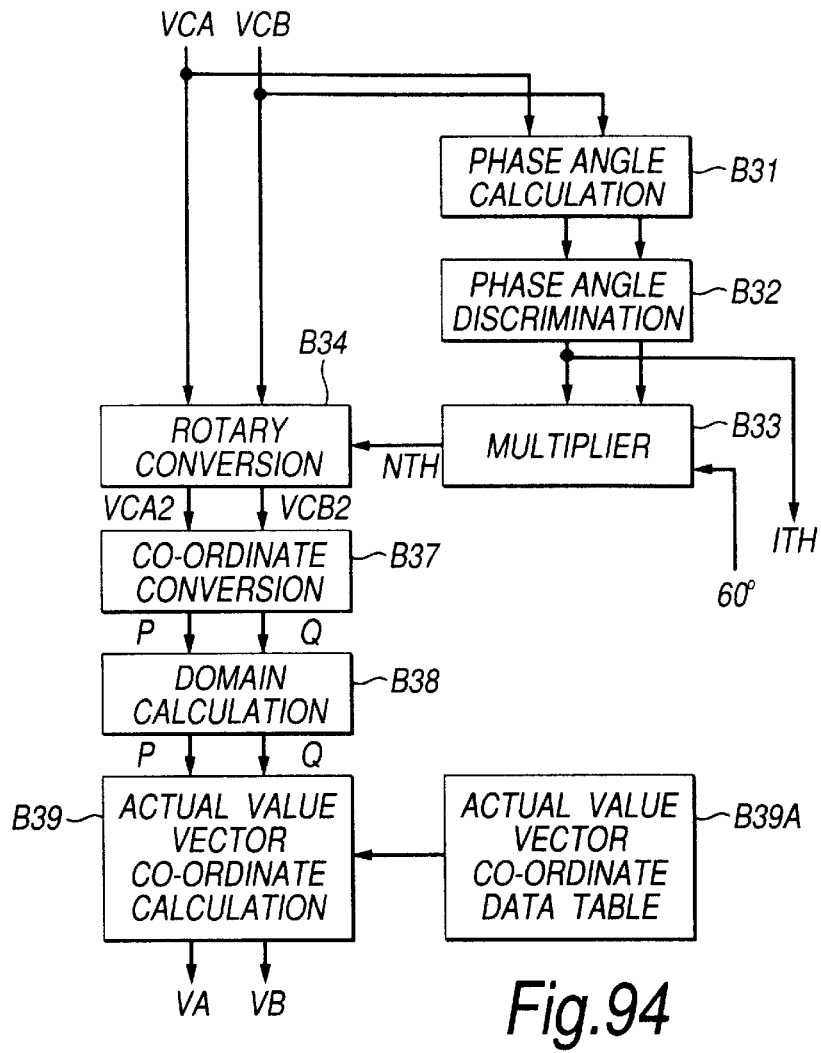
FIG. 94 is a block diagram showing the function and sequence of an actual voltage value vector selection circuit in a multi-level-output 3-phase power converter according to a nineteenth embodiment.

The operation of voltage actual value vector selection circuit B30 for the present embodiment is explained here with reference to FIG. 94.

In FIG. 94, the operation of phase angle calculation circuit B31, phase angle discrimination circuit B32, multiplier B33 and rotary converter circuit B34 are the same as for the previously described fifteenth embodiment.

Coordinate converter circuit B37 coordinate converts VCA2 and VCB2 output from rotary converter circuit B34 and outputs coordinate values (P, Q).

Based on coordinate values (P, Q), domain calculation circuit B38 calculates domains IP, IQ and IR where the voltage command value vector tips exist.

Actual value vector coordinate calculation circuit B39 calculates voltage actual value vector coordinate values VA and VB based on domains IP, IQ, IR and actual value vector coordinate data table B39A.

Next the operation of a multi-level output 3-phase power converter as configured above for the present embodiment is explained.

The operation from the calculation of voltage command value vector phase angle TH by phase angle calculation circuit B31 to calculation of voltage command value vector (VCA2, VCB2) by rotary converter circuit B34 is the same as described previously, and is omitted here.

Figure 95:
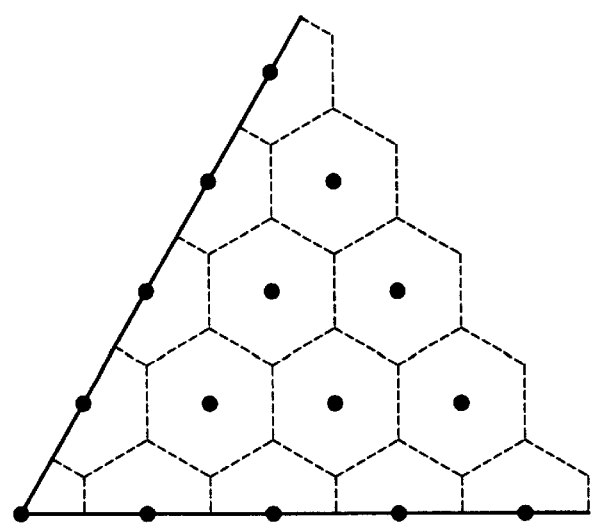
FIG. 95 is a diagram showing sector domains for actual voltage value vectors used in a multi-level-output 3-phase power converter according to a nineteenth embodiment.

FIG. 95 illustrates regular hexagonal areas divided so as to contain one each of voltage actual value vector end points used to select voltage actual value vectors.

As shown in FIG. 95, when a voltage command value vector end point is contained in each domain, the voltage actual value vector located at the centre of that domain is the vector closest to the voltage command value vector.

Next the processing for selecting voltage actual value vector based on this domain separation is explained.

Coordinate converter circuit B37 carries out coordinate conversion for rotary converter circuit B34 output VCA2 and VCB2 according to the formulae below.

$$P = 2 \times VCA2$$

$$Q = VCA2 + \sqrt{3} \times VCB2$$

These coordinate values (P, Q) correspond to the two voltage vector direction components that make up the 60° section containing the voltage command value vectors.

Domain calculation circuit B38 calculates the domain in which voltage command value vector tip exists, based on coordinate values (P, Q), according to the following formulae.

IP=INT (P)

IQ=INT (Q)

IR=TNT (Q−IQ−P+IP)

INT (*) in the formulae expresses integral computation.

Figure 96:
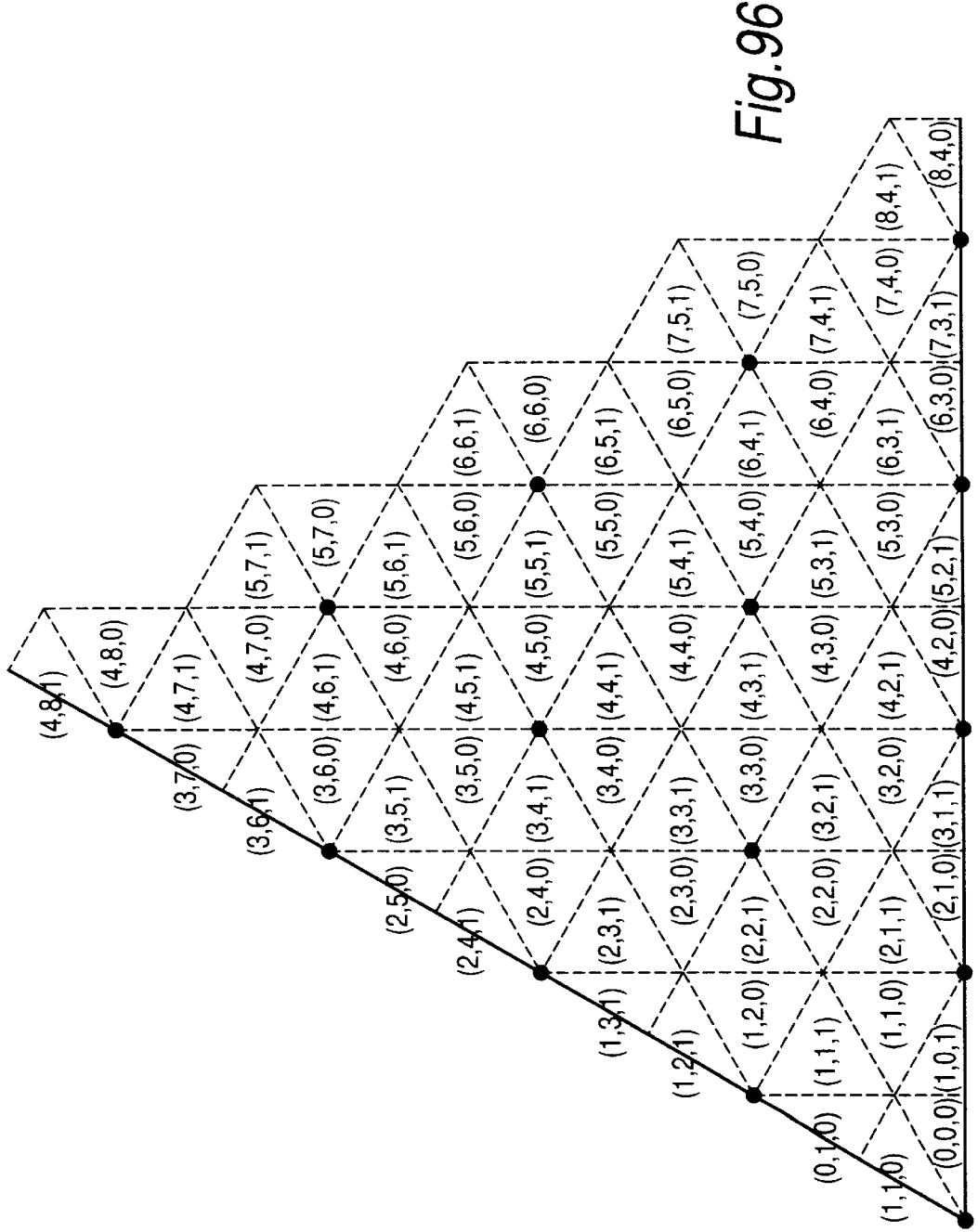
FIG. 96 is a diagram for describing the operation of a domain calculating circuit of the actual voltage value vector selection circuit in a multi-level-output 3-phase power converter according to a nineteenth embodiment.

Also, IP, IQ and IR correspond one to one to the regular triangular domains (FIG. 96) determined by joining the voltage actual value vector end points in the centter of the regular hexagonal domains in FIG. 95 and each apex.

Therefore, the above calculations compute (calculate) in which regular triangular domain the voltage command value vector end point exists.

Actual value vector coordinate calculation circuit B39 refers to actual value vector coordinate data table B39A and calculates voltage actual value vector coordinate values VA and VB, based on domains IP, IQ and IR.

Subsequently, the same as for the previously described fifteenth embodiment, the self-extinguishing elements of each single phase-power converter U, V and W are turned ON/OFF by VA, VB and ITH, via ON/OFF pattern generator circuit B40 and gate pulse generator circuit B18.

As explained above, on the multi-level output 3-phase power converter fin the present embodiment, control is possible so that voltage vectors near the voltage vector that changes to a sine wave are output.

That is to say, the same as in the example of a fifteenth embodiment previously described, the power converter unit output voltage can follow the command value and be controlled to a staircase wave, so that sine wave output voltage having little distortion can be obtained.

Also, by considering the regular hexagonal domains sectioning the voltage actual value vectors, the vector closest to the voltage command value vector can be calculate: rapidly without complicated distance calculation.

Further, power converter unit switching operation occurs only when the voltage vector end point corresponding to voltage command moves from the hexagonal domain sectioning the voltage actual value vector end point to a different hexagonal domain. In other words, during steady operation, since each self-extinguishing element on the power converter unit repeats ON/OFF only one time in one cycle, the number of switching operations is kept to the required minimum, and this reduces switching loss and enables the realisation of a high efficiency power converter.

(Twentieth embodiment)

The multi-level output 3-phase power converter in the present embodiment is an example of applying the voltage actual value vector selection circuit in FIG. 94 to voltage actual value vector selection circuit B30 in the 7-level output 3-phase power converter (7-level inverter) described in FIG. 90.

The operation of phase angle calculation circuit B31, phase angle discrimination circuit B32, multiplier B33 and rotary converter circuit B34 are the same as for the previously described fifteenth embodiment, so identical reference numbers are used for the same sections, and only the sections that differ are described here.

Domain selection circuit B36 sets the domain containing the voltage actual value vector end point and selects the actual value vector due to the fact that the vector output from rotary converter circuit B34 is contained in the domain containing the end point.

ON/OFF pattern generator circuit B40 generates command signals that perform ON/OFF for self-extinguishing elements Su1~Su (2 (n−1)) of each single phase power converter U, V and W, according to the state of the voltage actual value vector output from voltage actual value vector selection circuit B30.

Next, the operation of a multi-level output 3-phase power converter configured as described above for the present embodiment is explained.

As in the seventeenth embodiment, domain selection circuit B36 decides to which domain, sectioned so that one voltage actual value vector end point is contained in each, the end point of voltage command value vector expressed by VCA2 and VCB2 output from rotary converter circuit B34 belongs.

The same as in the previously described seventeenth embodiment, coordinate converter circuit B37 coordinate converts VCA2 and VCB2 output from rotary conversion circuit B34.

Based on coordinate values (P, Q), domain calculation circuit B38 calculates the domains where the voltage command value vector tips exist, the same as in the previously described seventeenth embodiment.

The same as in the previously described seventeenth embodiment, actual value vector coordinate calculation circuit B39 calculates voltage actual value vector coordinate values VA and VB with reference to actual value vector coordinate data table B39A.

Subsequently, the same as for the previously described fifteenth embodiment, the self-extinguishing elements of each single phase power converter U, V and W are turned ON/OFF by VA, VB and ITH, via ON/OFF pattern generator circuit B40 and gate pulse generator circuit B18.

As explained above, on the multi-level output 3-phase power converter in the present embodiment, even for combinations of single phase cell inverters, control is possible so that voltage vectors near the voltage vector that changes to a sine wave are output.

That is to say, the same as for the fifteenth embodiment described previously power converter unit output voltage can follow the command value and be controlled to a staircase wave, so that sine wave output voltage having little distortion can be obtained.

Also, by considering the regular hexagonal domains sectioning the voltage actual value vectors, the vector closest to the voltage command value vector can be calculated rapidly without complicated distance calculation.

Further, power converter unit switching operation occurs only when the voltage vector end point corresponding to voltage command moves from the hexagonal domain sectioning the voltage actual value vector end point to a different hexagonal domain. In other words, during steady operation, since each self-extinguishing element on the power converter unit repeats ON/OFF only one time in one cycle, the number of switching operations is kept to the required minimum, and this reduces switching loss and enables realisation of a high efficiency power converter.

(Twenty-first embodiment)

The structure of the multi-level output 3-phase power converter in the present embodiment is similar to that shown in FIG. 85 for the fifteenth embodiment. Only the operation of previously described voltage actual value vector selection circuit B30 is different, so only the differing sections are explained here, while explanations of the same parts are omitted and identical reference numbers are used for the same sections.

Figure 97:
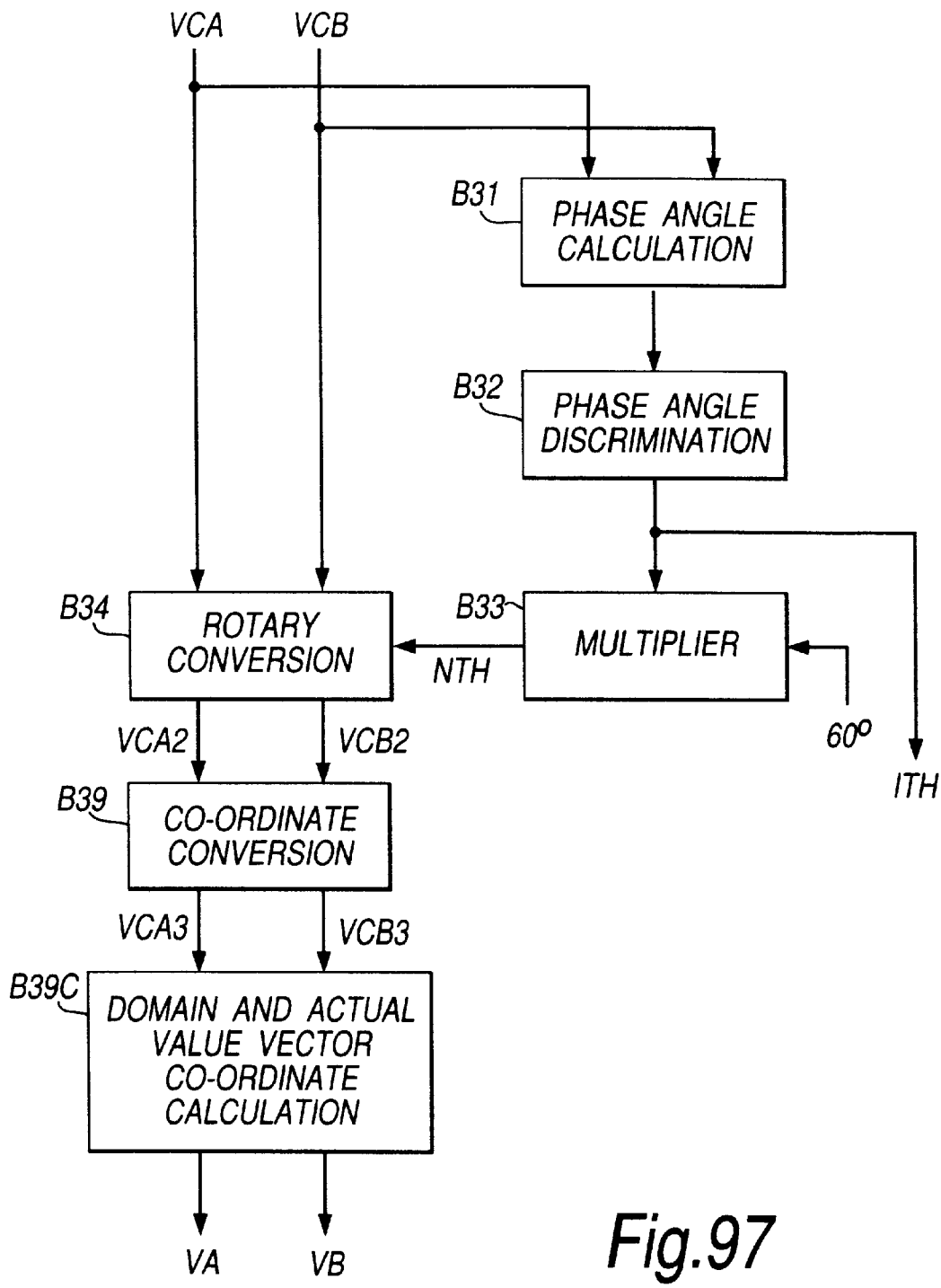
FIG. 97 is a block diagram showing the function and sequence of an actual voltage value vector selection circuit in a multi-level-output 3-phase power converter according to a twenty-first embodiment.

The operation of voltage actual value vector selection circuit B30 in the present embodiment is explained here with reference to FIG. 97.

In FIG. 97, the operation of phase angle calculation circuit B31, phase angle discrimination circuit B32, multiplier B33 and rotary converter circuit B34 are the same as for the previously described fifteenth embodiment.

Coordinate converter circuit B39B coordinate converts VCA2 and VCB2 output from rotary converter circuit B34 and outputs coordinate values (VCA3, VCB3).

Domain calculation and actual value vector coordinate calculation circuit B93C calculates voltage actual value vector coordinate values VA and VB based on coordinate values (VCA3, VCB3).

Next, the operation of a multi-level output 3-phase power converter configured as described above for the present embodiment is explained.

The operation from the calculation of voltage command value vector phase angle TH by phase angle calculation circuit B31 to calculation of voltage command value vector (VCA2, VCB2) by rotary converter circuit B34 is the same as described previously, and is omitted here.

Figure 98:
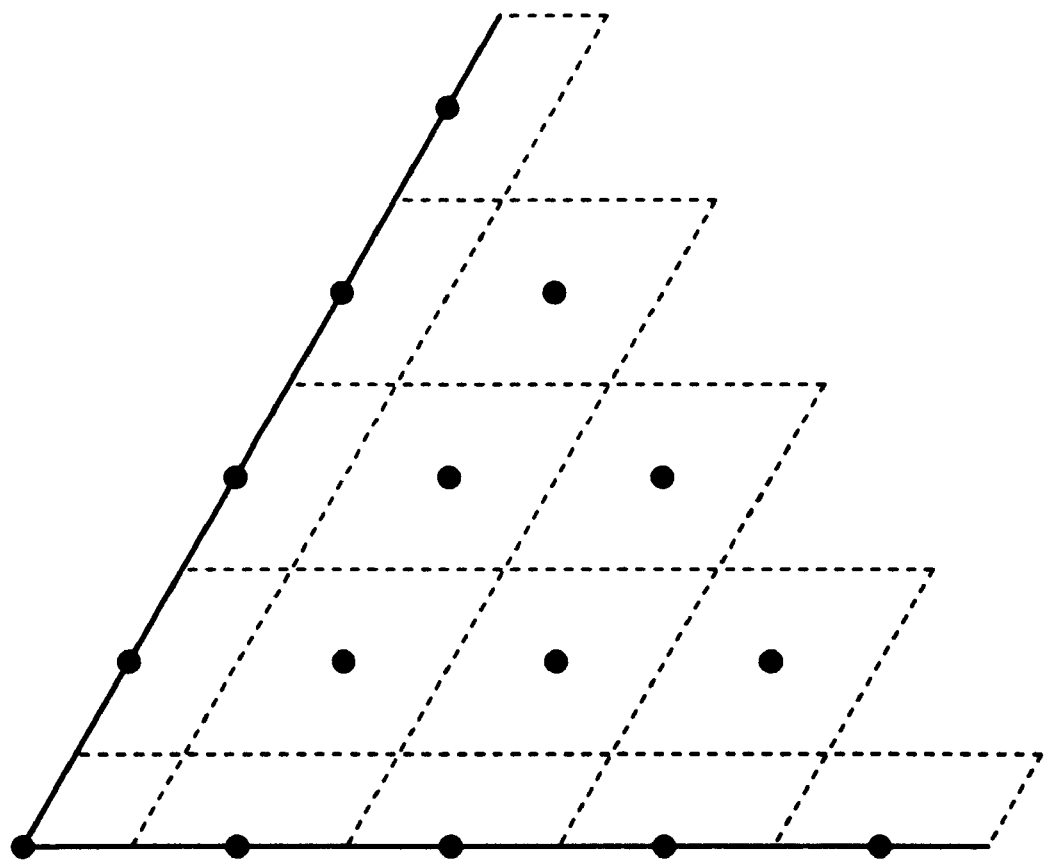
FIG. 98 is a diagram showing sector domains for actual voltage value vectors used in a multi-level-output 3-phase power converter according to a twenty-first embodiment.

FIG. 98 illustrates rhombic areas divided so as to contain one each of voltage actual vector end points used to select voltage actual value vectors.

As shown in FIG. 98, when a voltage command value vector end point is contained in each domain, the voltage actual value vector located at the centre of that domain is the vector closest to the voltage command value vector.

Next the processing for selecting voltage actual value vector based on this domain separation is explained.

Coordinate converted circuit B39B coordinate converts VCA2 and VCB2 output from rotary converter circuit B34 according to the formulae below.

$$VCA3 = VCA2 - 1/\sqrt{3} \times VCB2$$

$$VCB3 = 2/\sqrt{3} \times VCB2$$

These coordinate values (VCA3, VCB3) correspond to the distance from the point of origin of the intersecting point determined by a straight line parallel to the two voltage vector directions, from the end point of the voltage command value vectors, relative to the straight lines of the two voltage vector directions that make up the 60° section containing the voltage command value vector.

Domain calculation and actual value vector coordinate calculation circuit B93C calculates voltage actual value vector coordinate values VA and VB according to the following formulae.

$$VA=INT(VCA3+0.5)$$

$$VB=INT(VCB3+0.5)$$

INT (*) in the formulae expresses integral calculation.

Subsequently, the same as for the previously described example of a fifteenth embodiment, the self-extinguishing elements of each single phase power converter U, V and W are turned ON/OFF by VA, VB and ITH, via ON/OFF pattern generator circuit B40 and gate pulse generator circuit B18.

As explained above, on the multi-level output 3-phase power converter in the present embodiment, control is possible so that voltage vectors near the voltage vector that changes to a sine wave are output.

That is to say, the same as in the example of a fifteenth embodiment previously described, the power converter unit output voltage can follow the command value and be controlled to a staircase wave, so that sine wave output voltage having little distortion can be obtained.

Also, by considering the rhombic domains sectioning the voltage actual value vectors, the vector closest to the voltage command value vector can be calculated rapidly without complicated distance calculation.

Further, when rhombic domains are used, even if the voltage command value sector amplitude changes slightly, the switching pattern obtained also changes, so that excellent current control characteristics can be obtained.

Even further, power converter unit switching operation occurs only when the voltage vector end point corresponding to voltage command moves from the domain sectioning the voltage actual value vector end point to a domain sectioning a different voltage actual value vector end point. In other words, during steady operations since each self-extinguishing element on the power converter unit repeats ON/OFF only one time in one cycle, the number of switching operations is kept to the required minimum, and this reduces switching loss and enables the realisation of a high efficiency power converter.

(Twenty-second embodiment)

The multi-level output 3-phase power converter in the present embodiment has a voltage actual value vector selection circuit as shown FIG. 97 applied to voltage actual value vector selection circuit B30 in the 7-level output 3-phase output converter (7-level inverter) shown in FIG. 90.

The operation of phase angle calculation circuit B31, phase angle discrimination circuit B32, multiplier B33 and rotary converter circuit B34 are the same as for the previously described fifteenth embodiment, so identical reference numbers are used for the same sections, and only the sections that differ are described here.

Domain selection circuit B36 sets the domain containing the voltage actual value vector end point and selects the actual value vector due to the fact that the vector output from rotary converter circuit B34 is contained in the domain containing the end point.

ON/OFF pattern generator circuit B40 generates command signals that perform ON/OFF for the self-extinguishing elements Su1~Su (2 (n−1)) of each single phase power converter U, V and W, according to the state of the voltage actual value vector output from voltage actual value vector selection circuit B30.

Next, the operation of a multi-level output 3-phase power converter configured as described above for the present embodiment is explained.

The same as for the example of an eighteenth embodiment previously described, domain judgement circuit B36 decides to which domain, sectioned so that one voltage actual value vector end point is contained in each, the end point of voltage command value vector expressed by VCA2, VCB2 output from rotary converter circuit B34 belongs.

Subsequently, the same as for the fifteenth embodiment previously described, the self-extinguishing elements of each single phase power converter U, V and W are turned ON/OFF by VA, VB and ITH, via ON/OFF pattern generator circuit B40 and gate pulse generator circuit B18.

As explained above, on the multi-level output 3-phase power converter in the example of the present embodiment, even for combinations of single phase cell inverters, control is possible so that voltage vectors near the voltage vector that changes to a sine wave are output.

That is to say, the same as for the example of a fifteenth embodiment described previously, power converter unit output voltage can follow the command value and be controlled to a staircase wave, so that sine wave output voltage having little distortion can be obtained.

Also, by considering the rhombic domains sectioning the voltage actual value vectors, the vector closest to the voltage command value vector can be calculated rapidly without complicated distance calculation.

Further, when rhombic domains are used, even it the voltage command value sector amplitude changes slightly, the switching pattern obtained also changes, so that excellent current control characteristics can be obtained.

Even further, power converter unit switching operation occurs only when the voltage vector end point corresponding to voltage command moves front the domain sectioning the voltage actual value vector end point to a domain sectioning a different voltage actual value vector end point. In other words, during steady operation, since each self-extinguishing element on the power converter unit repeats ON/OFF only one time in one cycle, the number of switching operations is kept to the required minimum, and this reduces switching loss and enables the realisation of a high efficiency power converter.

With a power converter as described above for the present invention, for multi-level output power converters that can output voltage of four or more levels, power converter unit output voltage can follow command value and be controlled to a staircase waveform, because the voltage command value vector corresponding to the voltage that should be output by the power converter unit is calculated from power converter unit output current, and the power converter unit applies the outputable voltage actual value vector to select the voltage actual value vector closest to the above voltage command value vector, and the self-extinguishing elements are turned ON/OFF according to this voltage actual value vector. This results in the possibility of obtaining sine wave output voltage with little distortion.

Further, with a controller for a power converter in the present invention, during steady operation, each self-extinguishing element on the power converter unit repeats ON/OFF only one time in one cycle, so the number of switching operations is kept to the required minimum, and this reduces switching loss and allows higher efficiency.

Obviously, numerous additional modifications and variations of the present invention are possible in light of the above teachings. It is therefore to be understood that within the scope of the appended claims, the invention may be practiced otherwise than as specially described herein.

What is claimed is:

1. A controller for a power converter comprising:
   n converters which convert DC power to AC power, n being an integer greater than 1, each of which includes bridge-connecting self-extinguishing type switching elements, and feedback diodes which are respectively connected to each said self-extinguishing type switching element,
   n transformers for respectively inputting the outputs of said n number converters, and connecting with an AC load by connecting in series the secondary sides of said n number transformers, and being provided with:

means for providing a voltage command vector of an AC output voltage of said power converter;

means for providing all output vectors of said AC output voltages which said power converter can generate;

output vector selection means for selecting said output vectors according to said voltage command vector; and control means for controlling conductive states of said self-extinguishing type switching elements according to output vectors selected by said output vector selection means, wherein a spatial vector diagram is split into 6 ranges: 30 degrees, 30 degrees to 90 degrees, 90 degrees to 150 degrees, 150 degrees to 210 degrees, 210 degrees to 270 degrees and 270 degrees to 330 degrees, and range numbers 0 to 5 are assigned to those 6 split ranges, said output vector selection means comprising:
(a) a calculate means for calculating said range number in which said voltage command vector is present;
(b) a rotate means for rotating said voltage command vector through a specified angle;
(c) a coordinate convert means for performing coordinate transformation of said rotated voltage command vector to a vector in an oblique coordinate system which takes a first vector in the −30 degrees direction and a second vector in the 30 degrees direction of the rectangular coordinate system as two unit vectors;
(d) a split means for splitting a converter output-enabled portion of said vector diagram, which has undergone oblique transformation, using said unit vectors of said −30 degrees to +30 degrees range, of a spatial vector diagram in which said output vector is positioned, into square-shape patterns so that said output vector is positioned either in an upper left, a lower right, or both said lower left and upper right of each square-shape pattern, and then splitting any square-shape pattern which holds said output vector in both said lower left and said upper right, into two triangular domains by a segment which joins an upper left vertex and a lower right vertex;
(e) a judge means for judging whether said voltage command vector which has undergone oblique coordinate transformation is present in either said square-shape pattern domain or said triangular domain in said oblique coordinate system diagram which has been split into said domains; and
(f) a select means for selecting said output vector corresponding to said square-shape pattern domain or said triangular domain according to results of said judgement; and
(g) a calculation means for calculating an output vector which is rotated through a specified angle as said selected output vector.

2. A controller for a power converter comprising:

n converters which convert DC power to AC power, n being an integer greater than 1, each of which includes bridge-connecting self-extinguishing type switching elements, and feedback diodes which are respectively connected to each said self-extinguishing type switching element, n transformers for respectively inputting the outputs of said n number converters, and connecting with an AC load by connecting in series the secondary sides of said n number transformers, and being provided with:

means for providing a voltage command vector of an AC output voltage of the said power converter;

means for providing all output vectors of said AC output voltages which the said power converter can generate;

output vector selection means for selecting said output vectors according to said voltage command vector; and control means for controlling conductive states of said self-extinguishing type switching elements according to output vectors selected by the said output vector selection means, wherein a spatial vector diagram is split into 6 range: 30 degrees, 30 degrees to 90 degrees, 90 degrees to 150 degrees, 150 degrees to 210 degrees, 210 degrees to 270 degrees and 270 degrees to 330 degrees, and range numbers 0 to 5 are assigned to those 6 split ranges, said output vector selection means comprising:
(a) a calculate means for calculating said range number in which said voltage commend vector is present;
(b) a rotate means for rotating said voltage command vector through a specified angle;
(c) a coordinate convert means for performing coordinate transformation of said rotated voltage command vector to a vector in an oblique coordinate system which takes a first vector in the −30 degrees direction and a second vector in the 30 degrees direction of the rectangular coordinate system as two unit vectors;
(d) a split means for splitting a converter output-enabled portion of said vector diagram, which has undergone oblique transformation, using said unit vectors, of said −30 degrees to +30 degrees range of a spatial vector diagram in which said output vector is positioned, into square-shape patterns so that said output vector is positioned either in an upper left, a lower right, or both said lower left and upper right of each square-shape pattern, and then splitting each square-shape pattern into two triangular domains by a segment which joins an upper left vertex and a lower right vertex;
(e) a judge means for judging whether said voltage command vector which has undergone oblique coordinate transformation is present in a triangular domain in said oblique coordinate system diagram which has been split into said domains;
(f) a select means for selecting said output vector corresponding to said triangular domain according to results of said judgement; and
(g) a calculation means for calculating an output vector which is rotated through a specified angle as said selected output vector.

3. A controller for a power converter comprising:

n converters which convert DC power to AC power, n being an integer greater than 1, each of which includes bridge-connecting self-extinguishing type switching elements, and feedback diodes which are respectively connected to each said self-extinguishing type switching element, n transformers for respectively inputting the outputs of said n number converters, and connecting with an AC load by connecting in series the secondary sides of said n number transformers, and being provided with:

means for providing a voltage command vector of an AC output voltage of the said power converter;

means for providing all output vectors of said AC output voltages which the said power converter can generate;

output vector selection means for selecting said output vectors according to said voltage command vector; and control means for controlling conductive states of said self-extinguishing type switching elements according to output vectors selected by said output vector selection means, wherein a spatial vector diagram is split into 6 ranges: 30 degrees, 30 degrees to 90 degrees, 90 degrees to 150 degrees, 150 degrees to 210 degrees, 210 degrees to 270 degrees and 270 degrees to 330 degrees, and range numbers 0 to 5 are assigned to those 6 split ranges, said output vector selection means comprising:
- (a) a calculate means for calculating said range number in which said voltage command vector is present;
- (b) a coordinate convert means for performing coordinate transformation of said command vector to a vector in an oblique coordinate system which takes a vector in a first specified angular direction and a vector in a second specified angular direction as two unit vectors:
- (c) a split means for splitting a converter output-enabled portion of said vector diagram, which has undergone oblique transformation, using said unit vectors, of 60-degree range in which said voltage command vector is present within a spatial vector diagram in which said output vector is positioned, into square-shape patterns so that said output vector is positioned either in an upper left, a lower right, or both said lower left and upper right of each square-shape pattern, and then splitting each square-shape pattern which holds said output vector in both said lower left and said upper right into two triangular domains by a segment which joins an upper left vertex and a lower right vertex;
- (d) a judge means for judging whether said voltage command vector which has undergone oblique coordinate transformation is present in either said square-shape pattern domain or said triangular domain in said oblique coordinate system diagram which has been split into said domains; and
- (e) a select means for selecting said output vector corresponding to said square-shape domain or a triangular domain according to results of said judgement.

4. A controller for a power converter comprising:

n converters which convert DC power to AC power, n being an integer greater than 1, each of which includes bridge-connecting self-extinguishing type switching elements, and feedback diodes which are respectively connected to each said self-extinguishing type switching element, n transformers for respectively inputting the outputs of said n number converters, and connecting with an AC load by connecting in series the secondary sides of said n number transformers, and being provided with:

means for providing a voltage command vector of an AC output voltage of the said power converter;

means for providing all output vectors of said AC output voltages which the said power converter can generate;

output vector selection means for selecting said output vectors according to said voltage command vector; and control means for controlling conductive states of said self-extinguishing type switching elements according to output vectors selected by the said output vector selection means, wherein a spatial vector diagram is split into 6 ranges: 30 degrees, 30 degrees to 90 degrees, 90 degrees to 150 degrees, 150 degrees to 210 degrees, 210 degrees to 270 degrees and 270 degrees to 330 degrees, and range numbers 0 to 5 are assigned to those 6 split ranges, said output vector selection means comprising:
- (a) a calculate means for calculating said range number in which said voltage command vector is present;
- (b) a coordinate convert means for performing coordinate transformation of said command vector to a vector in an oblique coordinate system which takes a vector in a first specified angular direction and a vector in a second specified angular direction as two unit vectors;
- (c) a split means for splitting a converter output-enabled portion of said vector diagram, which has undergone oblique transformation, using said unit vectors, of the 60-degree range in which said voltage command vector is present within a spatial vector diagram in which said output vector is positioned, into square-shape patterns so that said output vector is positioned either in an upper left, a lower right, or both said lower left and upper right of each square-shape pattern, and then splitting each square-shape pattern into two triangular domains by a segment which joins a upper left vertex and a lower right vertex;
- (d) a judge means for judging whether said voltage command vector which has undergone oblique coordinate transformation is present in any triangular domain in said oblique coordinate system diagram which has been split into the said domains; and
- (e) a select means for selecting said output vector corresponding to said triangular domain according to results of said judgement.

5. A controller for a power converter comprising a split power source in which a DC voltage source is split into at least n, n being an integer of 3 or more, units, 3 sets of series circuits, composed by connecting in series (2×n) self-extinguishing type switching elements which are connected in parallel with said DC voltage source and to each of which a diode is connected in anti-parallel, and having converted voltage output terminals which output voltages which are converted from the voltage of said DC voltage source from between a nth self-extinguishing type switching element and a (n+1)th self-extinguishing type switching element from a positive side of said DC voltage source, and connecting said converted voltage output terminals to an AC load, and being provided with:

means for providing a voltage command vector of an AC output voltage of said power converter; a device which provides all the output vectors of the AC output voltages which the said power converter can generate;

output vector selection means for selecting said output vectors according to said voltage command vector; and control means for controlling conductive states of said self-extinguishing type switching elements according to said output vectors selected by said output vector selection means, wherein a spatial vector diagram is split into 6 ranges: 30 degrees, 30 degrees to 90 degrees, 90 degrees to 150 degrees, 150 degrees to 210 degrees, 210 degrees to 270 degrees and 270 degrees to 330 degrees, and range numbers 0 to 5 are assigned to those 6 split ranges, said output vector selection means comprising:

(a) a calculate means for calculating said range number in which said voltage command vector is present;
(b) a rotate means for rotating said voltage command vector through a specified angle;
(c) a coordinate convert means for performing coordinate transformation of said rotated voltage command vector to a vector in an oblique coordinate system which takes a first vector in the −30 degrees direction and a second vector in the 30 degrees direction of the rectangular coordinate system as two unit vectors;
(d) a split means for splitting a converter output-enabled portion of said vector diagram, which has undergone oblique transformation, using said unit vectors, of −30 degrees to +30 degrees range of said spatial vector diagram in which said output vector is positioned, into square-shape patterns so that said output vector is positioned either in an upper left, a lower right, or both said lower left and upper right of each square-shape pattern, and then splitting any square-shape pattern which holds said output vector in both said lower left and said upper right, into two triangular domains by a segment which joins an upper left vertex and a lower right vertex;
(e) a judge means for judging whether said voltage command vector which has undergone oblique coordinate transformation is present in either said square-shape pattern domain or said triangular domain in said oblique coordinate system diagram which has been split into said domains;
(f) a select means for selecting said output vector corresponding to said square-shape pattern domain or said triangular domain according to results of said judgement; and
(g) a calculation means for calculating an output vector which is rotated through a specified angle as said selected output vector.

6. A controller for a power converter comprising a split power source in which a DC voltage source is split into at least n, n being an integer of 3 or more, units,
3 sets of series circuits, composed by connecting in series (2×n) self-extinguishing type switching elements which are connected in parallel with said DC voltage source and to each of which a diode is connected in anti-parallel, and having converted voltage output terminals which output voltages which are converted from the voltage of said DC voltage source from between a nth self-extinguishing type switching element and a (n+1)th self-extinguishing type switching element from a positive side of said DC voltage source, and connecting said converted voltage output terminals to an AC load, and being provided with:
means for providing a voltage command vector of an AC output voltage of said power converter;
a rotate means for providing all output vectors of said AC output voltages which said power converter can generate;
output vector selection means for selecting said output vectors according to said voltage command vector; and
control means for controlling conductive states of said self-extinguishing type switching elements according to said output vectors selected by said output vector selection device,
wherein a spatial vector diagram is split into 6 ranges: 30 degrees, 30 degrees to 90 degrees, 90 degrees 20 to 150 degrees, 150 degrees 210 degrees, 210 degrees to 270 degrees and 270 degrees to 330 degrees, and range numbers 0 to 5 are assigned to those 6 split ranges, said output vector selection means comprising:
(a) a means for calculating said range number in which said voltage command vector is present;
(b) a rotate means for rotating said voltage command vector through a specified angle;
(c) a coordinate convert means for performing coordinate transformation of said rotated voltage command vector to a vector in an oblique coordinate system which takes a first vector in the −30 degrees direction and a second vector in the 30 degrees direction of the rectangular coordinate system as two unit vectors;
(d) a split means for splitting a converter output-enabled portion of vector diagram, which has undergone oblique transformation, using said unit vectors, of the −30 degrees—+30 degrees range of said spatial vector diagram in which said output vector is positioned, into square-shape patterns so that said output vector is positioned either in an upper left, a lower right, or both said lower left and upper right of each square-shape pattern, and then splitting each square-shape pattern into two triangular domains by a segment which joins an upper left vertex and a lower right vertex;
(e) a judge means for judging whether said voltage command vector which has undergone oblique coordinate transformation is present in said triangular domain in said oblique coordinate system diagram which has been split into said domains; and
(f) a calculation means for calculating an output vector which is rotated through a specified angle as said selected output vector.

7. A controller for a power converter comprising a split power source in which a DC voltage source is split into at least n, n being an integer of 3 or more, units,
3 sets of series circuits, composed by connecting in series (2×n) self-extinguishing typeswitching elements which are connected in parallel with said DC voltage source and to each of which a diode is connected in anti-parallel, and having converted voltage output terminals which output voltages which are converted from the voltage of said DC voltage source from between a nth self-extinguishing type switching element and a (n+1) th self-extinguishing type switching element from a positive side of said DC voltage source, and connecting said converted voltage output terminals to an AC load, and being provided with:
a means for providing a voltage command vector of an AC output voltage of said power converter; a device which provides all the output vectors of the AC output voltages which the said power converter can generate; and
an output vector selection means for selecting said output vectors according to said voltage command vector; a control means for controlling conductive states of said self-extinguishing type switching elements according to said output vectors selected by said output vector selection means,
wherein a spatial vector diagram is split into 6 ranges: 30 degrees, 30 degrees to 90 degrees, 90 degrees 20 to 150 degrees, 150 degrees 210 degrees, 210 degrees to 270 degrees and 270 degrees to 330 degrees, and range numbers 0 to 5 are assigned to those 6 split ranges, said output vector selection means comprising:

said output vector selection means comprising:
- (a) a means for calculating said range number in 5 which said voltage command vector is present;
- (b) a coordinate convert means for performing coordinate transformation of said command vector to a vector in an oblique coordinate system which takes a vector in a first specified angular direction and a vector in a second specified angular direction as two unit vectors;
- (c) a split means for splitting a converter output enabled portion of said vector diagram, which has undergone oblique transformation, using said unit vectors, off 60-degree range in which said voltage command vector is present within a spatial vector diagram in which said output vector is positioned, into square-shape patterns so that said output vector is positioned either in an upper left, a lower right, or both said lower left and upper right of each square-shape pattern, and then splitting each square-shape pattern which holds said output vector in both said lower left and said upper right into two triangular domains by a segment which joins an upper left vertex and a lower right vertex;
- (d) a judge means for judging whether said voltage command vector which has undergone oblique coordinate transformation is present in either said square-shape pattern domain or said triangular domain in said oblique coordinate system diagram which has been split into the said domains; and
- (e) a select means for selecting said output vector corresponding to said square-shape pattern domain or a triangular domain according to results off said judgement.

8. A controller for a power converter comprising a split power source in which a DC voltage source is split into at least n, n being an integer of 3 or more, units, 3 sets of series circuits, composed by connecting in series (2×n) self-extinguishing type switching elements which are connected in parallel with said DC voltage source and to each of which a diode is connected in anti-parallel, and having converted voltage output terminals which output voltages which are converged from the voltage of said DC voltage source from between a nth self-extinguishing type switching element and a (n+1)th self-extinguishing type switching element from a positive side of said DC voltage source, and connecting said converted voltage output terminals to an AC load, and being provided with:

a means for providing a voltage command vector of an AC output voltage of said power converter; a device which provides all the output vectors of the AC output voltages which the said power converter can generate;

an output vector selection means for selecting said output vectors according to said voltage command vector; and a control means for controlling conductive states of said self-extinguishing type switching elements according to said output vectors selected by said output vector selection means, when a spatial vector diagram is split into 6 ranges: 30 degrees, 30 degrees to 90 degrees, 90 degrees 20 to 150 degrees, 150 degrees 210 degrees, 210 degrees to 270 degrees and 270 degrees to 330 degrees, and range numbers 0 to 5 are assigned to those 6 split ranges, said output vector selection means comprising:
- (a) a means for calculating said range number in is which said voltage command vector is present;
- (b) a coordinate convert means for performing coordinate transformation of said command vector to a vector in an oblique coordinate system which takes a vector in a first specified angular direction and a vector in a second specified angular direction as two unit vectors;
- (c) a split means for splitting a converter output-enabled portion of said vector diagram, which has undergone oblique transformation, using said unit vectors, of the 60-degree range in which said voltage command vector is present within the spatial vector diagram in which said output vector is positioned, into square-shape patterns so that said output vector is positioned either in an upper left, a lower right, or both said lower left and upper right of each square-shape pattern, and then splitting each square-shape pattern into two triangular domains by a segment which joins an upper left vertex and a lower right vertex;
- (d) a judge means judging whether said voltage command vector which has undergone oblique coordinate transformation is present in any triangular domain in said oblique coordinate system diagram which has been split into said domains; and
- (e) a select means for selecting said output vector corresponding to said triangular domain according to results of said judgement.

9. A controller for a power converter for controlling said power converter by being:

constructed from multiple converters, composed by bridge-connecting self-extinguishing type switching; elements, and multiple DC reactors, which smooth the DC currents of the said multiple converters, composed by connecting AC terminals of the said multiple converters to an AC load in common, and connecting the said multiple DC reactors in series with a positive terminal and negative terminal of each of said multiple converters, said controller for a power converter comprising:
a vector command means for providing a command vector for an AC output current of said power converter;

an output-enabled vector generating means for providing all output-enabled vectors of said AC output currents which said power converter can generate;

a selected vector memory means for storing said output vector last outputted by said power converter;

a domain-split vector diagram generating means for, when a domain-split vector diagram generating means creates a domain-split vector diagram that contains output-enabled vectors based on output-enabled vectors from said output-enabled vector generating means, creating said domain-split vector diagram such that said domain containing the last output vector stored in said selected vector memory means is enlarged;

a vector selecting means for discriminating in which domain of said domain-split vector diagram created by said domain-split vector diagram generating means said command vector from aid vector command means is contained, and selecting and outputting said output-enabled vector which corresponds to said domain in which said command vector is present; and a means for controlling a conductive state of said self-extinguishing type switching elements according to said output vector selected by said vector selecting device.

10. The controller for a power converter according to claim 9, wherein:
said domains of said domain-split vector diagram, which contain said output-enabled vectors, are regular hexagonal domains.

11. The controller for a power converter according to claim 9, wherein:
said domains of said domain-split vector diagram, which contain said output-enabled vectors, are rhombus domains.

12. A controller for a power converter for controlling sail power converter by being:
constructed from multiple converters, composed by bridge-connecting self-extinguishing type switching elements and multiple-transformers to primary sides of which AC outputs of the converters are connected,
composed by connecting the secondary terminals of said multiple transformers in common to an AC load, said controller for a power converter comprising:
a vector command means for providing a command vector for an AC output current of said power converter;
an output-enabled vector generating means providing all the output-enabled vectors of said AC output currents which said power converter can generate;
a selected vector memory means for storing said output vector last outputted by said power converter;
a domain-split vector diagram generating means for, when said domain-split vector diagram generating means creates a domain-split vector diagram that contains output-enabled vectors based on output-enabled vectors from said output-enabled vector generating means, creating said domain-split vector diagram such that said domain containing the last output vector stored in said selected vector memory means is enlarged;
a vector selecting means for discriminating in which domain of said domain-split vector diagram created by said domain-split vector diagram generating means said command vector from said vector command means is contained, and selecting and outputting said output-enabled vector which corresponds to said domain in which said command vector is present; and
a means for controlling a conductive state of said self-extinguishing type switching elements according to said output vector selected by said vector selecting means.

13. The controller for a power converter according to claim 12, wherein:
said domains of said domain-split vector diagram, which contain said output-enabled vectors, are hexagonal domains.

14. The controller for a power converter according to claim 12, wherein:
said domains of said domain-split vector diagram, which contain said output-enabled vectors, are rhombus domains.

15. The controller for a power converter according to claim 12, wherein:
said domains of said domain-split vector diagram, which contain said output-enabled vectors, are rhombus domains.

16. A controller for a power converter for controlling a multi-level output power converter which outputs multi-level voltages, comprising:
a vector command means for providing a command vector for an AC output current of said power converter;
an output-enabled vector generating means for providing all output-enabled vectors of said AC output currents which said power converter can generate;
a selected vector memory means for storing said output vector last outputted by said power converter;
a domain-split vector diagram generating means for, when said domain-split vector diagram generating means creates a domain-split vector diagram that contains output-enabled vectors based on output-enabled vectors from said output-enabled vector generating device, creating said domain-split vector diagram such that said domain containing the last output vector stored in said selected vector memory means is enlarged;
a vector selecting means for discriminating in which domain of said domain-split vector diagram created by said domain-split vector diagram generating means said command vector from said vector command device is contained, and selecting and outputting said output-enabled vector which corresponds to said domain in which said command vector is present; and
a means for controlling a conductive state of said self-extinguishing type switching elements according to said output vector selected by said vector selecting means.

17. The controller for a power converter according to claim 16, wherein:
said domains of said domain-split vector diagram, which contain said output-enabled vectors, are hexagonal domains.

18. A controller for a multi-level output power converter capable of outputting voltages at 4 levels or more, comprising:
a first calculate means for calculating a voltage command vector corresponding to the voltage which a power converter itself should output, based on an output current of said power converter itself;
a provide means for providing voltage actual vectors of voltages which said power converter itself is capable of outputting;
a select means for selecting said voltage actual value vector closest to said calculated voltage command vector; and
a second calculate means for calculating ON/OFF commands for said self-extinguishing elements which compose a main circuit of said power converter itself corresponding to said selected voltage actual vector.

19. A controller for multi-level output power convert according to claim 18, wherein:
said controller includes a multi-level output 3-phase power converter in which the bridge for 1 phase is composed of;
a split voltage source in which a DC voltage source is split into at least n, n being an integer of 3 or more, units;
a series circuit, composed by connecting in series (2×n) self-extinguishing elements which are connected in parallel with said DC voltage source and to each of which a diode is connected in anti-parallel, which outputs a voltage which is converted from the voltage of said DC voltage source from between the nth self-extinguishing element and the (n+1)th self-extinguishing element counting from the positive side of said DC voltage source;

at least (n−1) first clamp diodes of which the anode sides are connected to the negative sides of each split voltage source up to the (n−1)th spit voltage source from the positive side of said DC voltage source, and of which the cathode sides are respectively connected to the negative terminals of each self-extinguishing element up to the (n−1)th self-extinguishing element from the positive side of said DC voltage source; and (n−1) second clamp diodes of which the cathode sides are connected to the negative sides of each split voltage source to the (−1)th split voltage source from the positive side of said DC voltage source, and of which the cathode sides are respectively connected to the negative terminals of each self-extinguishing element between the n+1 )th self-extinguishing element and the (2n−1)th self-extinguishing element from the positive side of said DC voltage source.

20. A controller for multi-level output power convert according to claim 18, wherein; said controller includes a multi-level output 3-phase power converter, comprising:

taking unit converters composed of converters which convert AC to DC power by rectification, and unit inverters, which convert said DC to AC power, as cell inverters; and connecting a number of said cell inverters.

21. A controller for a multi-level output power converter capable of outputting voltages at 4 levels or more, comprising:

a first calculate means for calculating a voltage command vector corresponding to the voltage which a power converter itself should output, based on an output current of said power converter itself;

a means for splitting a plane, which takes the start point of said voltage actual vectors of the voltages which said power converter itself should output as its origin and in which each vector is represented by an end points of said voltage actual vectors, into domains which each contain said end point of one said voltage actual vector, and, when said end point of said voltage command vector is contained in any of those split domains, selecting said actual voltage vector indicated by said end point being contained in that domain as the voltage actual vector of the voltage which said power converter itself actually outputs; and a second calculate means for calculating ON/OFF commands for said self-extinguishing elements which compose a main circuit of said power converter itself corresponding to said selected voltage actual vector.

22. A controller for multi-level output power convert according to claim 21, wherein:

said controller includes a multi-level output 3-phase power converter in which the bridge for 1 phase is composed of;

a split voltage source in which a DC voltage source is split into at least n, n being an integer of 3 or more, units;

a series circuit, composed by connecting in series (2×n) self-extinguishing elements which are connected in parallel with said DC voltage source and to each of which a diode is connected in anti-parallel, which outputs a voltage which is converted from the voltage of said DC voltage source from between the nth self-extinguishing element and the (n+1)th self-extinguishing element counting from the positive side of said DC voltage source;

at least (n−1) first clamp diodes of which the anode sides are connected to the negative sides of each split voltage source up to the (n−1)th split voltage source from the positive side of said DC voltage source, and of which the cathode sides are respectively connected to the negative terminals of each self-extinguishing element from the positive side of said DC voltage source; and (n−1) second clamp diodes of which the cathode sides are connected to the negative sides of each split voltage source up to the (n−1)th split voltage source from the positive side of said DC voltage source, and of which the cathode sides are respectively connected to the negative terminals of each self-extinguishing element between the (n+1)th self-extinguishing element and the (2n−1)th self-extinguishing element from the positive side of said DC voltage source.

23. A controller for multi-level output power convert according to claim 21, wherein:

said controller includes a multi-level output 3-phase power converter, comprising taking unit converters composed of the converters, which convert AC to DC power by rectification, and unit inverters, which convert said DC to AC power, as cell inverters; and connecting a number of said cell inverters.

24. A controller for a multi-level output power converter capable of outputting voltages at 4 levels or more, comprising:

a first calculate means for calculating a voltage command vector corresponding to the voltage which a power converter itself should output, based on the output current of said power converter itself;

a means for splitting a plane, which takes the start point of said voltage actual vectors of the voltages which said power converter itself should output as its origin and in which each vector is represented by the end points of said voltage actual vectors, into regular hexagonal domains which each contain the end point of one said voltage actual vector, and, when the end point of said voltage command vector is contained in any of those split domains, selecting said actual voltage vector indicated by said end point being contained in that domain as the voltage actual vector of the voltage which said power converter itself actually outputs; and a second calculate means for calculating a ON/OFF commands for said self-extinguishing elements which compose a main circuit of said power converter itself according to said selected voltage actual vector.

25. A controller for multi-level output power convert according to claim 24, wherein:

said controller includes a multi-level output 3-phase power converter in which the bridge for 1 phase is composed of;

a split voltage source in which a DC voltage source is split into at least n, n being an integer of 3 or more, units;

a series circuit, composed by connecting in series (2×n) self-extinguishing elements which are connected in parallel with said DC voltage source and to each of which a diode is connected in anti-parallel, which outputs a voltage which is converted from the voltage of said DC voltage source from between the nth self-extinguishing element and the (n+1)th self-extinguishing element counting from the positive side of said DC voltage source;

at least (n−1) first clamp diodes of which the anode sides are connected to the negative sides of each split voltage source up to the (n−1)th split voltage source from the positive side of said DC voltage source, and of which the cathode sides are respectively connected to the negative terminals of each self-extinguishing element from the positive side of said DC voltage source; and (n−1) second clamp diodes of which the cathode sides are connected to the negative sides of each split voltage source up to the (n−1)th split voltage source from the positive side of said DC voltage source, and of which the cathode sides are respectively connected to the negative terminals of each self-extinguishing element between the (n+1)th self-extinguishing element and the (2n−1)th self-extinguishing element from the positive side of said DC voltage source.

26. A controller for multi-level output power convert according to claim 24, wherein:

said controller includes a multi-level output 3-phase power converter, comprising taking unit converters composed of the converters, which convert AC to DC power by rectification, and unit inverters, which convert said DC to AC power, as cell inverters; and connecting a number of said cell inverters.

27. A controller for a multi-level output power converter capable of outputting voltages at 4 levels or more, comprising:

a first calculate means for calculating a voltage command vector corresponding to the voltage which a power converter itself should output, based on the output current of said power converter itself;

a means for splitting a plane, winch takes the start point of the voltage actual vectors of the voltages which said power converter itself should output as its origin and in which each vector is represented by the end points of said voltage actual vectors, into 6 sections in the directions of 6 types of voltage vector which the said power converter itself is capable of generating, and, using straight lines parallel to two types of voltage vector in adjacent sections, then splitting said 6 sections into rhombiform domains which each contain the end point of one said voltage actual vector, and, when an end point of said voltage command vector is contained in any of those split domains, selecting said actual voltage vector indicated by said end point being contained in that domain as the voltage actual vector of the voltage which said power converter itself actually outputs; and a second calculate means for calculating ON/OFF commands for said self-extinguishing elements which compose a main circuit of said power converter itself corresponding to said selected voltage actual vector.

28. A controller for multi-level output power convert according to claim 27, wherein:

said controller includes a multi-level output 3-phase power converter in which the bridge for 1 phase is composed of;

a split voltage source in which a DC voltage source is split into at least n, n being an integer of 3 or more, units;

a series circuit, composed by connecting in series (2×n) self-extinguishing elements which are connected in parallel with said DC voltage source and to each of which a diode is connected in anti-parallel, which outputs a voltage which is converted from the voltage of said DC voltage source from between the nth self-extinguishing element and the (n+1)th self-extinguishing element counting from the positive side of said DC voltage source;

at least (n−1) first clamp diodes of which the anode sides are connected to the negative sides of each split voltage source up to the (n−1)th split voltage source from the positive side of said DC voltage source, and of which the cathode sides are respectively connected to the negative terminals of each self-extinguishing element from the positive side of said DC voltage source; and (n−1) second clamp diodes of which the cathode sides are connected to the negative sides of each split voltage source up to the (n−1)th split voltage source from the positive side of said DC voltage source, and of which the cathode sides are respectively connected to the negative terminals of each self-extinguishing element between the (n+1)th self-extinguishing element and the (2n−1)th self-extinguishing element from the positive side of said DC voltage source.

29. A controller for multi-level output power convert according to claim 27, wherein:

said controller includes a multi-level output 3-phase power converter, comprising taking unit converters composed of the converters, which convert AC to DC power by rectification, and unit inverters, which convert said DC to AC power, as cell inverters; and connecting a number of said cell inverters.

* * * * *